Dec. 25, 1962 L. D. AMDAHL ETAL 3,070,304

ARITHMETIC UNIT FOR DIGITAL CONTROL SYSTEMS

Filed April 12, 1957 32 Sheets-Sheet 1

INVENTORS
LOWELL D. AMDAHL
ROBERT C. DOUTHITT
HOWARD L. ENGEL
JAMES D. HOGAN

BY

ATTORNEY

INVENTORS.
LOWELL D. AMDAHL
ROBERT C. DOUTHITT
HOWARD L. ENGEL
JAMES D. HOGAN
BY [signature]
ATTORNEY

ARITHMETIC UNIT FOR DIGITAL CONTROL SYSTEMS

| FIG. 3a. | FIG. 3b. | FIG. 3c. |
|---|---|---|
| | | FIG. 3d. |

INVENTORS.
LOWELL D. AMDAHL
ROBERT C. DOUTHITT
BY HOWARD L. ENGEL
JAMES D. HOGAN

[signature]
ATTORNEY

ARITHMETIC UNIT FOR DIGITAL CONTROL SYSTEMS

Filed April 12, 1957 32 Sheets-Sheet 4

INVENTORS.
LOWELL D. AMDAHL
ROBERT C. DOUTHITT
BY HOWARD L. ENGEL
JAMES D. HOGAN
ATTORNEY

ARITHMETIC UNIT FOR DIGITAL CONTROL SYSTEMS

INVENTORS.
LOWELL D. AMDAHL
ROBERT C. DOUTHITT
HOWARD L. ENGEL
JAMES D. HOGAN
BY
ATTORNEY

ARITHMETIC UNIT FOR DIGITAL CONTROL SYSTEMS

Filed April 12, 1957

32 Sheets-Sheet 7

INVENTORS.
LOWELL D. AMDAHL
ROBERT C. DOUTHITT
HOWARD L. ENGEL
JAMES D. HOGAN

BY

ATTORNEY

Dec. 25, 1962 L. D. AMDAHL ETAL 3,070,304

ARITHMETIC UNIT FOR DIGITAL CONTROL SYSTEMS

Filed April 12, 1957 32 Sheets-Sheet 8

(d) TO "e" TRANSFER

INVENTORS.
BY LOWELL D. AMDAHL
ROBERT C. DOUTHITT
HOWARD L. ENGEL
JAMES D. HOGAN

ATTORNEY

Ad, Su, Ca AND Cm
WITHOUT PROGRAM TRANSFER

INVENTORS.
LOWELL D. AMDAHL
ROBERT C. DOUTHITT
HOWARD L. ENGEL
JAMES D. HOGAN
BY
ATTORNEY

MULTIPLICATION

INVENTORS.
LOWELL D. AMDAHL
ROBERT C. DOUTHITT
HOWARD L. ENGEL
JAMES D. HOGAN
BY [signature]
ATTORNEY

ARITHMETIC UNIT FOR DIGITAL CONTROL SYSTEMS

Filed April 12, 1957

32 Sheets-Sheet 11

MULTIPLICATION
TIMING AND OPERATION
Wt1

INVENTORS.
LOWELL D. AMDAHL
ROBERT C. DOUTHITT
HOWARD L. ENGEL
JAMES D. HOGAN

BY [signature]

ATTORNEY

MULTIPLICATION
TIMING AND OPERATION
Wt2

INVENTORS.
BY LOWELL D. AMDAHL
ROBERT C. DOUTHITT
HOWARD L. ENGEL
JAMES D. HOGAN
ATTORNEY

ARITHMETIC UNIT FOR DIGITAL CONTROL SYSTEMS

Filed April 12, 1957 32 Sheets-Sheet 13

DIVISION OR ROOT

D+R = X7X6

INVENTORS.
LOWELL D. AMDAHL
ROBERT C. DOUTHITT
HOWARD L. ENGEL
JAMES D. HOGAN

BY

ATTORNEY

DIVISION TIMING AND OPERATION

Wt1 - Wt4

INVENTORS.
LOWELL D. AMDAHL
ROBERT C. DOUTHITT
HOWARD L. ENGEL
JAMES D. HOGAN
BY
ATTORNEY

DIVISION TIMING AND OPERATION
Wt17 - Wt20

INVENTORS.
BY LOWELL D. AMDAHL
ROBERT C. DOUTHITT
HOWARD L. ENGEL
JAMES D. HOGAN
ATTORNEY

SQUARE ROOT TIMING AND OPERATION

Wt1 - Wt4

INVENTORS.
BY LOWELL D. AMDAHL
ROBERT C. DOUTHITT
HOWARD L. ENGEL
JAMES D. HOGAN
[signature]
ATTORNEY

ARITHMETIC UNIT FOR DIGITAL CONTROL SYSTEMS

Filed April 12, 1957 32 Sheets-Sheet 17

| SX2 | SX1 | S21 | S2 | S1 | C20 | C19 | C3 | C2 | Y70 | C21 | CX1 | M2 | AX2 | A2 | A20 | M5 | |
|---|---|---|---|---|---|---|---|---|---|---|---|---|---|---|---|---|---|
| 0 | | 0-20 | 0-21 | 1-21 | 0-19 | 1-18 | 0 | 0 | 1-20 | 1 | | | | 1-6 | 0 | | Wt17 T12 = 1 |
| 1 | | 0-20 | 0 | 1-21 | 0-19 | 1-18 | . | . | 1-20 | 0 | | | | 0-5 | . | 1 | |
| 2 | | 0-20 | 0-1 | 1-21 | 1-20 | 0-19 | 0 | . | 0 | . | | | | . | . | 0 | |
| 3 | | 1-21 | 0-2 | 0-2 | 0 | 1-20 | 1-4 | 0 | 0 | . | | | | . | . | . | |
| 4 | | 0-2 | 0-3 | 0-3 | 0 | 0 | 0-5 | 1-4 | 1-3 | . | | | | . | . | . | |
| 5 | | 0-3 | 0-4 | 1-4 | 1-3 | 0 | 1-6 | 0-5 | 1-4 | 0 | | | | . | . | . | |
| 6 | | 1-4 | 1-5 | 1-5 | 1-4 | 1-3 | 1-7 | 1-6 | 0-5 | 0 | | | | . | . | . | |
| . | | . | . | . | . | . | . | . | . | . | | | | . | . | . | |
| . | | . | . | . | . | . | . | . | . | . | | | | . | . | . | |
| 17 | | 1-15 | 1-16 | 1-16 | 1-15 | 1-14 | 1-18 | 1-17 | 1-16 | 0 | | | | . | . | . | |
| 18 | | 1-16 | 0-17 | 1-17 | 1-16 | 1-15 | 0-19 | 1-18 | 1-17 | 1 | | | | . | . | . | |
| 19 | | 0-17 | 1-18 | 0-18 | 1-17 | 1-16 | 1-20 | 0-19 | 1-18 | 1 | | | | . | . | . | |
| 20 | | 0-18 | 1-19 | 0-19 | 1-18 | 1-17 | 0 | 1-20 | 0-19 | 1 | | | | . | . | . | |
| 21 | | 1-19 | 0-20 | 0-20 | 0-19 | 1-18 | 0 | 0 | 1-20 | 1 | | | | . | . | . | |
| 0 | | 0-20 | 1-21 | 0-21 | 0-19 | 1-18 | 0 | 0 | 0-20 | 1 | | | | 0-5 | 0 | . | Wt18 T12 = 1 |
| 1 | | 0-20 | 0 | 0-21 | 0-19 | 1-18 | 0 | . | 0-20 | 1 | | | | 1-4 | . | 0 | |
| 2 | | 0-20 | 0-1 | 0-21 | 1-20 | 0-19 | 1-3 | 0 | 1 | . | | | | . | . | 1 | |
| 3 | | 0-21 | 0-2 | 0-2 | 0 | 1-20 | 1-4 | 0-3 | 0-2 | . | | | | . | . | | |
| 4 | | 0-2 | 0-3 | 1-3 | 1-2 | 0 | 0-5 | 1-4 | 1-3 | 0 | | | | . | . | | |
| 5 | | 1-3 | 1-4 | 1-4 | 0-3 | 1-2 | 1-6 | 0-5 | 0-4 | 0 | | | | . | . | | |
| 6 | | 1-4 | 1-5 | 1-5 | 1-4 | 0-3 | 1-7 | 1-6 | 1-5 | 0 | | | | . | . | | |
| . | | . | . | . | . | . | . | . | . | . | | | | . | . | | |
| . | | . | . | . | . | . | . | . | . | . | | | | . | . | | |
| 17 | | 1-15 | 1-16 | 1-16 | 1-15 | 1-14 | 1-18 | 1-17 | 0-16 | 0 | | | | . | . | | |
| 18 | | 1-16 | 0-17 | 1-17 | 1-16 | 1-15 | 0-19 | 1-18 | 0-17 | 0 | | | | . | . | | |
| 19 | | 1-17 | 0-18 | 0-18 | 1-17 | 1-16 | 1-20 | 0-19 | 0-18 | 0 | | | | . | . | | |
| 20 | | 0-18 | 1-19 | 0-19 | 1-18 | 1-17 | 0 | 1-20 | 1-19 | 0 | | | | . | . | | |
| 21 | | 0-19 | 0-20 | 0-20 | 0-19 | 1-18 | 1-2 | 0 | 0-20 | 1 | | | | . | . | | |
| 0 | | 0-20 | 0-21 | 1-21 | 0-19 | 1-18 | 1-2 | 0 | 1-20 | 0 | | | | 1-4 | 0 | | Wt19 T12 = 1 |
| 1 | | 0-20 | 0 | 1-21 | 0-19 | 1-18 | 1-2 | 0 | 1-20 | 0 | | | | 0-3 | 1 | 1 | |
| 2 | | 0-20 | 0-1 | 1-21 | 1-20 | 0-19 | 0-3 | 1-2 | 1-1 | 0 | | | | . | | 0 | |
| 3 | | 1-21 | 0-2 | 1-2 | 0 | 1-20 | 1-4 | 0-3 | 1-2 | 0 | | | | . | | . | |
| 4 | | 0 | 1-3 | 1-3 | . | 0 | 0-5 | 1-4 | 0-3 | 0 | | | | . | | . | |
| 5 | | . | 1-4 | 1-4 | . | . | 1-6 | 0-5 | 1-4 | 0 | | | | . | | . | |
| 6 | | . | 1-5 | 0-5 | . | . | 1-7 | 1-6 | 0-5 | 1 | | | | . | | . | |
| . | | . | . | . | . | . | . | . | . | . | | | | . | | . | |
| . | | . | . | . | .. | . | . | . | . | . | | | | . | | . | |
| 17 | | . | 1-16 | 0-16 | . | . | 1-18 | 1-17 | 1-16 | 1 | | | | . | | . | |
| 18 | | . | 1-17 | 1-17 | . | . | 0-19 | 1-18 | 1-17 | 1 | | | | . | | . | |
| 19 | | . | 0-18 | 1-18 | . | . | 1-20 | 0-19 | 1-18 | 1 | | | | . | | . | |
| 20 | | . | 0-19 | 0-19 | . | . | 0 | 1-20 | 0-19 | 1 | | | | . | | . | |
| 21 | | . | 0-20 | 1-20 | . | . | 0 | 0 | 1-20 | 0 | | | | . | | . | |
| 0 | | 0 | 1-21 | 1-21 | 0 | 0 | 0 | 0 | 0 | 0 | | | | 0-3 | 1 | 0 | Wt20 T13 = 1 |
| 1 | | 0 | 1-1 | Y71 | . | . | . | . | . | . | | | | 0-2 | . | . | |
| 2 | | 1-20 . . . | 0-2 | 1-1 | . | . | . | . | . | . | | | | . | . | . | |
| 3 | | 0 | 0-3 | 0-2 | . | . | . | . | . | . | | | | . | Sa | . | |
| 4 | | . | 1-4 | 0-3 | . | . | . | . | . | . | | | | . | . | . | |
| 5 | | . | 0-5 | 1-4 | . | . | . | . | . | . | | | | . | . | . | |
| 6 | | . | 1-6 | 0-5 | . | . | . | . | . | . | | | | . | . | . | |
| . | | . | . | . | . | . | . | . | . | . | | | | . | . | . | |
| . | | . | . | . | . | . | . | . | . | . | | | | . | . | . | |
| 17 | | . | 1-17 | 1-16 | . | . | . | . | . | . | | | | . | "a" | . | |
| 18 | | . | 1-18 | 1-17 | . | . | . | . | . | . | | | | . | . | . | |
| 19 | | . | 0-19 | 1-18 | . | . | . | . | . | . | | | | . | . | . | |
| 20 | | . | 1-20 | 0-19 | . | . | . | . | . | . | | | | . | . | . | |
| 21 | | . | 0 | 1-20 | 0 | . | 0 | 0 | 0 | 0 | | | | Sa | . | . | |

TRIPLET INSERTION

TRIPLET INSERTION

TRIPLET INSERTION

FORCED ROUND SIGN INSERTION

TRIPLET INSERTION

TRIPLET CLEAR

ZERO CLEAR

PARALLEL ENTRY

ZERO CLEAR

INVENTORS.
LOWELL D. AMDAHL
ROBERT C. DOUTHITT
BY HOWARD L. ENGEL
JAMES D. HOGAN
[signature]
ATTORNEY

SQUARE ROOT TIMING AND OPERATION

Wt17 - Wt20

FIG. 7d.

Dec. 25, 1962 L. D. AMDAHL ET AL 3,070,304
ARITHMETIC UNIT FOR DIGITAL CONTROL SYSTEMS
Filed April 12, 1957 32 Sheets-Sheet 18
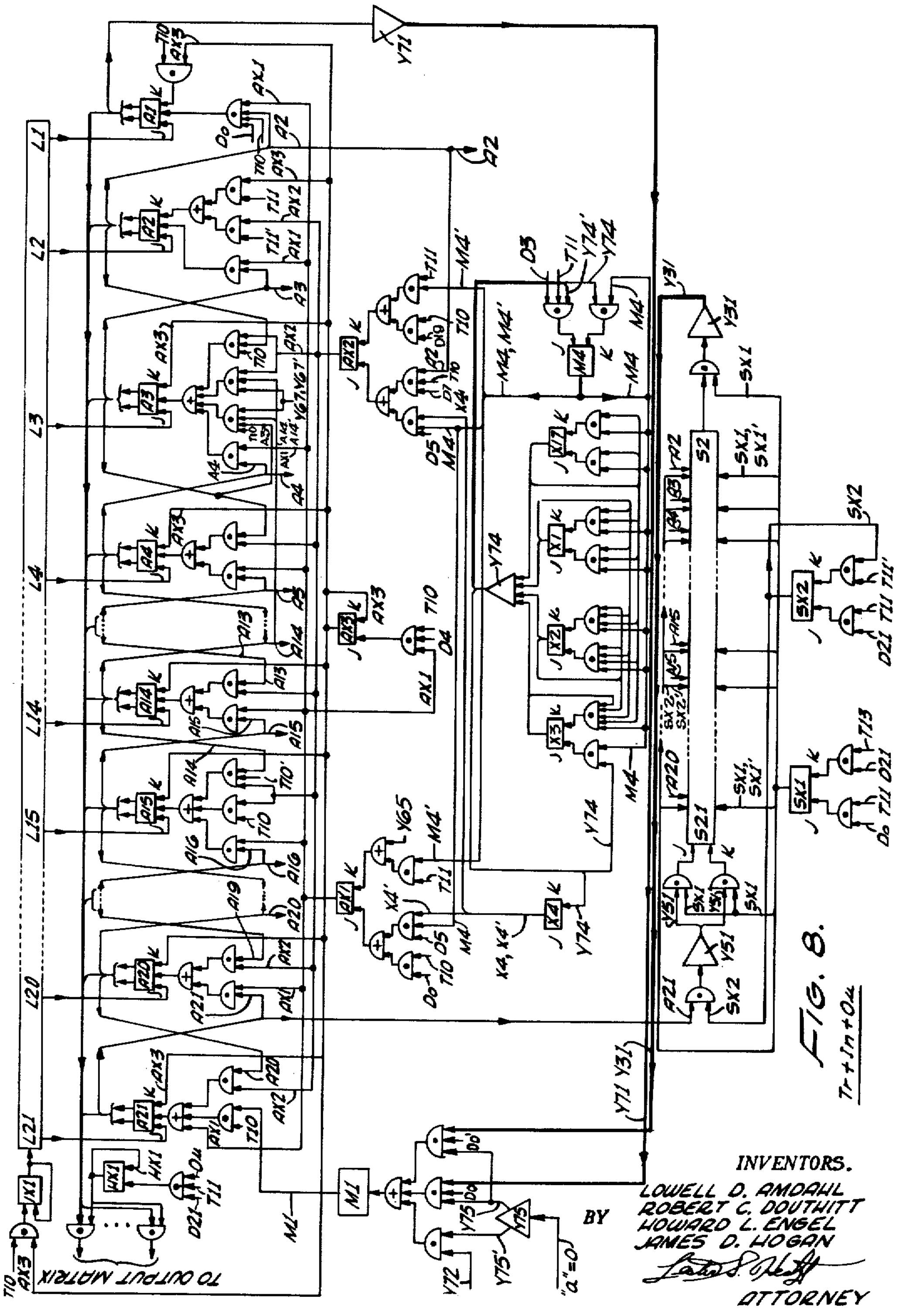
FIG. 8. Tr+In+Ou
INVENTORS.
LOWELL D. AMDAHL
ROBERT C. DOUTHITT
HOWARD L. ENGEL
JAMES D. HOGAN
BY [signature]
ATTORNEY Tr, In AND Ou INVENTORS.
LOWELL D. AMDAHL
ROBERT C. DOUTHITT
HOWARD L. ENGEL
JAMES D. HOGAN
BY [signature]
ATTORNEY

ARITHMETIC UNIT FOR DIGITAL CONTROL SYSTEMS

Filed April 12, 1957 32 Sheets-Sheet 20

Tr, In AND Ou

INVENTORS.
LOWELL D. AMDAHL
ROBERT C. DOUTHITT
BY HOWARD L. ENGEL
JAMES D. HOGAN
ATTORNEY

ARITHMETIC UNIT FOR DIGITAL CONTROL SYSTEMS

Filed April 12, 1957 32 Sheets-Sheet 21

INVENTORS
LOWELL D. AMDAHL
ROBERT C. DOUTHITT
HOWARD L. ENGEL
JAMES D. HOGAN
BY
ATTORNEY

ARITHMETIC UNIT FOR DIGITAL CONTROL SYSTEMS

Filed April 12, 1957 32 Sheets-Sheet 22

INVENTORS.
LOWELL D. AMDAHL
ROBERT C. DOUTHITT
HOWARD L. ENGEL
JAMES D. HOGAN
BY
ATTORNEY

ARITHMETIC UNIT FOR DIGITAL CONTROL SYSTEMS

Filed April 12, 1957 32 Sheets-Sheet 23

INVENTORS.
LOWELL D. AMDAHL
ROBERT C. DOUTHITT
BY HOWARD L. ENGEL
JAMES D. HOGAN
[signature]
ATTORNEY

ARITHMETIC UNIT FOR DIGITAL CONTROL SYSTEMS

TIMING AND SEQUENCE CONTROL CIRCUITS

INVENTORS.
LOWELL D. AMDAHL
ROBERT C. DOUTHITT
HOWARD L. ENGEL
JAMES D. HOGAN

BY

ATTORNEY

INVENTORS:
LOWELL D. AMDAHL
ROBERT C. DOUTHITT
HOWARD L. ENGEL
JAMES D. HOGAN
BY
ATTORNEY

ARITHMETIC UNIT FOR DIGITAL CONTROL SYSTEMS

Filed April 12, 1957 32 Sheets-Sheet 26

INVENTORS.
LOWELL D. AMDAHL
ROBERT C. DOUTHITT
HOWARD L. ENGEL
JAMES D. HOGAN
BY
ATTORNEY

INVENTORS.
LOWELL D. AMDAHL
ROBERT C. DOUTHITT
BY HOWARD L. ENGEL
JAMES D. HOGAN
ATTORNEY

ARITHMETIC UNIT FOR DIGITAL CONTROL SYSTEMS

| | X3 | X2 | X1 |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

INVENTORS.
LOWELL D. AMDAHL
ROBERT C. DOUTHITT
HOWARD L. ENGEL
JAMES D. HOGAN
BY [signature]
ATTORNEY

ARITHMETIC UNIT FOR DIGITAL CONTROL SYSTEMS

Filed April 12, 1957 32 Sheets-Sheet 29

READING AMPLIFIER AND CONTROL CIRCUIT.

WRITING AMPLIFIER AND CONTROL CIRCUIT

INVENTORS.
LOWELL D. AMDAHL
ROBERT C. DOUTHITT
HOWARD L. ENGEL
JAMES D. HOGAN
BY
ATTORNEY

ARITHMETIC UNIT FOR DIGITAL CONTROL SYSTEMS

MANUAL CONTROL

INVENTORS.
LOWELL D. AMDAHL
ROBERT C. DOUTHITT
HOWARD L. ENGEL
JAMES D. HOGAN
BY [signature]
ATTORNEY

MANUAL AND TEST CONTROL OPERATION

INVENTORS.
LOWELL D. AMDAHL
ROBERT C. DOUTHITT
HOWARD L. ENGEL
JAMES D. HOGAN
BY
ATTORNEY

Dec. 25, 1962 L. D. AMDAHL ETAL 3,070,304

ARITHMETIC UNIT FOR DIGITAL CONTROL SYSTEMS

Filed April 12, 1957 32 Sheets-Sheet 32

MANUAL AND TEST CONTROL OPERATION

INVENTORS.
LOWELL D. AMDAHL
ROBERT C. DOUTHITT
BY HOWARD L. ENGEL
JAMES D. HOGAN

ATTORNEY

United States Patent Office 3,070,304
Patented Dec. 25, 1962

3,070,304
ARITHMETIC UNIT FOR DIGITAL CONTROL SYSTEMS

Lowell D. Amdahl, Redondo Beach, Robert C. Douthitt, El Cerrito, and Howard L. Engel and James D. Hogan, Rolling Hills, Calif., assignors, by mesne assignments, to Thompson Ramo Wooldridge Inc., Cleveland, Ohio, a corporation of Ohio Filed Apr. 12, 1957, Ser. No. 652,407
47 Claims. (Cl. 235—157)

This invention relates to arithmetic units for digital control systems and, more particularly, to a high-speed, serial-parallel arithmetic or control system wherein the command and computational structure is arranged to allow an efficient handling of the typical automation problem. In further particular, the invention relates to arithmetic and other logical control circuits for a system wherein input information must be processed to develop output control signals in accordance with a predetermined set of automatic control parameters.

Except for special circumstances, the prior art has developed only two general types of arithmetic units. The first of these is referred to as the general purpose or scientific computer and is adapted to handle problems of the iterative nature where, for example, an integration is performed as the summation of ordinate values over discrete intervals.

The other general class of arithmetic units is referred to as the business machine and is especially adapted to handle accounting problems where the internal process may be very simple, but the machine must be capable of handling a large amount of input and output data from a large variety of sources.

While these machines are suitable for their respective operations, they are not readily adapted to the usual automation problem. In the first place, the machines are large and costly and cannot be employed economically unless a considerable number of different problems may be handled. Thus a large-scale scientific computer would not be purchased to control the operation of a small automatic machine, although this computer could be employed to determine certain control parameters which would then be applied to the machine by a different unit.

But the size and cost of these machines is not the only undesirable factor. They have not been designed for the automation problem and, consequently, may not have the requisite speed for the operations which are the most frequent. Thus the typical high-speed scientific computer presently available may be lacking in the required multiplication speed, considering all operand access time and read-out time and, consequently, may be too slow for certain automation applications.

Smaller and less expensive scientific and business machines have been devised which are generally of the serial memory type, but these machines are even more limited in speed although the size and cost may be low enough to employ such machines for the smaller automation control problem.

The reason these machines have been limited in speed is best illustrated by way of a particular example. The notation employed in this example will also be utilized throughout this specification so as to show the particular improvement of the invention where applicable.

In general, the definitions employed herein are consistent with those found in the Proceedings of the I.R.E., March 1950, page 271. As indicated in the I.R.E. definitions, a "word" is "an ordered set of characters having a meaning and considered as a unit." In the present case, the characters are binary digits and each word has a fixed number of binary digits, such as 21. The term "word" may also be utilized herein to specify a predetermined interval corresponding to the time required to represent a digital quantity as a succession of digits generated serially. A word-time interval may also be referred to hereafter and corresponds to that serial interval which is required to generate a series of signals representing a particular digital quantity.

In a serial computer, the instruction is also coded serially and generally occupies a word position. The term "command word" will be employed hereafter as synonymous with "instruction," although this does not correspond directly to the I.R.E. definition.

The location of a command word is generally specified in a digital computer in terms of a memory position, which may be a channel on a magnetic drum, and in terms of the time or words which must pass before the particular command word is available.

Each command word, then, in addition to including information specifying the next command and the time to wait before reading this command, also must specify the particular operation which is to be performed. The portion of the command specifying this operation is designated herein as the operation code.

In a typical prior art serial machine, a command word comprises four parts as follows:

(1) The memory address or location of the next instruction or command word to be read—referred to hereinafter as "*n*."
(2) The time or words to wait before the particular command word is next to be picked up. This wait time is referred to hereinafter as "*w*."
(3) The address of the operand which is to be handled during the present operation—referred to hereinafter as "*a*." The operand located at this address will be referred to as operand (*a*).
(4) The particular operation which is to be performed upon operand (*a*), designated as an operation code "*f*."

The above type of instruction or command word may be considered to be based upon a "floating reference." This terminology is employed since the reference point is the end of a previous operation plus any waiting period specified by the code "*w*." Since the operation lengths vary, the reference point is thus "floating." It will be understood, therefore, in the discussion which follows that the designation of an address in memory does not completely locate the information desired since the waiting time "*w*" must also be specified.

In the earlier usage of this type of command word, nine successive word-time intervals of operation were required in order to perform a simple subtraction, as is indicated by the following outline of procedure:

I. Bring in the Minuend from Memory
  (1) First word time—read in command word.
  (2) Second word time—transfer operand to "A" register.
  (3) Third word time—add operand to "B" register (cleared) to effect transfer.
II. Bring in Subtrahend
  (1) Fourth word time—read in command.
  (2) Fifth word time—transfer second operand to "A" register.
III. Subtract
  (1) Sixth word time—read in command.
  (2) Seventh word time—perform subtraction.
IV. Transfer Result to Memory
  (1) Eighth word time—read in command.
  (2) Ninth word time—effect transfer.

In later developments of the prior art, proposals have been made for reducing the operational time to five words by performing certain of the read-in and read-out operations simultaneously as indicated by the second outline which follows. To date, however, these proposals have not materialized in the form of an economical and efficient machine for automation.

I. Bring in the Minuend from Memory
  (1) First word time—read in command.
  (2) Second word time—transfer first operand to "A" register.
  (3) Third word time—
    a. Add operand to "B" register (cleared) to effect transfer; and
    b. Simultaneously bring in second operation code for Subtrahend transfer.
II. Bring in Subtrahend
  (1) Fourth word time—
    a. Transfer second operand to "A" register; and
    b. Simultaneously bring in third operation code to subtract.
III. Subtract
  (1) Fifth word time—
    a. Perform subtraction and
    b. Simultaneously bring in first order for next operation.

Prior to the present invention then, it became apparent that the conventional command and arithmetic structure of machines which were of a suitable size and cost for the automation problem were not fast enough for the controls required.

Accordingly, the present invention has been developed to provide an efficient command and arithmetic structure so as to reduce the time between the first receipt of an input signal and the formulation of the required control signal as specified by the automation parameters.

In accordance with one of the basic concepts of the invention, the command words are advanced in time relationship to the arithmetic words and the *"a"* address is made the first part of a command word so that it becomes available before the following arithmetic word. This, then, allows the corresponding (*a*) operand to be entered into an "A" register during the time that the remainder of a command is being read.

The next improvement of the invention to be discussed is best understood by returning again to a consideration of the prior art command. Typically this command appeared in the form:

*/f,* and *a/w/n/* and was read in serially from right to left so that the next channel address *"n"* was read first, *"w"* next, and then *"f"* and *"a,"* which may be designated in a single code. The important thing to note here is that the command portions *"n"* and *"w"* were always carried as part of the command.

One of the important concepts of the present invention, on the other hand, lies in the separation of the usual arithmetic commands and those commands requiring the channel address change or waiting intervals. It will be shown below that it is possible to perform a continuous series of arithmetic operations, such as addition, subtraction, comparison, and multiplication without channel transfers being required, successive command words being located immediately following each previous operation. Thus, in a particular illustration, it is shown that the majority of arithmetic operations may be performed during two word time intervals so that, for example, the selection of a 63 word serial memory makes it possible to read all of the 63 command words during two successive memory cycles, thus obviating the necessity of a channel transfer operation with its programming complexity and delay.

The usual arithmetic command word, according to the present invention, appears as follows:

*/e/d/c/b/f/a/*

In this command the new terms *"b," "c," "d,"* and *"e"* are defined as follows:

(1) *"b"* is the address of the second operand which is to be handled along with (*a*) in accordance with the operation code *"f."* This operand will be referred to as (*b*).
(2) *"c"* is the address to which the result of the operation upon (*a*) and (*b*) is to go. This result operand will be referred to herein as (*r*).
(3) The *"d"* and *"e"* addresses relate to a transfer operation which occurs during the performance of the usual arithmetic process and are discussed further below.

It will now be shown that the command arrangement of the present invention allows a two-word arithmetic operation including the time required to bring in operands and read out the results. This is most clearly shown in the form of an outline as follows:

—*"a"* address entered at end of previous operation
I. Bring in (*a*) operand
  (1) First word time—referred to as W*t*0.
    a. Enter (*a*) operand and
    b. Simultaneously read in remainder of command.
II. Bring in (*b*) operand and perform operation specified by command word entered in W*t*0.
  (1) Second word time—referred to as W*t*1.
    a. Read in (*b*) and perform operation specified by code *"f"* on (*a*) and (*b*).
III. Complete operation upon (*b*) and (*a*) and transfer result (*r*) to memory
  (1) Third word time—referred to as W*t*2 or W*t*0; this may be the beginning of the next operation.
    a. Transfer (*r*) to *"c"* address is formed.
    b. Enter *"a"* address for new operation at end of word.

The operation timing specified by this outline can be shown in a time diagram as follows:

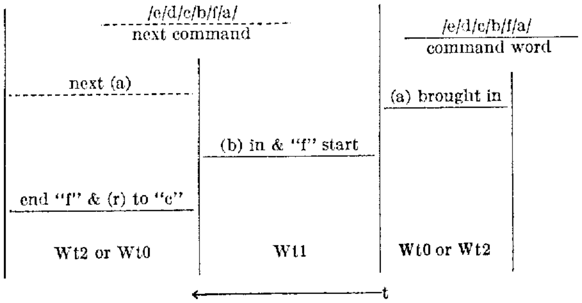

The convention of showing time as running from right to left is adopted so that serial numbers, appearing in time with the least significant digits first, will be shown graphically in a conventional arithmetical mode where the most significant digits are shown at the left.

From the above discussion, it can be seen that the invention provides an efficient time sharing of various arithmetic phases whereby operands are brought in and results are read out without wasting computational time.

An important part of the two-word operation contemplated by the invention is the ability to perform serial-parallel multiplication in synchronous timing with other two-word operations, such as addition, subtraction, algebraic and magnitude comparison. While high-speed multiplication schemes have been previously devised, these schemes have generally not integrated the multiplication circuits effectively. A typical arrangement which is known is found in the "whiffletree" multiplier described in an article entitled "Digital Computer For Use in Operational Flight Trainer" in the I.R.E. Transactions of Electronic Computers, volume EC-4, No. 2, June 1955.

The multiplier circuits shown in this article are not employed for other arithmetic processes so that most, if not all, of the equipment introduced to attain the higher speed results in a corresponding extra cost. In accordance with the present invention, on the other hand, the multiplier circuits are utilized wherever possible in most of the various other operations.

Another important concept introduced herein relates to the provision of a serial-memory transfer operation during all of the common arithmetic operations, such as: addition; subtraction; multiplication; division; and square root. According to this feature of the invention, "*d*" and "*e*" addresses are specified to permit the transfer of a (*d*) operand to the "*e*" address. As indicated above, these two addresses are provided at the end of a command word. The "*d*" address code may be entered into the storage devices that received the "*a*" address matrix. With this technique, the computational word of operation, referred to as W*t*1, is time shared to allow the (*d*) to "*e*" transfer.

In this manner, then, operands may be repositioned in memory for future operations without interrupting or delaying a present operation. This repositioning may be made, for example, by employing several revolvers or circulating registers of different lengths, selected to permit the desired combinations of word-time delay. Thus in the typical arrangement described herein, revolvers of three, five, seven and nine word lengths are employed to effect the desired repositioning. It will be understood, of course, that this arrangement is simply exemplary and is not intended as a limitation of the invention. The (*d*) to "*e*" transfer technique thus facilitates programming for the normal two-word operation.

Up to this point, the discussion has related primarily to the two-word operation of the invention with specific reference being made to the integration of fast multiplication and the simultaneous (*d*) to "*e*" transfer. This two-word computation technique not only results in a considerable increase in speed as discussed above but also makes it possible to separate channel transfer operations from normal arithmetic operations. A channel transfer can then be performed as part of a program which changes the arithmetic system from one set of commands to another.

The invention also contemplates many improvements in the area of the program transfer. It is this transfer which allows the so-called "branch point" or conditional subroutine in an arithmetic process. Thus in a typical situation a branch point or program-transfer point may occur as the result of a choice between two arithmetic subroutines, the selection being conditioned upon an algebraic or magnitude comparison. In other cases the program transfer may be specified as a change to an entirely new computational phase, perhaps at the selection of an operator who is present to supervise the control process.

In one improved aspect of the program-transfer operation provided by the invention, the conventional words-to-wait technique is given an expansion which allows a waiting time limited only by the capacity of the memory system. This is achieved by reserving one wait-time code "*w*" for a "search for home command." In this case, then, the usual word-time wait is not specified in the command but rather is provided as a particular code in a predetermined command position, referred to as the "home command."

In a typical utilization of this arrangement of the invention, the code $w=11111$ specifies a search for home command and the code $w=00000$ is placed at a corresponding position in the "home" command which is to be sought.

The search for home command technique of the invention may be made either conditional or unconditional. If the condition is satisfied, the transfer may be made to the "home command" in the channel "*n*" as specified by the corresponding command word. If the condition is not satisfied, transfer may be made to the origin command in the memory system. If the code "*w*" does not specify a search for home command, the failure to satisfy a condition may be employed to maintain the system on the present program, whereas the fulfillment of the condition may then be employed to transfer to the program specified in channel "*n*" after the time of waiting "*w*."

In another aspect of the program transfer phase of the invention, a sense command is provided which allows communication with the machine by an operator or other supervisory personnel. According to this command, the operator may set up certain predetermined codes on input switches which specify a program which the operator desires to be executed. The programmer who originally specifies the various arithmetic operations of the system enters a "*q*" field into the sense command which is then compared to the operator's selection. If there is a correspondence between the "*q*" field and the desired operator's program, a transfer is effected to this new program.

The sense command has another important aspect since the "*q*" field may not specifiy any switch interrogation. In this case, the circuit logic may be arranged to indicate that the program transfer condition has been met. Thus a sense command with no switch interrogation specified may be employed to effect a channel chansfer or to insure that the condition will be met for a "home command."

In considering the system of the invention as a whole, then, it becomes apparent that a very efficient arrangement is provided where the most frequent control operations of addition, subtraction, and multiplication are performed in synchronous two-word periods. An odd-length memory channel may then be employed so that successive two-word operations may be continued during two successive cycles of the memory without transferring to a different channel for new instructions.

The technique of the simultaneous (*d*) to "*e*" transfer, in accordance with the invention, further insures that the succession of two-word operations may be performed without transferring to a different channel. This approach allows the simultaneous rearrangement of arithmetic data while performing the usual arithmetic operations so that the data required for each successive operation will be available with a minimum of delay following the termination of the previous operation.

In this manner, the channel transfer requirement becomes an unusual case and is handled as part of a program transfer operation, as discussed above. The separation of the usual two-word operation from the transfer operation allows the utilization of the command code to better advantage whereby the technique of (*d*) to "*e*" transfer is possible.

Along more specific lines, the invention contemplates the incorporation of the above-mentioned, two-word serial-parallel multiplication operation into the system with a minimum of specific-purpose circuits. A parallel "A" register is employed to present the multiplicand for multiplication and is also utilized for input conversion, shifting, square root, and division, as well as a delay device for other operations.

A parallel adder is employed for multiplication and then utilized separately for other operations. The carry storage devices required are gated together as a shifting or circulating register for addition, subtraction, division, and square root. This same register functions as a delay device for the reconversion of numbers which become complemented during subtraction. Such numbers are then reconverted into absolute value plus sign during W*t*2 as further discussed below.

Arrangement is also made in the multiplication scheme so that the "A" and "C" registers are either *both* added to the parallel adder (referred to as the "S" register hereinafter) or *neither* of these registers are added. This technique requires but a simple modification in the serial-parallel multiplication scheme and results in a considerable simplification in the parallel adder logic required.

In this manner, two-word multiplication logic is incorporated as an integral part of the arithmetic system logic of the present invention with a minimum of additional parallel adder logic being required and a maximum of equipment sharing with other operations being accomplished.

A similar efficient integration technique is followed in incorporating square root so that it is performed much in the same manner as non-restoring division. The invention teaches a technique which allows the employment of the same logic for forming the root digits and quotient digits. This technique also allows the same timing and add-subtract control for both operations. As a result, the square root operation requires but little extra equipment over that required for division.

In another specific improvement of the invention, a technique is provided for handling operands with their sign digits appearing in time ahead of the least significant digit position. It will be seen that this is an important part of the two-word operation of the invention where it is desired that the operands be stored in memory represented by their absolute value and sign. The techinique of the invention provides for an examination of certain results to determine whether the number involved is in its true or "2's" complemented form. If the number is in its complemented form, it is then converted back to absolute value plus sign as it is read out to the "*c*" address during W*t*2, which may also be W*t*0 of the next operation.

Accordingly it is an object of the present invention to provide an improved arithmetic unit adapted for efficient automation usage.

Another object is to provide a control system which may be constructed in a compact form at a relatively low cost but which nevertheless has a speed which is suitable for most automation control problems considering all operand access and storage time.

A further object is to provide a high-speed, serial-parallel computing system wherein most of the frequently required arithmetic control operations may be performed in two serial word times, the word time corresponding to the length of the serial operands, plus any space required between operands.

Yet another object is to provide an improved method of command organization and timing in an arithmetic system whereby the first operand required may be obtained prior to the completion of the command word read-in period, and computation then may be performed immediately thereafter without delay.

Still a further object is to provide an improved method of command sequencing in arithemetic operation whereby the results of successive operations may be transferred to memory at the same time the first operand of a new operation is being read in.

Still another object is to provide an improved arithmetic system wherein the usual arithmetic processes may be performed at relatively high speed as compared to the time length of a memory channel; whereby channel transfers need not be made frequently and a separation is possible in the command structure between the normal arithmetic command and the program transfer command; thus allowing a more efficient utilization of the command code for each of the two phases.

An additional object is to provide an efficient utilization of the command code in an arithmetic control system for automation whereby a simultaneous memory transfer operation is possible during the most frequent arithmetic control processes, such as, addition, subtraction, and multiplication, allowing the rearrangement of new data for more suitable availability for later operations.

Yet a further object is to provide a method of program transfer allowing a specification of words to wait within the range of a words-to-wait code as well as the entire memory range available in terms of a predetermined "home command" position.

Still an additional object is to provide a logical operation for an automatic control system allowing an external interrogation of the program status of the system and a transfer to a new program upon the finding of correspondence between a desired program and that which the system is ready to perform.

It is also an object to provide an improved serial-parallel multiplication circuit which may be incorporated efficiently into an arithmetic control system without the requirements of many additional circuits.

It is yet another object to provide a high-speed, serial-parallel arithmetic unit wherein most operations which are required for control may be performed in two-word times including all phases of operand read in, read out, and computation.

A more specific object is to provide a high-speed, serial-parallel multiplier circuit for an arithmetic control system wherein a simplified parallel adder logic is made possible by a modification wherein either the multiplicand and carries are *both* added to the previous partial product or *neither* the multiplicant nor previous carries are added to the previously formed partial product; the system providing for the shifting of the previously formed partial product and carries in the latter case.

Another specific object is to incorporate highspeed, serial-parallel multiplication logic into a computer system whereby the additional structure required may be employed for many other operations, such as, shift, input conversion, addition, subtraction, division, and square root.

A further specific object is to incorporate a square root operation into a system including division with a minimum of additional logical circuits being required to achieve a non-restoring operation.

Yet another specific object is to provide a serial-parallel arithmetic unit wherein an efficient sign handling is accomplished allowing the signs to be read in advance of reading each operand, and to be entered as first digits in the results which are formed, represented as absolute value plus sign.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 3A:
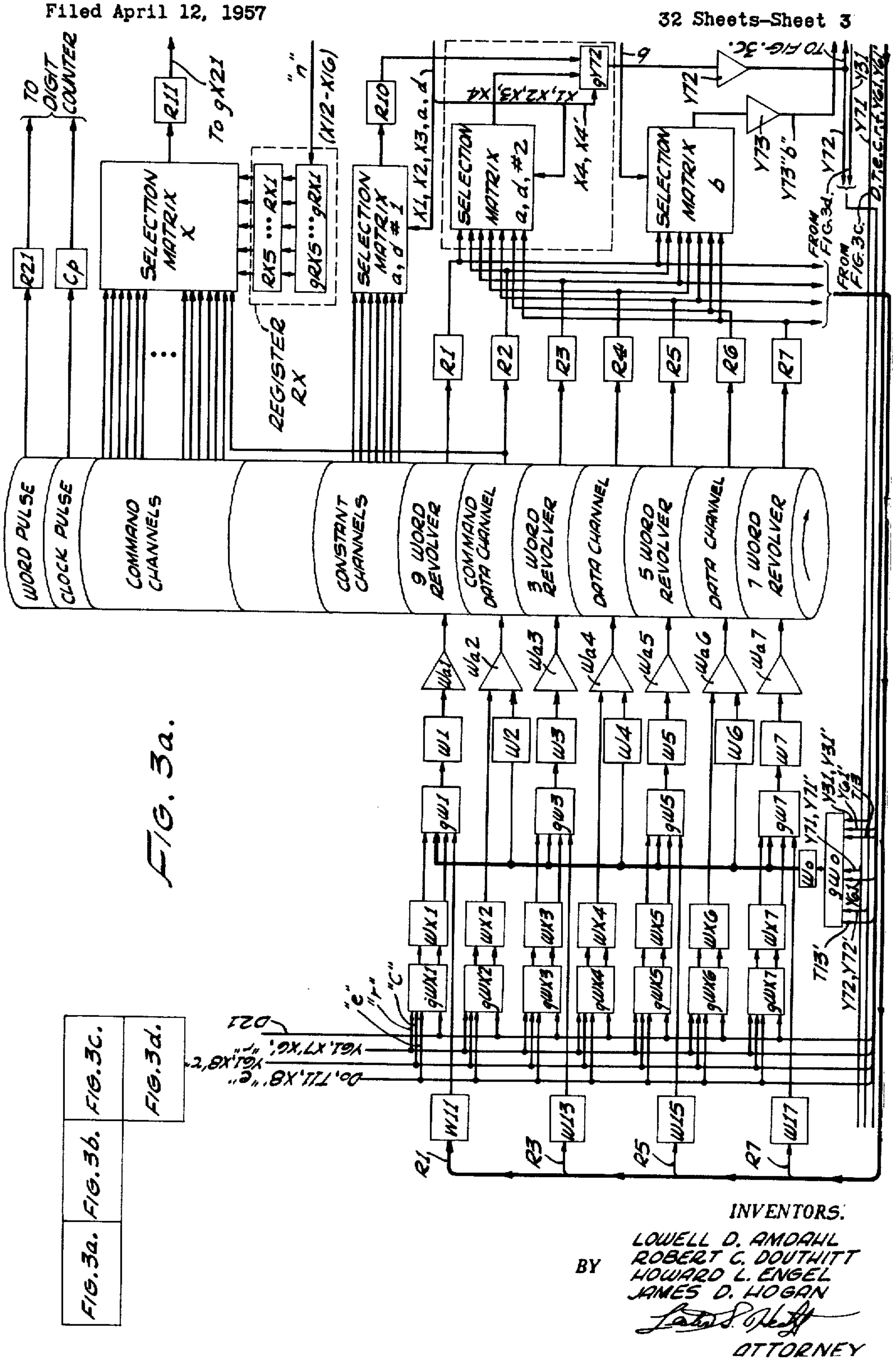
Figure 3B:
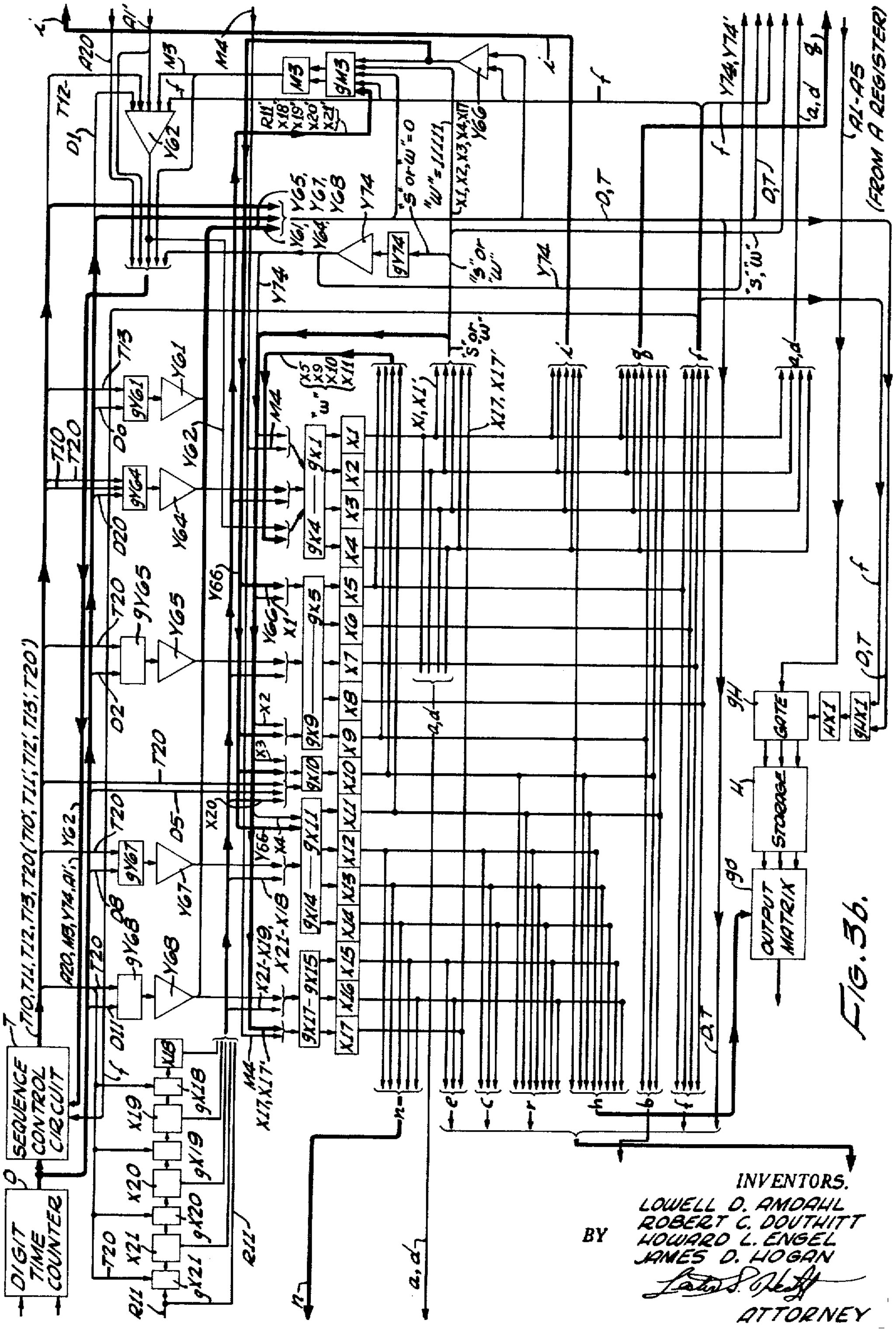
Figure 3C:
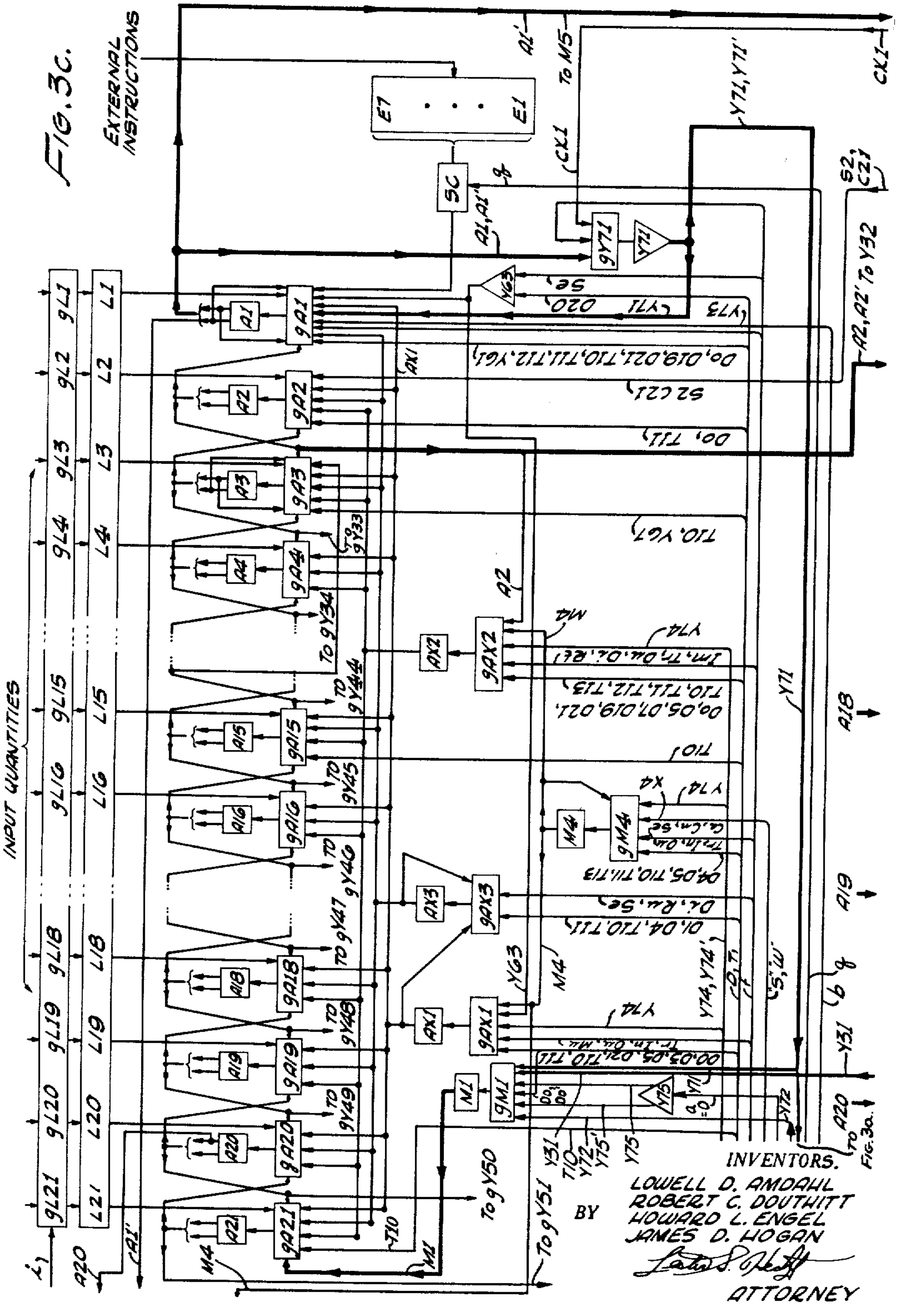
Figure 3D:
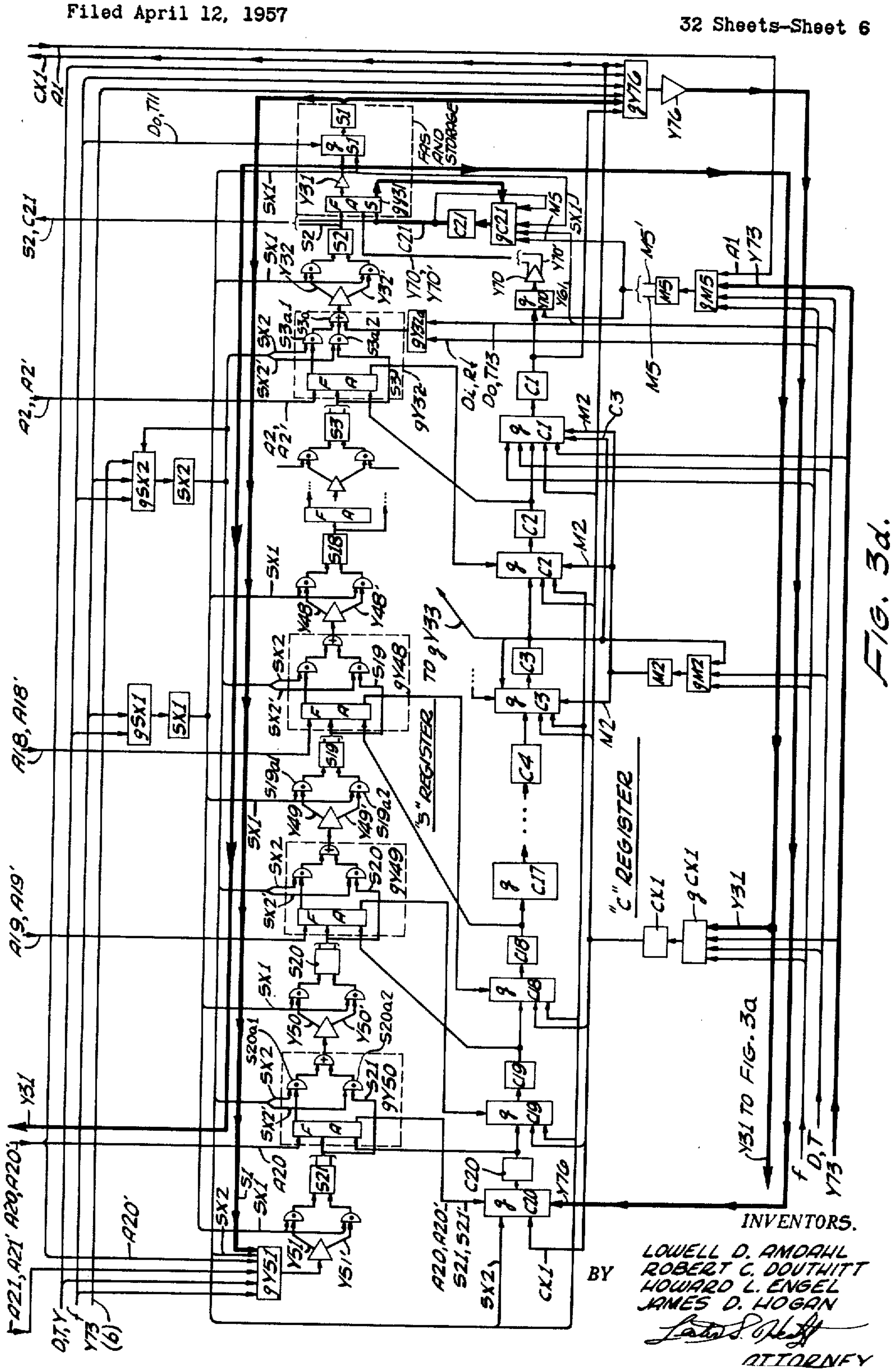
Figure 5:
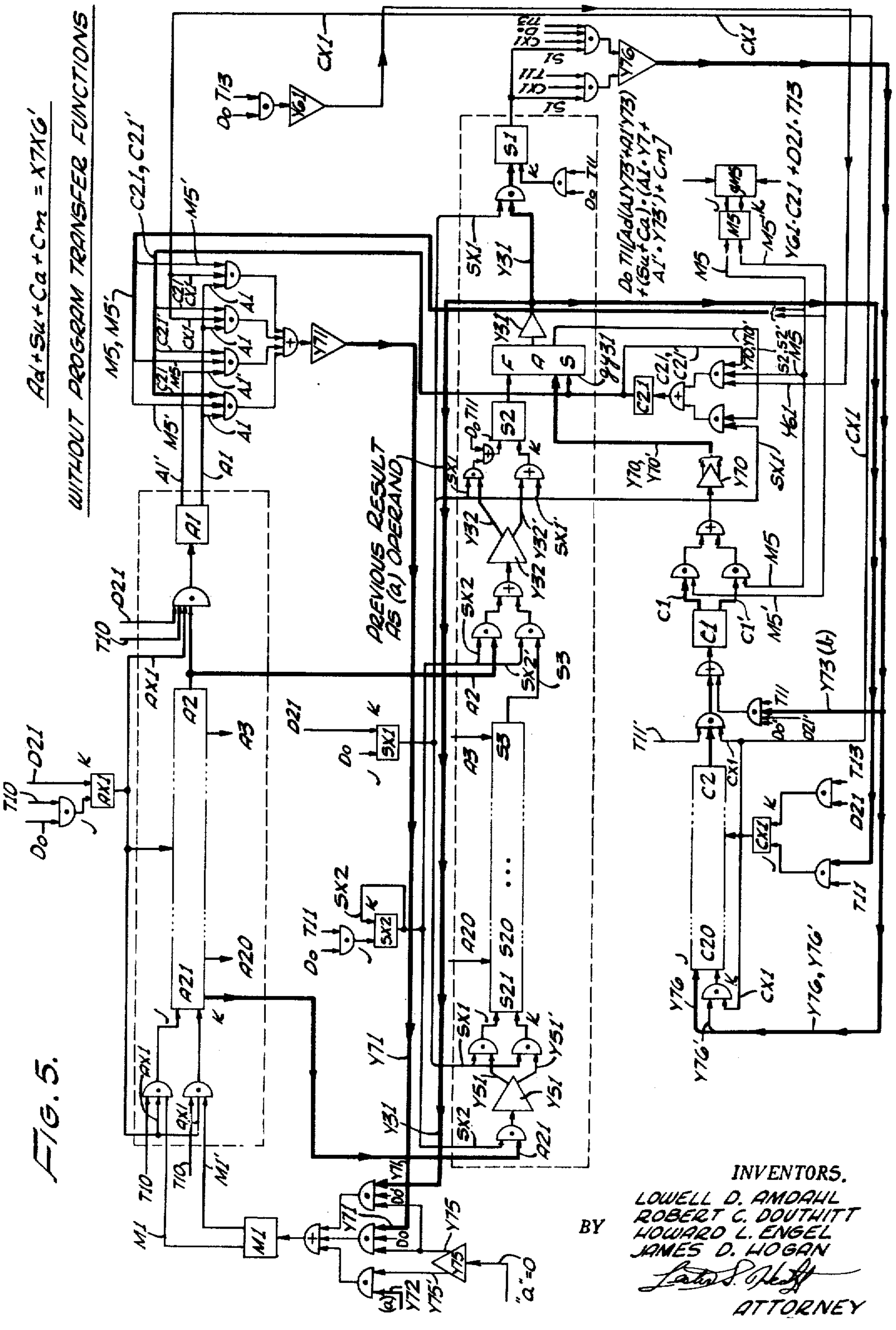
Figure 4:
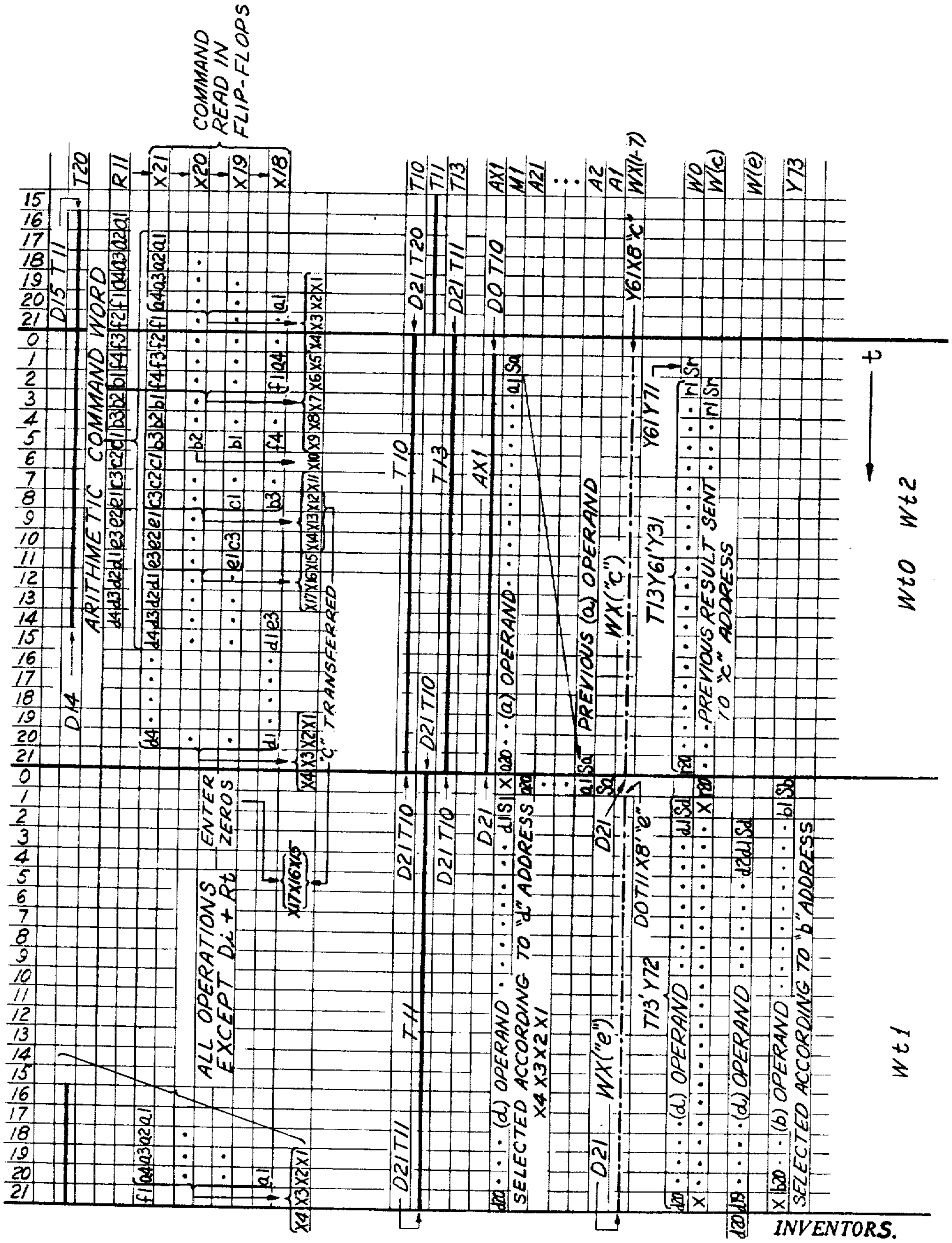
Figure 5A:
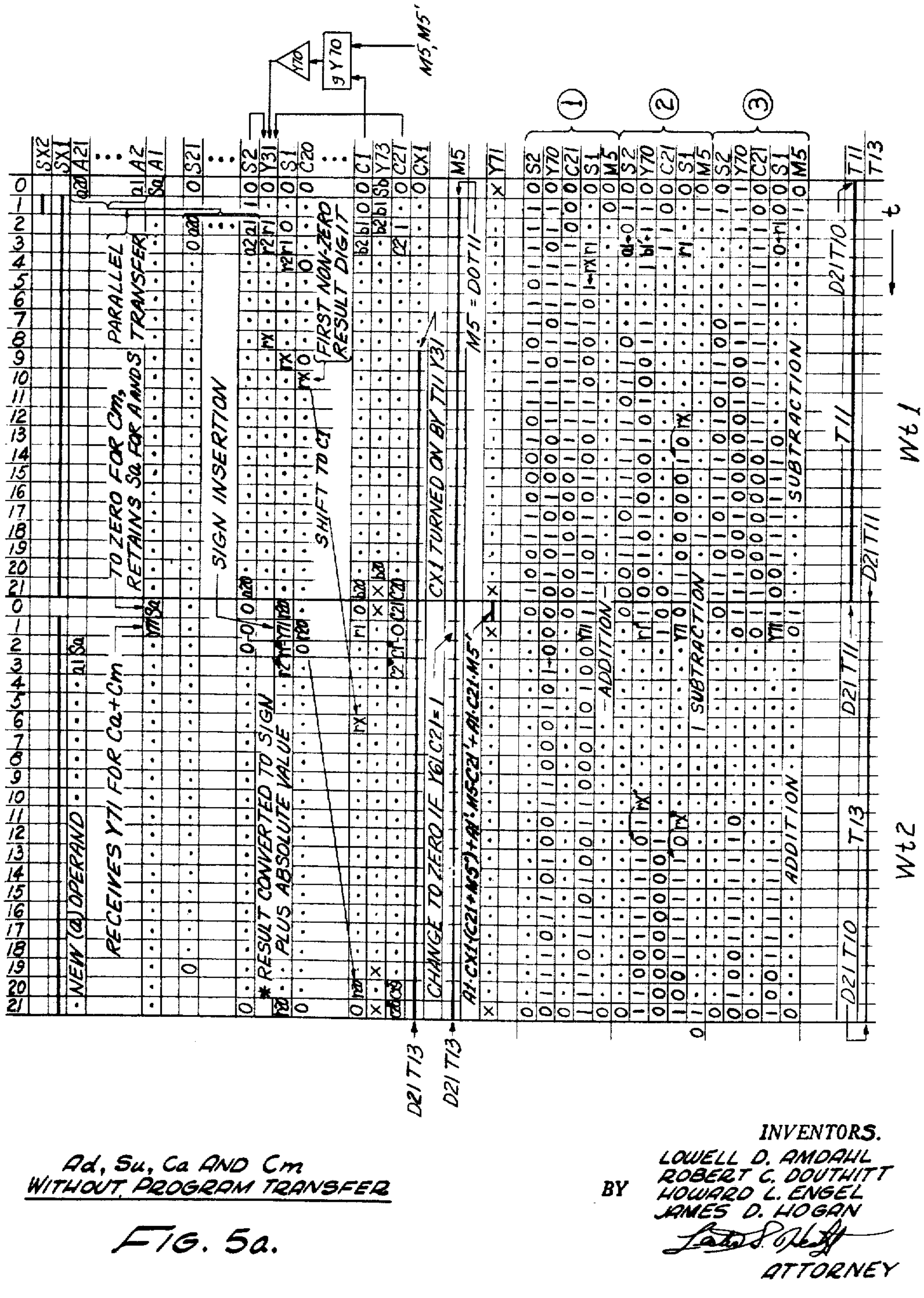
Figure 6:
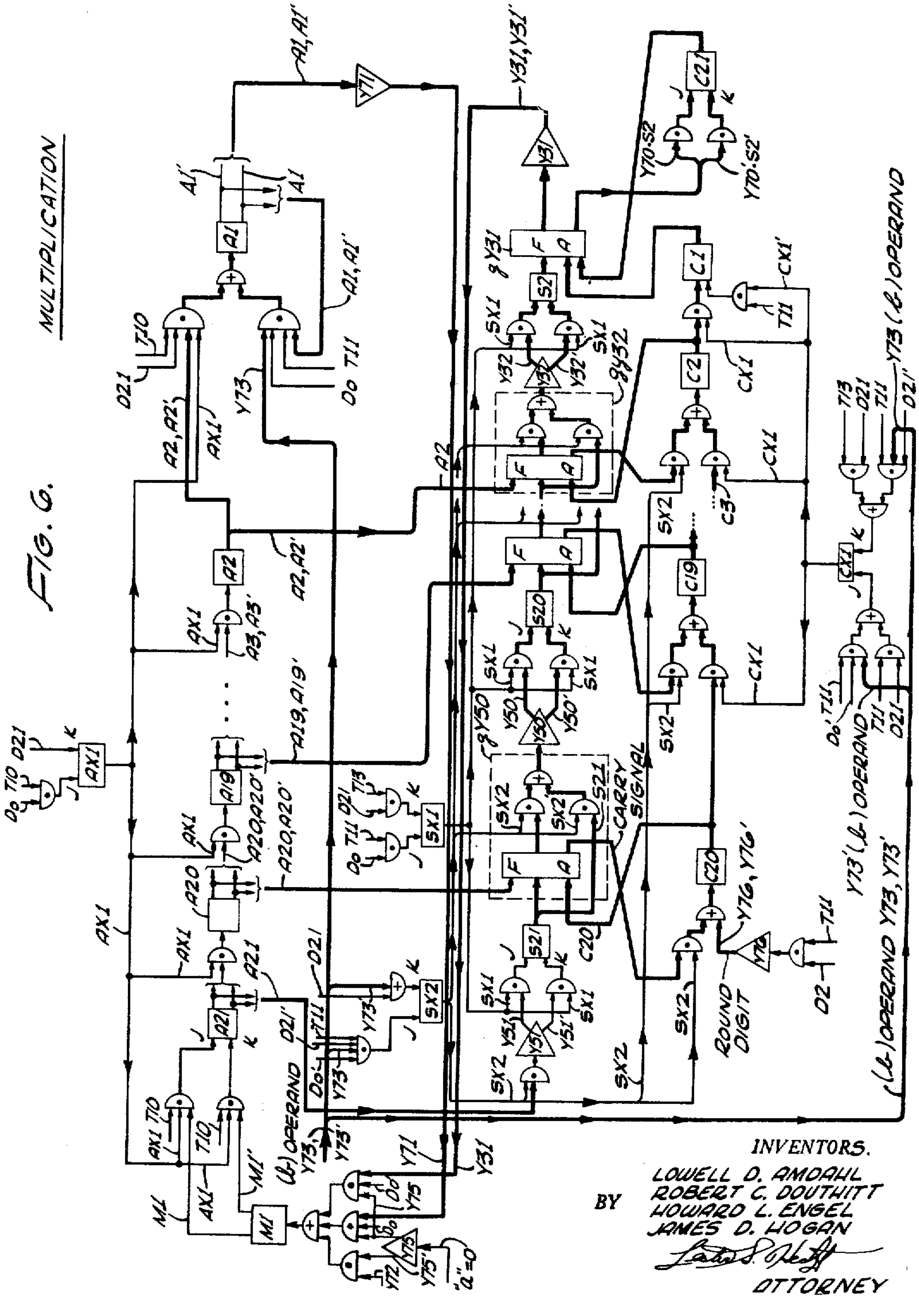
Figure 6A:
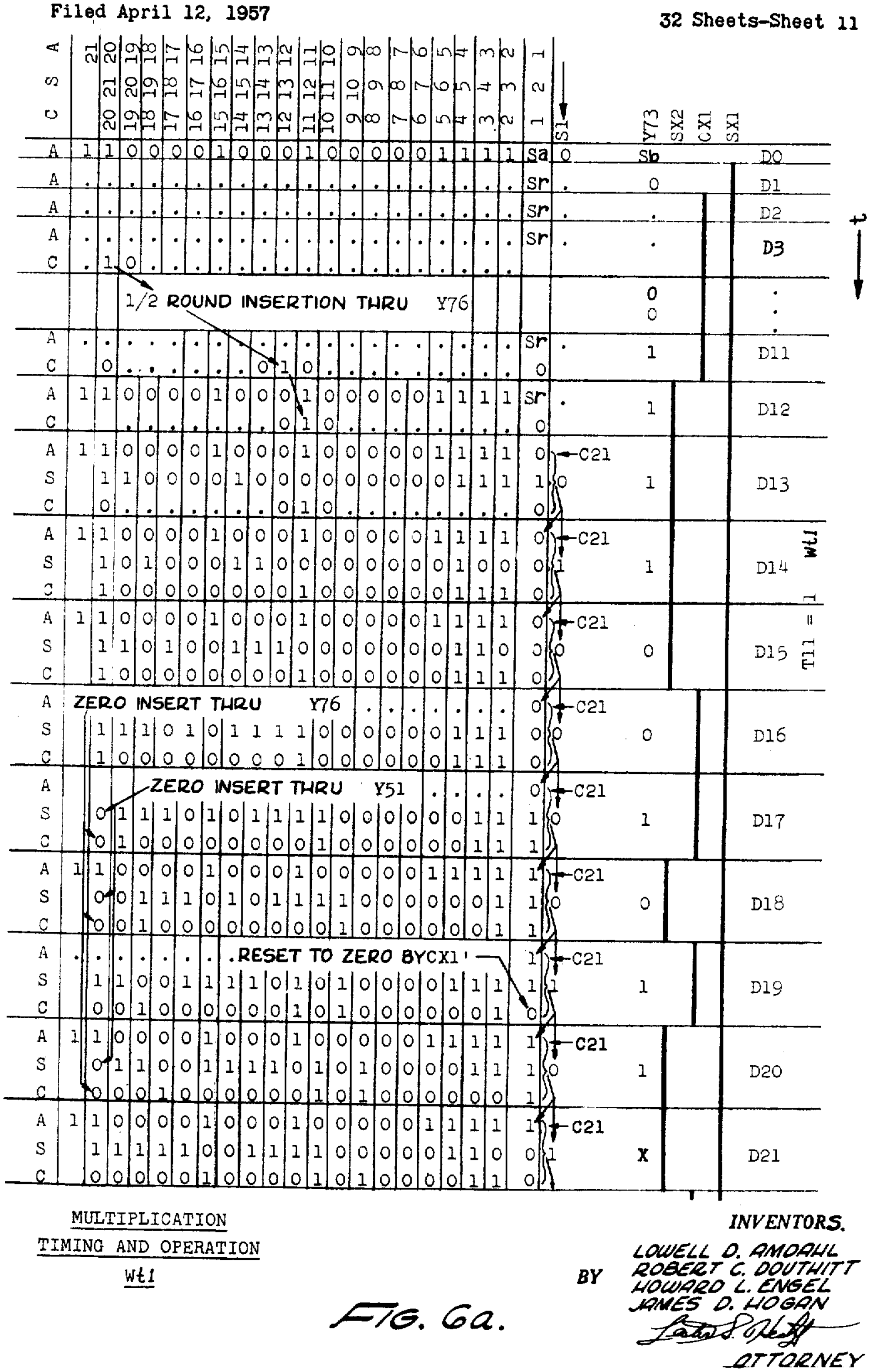
Figure 6B:
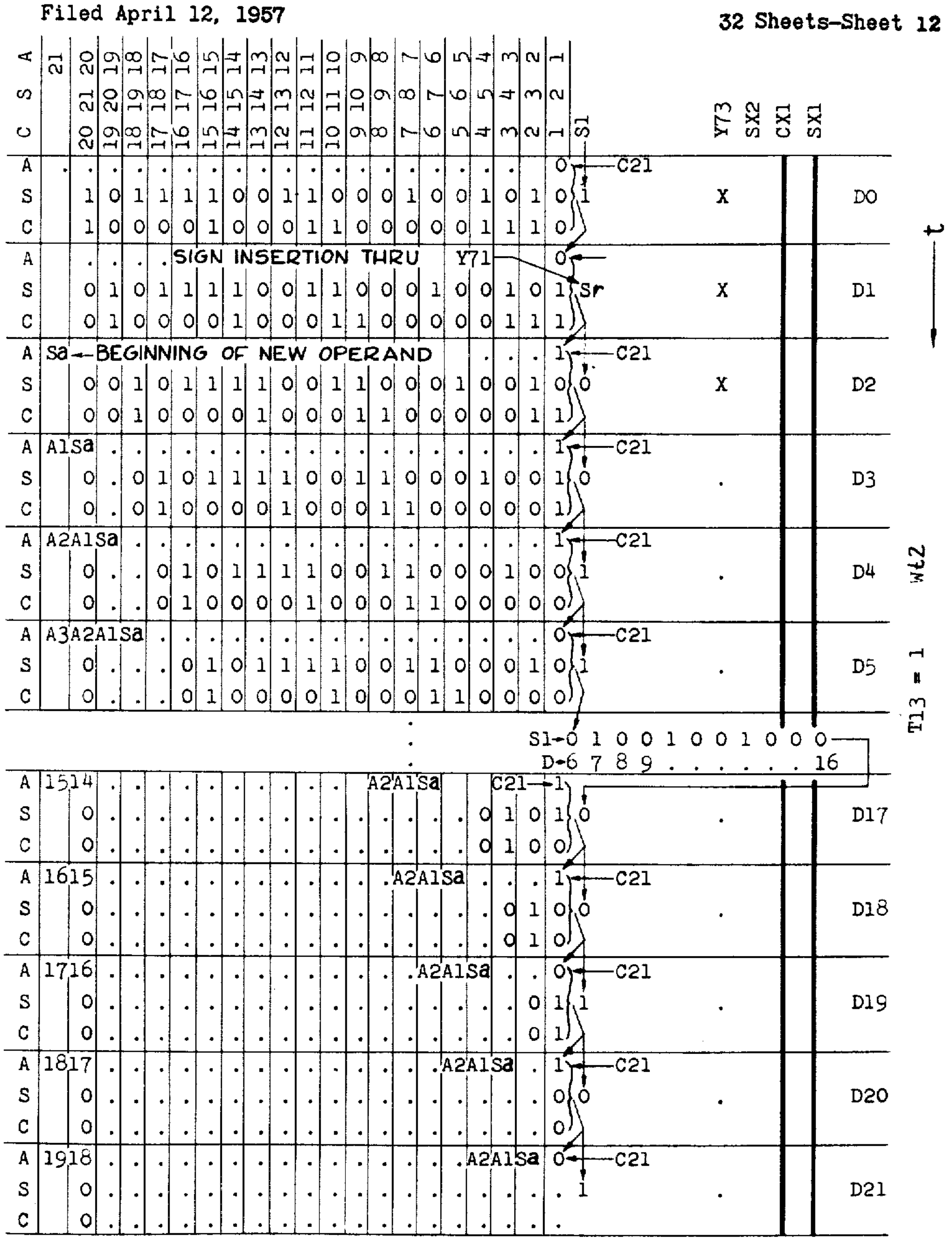
Figure 7:
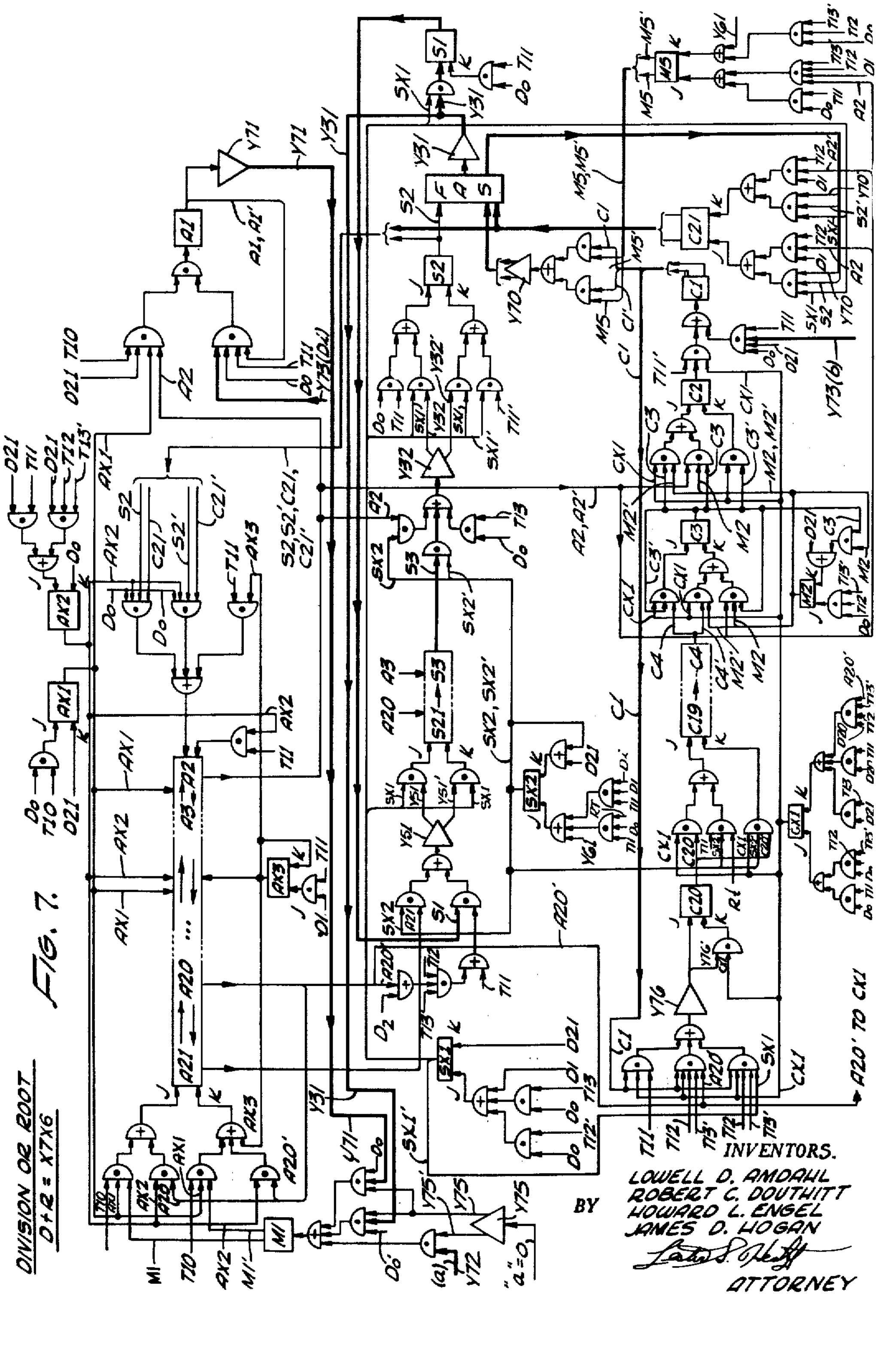
Figure 7A:
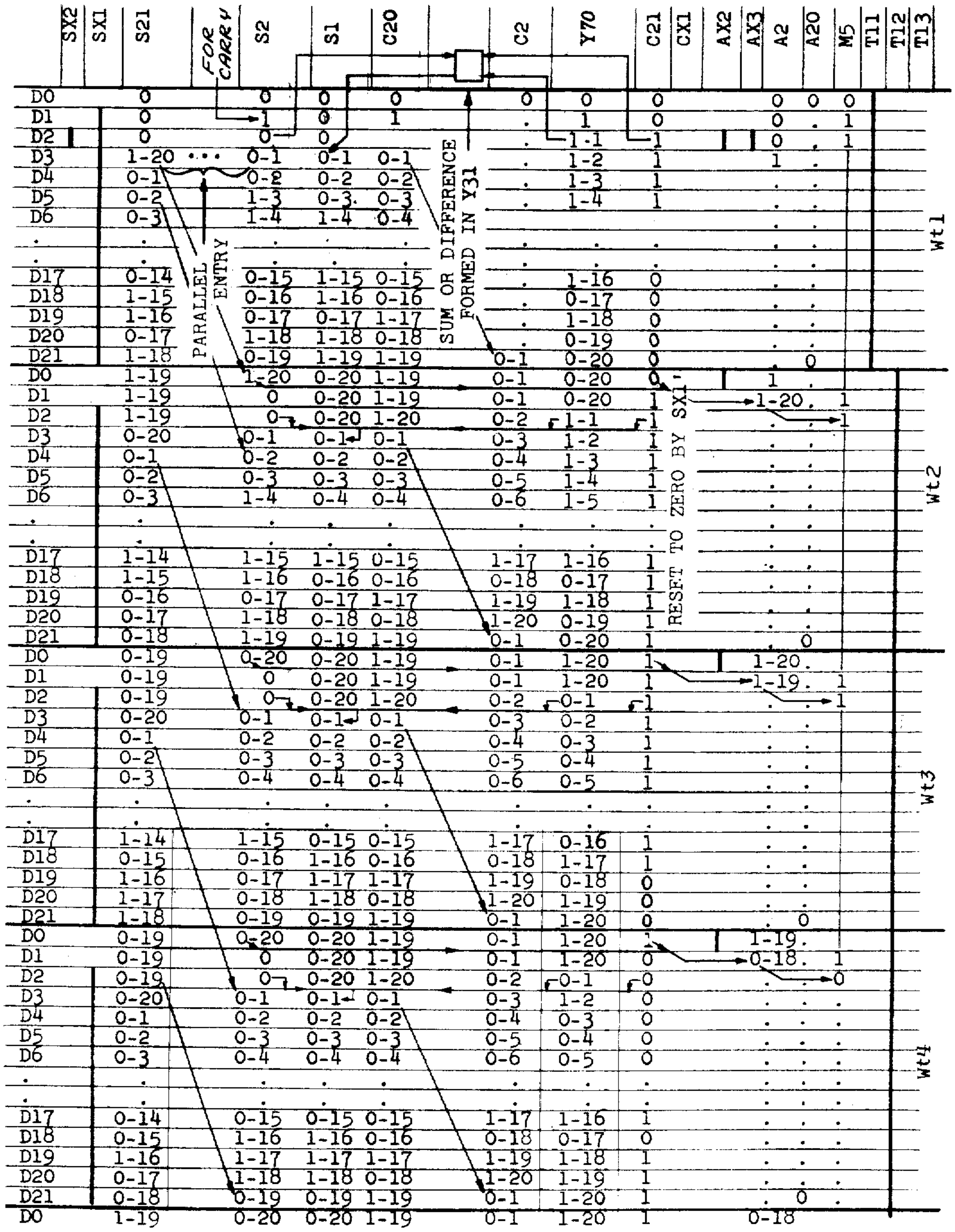
Figure 7B:
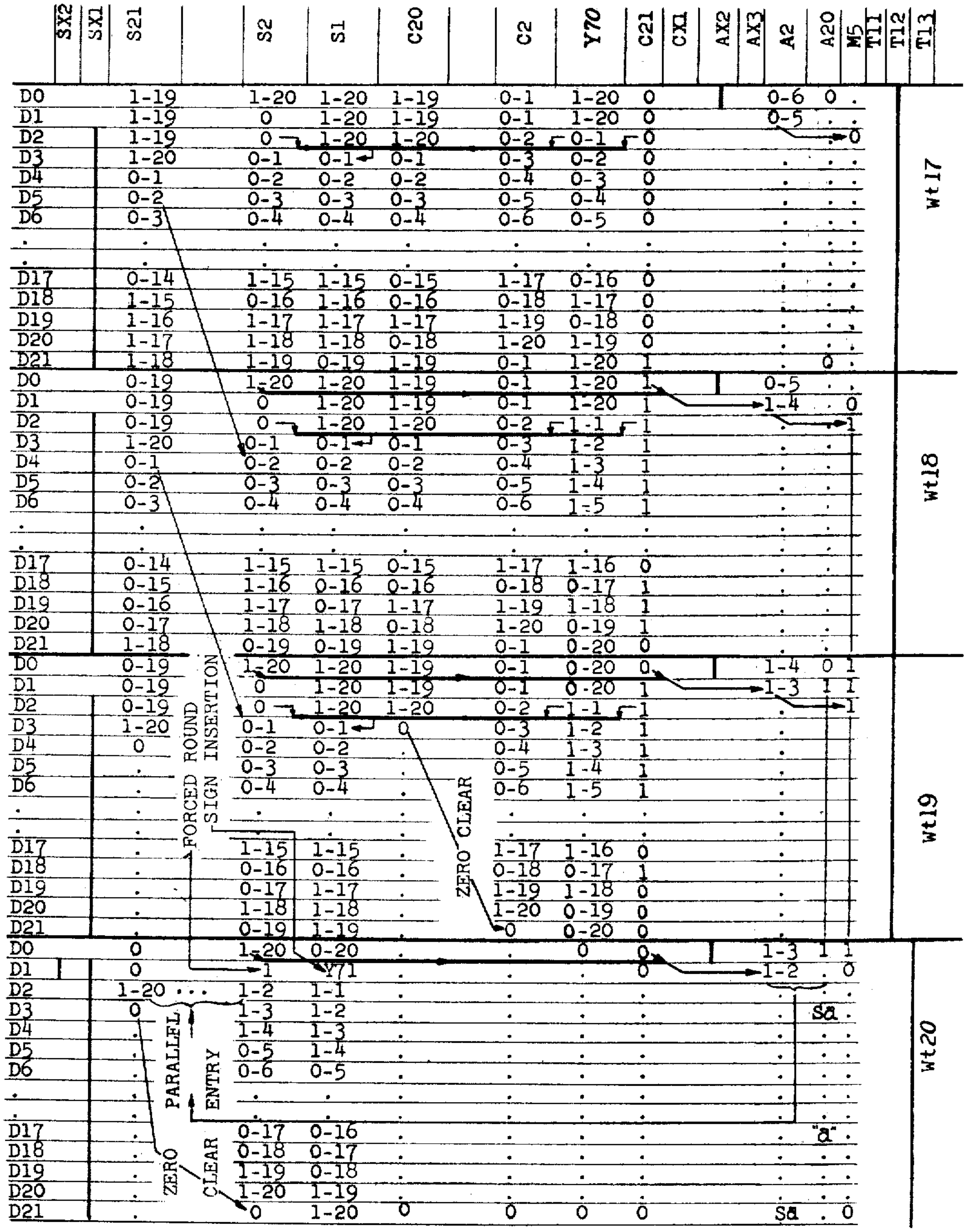
Figure 7C:
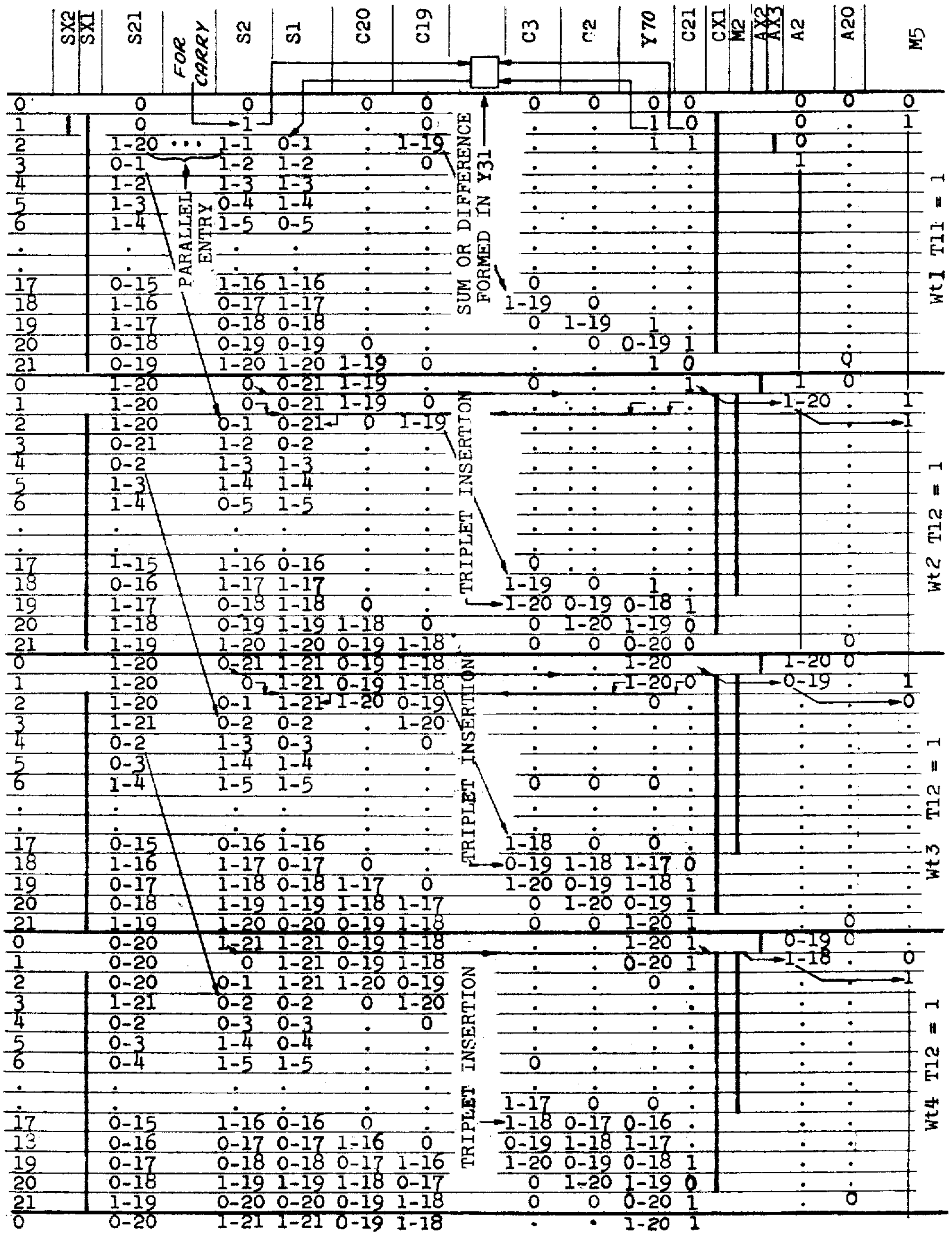
Figure 8A:
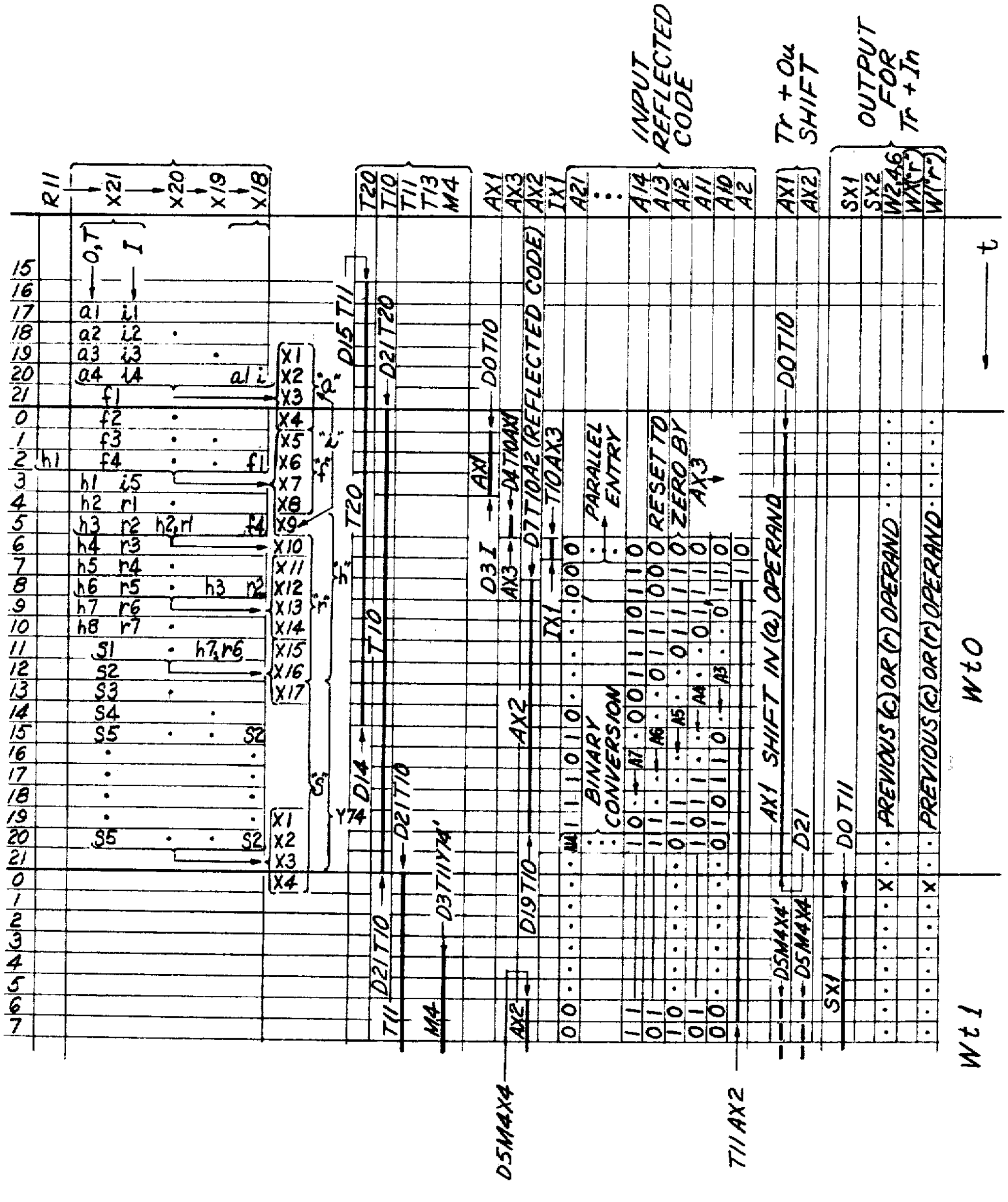
Figure 8B:
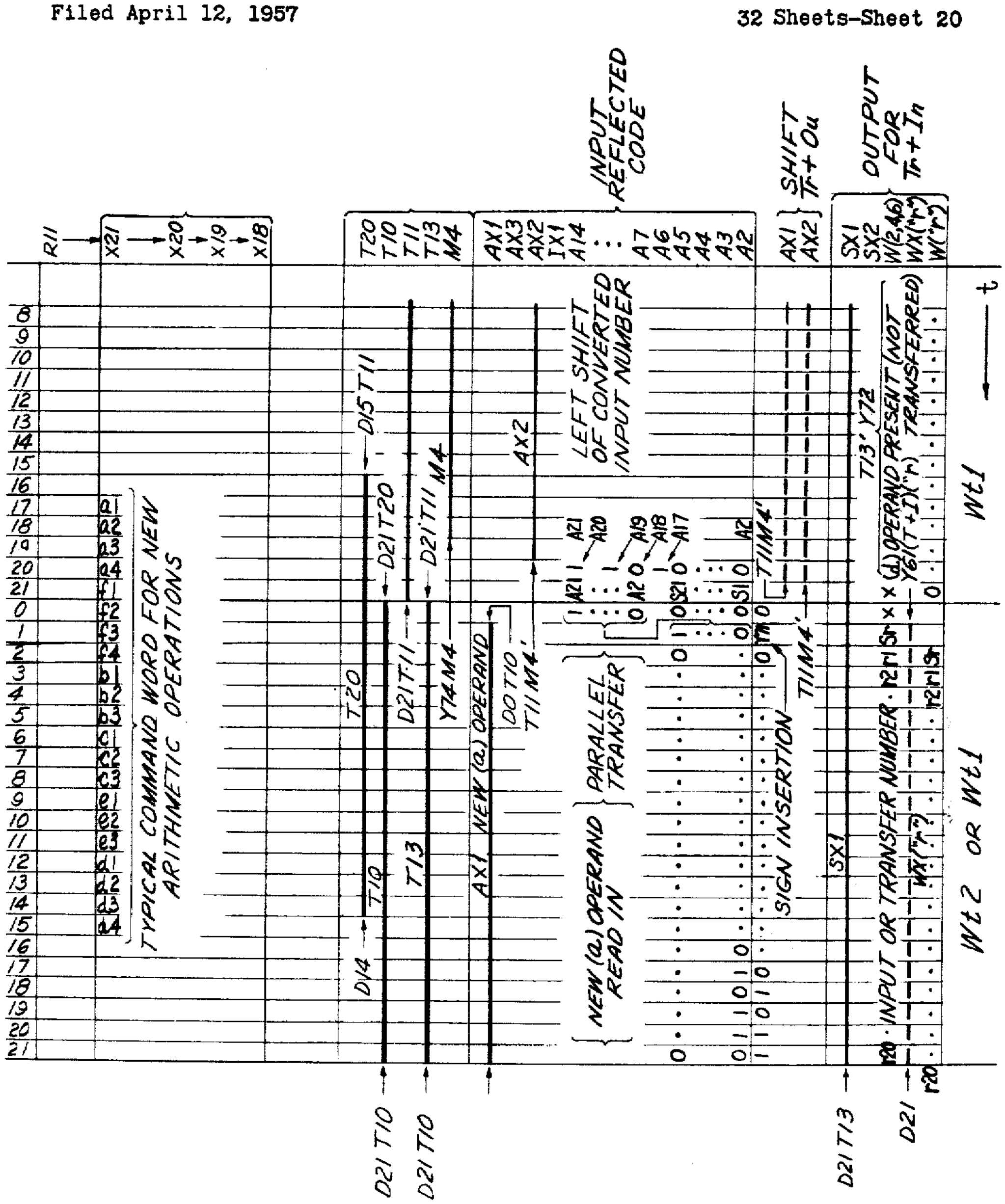
Figure 9:
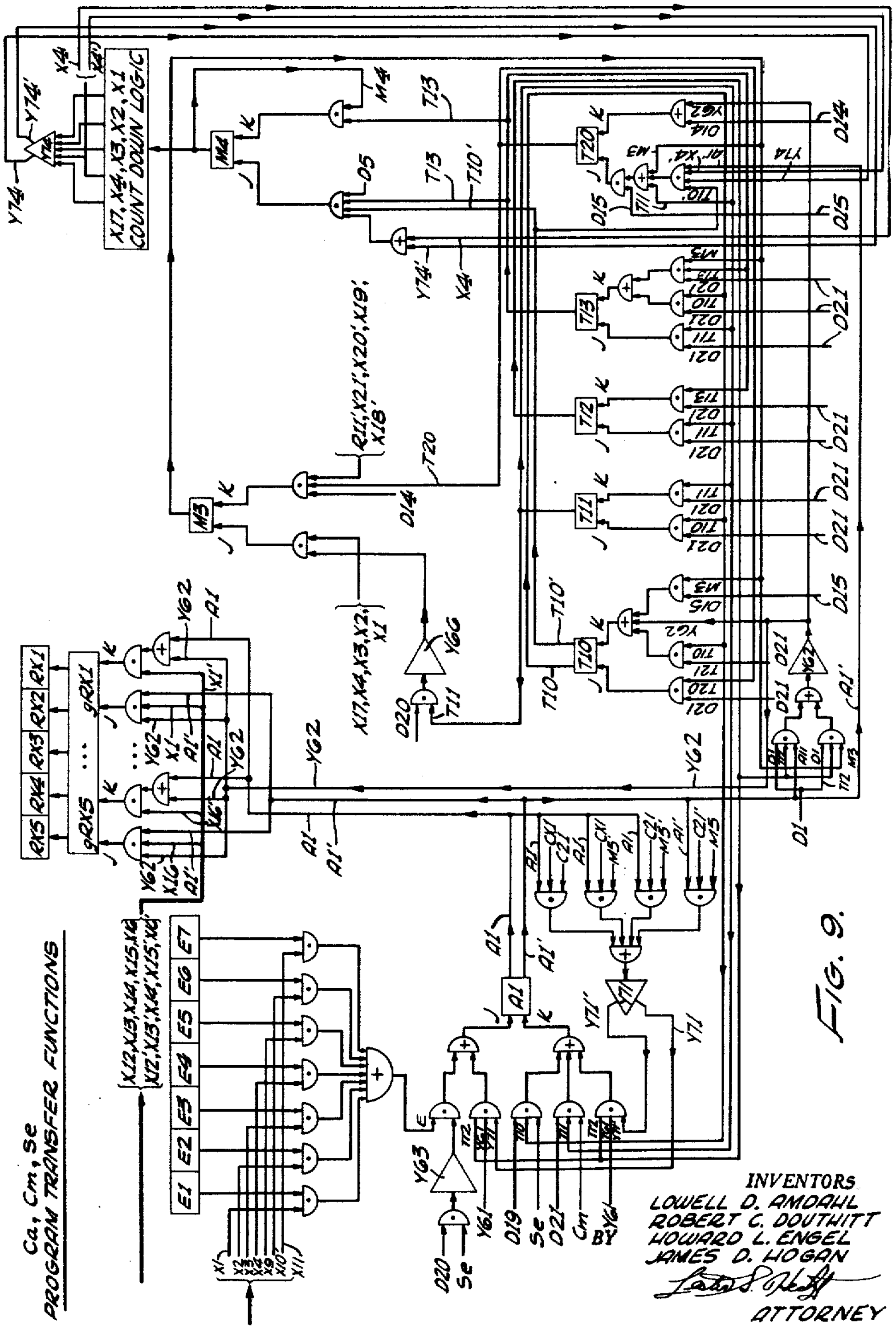
Figure 9A:
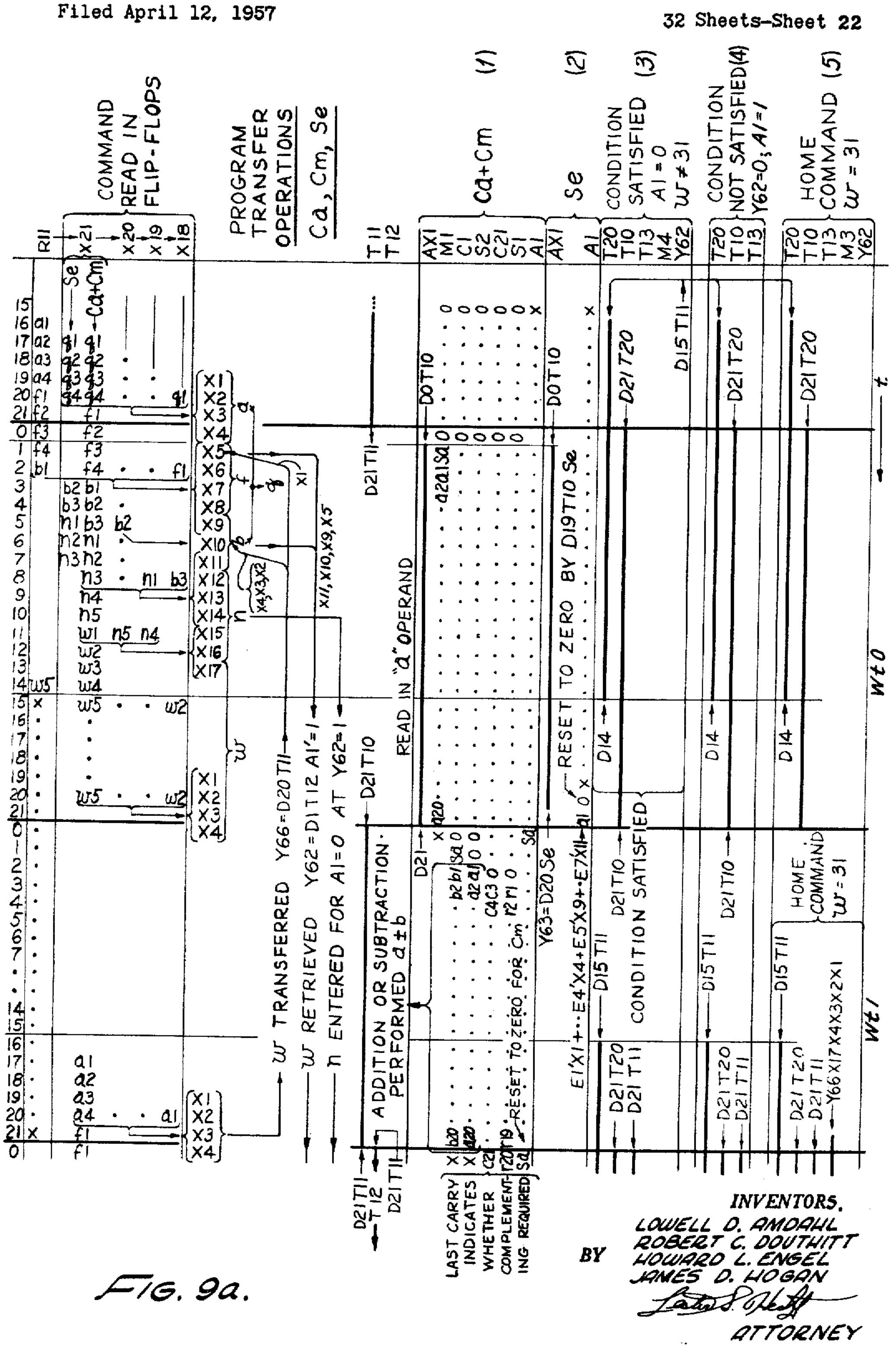
Figure 9B:
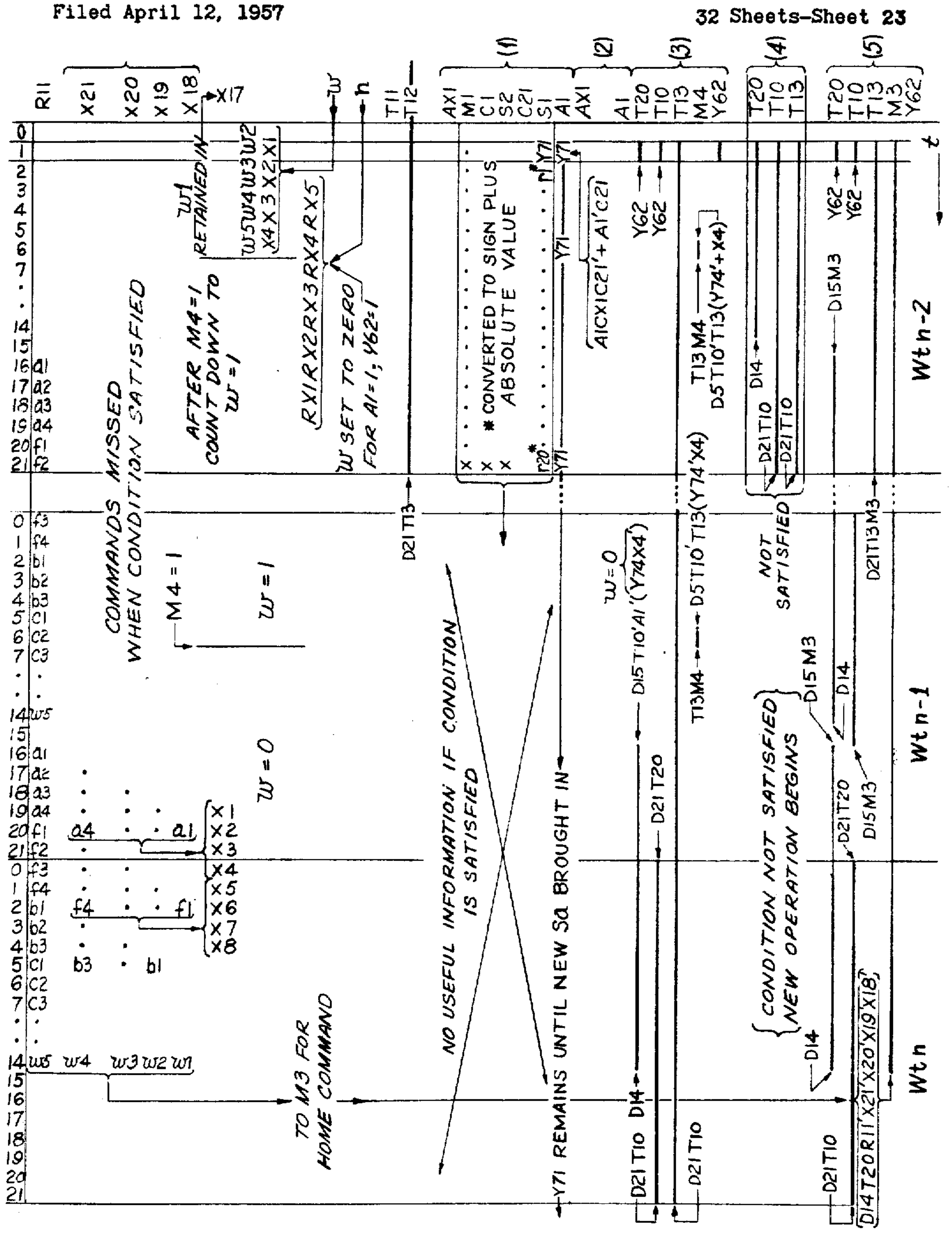
Figure 10:
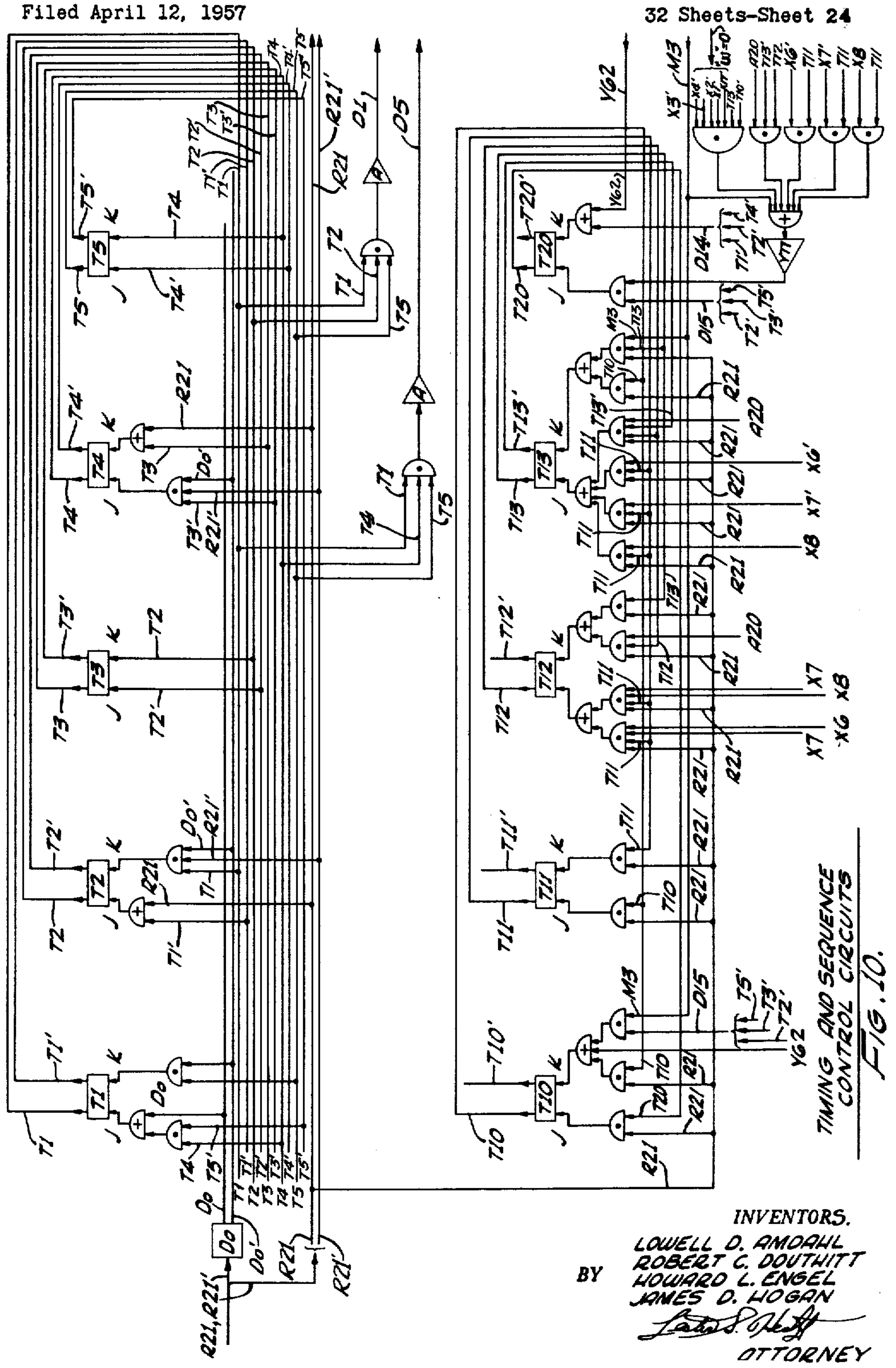
Figure 11:
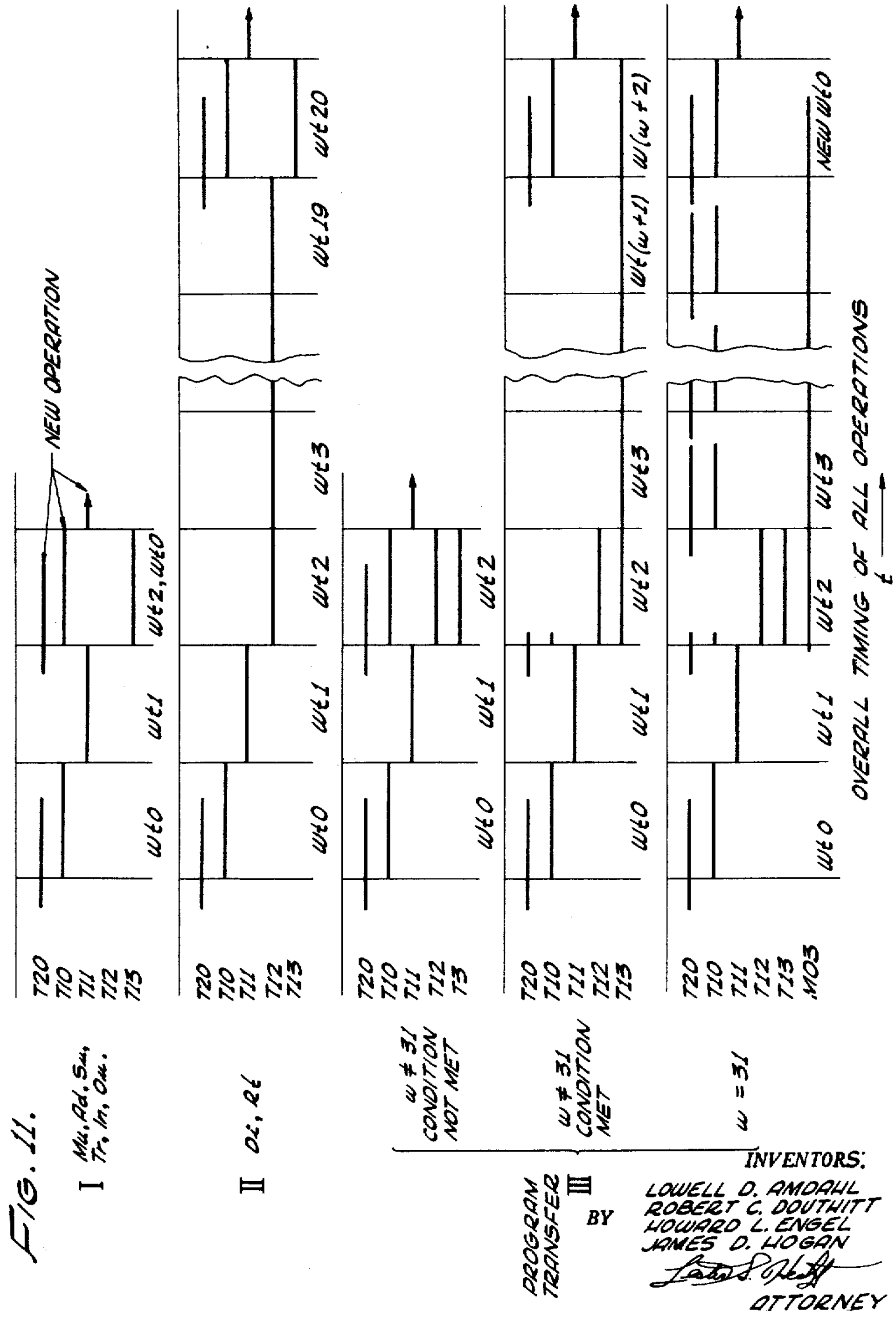
Figure 15C:
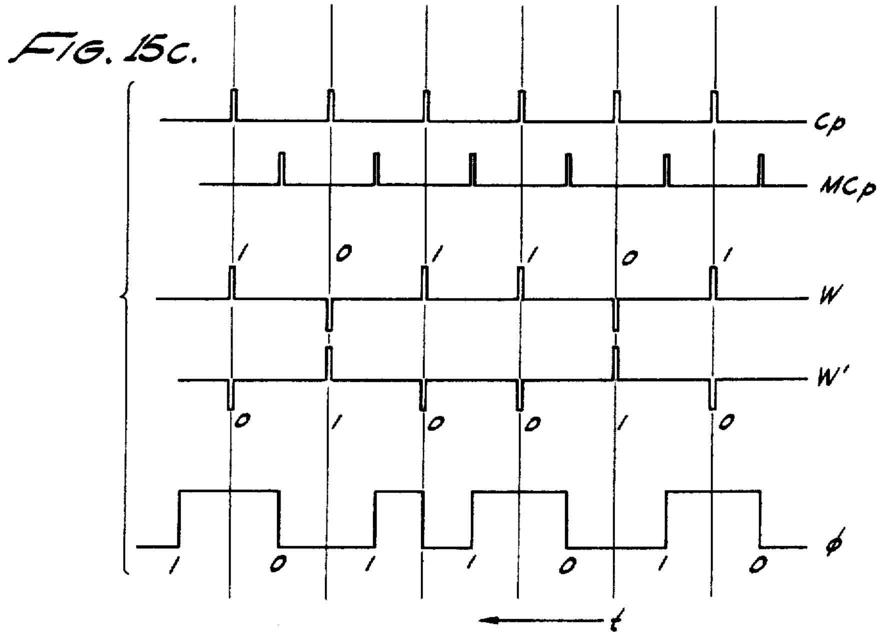
Figure 12:
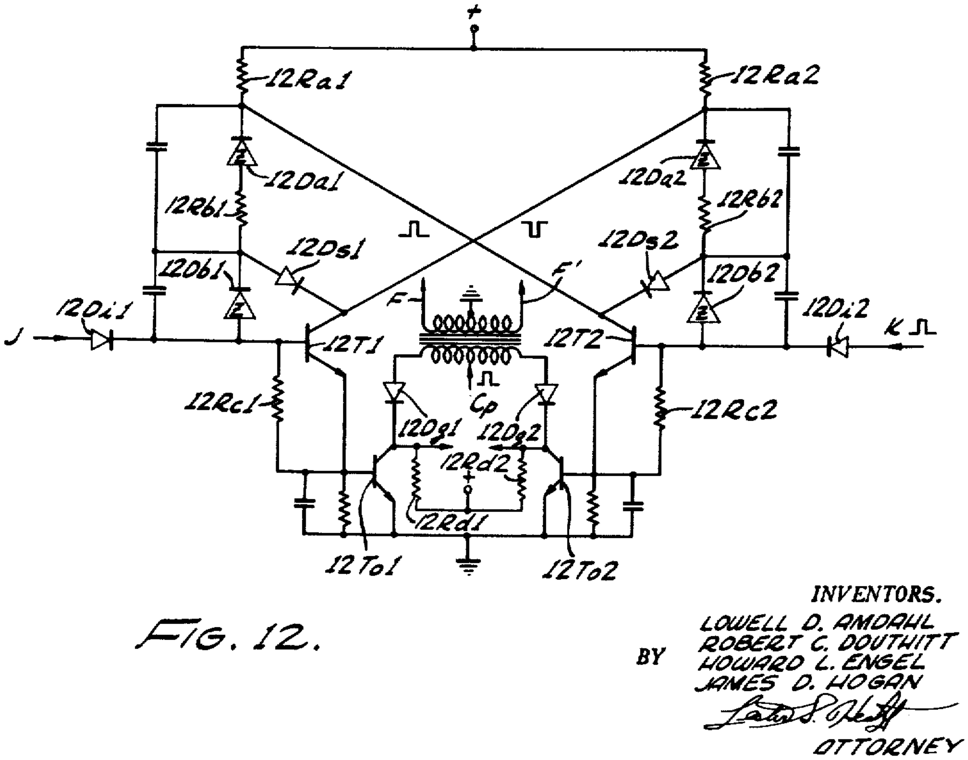
Figure 13:
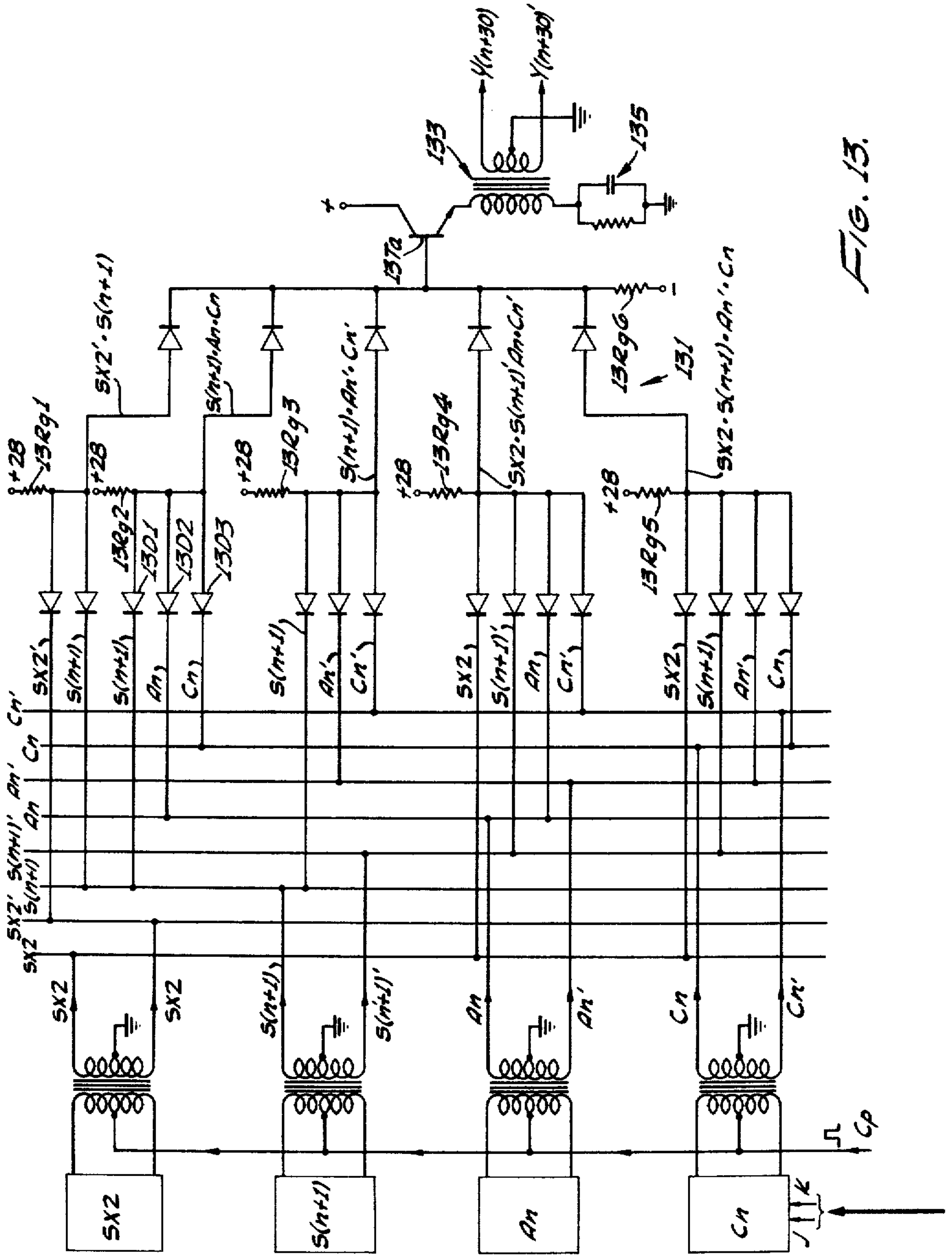
Figure 14:
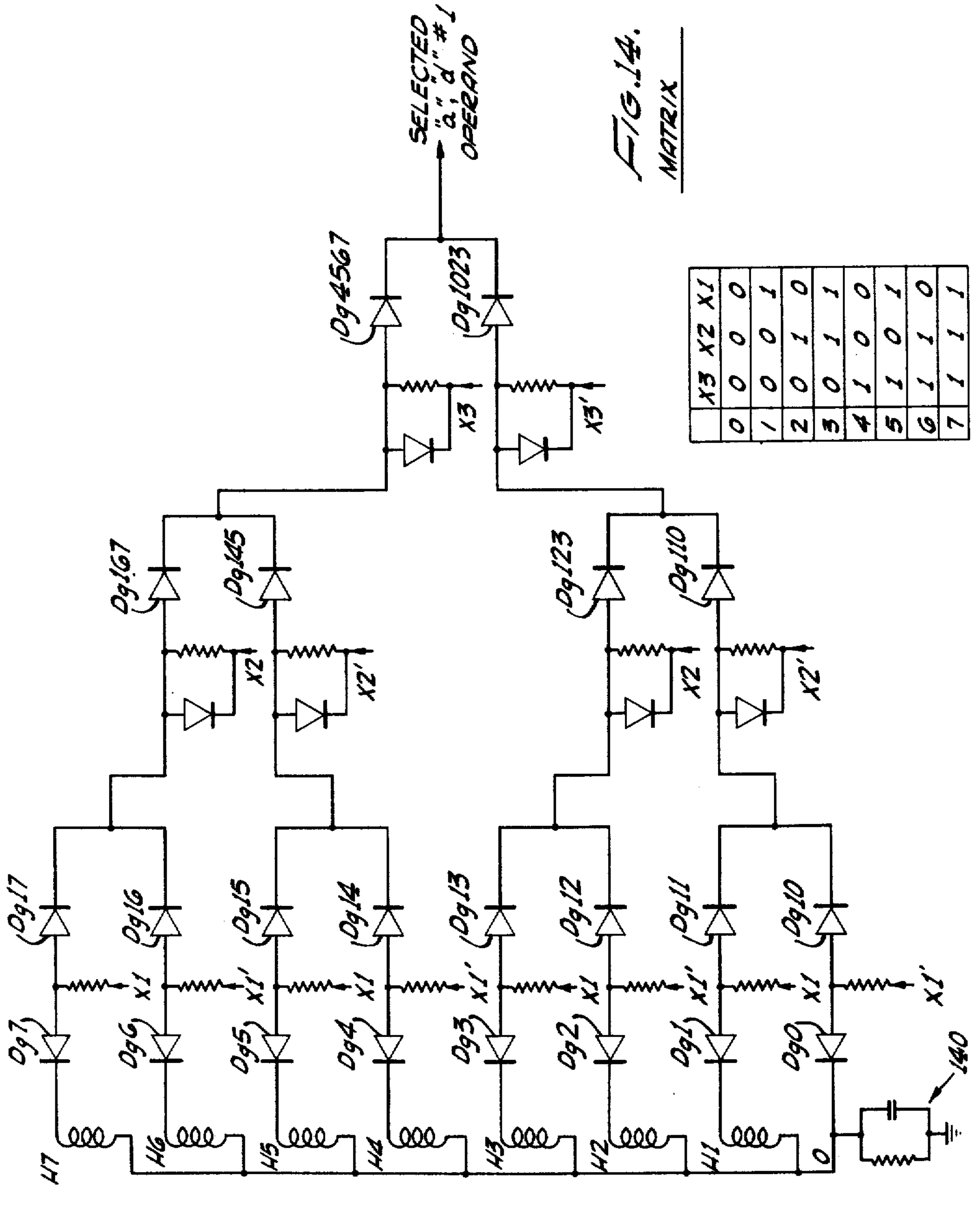
Figure 15A:
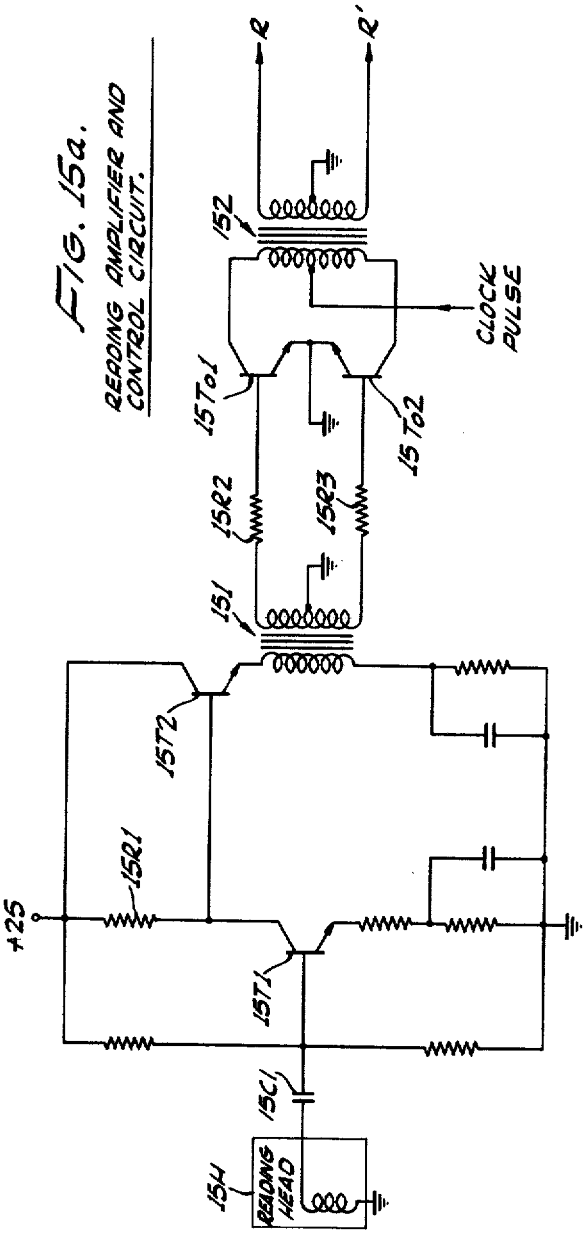
Figure 15B:
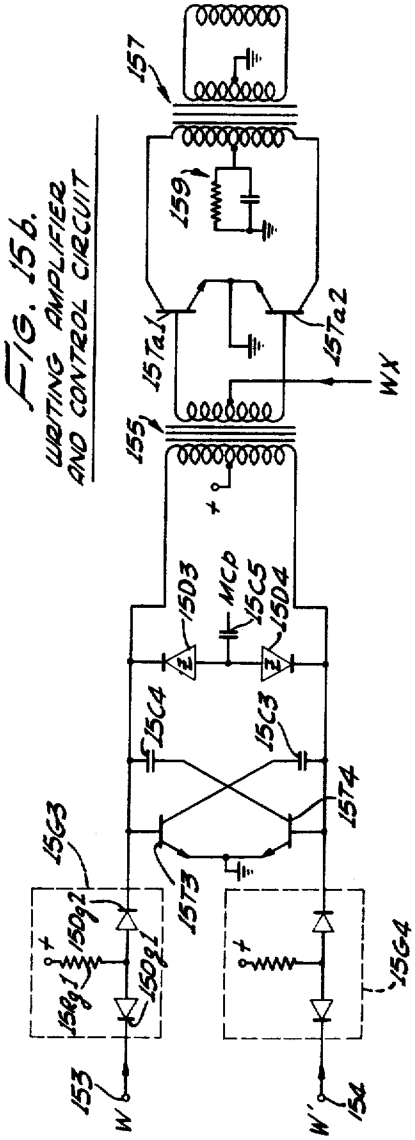
Figure 16:
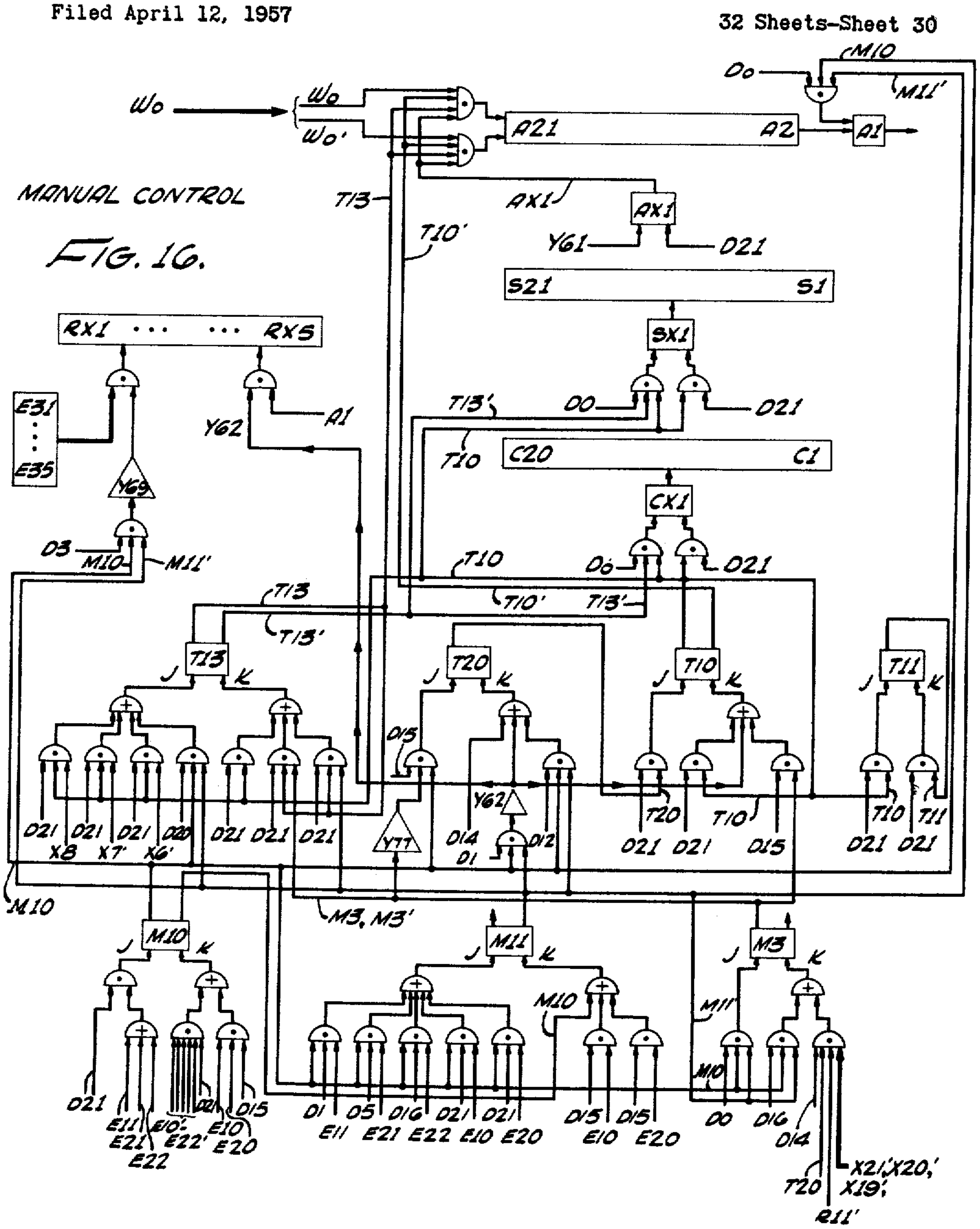
Figure 16A:
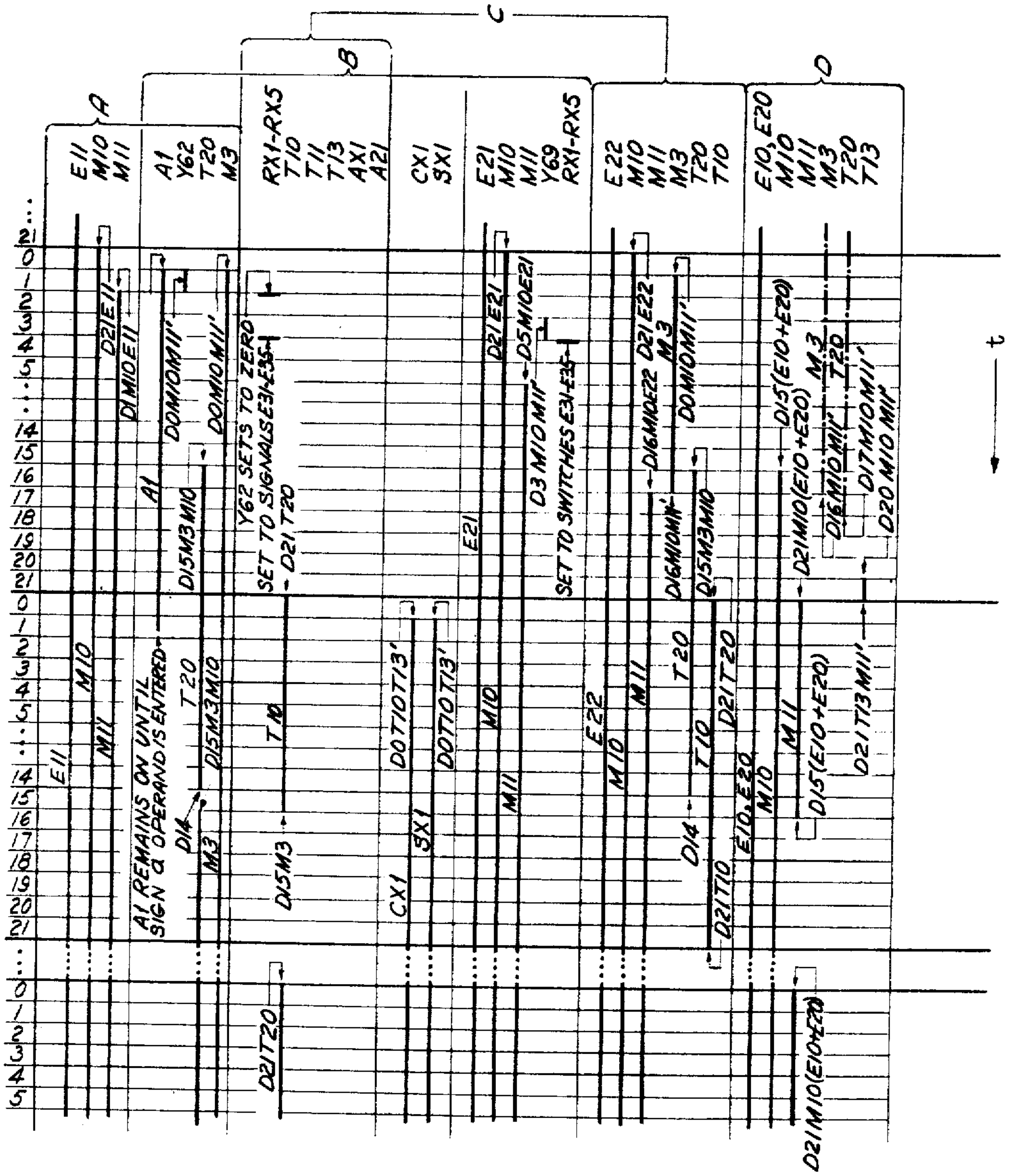
Figure 16B:
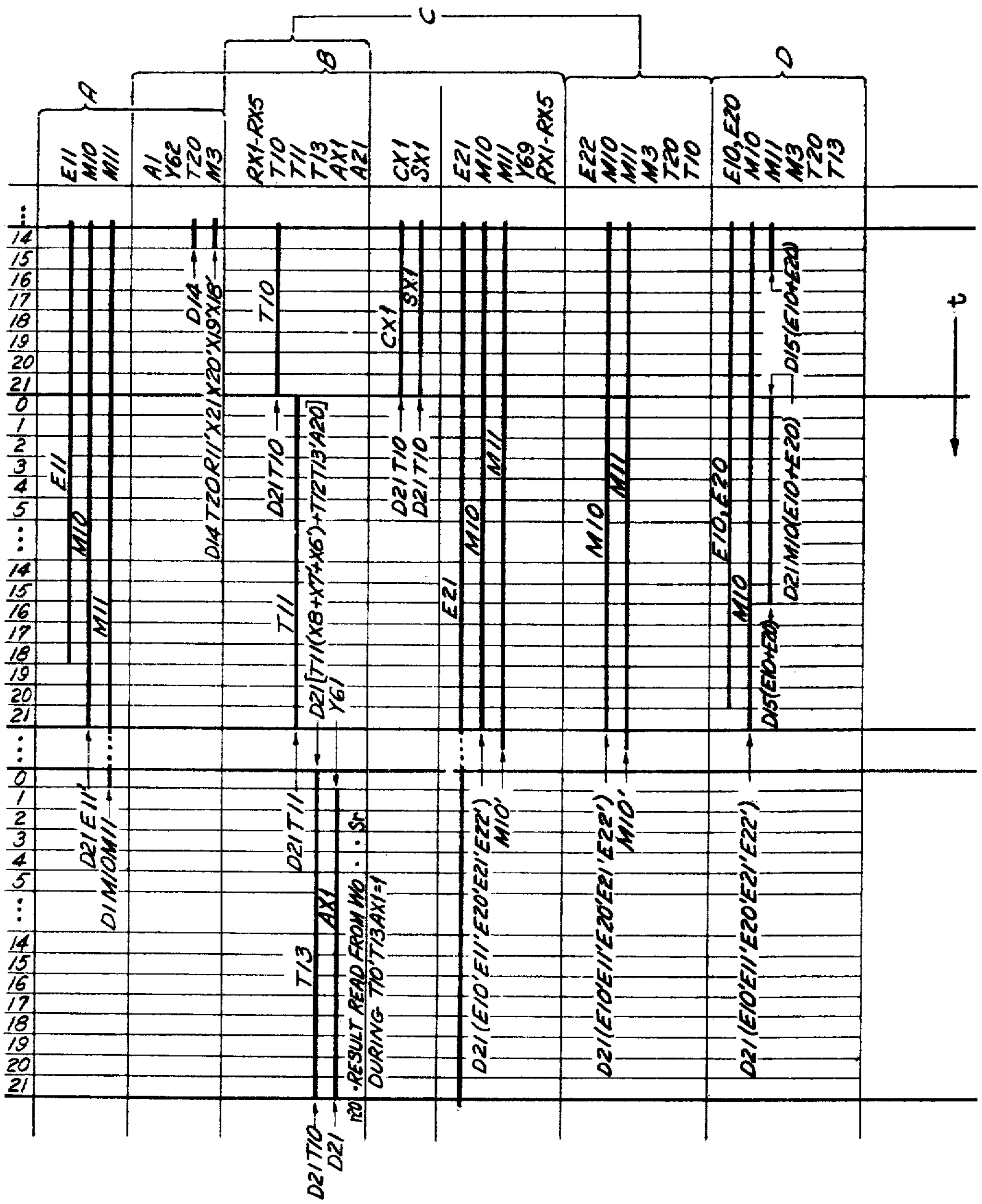

FIGS. 3*a*, 3*b*, 3*c*, and 3*d* are sections of a schematic diagram illustrating a specific form of the invention wherein:

FIG. 3*a* shows the memory device and associated writing and reading circuits as well as the selection matrices required;

FIG. 3*b* illustrates the general association between the timing and sequence control circuits and the command word storage and translation network; certain aspects of the program transfer circuits and other circuits being also shown;

FIG. 3*c* illustrates the general form of the A register circuits and the associated control devices as well as other circuits which receive signals from or send signals to the A register;

FIG. 3*d* illustrates the general form of the S and C register circuits and the associated control devices as well as other circuits which receive signals from or send signals to the S and C registers;

FIG. 4 is a timing and operation diagram illustrating the normal two-word phasing as well as the simultaneous (*d*) to "*e*" transfers;

FIG. 5 is a schematic diagram illustrating the function and general structural arrangement of the circuits required for addition, subtraction, and algebraic or magnitude comparison without program transfer functions;

FIG. 5*a* is a timing and operation diagram illustrating the manner in which the circuits of FIG. 5 operate in several typical circumstances;

FIG. 6 is a schematic diagram illustrating the function and general structural arrangement of the circuits required for multiplication;

FIGS. 6*a* and 6*b* together form a timing and operation diagram illustrating a typical two-word, serial-parallel multiplication process; FIG. 6*a* relating to the operation occurring during word W*t*1 and FIG. 6*b* relating to the operation during word W*t*2;

FIG. 7 is a schematic diagram illustrating the function and general structural arrangement of the circuits for division and square foot;

FIGS. 7*a* and 7*b* together form a timing and operation diagram illustrating a typical division operation; FIG. 7*a* showing the operation during words W*t*1–W*t*4 and FIG. 7*b* showing the operation during the words W*t*17–W*t*20;

FIGS. 7*c* and 7*d* together form a timing and operation diagram illustrating a typical square root problem solved in accordance with the present invention; FIG. 7*c* illustrating the operation during words W*t*1–W*t*4 and FIG. 7*d* illustrating the operation during the words W*t*17–W*t*20;

FIG. 8 is a schematic diagram illustrating the function and typical structural arrangement for the operations of transmit, input, and output;

FIGS. 8*a* and 8*b* together form a timing and operation diagram illustrating typical transmit, input, and output operations, where FIG. 8*a* covers words W*t*0 and W*t*1 and FIG. 8*b* covers words W*t*1 and W*t*2;

FIG. 9 is a schematic diagram illustrating the function and general structural arrangement of circuits for algebraic and magnitude comparison and the sense operation and is specifically related to the program transfer circuits required in accordance with the present invention;

FIGS. 9*a* and 9*b* together form an operation and timing diagram for the various conditional and unconditional program transfer operations and the home command; FIG. 9*a* covers the words W*t*0 and W*t*1 and FIG. 9*b* covers the words W*t*2, W*tn*–1, and W*tn*;

FIG. 10 is a schematic diagram illustrating a complete mechanization for the timing and sequence control circuits required for one form of the present invention;

FIG. 11 is a timing diagram illustrating the phasing of the various signals produced by the circuits of FIG. 10 during the indicated operations;

FIG. 12 is a schematic diagram of a suitable transistor flip-flop circuit which may be employed in the system of the present invention;

FIG. 13 is a schematic diagram of a typical transistor adder circuit which may be employed in the S register;

FIG. 14 illustrates one form of selection matrix which may be employed in the system of the invention;

FIG. 15*a* illustrates a suitable form of transistor reading amplifier which may be employed in the systems employing the invention;

FIG. 15*b* illustrates a suitable form of transistor writing amplifier which may be employed in systems employing the invention;

FIG. 15*c* is a composite set of wave forms occurring at various points in the operation of the circuit of FIG. 15*b*;

FIG. 16 is a schematic diagram illustrating the function and general structural arrangement of one form of manual control circuits which may be associated with systems employing the invention, requiring a minimum of additional equipment;

FIGS. 16*a* and 16*b* together form an operation and timing diagram illustrating a typical utilization of the manual control circuits shown in FIG. 16.

*General Description of System Embodying the Invention*

Figure 1:
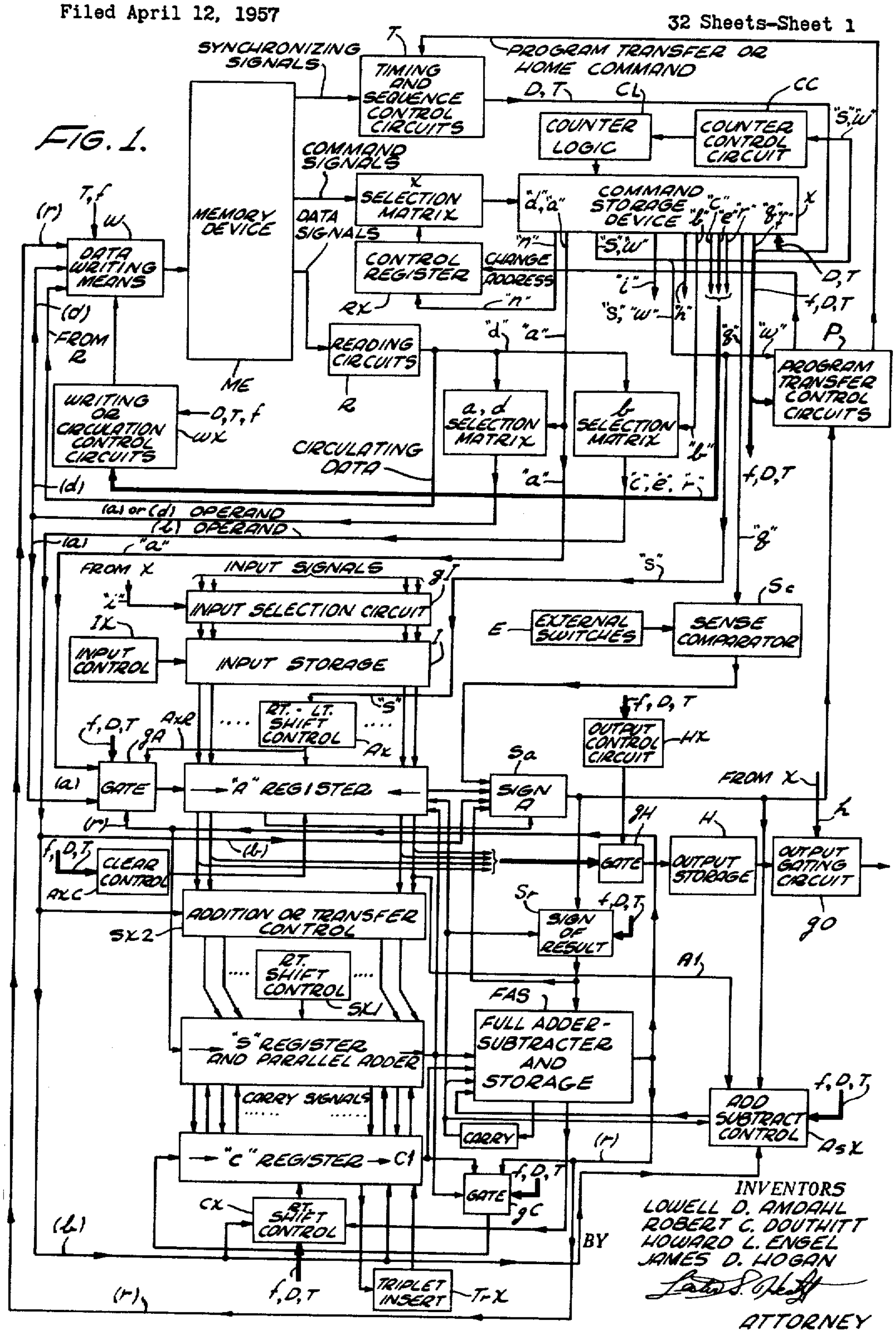
FIG. 1 is a block diagram illustrating a typical form of arithmetic unit employing the basic principles of the present invention.
Figure 2:
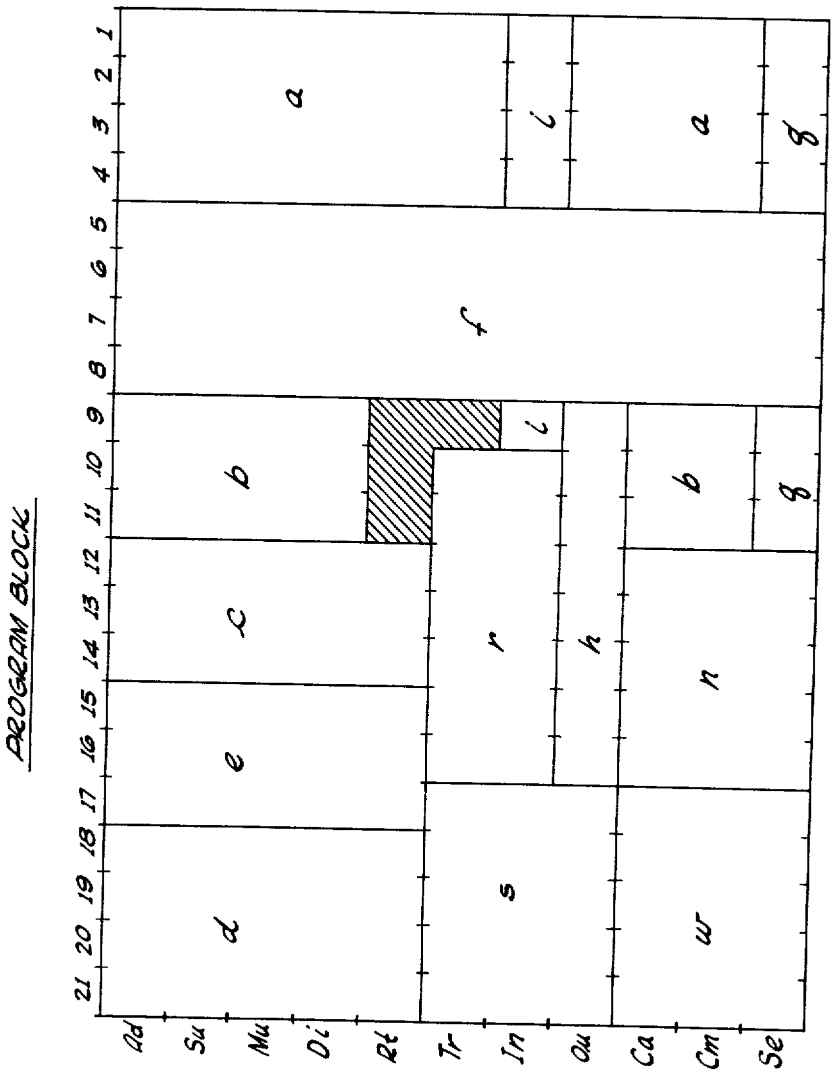
FIG. 2 is a diagram illustrating the form of the command words for the various operations which the typical artihmetic unit of FIG. 1 may perform.

(Reference to FIGS. 1 and 2)

Reference is now made to FIG. 1 wherein a typical system, arranged in accordance with the present invention, is shown in block diagram form. It will be understood that while the invention will be illustrated herein as a complete system, certain aspects of the invention may find independent utilization and are defined separately in the claims which follow. The description of an integral system is intended only to illustrate the interfunctioning of the various subcomponents of the invention and not to constitute a requirement that all of these components be employed to realize the various improved features of the invention resulting both from the independent and dependent operation of the respective components.

Referring now specifically to FIG. 1, it will be noted that a memory device ME is shown producing synchronizing signals, command signals, and data signals. The synchronizing signals are applied to a timing and sequence control circuit T which produces corresponding digit time signals D and sequence timing signals T. The notation employed here will be followed throughout where possible so that the elements and subcomponent circuits designated hereinafter will receive the same capital letter designation. Thus the flip-flops T10, T11, E12, T13, and T20, which are mentioned in the specific description which follows, form part of the timing and sequence control circuit T; and signals D0, D1 . . . D21 are specific digit time signals.

The command signals produced by the memory device are applied to a selection matrix X which then routes the selected signals to a command storage device referenced also as X. Hereafter the matrix will be referred to as matrix X and the storage device as storage device X. The same notation is employed to indicate the association of the two devices.

Matrix X is controlled by a register RX which receives the command address designation "*n*" from storage device X. Register RX also receives change of address control signals from a program transfer control circuit P.

The data signals read from memory device ME are applied to a set of reading circuits R and then either are reapplied to memory device ME through a data writing means W or are passed through one of two selection matrices for other routing. The signals read through circuits R are applied to a selection matrix (*a*,*d*), the output signal of which represents either a selected (*a*) operand or a selected (*d*) operand which is transferred to the "*e*" address as discussed above. The signals read through circuit R are also applied to a selection matrix (*b*), the output signal of which represents a (*b*) operand.

In addition to receiving data which is recirculated, data writing means W also receives the selected (*d*) operand and results (*r*) of operations which pass through a full adder-subtractor FAS to be discussed further below. The selection as to which of the various memory channels is to receive the data, and the timing of the selection, is controlled through a writing or circulation control circuit WX. It may be noted here that the letter X as employed in a second letter position represents a control circuit. Thus control circuit WX is designated with the letter X in its second letter position since it controls writing circuit W. Similar correspondence between the controlled and controlling circuits will be found in the discussion which follows.

Circuit WX thus receives the writing address code signals "*c*," "*e*," or "*r*," not previously mentioned; the latter representing the address of operands during input and transfer operations which will be further discussed below. For present purposes it is sufficient to note that the "*c*" address and the "*r*" address are quite similar in representing the channel that results are to be written on, whereas "*e*" is the address which receives the (*d*) operand during the simultaneous arithmetic transfer.

Referring again to program transfer control circuit P, it will be noted that this circuit receives code signals representing "*w*" which may indicate a waiting time or have particular code values for a search for home command. Circuit P then provides a control signal for timing and sequence circuit T which changes the timing as is required for the program transfer.

The code signal "*w*" as well as the code signal "*s*," not previously mentioned, are applied to a counter-control circuit CC. This circuit, in turn, actuates counter logic CL associated with certain storage elements in storage device X to cause these elements to count down from the code "*w*" or "*s*" to zero, as will be discussed further below. The quantity "*s*" represents an amount of shift and occupies the same code position as "*w*" during transmit, input, and output operations; allowing quantities to be shifted or scaled as required for subsequent operation. In this manner a dual operation of the same storage device X is possible due to the separation of the program transfer phase from the normal computation phase.

The counter logic device CL is the same in all cases, but the counter control circuit CC differs so that when code "*w*" is in storage device X, counting is performed once each word time until the end of the words-to-wait period and when code "*s*" is in storage device X, counting occurs once each digit time to provide a shift control signal. In the specific circuit mechanization which will be described, the counter logic is incorporated into the logic of storage device X.

It will be noted that the operation code "*f*" is stored in device X and then is shown as combined into a cable designated as *f*, D, T. This is done as a convenient representation to avoid the carrying of these signals throughout the drawings. Thus where they are required, they are shown as a short input arrow with the corresponding designation as will be noted in the description which follows.

The other signals which are produced by storage device X are best understood by considering a field designation diagram as shown in FIG. 2 wherein the command word is shown as it appears for each of the various operations which may be performed in the system.

The field designation diagram of FIG. 2 will be considered along with Table I below wherein the various operation symbols are defined and the operations are described briefly.

and the transmit commands appear in the general form:

/*s*/*r* or *h*, part *i*/*f*/*a*, *part i*/

It will be noted in Table I that the address "*h*," not previously mentioned, defines an output device position, and the address "*i*" defines a particular input address where the quantity (*i*) is located. The term "*s*" then defines the amount of shift required to shift an operand to be transferred as desired. The program transfer commands appear generally in the form:

/*w*/*n*/*b*, part *q*/*f*/*a*, part *q*/ where "*q*" is a sense command code specifying switches E to be sensed, as described below.

The numbers at the top of the program block shown in FIG. 2 correspond to the storage devices X1 through X21, shown specifically in FIG. 3*b*, which will be described below. These devices store the command word as it is entered providing then a parallel presentation of the corresponding code digits which are then grouped, as shown in FIG. 3*b*, in accordance with the program block separation shown in FIG. 2.

The fundamental philosophy of the command class separation provided by the invention is that each class then may employ the command code more efficiently and the net result is higher operational speed without a corresponding requirement of increased structure. The reason for this improvement will be understood better as the description continues with respect to specific circuits, but generally speaking it results from the ability to rearrange data during normal arithmetic processes so that the proper data may be obtained immediately following the end of an operation without any waiting time. During the usual arithmetic processing of the first class, then, each command word is read from the same channel immediately following the end of the previous operation to permit a continuous series of operations without any delay being required for a transfer to a different channel.

Referring now again to the general system shown in FIG. 1, it will be noted that the (*a*) operand selected through matrix (*a*,*d*) is applied to a gating circuit *g*A which also receives address signals "*a*." Gate *g*A also receives the operation and timing signals *f*, D, T as discussed above, and the output signals (*r*) which corresponds to the result of the previous operation, as will be discussed below. Gate *g*A is further controlled by a right-shift control signal AXR produced by shift control circuit AX.

Since the "*a*" address is the first code of each command, it is effective immediately after receipt to control the

TABLE I

| Class of command | Command | Symbol | Description of operations performed |
|---|---|---|---|
| Arithmetic | Multiply | Mu | Multiply (*a*) by (*b*) and store product in "*c*"; Transfer (*d*) to "*e*." |
| | Add | Ad | Add (*a*) to (*b*) and store sum in "*c*"; Transfer (*d*) to "*e*." |
| | Subtract | Su | Subtract (*b*) from (*a*) and store difference in "*c*"; Transfer (*d*) to "*e*." |
| | Divide | Di | Divide (*a*) by (*b*) and store quotient in "*c*"; Transfer (*d*) to "*e*." |
| | Square root | Rt | Take square root of (*a*) and store result in "*c*"; Transfer (*d*) to "*e*." |
| Transmit | Internal transmit | Tr | Multiply (*a*) by $2^s$ and store result in "*r*." |
| | Input transmit | In | Translate input quantity (*i*) if necessary. Multiply by $2^s$ and store result in "*r*." |
| | Output transmit | Ou | Multiply (*a*) by $2^s$ and make result available to output device "*h*." |
| Program transfer | Compare magnitude | Cm | If $\lvert(a)\rvert \geq \lvert(b)\rvert$, Wait *w* word-times and go to "*n*" for next command.[1] |
| | Compare algebraically | Ca | If $(a) \geq (b)$, Wait *w* word-times and go to "*n*" for next command.[1] |
| | Sense | Se | If all quantities sensed by *q* are binary 1's, wait *w* word-times and go to "*n*" for the next command. |

[1] Has special search-for-home interpretation.

It will be noted from Table I that three classes of commands are provided: arithmetic; transmit; and program transfer. As indicated in FIG. 2, the arithmetic commands include the information:

/*d*/*e*/*s*/*b*/*f*/*a* selection operation of matrix (*a*,*d*) which then reads the (*a*) operand. Thus, gating circuit *g*A functions to read in the corresponding (*a*) operand during the time that the remainder of the command word is being passed through matrix X to storage device X. The address "*a*" is also applied to gate $gA$ so that one code may be reserved to specify the circulation of the previous result ($r$) passing through device FAS back to the A register.

The ($a$) operand signals are entered into the A register in this manner until the sign digit thereof, appearing as the first serial digit, is shifted into device $Sa$. The sign storage device $Sa$ also receives a multitude of other signals and has several functions. It will be noted that the sensing code "$q$" which is entered into storage device X is applied to a sense comparator $Sc$ which also receives signals provided by external switches E. The output signal of sense comparator $Sc$ is then applied to sign storage device $Sa$ which produces a signal employed in program transfer control circuit P to indicate whether or not a predetermined transfer condition has been satisfied.

In other operations, storage device $Sa$ receives the sign of the result derived through a circuit $Sr$ which is also operative to produce a signal to indicate whether or not a program transfer condition has been satisfied. Thus it will be noted that the result sign circuit $Sr$ receives the signal from a carry circuit associated with full adder-subtracter FAS which indicates whether or not the operation performed has resulted in an overdraft.

It will be seen from the detailed description which follows that the logic for determining the sign of the result is similar in many respects to that required to determine whether or not a program transfer condition has been satisfied. It will also be noted that the sign of the ($b$) operand is applied to storage device $Sa$ as is required in order to form the sign of the result for multiplication and division.

The ($b$) operand derived through the ($b$) selection matrix may constitute a number for addition or subtraction, a divisor, or a multiplier. In the operations of addition or subtraction, the ($b$) operand signals are passed through stage C1 constituting the end of a C register to a full adder-subtracter FAS, being combined therein with the ($a$) operand originally entered into the A register and transferred in parallel to an S register under the control of addition or transfer control device SX2. A similar entry is made for division, provision being made for recirculating the C register through a gate $gC$.

In multiplication the ($b$) operand multiplier digits are applied both to control device SX2 and to right shift control device CX associated with the C register. In this case the ($a$) operand remains in the A register and is added or subtracted in accordance with the ($b$) operand digit value. When the ($b$) operand digits are zero, device SX2 is set to zero and CX is set to one and right shift control device CX1 for the S register is turned on so that both the S and C registers are shifted to the right and applied to full adder-subtracter FAS. This provides an improved multiplication technique which will be discussed further below allowing a considerable simplification in the parallel adder logic forming the S register.

The ($b$) operand is also applied to add-subtract control device $AsX$ which further receives the sign of the ($a$) operand from device $Sa$, various timing and control signals $f$, D, T, and a signal from the end of the A register representing a quotient or root digit to specify the add-subtract control for division or square root.

Although many add and shift controls are possible for the S register, it will be assumed that the control configuration employed is represented as follows:

| SX1 | SX2 | |
|---|---|---|
| 0 | 0 | No operation. |
| 1 | 0 | Shift without adding. |
| 1 | 1 | Shift and add. |

According to this table, then, when both signals SX1, SX2 are off, neither addition nor shift is performed. When they are both on, addition is performed with the numbers being shifted to the right; and when only SX1 is on, right shift is performed with no addition, such as is the case when signals are shifted to full adder-subtractor FAS without modification.

With the circuits just discussed, serial operations $Ad$, $Su$, $Ca$, $Cm$ and $Di$ are performed by shifting numbers in the S and C registers and passing them through adder-subtracter FAS. In operations of addition and subtraction, the ($a$) operand is entered into the A register and then transferred in parallel to the S register. In division the dividend is initially transferred as the ($a$) operand from the A register to the S register and then successive partial remainders in the S register are combined with the divisor entered as the ($b$) operand into the C register, being circulated successively therethrough.

In division and square root the result digits are entered into the A register as they are formed and then are transferred to the S register by addition to zero under the control of device SX2 at the end of the operation. The S register result (quotient or root) is shifted out serially through full adder-subtracter FAS. It will also be noted that full adder-subtracter FAS has an output lead applied to right shift control device CX. This connection is employed to control the right shifting of the C register so that it does not begin until a non-zero digit is detected in the result. If right shift control device CX is not turned on throughout the complete addition or subtraction operation, the result is zero and this is used in a logical manner discussed for comparison operations. The result ($r$) is produced by adder-subtracter FAS and is also applied to gate $gC$ for recirculation to allow complementation where there has been an overdraft, as would be indicated by the carry signal of the carry device associated with device FAS.

Also associated with the C register is triplet insertion control circuit $TrX$ which is employed for square root to make a succession of changes in the root subtrahend as is required.

During input operations, the input code "$i$" is applied to an input selection circuit $gI$ which passes the input signal to an input storage device I controlled by an input control device IX. Signals provided by storage device I are transferred in parallel to the A register, which is cleared by control device AXC, and then shifted right or left in accordance with the code "$s$" which is applied to shift control circuit AX. The code "$s$" is also applied tó counter control circuit CC, as discussed above, which is effective through counter logic CL to actuate the corresponding storage devices X to count down until the code "$s$" becomes zero. When "$s$" becomes zero, shift control device AX is turned off and the quantity in the A register is in the desired position.

A similar set of structure is employed for transmitting output signals, a typical situation being illustrated in the parallel transmission of A register signals through a gate $gH$ to an output storage device H under the control of the circuit HX which receives certain control and timing signals F, D, T. The signals of storage device H then are sent to the desired point of utilization through an output gating circuit $gO$, the address being specified by the code "$h$" which is held in storage device X.

*General Description of Serial Magnetic Drum System Embodying Various Features of Invention*

(Reference to FIGS. 3$a$, 3$b$, 3$c$ and 3$d$)

The general as well as the specific improvements provided by the present invention can best be understood by considering a specific example. Reference for this purpose is therefore made to FIGS. 3$a$, 3$b$, 3$c$ and 3$d$ illustrating the general form of a particular embodiment of the invention wherein a magnetic drum is employed as the memory and all operations are performed serially except multiplication which is performed in serial-parallel.

In the description which follows, many particular circuit arrangements will be described which may constitute the general block components shown in FIG. 1. It will be understood, of course, that the particular arrangement to be discussed is not intended in any way to constitute a limitation of the invention and in many cases does not necessarily constitute preferred practice since so many alternatives are possible. An attempt will be made throughout to correlate the specific circuits to be described with the general block means shown in FIG. 1.

The principal purpose of the following description is to introduce the various signals which are employed in the system so as to form a basis for the logical derivation of the various circuits which follow. Occasionally, specific logical expressions will be introduced so that a gradual transition may be made into the more complex derivations which follow. The actual logical derivation will be covered separately with regard to various groups of operations covered in the following sections as follows:

(1) Logic for the operations of addition, subtraction, compare algebraically, and compare magnitude without program transfer functions—including basic system timing.
(2) Logic defining the transfer of information to and from the memory.
(3) Derivation of the logic for serial-parallel multiplication.
(4) Derivation of the logic for division.
(5) Derivation of the square root logic.
(6) Derivation of the logic for the operations of transmit, input, and output.
(7) Derivation of the logic for the program transfer operations, compare algebraically, compare magnitude, and sense.
(8) Derivation of the complete timing and sequence control functions for all operations.
(9) Summary of complete system logic for all operations.

Referring now specifically to FIG. 3*a*, it will be noted that in the upper left-hand corner thereof a legend is shown indicating the manner in which FIGS. 3*a*, 3*b*, 3*c* and 3*d* are related so that a complete system employing the invention may be studied. In FIG. 3*a*, in particular, it will be noted that the memory device ME of FIG. 1 is found in a magnetic drum which provides both the required command and data storage and certain synchronizing signals as will be discussed.

It will be noted that a channel is provided for word pulses, the output signal of which is applied to a reading flip-flop R21. This word pulse also may be referred to herein as a digit timing pulse D21 since it occurs in the last digit position of each word, assumed as an illustration to include positions D0, D1 through D21, or 22 digit time intervals.

The other basic synchronizing pulses referred to herein are the clock pulses and are also derived from a channel on the magnetic drum. These pulses are applied to a clock pulse generating circuit designated as C*p*. The clock pulse signals will not be considered to be part of the logic which follows. It will be assumed, however, that these signals are applied to the flip-flop circuits, such as is shown in FIG. 12 and therefore are inherent in the logic due to the gating function obtained through the flip-flop. The manner in which this may be accomplished is shown in specific detail in FIG. 12, wherein a typical flip-flop is shown.

A plurality of command channels are provided, the output signals of which are applied to a selection matrix X which is controlled through a register RX including stages RX1–RX5, and corresponding associated gating circuits *g*RX1–*g*RX5 which receive the channel address code "*n*" stored in command storage flip-flops X12–X16, respectively. The output signal provided by matrix X is passed through a reading flip-flop R11 which then provides the input signal for the first stage X21 of the command storage register, as shown in FIG. 3*b*.

The magnetic drum includes a plurality of constant channels, the output signals of which are applied to selection matrix (*a,d* #1) coupled then to a reading flip-flop R10, through an amplifier R*a*10.

The memory channels described up to this point include permanent information which must be entered through external means, not shown. These signals are not modified during the course of the computation which is to follow.

In addition, a plurality of memory channels are provided wherein the information may be modified, certain of these channels being revolvers, or circulating registers. In particular, it will be noted that 9, 3, 5 and 7 word revolvers are provided, the output signals of which are applied to reading circuits R1, R3, R5 and R7, respectively. The purpose of these revolvers will be more particularly described below, but in general they make it possible to rearrange data during the (*d*) to "*e*" transfer. Several data channels are also provided, the output signals of which are applied to reading circuits R2, R4 and R6, respectively. It will be noted that a command data channel is included allowing the system to modify its own command words.

Since the signals available from the erasable channels are passed through reading circuits producing the usual logical output signals, the selection matrices (*a,d* #2) and (*b*) may be mechanized in the general form of the logical circuits which are employed throughout the system to be described. Accordingly, these matrices will not be shown in specific detail since it is believed that such a design will be apparent to those skilled in the art. On the other hand, matrix (*a,d* #1) reads the magnetic drum signals directly and a different type of gating is required. A suitable form for this type of matrix is shown in FIG. 14 and constitutes the invention of copending application by Robert C. Reed et al. for "Electrical Gating Circuit" filed October 20, 1958, Serial No. 768,236, now Patent No. 2,984,826.

The output signals of reading circuit R10 and selection matrix (*a,d* #2) are applied to a gating circuit *g*Y72 which provides input signals for an amplifier Y72. This series of circuits corresponds to reading circuits R and the selection matrix (*a,d*) shown in FIG. 1. The designation "Y" will be employed throughout this specification to specify amplifiers, and the particular numbers employed correspond to those presently used in an embodiment of the invention.

It will be noted that a dotted line is shown around matrix (*a,d* #2) and the gate *g*Y72. The purpose of this is to indicate that these two circuits may be combined into a single logical network which could be designated as *g*Y72 since it drives amplifier Y72.

It will be noted that the command storage signals X1, X2, and X3 control the selection operation of matrix (*a,d* #2); and the same signals are applied to selection matrix (*a,d* #1). The command storage signals X4, X4′ (X4′ being the complementary state signal and X4 being the normal signal) are applied to gating circuit *g*Y72. The particular channel selections defined by the command register signals are indicated in Table II below although it will be understood that many different gating codes may be employed which are equally suitable.

TABLE II

| $a$, $d$ | | | | Interpretation |
|---|---|---|---|---|
| 0 | 0 | 0 | 0 | $a$: S register content. $d$: Home mark.[1] |
| 0 | 0 | 0 | 1 | 9 word revolver. |
| 0 | 0 | 1 | 0 | Command-data channel. |
| 0 | 0 | 1 | 1 | 3 word revolver. |
| 0 | 1 | 0 | 0 | Data channel. |
| 0 | 1 | 0 | 1 | 5 word revolver. |
| 0 | 1 | 1 | 0 | Data channel. |
| 0 | 1 | 1 | 1 | 7 word revolver. |
| 1 | 0 | 0 | 0 | Source of zeros. |
| 1 | 0 | 0 | 1 | Constant channel. |
| 1 | 0 | 1 | 0 | Do. |
| 1 | 0 | 1 | 1 | Do. |
| 1 | 1 | 0 | 0 | Do. |
| 1 | 1 | 0 | 1 | Do. |
| 1 | 1 | 1 | 0 | Do. |
| 1 | 1 | 1 | 1 | Do. |
| X4 | X3 | X2 | X1 | Command register flip-flops. |

[1] Assumed to be accompanied by "e"=000.

It will be noted from Table II that when X4′ equals 1, corresponding to the zeros in the table in the X4 position, the erasable channels are read and when X4 equals 1, the constant channels are read except for the code 1000 where the absence of any selection results in zero output signal of amplifier Y72 as will be considered further below.

The signals of reading circuits R1, R3, R5, and R7 are applied to circulation flip-flops W11, W13, W15, and W17, respectively, so that they may be recirculated except when data rearrangement is being performed in accordance with the ($d$) to "$e$" transfer, or when results are entered. The signals of the circulation flip-flops are then applied to gating circuits $g$W1, $g$W3, $g$W5, and $g$W7 associated with the corresponding writing flip-flops. These gating circuits also receive the output signal of a flip-flop W0.

In the case of the even-numbered channels, it will be noted that the related control signals are applied directly to the writing amplifier; whereas the control signals for the odd-numbered channels are employed to transfer signal W0 into corresponding writing flip-flops. Thus the signals produced by control devices WX2, WX4, and WX6 are applied directly to amplifiers W$a$2, W$a$4, and W$a$6, respectively; whereas the signals of devices WX1, WX3, WX5, and WX7 are applied to gating circuits $g$W1, $g$W3, $g$W5, and $g$W7, respectively, controlling the passage of signals W0 into respective writing amplifiers.

The reason for this is that the even-numbered channels are data channels which do not always receive information to be recorded. It may be necessary to cut off the writing amplifier entirely to avoid destroying information on the data channel. Thus the control signal is applied as a cut-off bias to the associated amplifier rather than as a gating signal to the logical gating network. A suitable technique for biasing a writing amplifier to prevent the recording of any signal is indicated in FIG. 15$b$ which will be discussed below. For present purposes, however, it is sufficient to note that new information or previous information is entered into the odd-numbered channels under the control of the corresponding control flip-flop since in this case information is always being either entered or recirculated; whereas, in the case of data channels, information may be entered but is not recirculated except by way of the complete revolution of the memory drum.

Gating circuit $g$W0 providing input signals for flip-flop W0 serves to separate the results of various operations. During the last word-time interval of an operation, as will be designated hereafter by a timing control signal T13, the result signals ($r$) are derived from full adder-subtracter FAS, which is assumed hereafter to include an amplifier Y31. At the beginning of the time interval T13, or during D0 time, the first digit time interval, the sign of the result ($r$) is entered into gating network $g$W0. This particular time interval, namely, D0 and T13, is designated hereafter by the amplifier signal $Y61=D0.T13$, where the dot (.) represents the logical "and." This signal is generated as a matter of convenience since it is employed in various other points of the system. The sign signal is derived through an amplifier Y71 which corresponds to device S$a$ discussed above with reference to FIG. 1.

During word-time intervals other than the last operating time interval, which is designated by $T13=1$, the complementary signal condition occurs where the signal $T13'=1$. When $T13'=1$, and specifically $T11=1$, the ($d$) to "$c$" transfer is performed, the ($d$) operand being obtained through amplifier Y72 and applied to gating network $g$W0.

The gating operation thus described is indicated generally in FIG. 3$a$ by associating corresponding signals with each other. Thus the pair of signal leads designated as: T13′ and Y72, Y72′, are shown to indicate that when signal $T13'=1$, the information indicating operand ($d$), available through amplifier Y72, is passed into flip-flop W0. In a similar manner, signal Y61 is associated with sign signals Y71, Y71′, to indicate the entry of the sign at the time $Y61=D0.T13=1$. Finally, the full adder-subtracter signals Y31, Y31′, are entered by signals T13 and Y61′, indicating the last word time interval of an operation, other than the sign interval ($Y61'=1$).

The final separation of the signals to be reentered into the memory through any of writing amplifiers W$a$1 through W$a$7 is made under the control of flip-flops WX1 through WX7. During the performance of usual arithmetic operations, which are designated by the signal $T11=1$, as will be further discussed below, the flip-flops WX1 through WX7 are selectively turned on in accordance with the "$e$" address. At the beginning of the last word of an arithmetic operation flip-flops WX1 through WX7 are selectively turned on in accordance with the "$c$" address. During the last word of the operations I$n$ and T$r$, the control flip-flops are selectively turned on in accordance with the "$r$" address. An attempt is made to show this correspondence generally in FIG. 3$a$ by grouping corresponding signals as they are employed.

A suitable address code designation for "$b$," "$c$," "$e$" and "$r$" is shown in Tables III and IV below and a suitable operation code designation is shown in Table V.

TABLE III

| $b$, $c$, $e$ | | | Interpretation |
|---|---|---|---|
| 0 | 0 | 0 | $b$: Source of zeros. $c$, $e$: No drum storage. |
| 0 | 0 | 1 | 9 word revolver. |
| 0 | 1 | 0 | Command-data channel. |
| 0 | 1 | 1 | 3 word revolver. |
| 1 | 0 | 0 | Data channel. |
| 1 | 0 | 1 | 5 word revolver. |
| 1 | 1 | 0 | Data channel. |
| 1 | 1 | 1 | 7 word revolver. |
| X11 | X10 | X9 | $b$ } Command register flip-flops. |
| X14 | X13 | X12 | $c$ } Command register flip-flops. |
| X17 | X16 | X15 | $e$ } Command register flip-flops. |

TABLE IV

| Bit of $r$ | Recipient | Command register flip-flops |
|---|---|---|
| 1 | 9-word revolver | X10 |
| 2 | Command-data channel | X11 |
| 3 | 3-word revolver | X12 |
| 4 | Data channel | X13 |
| 5 | 5-word revolver | X14 |
| 6 | Data channel | X15 |
| 7 | 7-word revolver | X16 |

TABLE V

| f | | | | Symbol | Command |
|---|---|---|---|---|---|
| 0 | 0 | 0 | 0 | ---- | Not used. |
| 0 | 0 | 0 | 1 | ---- | Do. |
| 0 | 0 | 1 | 0 | Mu | Multiply. |
| 0 | 0 | 1 | 1 | ---- | Not used. |
| 0 | 1 | 0 | 0 | Ad | Add. |
| 0 | 1 | 0 | 1 | Su | Subtract. |
| 0 | 1 | 1 | 0 | Di | Divide. |
| 0 | 1 | 1 | 1 | Rt | Square root. |
| 1 | 0 | 0 | 0 | Tr | Internal transmit. |
| 1 | 0 | 0 | 1 | In | Input transmit. |
| 1 | 0 | 1 | 0 | Ou | Output transmit. |
| 1 | 0 | 1 | 1 | ---- | Not used. |
| 1 | 1 | 0 | 0 | Cm | Compare magnitude. |
| 1 | 1 | 0 | 1 | Ca | Compare algebraically. |
| 1 | 1 | 1 | 0 | Se | Sense. |
| 1 | 1 | 1 | 1 | ---- | Not used. |
| X8 | X7 | X6 | X5 | Command register flip-flops | |

Referring again to FIG. 3*a* and to Tables III and IV, it will be noted that a particular code designation for "*c*" and "*e*" and "*r*" is indicated for the input signals applied to *g*WX1. Thus signals X17′, X16′ and X15 are included for selecting the nine-word revolver for the "*e*" address, corresponding to the code 001; the signals X14′, X13′, X12 for selecting the "*c*" address corresponding to the code 001; and the signal X10 for selecting the "*r*" address. The manner in which the other signals are employed in accordance with the code designations should be apparent from this example.

It will be shown in the detailed discussion below that the writing logic may be simplified by transferring the "*c*" address from storage devices X12–X14 to storage devices X15–X17 so that the signals representing the "*c*" and "*e*" addresses are the same.

In considering Table V, it will be noted that the signal X8 is equal to zero for all of the usual arithmetic processes: M*u*, A*d*, S*u*, D*i* and R*t*. Thus it will be recalled that X8′ appears in association with the addresses "*c*" and "*e*" to designate the address for results of arithmetic operations or the address for the simultaneous transfer operation. As indicated in Table V, the "*f*" code $$X7'.X6'=1$$

designates only the operations T*r* and I*n*, since the other possibilities are not used. This code then appears with the "*r*" address.

Referring now to FIG. 3*b*, it will be noted that the word pulse signals and the clock pulse signals derived through flip-flops R21 and C*p*, respectively, are applied to a digit counter D which produces the various digit timing signals employed throughout the system. Certain of these digit time signals are applied to a sequence control circuit T which also receives certain "*f*" signals and certain signals which may be considered to come from various program transfer control circuits. Circuits D and T together may be considered to comprise the timing and sequence control circuits T of FIG. 1.

The command words which are selected through matrix X and passed through reading flip-flop R11 are shifted serially into storage flip-flop X21 through its gating circuit *g*X21 under the control of a timing signal T20. This timing signal thus controls the reading in of all command words and has a complex definition in order to account for the various operations which may be performed and the various program transfer functions which are provided in accordance with the invention. The logic which is required will be developed as that for the various operations is considered and then summarized in connection with FIG. 10 where a suitable mechanization for sequence control circuit T is shown.

Storage device X21 is connected in series through respective gating circuits to devices X20, X19 and X18, in that order. These four storage devices and the reading flip-flop R11 provide a parallel code storage which is then read for transferring various code groups into the other command storage flip-flops, as will be described.

(Reference to FIG. 4 for Command Word Transfer)

The manner in which this transfer occurs for the usual arithmetic command is best illustrated in FIG. 4 where it will be noted that time runs from right to left. As indicated in FIG. 4, the first "*a*" address digit *a*1 appears in flip-flop R11 at digit time D16. This digit, then, is successively shifted through flip-flops X21, X20 and X19 to X18 during the digit times D17, D18, D19 and D20. At digit time D20, then, address code digits *a*1, *a*2, *a*3 and *a*4 appear in the flip-flops X18, X19, X20 and X21, respectively, and are then transferred in parallel to the storage flip-flops X1, X2, X3 and X4, respectively. The code digits *b*1, *f*4, *f*3, *f*2, and *f*1 appear in the flip-flops R11, X21, X20, X19, and X18, respectively, during the digit time D2 and are then transferred in parallel to flip-flops X9, X8, X7, X6, and X5, respectively. This type of entry is continued then with the code digit *b*2 being transferred to flip-flop X10 at digit time D5; the code digits *c*3, *c*2, *c*1, and *b*3 being transferred to X14–X11 at D8 time; and the code digits *e*3, *e*2, and *e*1 being transferred to the flip-flops X17, X16, and X15 at D11.

It will be noted then that the code digits *d*4, *d*3, *d*2, and *d*1 remain in flip-flops X21, X20, X19 and X18, respectively, and are not transferred to flip-flops X4, X3, X2, and X1, respectively, until D20. This transfer occurs after the (*a*) operand has been entered into the A register. In this manner, the "*d*" address is entered into the same flip-flops that retain the "*a*" address so that as soon as the arithmetic operation begins during the following word time interval (designated by the timing signal $T11=1$) the simultaneous (*d*) to "*e*" transfer may be performed.

Returning now again to FIG. 3*b*, it will be noted that the timing signals D20, T10 and T20 are applied to a gating circuit *g*Y64 which actuates an amplifier Y64. The signal Y64 then provides the timing control required to transfer the "*a*" and "*d*" addresses of the command signals into the flip-flops X1–X4. Thus the address "*a*" is transferred at the time $D20.T20=1$ and the address "*d*" is transferred at the time $D20.T10=1$, as indicated in FIG. 4. In a similar manner, a signal Y66 is defined as $D2.T20$ and is employed to effect the transfer to the flip-flops X5–X9 as discussed above; a signal Y67 is defined as $D8.T20$ and controls the transfer to flip-flops X11–X14; and a signal Y68 is defined controlling the transfer to flip-flops X15–X17. Since only a single flip-flop is involved, the timing signals D5 and T20 are employed directly to effect the gating to flip-flop X10. It will be understood that this particular arrangement of timing signal amplifiers is not necessary in practicing the invention but is employed here simply as a convenient means of limiting the loading on the timing flip-flops. The various amplified timing signals provided by Y61, Y64, Y65, Y67, and Y68 are all run into the same cable and then joined with the other D and T timing signals to be employed throughout the rest of the system.

(Reference to FIGS. 9*a* and 9*b* for Program Transfer)

It will be noted that the signals X1, X2, X3 and X4 are transferred to the flip-flops X5, X9, X10, and X11, respectively, when the signal Y66 is present. The signal Y66 is defined as follows:

$$Y66=D20.T11.X8.X7$$

and indicates that a program transfer is being performed. In this case, the code "*w*" which is entered into the flip-flops X1–X4, as shown in FIG. 9*a*, must be held in order to determine whether or not the program transfer condition is satisfied. Thus, in FIG. 9*a*, it will be noted that the code "*w*" is transferred at the time $D20.T11=1$ so that the new "*a*" address may be entered into the flip-flops X1–X4. If the program transfer condition is satisfied, a signal Y62 is generated and then the "$w$" code is returned to the flip-flops X1–X4. Thus, it will be noted in FIG. 3$b$ that the signals X5, X9, X10 and X11 are returned to flip-flops X1–X4, respectively, in response to the signal Y62, which is defined below.

The manner in which the various program transfer operations are performed will be more fully described with reference to FIG. 9, where the structure is shown, and FIGS. 9$a$ and 9$b$ illustrating the typical timing involved.

For present purposes it is sufficient to note that signal Y66 indicates that a program transfer operation is being performed and that signal Y62 indicates either that the condition has been satisfied or that a search for home command is being performed. A signal is entered into a flip-flop M3, shown in FIG. 3$b$, through its gating circuit $g$M3 when "$w$" is a first code specifying that a search for home command is to be performed, assumed hereafter to be:

$$w5w4w3w2w1=11111$$

Flip-flop M3 is turned off when the home command word is located. The home command word may be designated by any desired code in any convenient position. As an illustration, it will be assumed that this is done by means of a second code "$w$" assumed to be:

$$w5w4w3w2w1=00000$$

However, the particular location of the home-command-designating code is unimportant in the technique of the invention.

It will be noted that signals representing the second home command code "$w$" (00000) are obtained by sensing flip-flops R11 and X18 through X21 rather than flip-flops X1 through X4 and X17 where the code "$w$" is generally stored. The reason for this is that the home command flip-flop M3 must be turned to zero prior to the time that the sequence timing flip-flop T20 is normally turned on. It will be seen later that this requires that M3 be turned off at D14 time and it is at this time that the "$w$" is available as indicated.

It will also be noted that the codes "$s$" and "$w$" are both available through the same flip-flops due to the code sharing indicated by the program block shown in FIG. 2. In FIG. 2 these codes are shown associated with the flip-flops X17 through X21 but the digits in the flip-flops X18 through X21 are transferred to flip-flops X1–X4 in the same manner as the "$d$" address at the time D20, reference being made again to FIG. 4.

Referring again to FIG. 3$b$, it will be noted that the "$s$" or "$w$" code signals are applied to a gate $g$Y74 for an amplifier Y74, the gate sensing all of the zero or prime output signals to detect the condition $s$ or $w=0$. The command register flip-flops X1–X4 and X17 are interconnected as a counter so that either the code "$w$" or "$s$" may be counted down to zero. This count-down function is controlled through a flip-flop M4 shown in FIG. 3$c$, which is turned on if the code "$w$" or "$s$" is not equal to zero and is turned off after "$s$" equals zero or immediately after being turned on for the words-to-wait operation.

In transmit operations, the condition "$s$"=0, as indicated by the signal Y74, terminates the shifting of the operand in the A register; whereas in program transfer operations, the condition "$w$"=0, again indicated by signal Y74, is utilized to turn on sequencing timing flip-flop T20 so that the next command is brought in. Thus counting down from the code "$w$" to zero provides the desired words to wait. It should be noted, however, that where the code "$w$" is the search-for-home-command code, the normal words-to-wait operation is not performed, although flip-flops X1–X4 and X17 may be actuated to count down. In this case, flip-flop M3, mentioned above, is turned on so that sequence timing flip-flop T20 is turned on at the beginning of each command word until the home command code is located.

The logical control required in gating circuits $g$X1–$g$X4 and $g$X17 may be considered to constitute the count logic device CL shown in FIG. 1, and the gating circuit $g$M4 and flip-flop M4 may be considered to constitute count control device CC of FIG. 1.

The manner in which the various connections are made to flip-flops X1 through X17, as indicated in FIG. 3$b$, is best understood by considering this figure along with the program block of FIG. 2. Codes "$a$" and "$d$," for example, are both obtained from the storage devices X1 through X4, the code "$d$" being transferred to these storage devices at the end of a command word read-in time, as indicated above. The code "$f$" is obtained as a function of the storage flip-flop signals X5 to X8; the code "$b$" as a function of the signals X9, X10 and X11, the input code "$i$" as a function of the storage devices X1 through X4 and X9; the code "$h$" as a function of the signals X9 through X16, and so forth.

It will be noted that the code "$h$" is applied to an output matrix which receives the output operand, typically consisting of signals A1 through A5 from the A register. The gating circuit $g$H is controlled by control device HX1 which receives certain control signals $f$, D and T through a gating circuit $g$HX1. The A register signals then are passed through this gate to a storage device H and then to an output matrix $g$O which receives the code "$h$" determining where the particular output operand is to be routed.

Reference is now made to FIG. 3$c$ where the general form of the circuits associated with the A register is shown. As indicated in FIG. 3$c$, the A register typically may include flip-flops A1 through A21. In referring again to Table II above, it will be noted that the ($a$) operand may be derived either from the revolvers or various data channels or, for the code 0000, may be taken from the S register. The "$a$" address code signals are applied to an amplifier gate $g$Y75 to produce signals Y75' and Y75 indicating "$a$"$\neq$0 and "$a$"=0, respectively. When address "$a$" is equal to all zeros ($Y75=1$), the S register result signals are derived through full adder-subtracter amplifier Y31 and entered into flip-flop M1 shown in FIG. 3$c$. This applies for all time intervals except the first, D0, at which time the sign of the result is obtained from amplifier Y71. Whenever the code "$a$" is not equal to zero ($Y75'=1$), the selected ($a$) operand passed through amplifier Y72 is entered into flip-flop M1.

The right shift control is provided through a flip-flop AX1 which is coupled to each of the gating circuits for the various A register flip-flops and the left shift control is achieved through a flip-flop AX2. Signal AX2 need not be applied to gating circuit $g$AX1 since no flip-flop appears to the right thereof. It will be noted that signal AX2 is applied to circuit $g$A2 although signal A1 is not. In this case, signal AX2 is applied to control the shifting in of quotient and root digits for division and square root.

A clear control flip-flop AX3 is shown corresponding to the clear control means AXC of FIG. 1 and is employed to reset all flip-flops to zero prior to the entry of input quantities through gates $g$L1 through $g$L21 to devices L1 through L21, which may be either amplifiers or flip-flops depending upon the input logic. It will be noted that the input code "$i$" is applied to gates $g$L1 through $g$L21 and determines which input quantity is passed to the A register.

Wherever it is convenient, the various signals which are employed in the gating circuit shown in FIG. 3$c$ are shown so that reference may be made later to FIG. 3$c$ after the logic for the various gating circuits has been developed. Thus a general summary of the organization of a typical system in accordance with the invention is provided.

It will be noted that the flip-flop M4, mentioned above, controls each of the flip-flops AX1 and AX2 so that shifting is performed until "$s$"=0. Thus signal Y74 is also applied to flip-flop M4 to turn it off as mentioned above.

Flip-flop A1 corresponds to sign storage device S$a$ shown in FIG. 1 and receives a sense comparison signal through comparator S$c$ which receives the sense code "$q$"

and switch signals E1 through E7. The output signal of comparator Sc is entered into flip-flop A1 under the control of amplifier signal Y63 defined as D20.*Se*, indicating the end of word W*t*0 for the sense operation.

Although other operations are possible, in the illustrative logic shown below the output signal of comparator Sc is arranged to turn flip-flop A1 on if the sense condition is not met, flip-flop A1 being initially set to zero.

With this convention, the zero state of flip-flop A1 indicates that the condition has been met and accordingly, signal A1′ will be noted in various places as designating a situation where a particular program transfer condition has been met.

Flip-flop A1 also receives signal Y71 which represents the sign of the result and corresponds to the signal produced by circuit S*r* of FIG. 1. In order to insure the proper logical correspondence between the sense condition and other conditions, as well as the sign of the result, signal Y71 is defined to be on whenever the result of an operation is negative, or a comparison has been performed indicating that the (*b*) operand is greater than the (*a*) operand.

Reference is now made to FIG. 3*d* where the A and C registers and associated circuits are shown. The S register includes a series of full adders designated as FA and the C register includes a series of carry circuits, each carry circuit being associated with one of full adders FA. Both the S and C register may be operated either to shift the information therein without change or to function as a series of separate serial adders, each combining an applied A register signal, the S register signal from the next higher place and a carry signal from the associated carry storage device.

Thus it will be noted that S register storage device S20 receives signals through a gating network *g*Y50 which includes a full adder FA combining the following signals: A register signal A20, S register signal S21, and C register carry signal C20, to form a series of sum digits.

Gating circuit *g*Y50 is shown as including two "and" circuits S20*a*1 and S20*a*2 controlled by signals SX2 and SX2′, respectively. Control signals SX2 and SX2′ are produced by device SX2 which controls the adding or shifting function of the S register. When signal $SX2=1$, the S register functions as a series of full adders and when $SX2'=1$, it functions as a shifting register, at which time a signal, such as S21, is shifted directly to the next lower S register place, such as S20. When the S register functions as a series of full adders, each full adder FA signal is passed through a corresponding "and" circuit, such as S20*a*1, to its associated amplifier, such as Y50.

The S register operation is also controlled by shift control device SX1, the signal of which is applied to the series of "and" circuits which shift the output signals of the S register amplifiers into the following flip-flop storage device. Thus amplifier signals Y49 and Y49′ are gated through "and" circuits S19*a*1 and S19*a*2, respectively, into flip-flop S19.

It will be understood that while the S register logic is shown separately in the above manner to illustrate either the formation of a signal through the full adders FA or the shifting of signals by respectively bypassing the full adders, actually the logic may be combined into a single expression as will be considered below.

In certain operations, such as serial addition and subtraction, it is necessary to add the number in the S register to the number in the C register as they are both shifted to the right. This is accomplished by applying the output signals of stage S2 of the S register to a full adder-subtracter considered to constitute gating circuit *g*Y31 driving amplifier Y31. In addition, a stage C21 is provided which receives any carry signals produced by full adder-subtracter FAS. It will also be noted that the (*b*) operand signals derived through amplifier Y73 are passed to C register stage C1.

It will also be noted that the output signals of flip-flop C1 are applied to a gating circuit *g*Y70 driving an amplifier Y70, gating circuit *g*Y70 also receiving add-subtract control signals M5 and M5′, providing the function of device A*s*X of FIG. 1. Amplifier Y70 is actuated to either gate signal C1 directly through during addition or to complement this signal for subtraction. Signals Y70 and Y70′ are then employed in adder-subtracter FAS so that during addition the (*b*) operand (represented by Y70) is added to the S register signals and during subtraction, the complement of the (*b*) operand is added (represented by Y70′).

The output signals of amplifier Y31 are entered into storage device S1 and may be circulated in the S register through gating circuit *g*Y51 and amplifier Y51 into flip-flop S21. This occurs for such operations as division and square root when the partial remainders are being formed.

Signal S1 is applied to the gating circuit *g*Y76 associated with amplifier Y76 so that the result of an operation may be passed to the C register through flip-flop C20. This operation will be discussed below when addition and subtraction are considered. Gating circuit *g*Y76 also receives the output signal C1 of the C register, which may be recirculated through gating circuit *g*C20 during such operations as division and square root.

The right shifting of the C register is controlled by means of a flip-flop CX1 corresponding to the shift control circuit CX of FIG. 1. It will be noted that each stage in the C register has its output signal applied to an associated full adder, certain output signals of which are applied to the C register stage gating circuit. Each of these flip-flops, then, is a carry for the full adder during multiplication whenever the multiplier digit is one, as will be discussed below. In this case the multiplier digit is sensed in the (*b*) operand. If the digit is one, flip-flop SX2 is set to one and the (*a*) operand or multiplicand is added to the partial product in the S register and to any previous carries in the C register.

During multiplication, shift control flip-flop SX1 remains on either to shift the S register digits to the right without modification, or to shift in the new partial product digits. When the (*b*) operand digit is one, flip-flop SX2 is also turned on and CX1 is turned off so that the (*a*) operand is added to form a new partial product which is shifted to the right under the control of signal SX1. When the (*b*) operand digit is zero, flip-flop CX1 is turned on and SX2 is turned off so that no addition is performed, the S and C registers being shifted to the right without modification, and are added serially in full adder-subtracter *g*Y31.

It will also be noted that flip-flop CX1 may be turned on by the signal Y31 under certain conditions. This occurs for the operations A*d*, S*u*, C*a* and C*m* so that no shifting is performed in the C register until a non-zero result digit is detected. The signal CX1 may then indicate whether or not the result was zero.

The gating circuit for flip-flops C4 through C19 are quite similar since each may either be a carry circuit or a shifting circuit. Flip-flops C1, C2 and C3, on the other hand, have a more complicated function since they receive the triplet insertion controlled by flip-flop M2, corresponding to the triplet insertion circuit T*r*X of FIG. 1 Before proceeding to consider specific operations, it will be useful to introduce the complete set of definitions for the signals shown in FIGS. 3*a*–3*d* as follows:

*Definitions*

| | |
|---|---|
| "*a*" | Address of operand (*a*). |
| (*a*) | Operand available in data, constant, or revolver channel. |

REGISTER

| | |
|---|---|
| A1 | Sign of (*a*), sign of (*i*), sign of (*c*), program transfer indication. |
| A2 | Least significant digit of (*a*). |

.

.

.

A21 Most significant digit of (*a*).
AX1 Right shift A register.
AX2 Left shift A register.
AX3 Clear A register.

---

A*d* Add operation symbol.
"*b*" Address for operand (*b*).
(*b*) Operand available in data or revolver channel.
"*c*" Address for results of arithmetic operations.
C*a* Compare algebraically operation symbol.
C*m* Compare magnitude operation symbol.

C REGISTER

C1 Least significant digit of C register, (*b*) operand entered here.
. . . Carry stages when SX2=1, shift stages when CX1=1.
C20 Most significant digit of C register.
C21 Carry storage for adder-subtracter FAS (Y31).
CX1 Right shift C register.
"*d*" Address for (*d*) operand.
(*d*) Operand available in data, constant, or revolver channel.
D*i* Division operation symbol.
D0 . . . D21 Digit timing signals.
"*e*" Address to which (*d*) operand is to be sent in simultaneous transfer.

SENSE SWITCHES

E1 Switch corresponding to low order digit of *q* field (S*e*).
. . .
E7 Switch corresponding to high order digit of *q* field.

---

"*f*" Operation code in X5-X8.
"*h*" Output operand address.
H Storage device for output operand.
HX1 Control signal for output read out.

INPUT SIGNALS

"*i*" Address for input quantity.
I*n* Input transfer operation symbol.
IX1 Control signal for input read in.
L1 Sign from selected input device.
L2 Code signal (L2=1 if Gray code and 0 if non-Gray code).
L3 Always least significant digit for Gray code from selected input device.
. . .
L14 Most significant digit for Gray code from selected input device.
L15-L21 Inputs exclusively for non-Gray code usage.

MISCELLANEOUS CIRCUITS

M1 Selected (*a*) or (*d*) operand.
M2 Triplet insertion control device (TrX).
M3 Search for a home command signal (P).
M4 Count down for "*s*" or "*w*" (CC).
M5 Add-subtract control (A*s*X).

---

M*u* Multiply operation symbol.
"*n*" Command channel address.
O*u* Output transmit operation.
P General designation for program transfer circuits.
"*r*" Address for operands transferred during I*n* or Tr.
R*t* Square root operation.

READING CIRCUITS

R21 Circuit for reading word pulse at D21.
R1 Reading circuit for 9 word revolver.
R2 Reading circuit for command data channel.
R3 Reading circuit for 3 word revolver.
R4 Reading circuit for data channel.
R5 Reading circuit for 5 word revolver.
R6 Reading circuit for data channel.
R7 Reading circuit for 7 word revolver.
R10 Reading circuit for selected constant channel.
R11 Reading circuit for selected command channel.

---

RX1 . . . RX5 Command channel control flip-flops receive "*n*" code specifying selected channel address.

---

"*s*" Amount of shift for operations I*n*, Tr and O*u*.
S*e* Sense operation code.
S*u* Subtract operation code.

S REGISTER

S1 Flip-flop holding least significant digit of S register number.
S2 Least significant digit of S register number.
S21 Flip-flop holding most significant digit of S register number.
SX1 Control flip-flop for energizing S register for parallel addition and right shift or for right shift alone.
SX2 Add A, S and C registers in parallel.

SEQUENCE TIMING SIGNALS

T10 Word-time W*t*0.
T11 Word-time W*t*l—begin normal computation.
T12 Intermediate word-times W*t*2-W*tn*1.
T13 Final word-time W*tn*, where *n* is total number words for operation.
T20 Specifies word time interval for reading in command.
T*r* Internal transmit operation symbol.

---

W*t*0, W*tl* . . . Specify word times of operation (*n*=2 for the two-word operation).
W*tn*-1 Next to last word.
W*tn* Last word.

WRITING CIRCUITS AND CONTROLS

W0 Information to be written into any selected data channel or revolver.
W1 Information to be written into 9 word revolver.
W2 Information to be written into data channel (command).
W3 Information to be written into 3 word revolver.
W4 Information to be written into data channel.
W5 Information to be written into 5 word revolver.
W6 Information to be written into data channel.
W7 Information to be written into 7 word revolver.
W11 Flip-flop for delaying R1 one digit time interval for recirculation.
W13 Flip-flop for delaying R3 one digit time interval for recirculation.
W15 Flip-flop for delaying R5 one digit time interval for recirculation.
W17 Flip-flop for delaying R7 one digit time interval for recirculation.
WX1 Select 9 word revolver for storing.
WX2 Select command data channel for storing.
WX3 Select 3 word revolver for storing.
WX4 Select data channel for storing.
WX5 Select 5 word revolver for storing.
WX6 Select data channel for storing.
WX7 Select 7 word revolver for storing.

COMMAND REGISTER SIGNALS

X1-X21 See program block FIG. 2.

MATRIX AMPLIFIER SIGNALS

Y31 Full adder-subtracter amplifier.
Y32 . . . Amplifiers providing full adder signals for S2-S20.
Y50 Amplifier provides input signals for S21.
Y51 =D0.T13.
Y61 Indicates accomplished program transfer.
Y62 =D20.T10.X8.X7.X6 for operation S*e*.
Y63 =D20.(T10+T20).
Y64 =D2.T20.
Y65 Transfer "*w*" signal for program transfer operations.
Y66 =D8.T20.
Y67 =D11.T20.
Y68 Complementing amplifier for subtraction.
Y70 Indicates sign of result and also provides signal indicating whether condition is satisfied for program transfer.
Y71 Reads (*a*) or (*d*) operand.
Y72 Reads (*b*) operand.
Y73 Indicates when "*s*" or "*w*" equals zero.
Y74 Indicates when "*a*" address equals zero.
Y75 Input amplifier for C register (C20).
Y76 Dot representing logical "and" unless otherwise specified.
(.) Plus representing logical inclusive "or" unless otherwise specified.
(+) Represents logical complement.
(')

*Derivation of the Logic for the Operations Ad, Su, Ca and Cm Without Program Transfer Functions*

(Reference to FIGS. 4, 5 and 5*a*)

The logic for the normal arithmetic operations of A*d*, S*u*, C*a*, and C*m* will now be developed. The general form of the structure as well as the logic which is employed is shown in FIG. 5. It will be noted in FIG. 5 that certain of the input circuits are labeled J and K. The application of a signal to the J input circuit of a flip-flop turns the flip-flop "on," or to a 1-representing state and the application of a signal to the K input circuit turns the flip-flop "off" or to a 0-representing state.

Other input circuits, however, simply receive a single input signal, shown as applied to the center of the corresponding drawing representation. Thus, it will be noted that all matrix amplifiers receive a single input signal and that certain flip-flops also receive this type of signal. The single input signal is employed where the signal representing the logic of the network is shifted or entered directly into the device. Thus a single input signal is applied to flip-flop C1 since essentially a shifting or entering function is performed, the flip-flop thereafter storing the signal for one digit time to provide a delay function. It will be noted that all of the control flip-flops (X being the second symbol) receive separate J and K input signals since these devices are actuated as two-state devices and do not normally have information signals shifted in. It should be understood in considering FIG. 5, however, that the logic shown relates only to the operations indicated and is not complete. In other words, FIG. 5 may be considered to illustrate a subcombination of the complete system shown in FIGS. 3*a* through 3*d*. The manner in which the logic for these operations may be combined to form the complete system logic will be discussed below.

It will also be noted in FIG. 5 that certain leads are given a heavier representation with arrows to indicate the general flow of information. Thus the results of operations appearing at full adder-subtracter Y31 are shown in this manner so that the various recirculation paths may be followed and, in a similar manner, various other information signals are shown in this way. The various timing and control signals, on the other hand, are generally shown with a lighter lead designation.

As in all of the usual arithmetic operations, sequence timing device T20 in sequence control circuit of FIG. 3*b* is turned on in response to a signal applied to its J input circuit at D15 time. In all of the operations except division or root, this occurs at the end of the word time W*t*1 of the previous operation which is signaled by the timing signal $T11=1$. Thus the J input circuit for sequencing device T20 may be defined as follows:

$$T20j=D15.T11$$

Timing device T20 then is turned off at the end of the command word, which is assumed to be 21 digits long as indicated in FIG. 4. Thus an off-turning signal is applied at D14 time so that T20*k* is defined as:

$$T20k=D14$$

After T20 has been turned on, the sequencing device T10 is turned on at the beginning of words W*t*0 to signal the time that the (*a*) operand should be read in. Flip-flop T10 is then turned off at the end of this period. The logic for this sequence may be specified as follows:

$$T10j=D21.T20$$

$$T10k=D21.T10$$

see also FIG. 4 for the sequencing signal.

It will be noted that each timing signal which is employed to effect a change in the state of a flip-flop occurs just prior to the time that the flip-flop should be turned on. The reason for this is that it is assumed herein that the timing signals are gating signals which control a clock pulse circuit so that the signals C*p* pass through the clock pulse circuit at the end of the time interval designated. Thus the signal D21 applied to the input gating circuit for flip-flop T10 controls the application of the clock pulse at the end of the interval represented thereby or, in other words, at the beginning of the interval D0. Flip-flop T10 is then on during the interval D0.

The first word time for computation is signaled by sequencing device T11 which is turned on at the end of the zeroth word time W*t*0 and then turned off at the end of word time W*t*1. This sequence is indicated by the logic:

$$T11j=D21.T10$$

$$T11k=D21.T11$$

Finally the last word time of the operation is indicated by signal T13 so that this flop-flop is turned on at the end of W*t*1 and then turned off after the signal T10 is on. This sequence is represented by the logic:

$$T13j=D21.T11$$

$$T13k=D21.T10$$

It must be borne in mind throughout this discussion that many of the timing signals which are developed will be different for other operations. Thus, for example, the signal T13, just described, is defined in a different manner for the operations of division and square root, and is turned off at a different time for the search for home command operation, as will be described below.

The complete set of timing logic required for the operations A*d*, S*u*, C*a*, and C*m* then may be specified as follows:

$$T10j=D21.T20 \qquad T13j=D21.T11$$
$$T10k=D21.T10 \qquad T13k=D21.T10$$
$$T11j=D21.T10 \qquad T20j=D15.T11$$
$$T11k=D21.T11 \qquad T20k=D14$$

This logic is also shown in FIG. 4 at the corresponding points of the signal change. Thus the logic D21.T20 is shown at the point where the signal T10 is turned on and the logic D21.T10 is shown at the point where the signal T10 is turned off, the heavy line designating the on condition of the signal. The other signal transitions are indicated in the same manner.

After signal T10 is turned on marking word W*t*0, right-shift control flip-flop AX1 is turned on at time D0. This flip-flop remains on so that the (*a*) operand may be read in and is turned off at the end of the word after digit time D21. The logic for this sequence is indicated as follows:

$$AX1j=D0.T10$$

$$AX1k=D21$$

After flip-flop AX1 has been turned on, the signals from flip-flop M1 may then be right shifted into the A register and thus enter the (*a*) operand which may have been obtained either through amplifier Y72 (FIG. 3*a*) or through amplifier Y31 and Y71 (FIG. 3*c*) providing signals representing a previous result (*r*). The logis for this entry may be defined as follows:

$$M1j=Y72.Y75'+D0.Y71.Y75+D0'.Y31.Y75$$

$$M1k=Y72'.Y75'+D0.Y71'.Y51+D0'.Y31'.Y75$$

The gating logic for the amplifier Y75 to select the (*a*) operand from Y31 and Y71 when "$a$"=0 and from Y72 when "$a$"$\neq$0 may be defined as follows:

$$Y75=X4'.X3'.X2'.X1' \quad (\text{"}a\text{"}=0)$$

In this manner, then, the command word is read in, and the (*a*) operand is shifted into the A register until the sign thereof is transferred into flip-flop A1. This transfer may be designated by the logic:

$$A1j=D21.T10.A2.AX1$$

$$A1K=D21.T10.A2'.AX1$$

As in many other situations which will be discussed below, a logical alternative is present here in the selection of the timing signal. It is possible to utilize signal T11' in the place of T10. This possibility may be noted by observing that flip-flop AX1 is either turned on in response to signal T10 or under certain conditions during the interval $T11=1$, such conditions to be discussed below, so that the timing restriction $T11'=1$ effectively excludes all but the desired word time interval.

The other flip-flops in the A register are shifted right in accordance with the general logic:

$$n=2\text{–}20$$
$$Anj=AX1.A(n+1)$$
$$Ank=AX1.A(n+1)'$$

As indicated in FIG. 5*a*, after the number has been entered into the A register, it is transferred in parallel to flip-flops S2 . . . S21 of the S register at time D1. This transfer is accomplished through the parallel adder function of the S register so that flip-flop SX2 is first turned on for one digit time. The logic for flip-flop SX2 may then be specified as follows:

$$SX2j=D0.T11$$
$$SX2k=SX2$$

It must be assumed for this transfer, of course, that the carry C register has been cleared to zero so that nothing is contributed from this register to the addition. The parallel adders are not shown in FIG. 5 since effectively a simple parallel transfer is accomplished. Accordingly, the logic for the adders will not be considered at this point.

Referring again to FIG. 5*a*, it will be noted that the signals S2 . . . S21 correspond to the (*a*) operand digits ***a*1 . . . *a*20** at digit time D2, after the parallel entry into the S register. Right shifting then is performed so that the signal S2 successively represents the (*a*) operand signals *a*2 . . . *a*20 during the time intervals D3 . . . D21. This right shift control is controlled by flip-flop SX1 which is actuated in accordance with the signals:

$$SX1j=D0$$
$$SX1k=D21$$

Flip-flop SX1, then, is employed to control the right shifting of the S register where the amplifier signals are passed to the corresponding flip-flops in accordance with the following function:

$$n=3\text{–}20$$
$$Snj=SX1.Y(n+30)$$
$$Snk=SX1.Y(n+30)'$$

S register flip-flop S21 receives the signal A21 through amplifier Y51 when $SX2=1$, and then receives zero signals shifted in when $SX2=0$ so that the S register is cleared as the (*a*) operand is shifted out. This is indicated by the logic:

$$Y51=SX2.A21$$
$$S21j=SX1.Y51$$
$$S21k=SX1.Y51'$$

At this point it is important to review the significance of the logical definitions. The amplifier logic provides a direct representation of certain conditions. If none of the conditions are satisfied, the amplifier signal is zero. Thus amplifier Y51 provides a 1-representing signal only when $SX2.A21=1$, otherwise it is zero. When amplifier Y51 is in a zero condition, zeros are entered into flip-flop S21 during successive clock pulse intervals.

The flip-flop signals are not direct representations of the input logic because of the storage characteristic thereof. After a flip-flop has been turned on by the application of a signal to its J input circuit, it remains in this state until turned off by a signal applied to its K input circuit. Thus the flip-flop stores a signal representing the input signal previously applied. It will be noted that the direct shifting of signals into a flip-flop, such as A1, is accomplished by gating the input signal to its J input circuit and gating the complement of the input signal to the K input circuit. Thus A2 is gated into flip-flop A1 by applying the signal A2 to the J input circuit and signal A2' to the K input circuit.

Returning now to consider the operation of the S register, it will be recalled that the (*a*) operand is transferred in parallel to the S register as if by addition. After this the (*a*) operand is shifted serially through the flip-flop S2 and added to the (*b*) operand in the full adder-subtractor forming the gating circuit for amplifier Y31. The full adder-subtracter also receives the carry signals C21 and produces a result signal defined as follows:

$$Y31=Y70.C21.S2+Y70.C21'.S2'+Y70'.C21.S2'+Y70'.C21'.S2$$

During addition, subtraction, compare algebraically, and compare magnitude operations, signal Y31 representing the sum or difference in combining operands (*a*) and (*b*) is shifted into flip-flop S1 as long as control signal $SX1=1$. The logic for flip-flop S1 may then be specified as follows:

$$S1j=SX1.Y31$$
$$S1k=SX1.Y31'$$

As the result is formed through the full adder-subtracter and passed through flip-flop S1, it is recirculated through amplifier Y76 into the C register. As indicated in FIG. 5*a*, this occurs after the first non-zero result digit is detected in the output signal Y31. This digit is designated as *rx* in FIG. 5*a*.

When this first non-zero result digit is detected, the C register right shift control flip-flop CX1 is turned on and thereafter the signal Y76 is shifted into the C register flip-flop C20. Since the most significant result digit *r*20 is not available in flip-flop S1 until the digit time D0 of W*t*2, the function for amplifier Y76 must include the sequence timing signal T11 as well as the additional digit time D0.T13. Thus the function for amplifier Y76 may be expressed as:

$$Y76=S1.CX1.(T11+D0.T13)$$

The input function for flip-flop C20 then may be specified as follows:

$$C20j=Y76$$
$$C20k=Y76'.CX1$$

And flip-flop CX1 is turned on and off in accordance with the function:

$$CX1j=T11.Y31$$
$$CX1k=D21.T13$$

Before considering the logical definitions suitable for the gating circuits associated with add-subtract control flip-flop M5 (A*s*X) and amplifier Y71 producing a signal representing the sign of the result (S*r*), a general analysis of the problem will be considered, reference being made to Tables VI*a* and VI*b* introduced below and to Table I previously introduced above.

TABLE VI*a*

| Values for M5—AsX | | | | | | |
|---|---|---|---|---|---|---|
| Signs | | Operations | | | | |
| Sa A1 | Sb Y73 | Ad | Su | Ca | Cm | |
| + | + | 0 | 1 | 1 | 1 | |
| + | − | 1 | 0 | 0 | 1 | A1 and Y73=0=+. |
| − | + | 1 | 0 | 0 | 1 | A1 and Y73=1=−. |
| − | − | 0 | 1 | 1 | 1 | |

TABLE VI*b*

| A1 | C21 | M5 | CX1 | Y71 |
|---|---|---|---|---|
| 0 | 0 | 0 | 0 | 0 |
| 1 | 0 | 0 | 0 | 0 |
| 0 | 1 | 0 | 0 | 0 |
| 1 | 1 | 0 | 0 | 1 |
| 0 | 0 | 1 | 0 | X |
| 1 | 0 | 1 | 0 | X |
| 0 | 1 | 1 | 0 | 0 |
| 1 | 1 | 1 | 0 | 0 |
| 0 | 0 | 0 | 1 | 0 |
| 1 | 0 | 0 | 1 | 1 |
| 0 | 1 | 0 | 1 | 0 |
| 1 | 1 | 0 | 1 | 1 |
| 0 | 0 | 1 | 1 | 1 |
| 1 | 0 | 1 | 1 | 0 |
| 0 | 1 | 1 | 1 | 0 |
| 1 | 1 | 1 | 1 | 1 |

As indicated in Table I, above, the operations A*d*, S*u*, C*a*, and C*m* may be represented as follows:

$$(\pm a)+(\pm b)\ \mathrm{A}d$$
$$(\pm a)-(\pm b)\ \mathrm{S}u$$
$$(a)-(b)\ \mathrm{C}m$$
$$(\pm a)-(\pm b)\ \mathrm{C}a$$

It will be noted that in the operations of A*d*, S*u*, and C*a*, the signs of the (*a*) and (*b*) operands are shown within the parentheses to indicate that these may be either plus or minus quantities. The plus sign then between the quantities in parentheses indicates that the operation A*d* is to be performed. The minus sign between quantities in parentheses for the operations S*u* and C*a* indicates that subtraction is to be performed. After subtraction is performed for algebraic comparison, the sign of the result is examined in order to determine which of the quantities was algebraically the greater. Thus, for example, if both the quantities (*a*) and (*b*) are negative quantities and (*b*) is algebraically greater than (*a*), that is less negative, the subtraction of these signed quantities would result in a negative result.

Thus, if the condition to be satisfied for a program transfer is specified as $(a)\geqq(b)$ and the quantity (*b*) is more positive than the quantity (*a*), the result will be negative and the condition is not satisfied. Therefore the negative sign of a result $Sr=1$, or $Y71=1$, indicates that a condition has not been satisfied; whereas the zero state of the signal Y71 indicates that a condition has been satisfied. As pointed out above, the signal representing the sign of the result may also be employed to indicate whether or not conditions are satisfied.

In a similar manner, the operation C*m* is performed through subtraction, but in this case the signs of the quantities are not considered. This is accomplished by resetting the sign storage flip-flop A1 to zero for this operation and setting flip-flop A1 to one whenever an overdraft occurs in subtracting (*b*) from (*a*).

In developing Table VI*a*, it has been assumed that all quantities to be operated upon are available as an absolute value plus a sign, the sign appearing first. In considering the definition of the signal $M5=AsX$, then, it will be noted that if both the signs of (*a*) and (*b*) are plus, as indicated by zeros in A1 and Y73, the operation A*d* is performed by setting M5 to zero and the operations S*u*, C*a*, C*m* are performed by setting M5 to one. A similar condition occurs when the signs of both the (*a*) and (*b*) operands are negative.

In this case, again, M5 is set to zero for A*d* and to one for S*u*, C*a*, and C*m*. If it is assumed that the flip-flop M5 has already been set to zero at the end of the previous operation (at the time $D21.T13$) then the J input function for the condition where the signs of the (*a*) and (*b*) operands are the same may be expressed as follows:

$$M5j=D0.T11[(Su+Ca).\underbrace{(A1.Y73+A1'.Y73')}_{Sa.Sb+Sa'.Sb'}]$$

The time $D0.T11$ is determined by noting that the sign of (*b*) is available to amplifier Y73 at this time. M5 must also be set to one during the operation A*d* when the signs of the (*a*) and (*b*) operands are different, and always for C*m*. The complete expression for controlling the flip-flop M5 may then be specified as follows:

$$M5j=D0.T11.[Ad(A1.Y73'+A1'.Y73)+(Su+Ca).(A1.Y73+A1'.Y73')+Cm]$$
$$M5k=D21.T13+Y61.C21$$

It will be noted that the term $Y61.C21$ has been added and is utilized to reset the sign control flip-flop to zero if no overdraft occurs as indicated by $C21=1$. If an overdraft has occurred as indicated by $C21=0$, it may mean that the sign control flip-flop M5 had originally been set to a 1-representing state for subtraction and that (*b*) was greater than (*a*) resulting in a complemented result. In this case, then, flip-flop M5 remains on as indicated in case (2) of FIG. 5*a*, which will be discussed below. It is not possible to perform subtraction and have a zero result as indicated by $CX1=0$ with an overdraft indicated by $C21=0$. Thus, these possibilities are indicated with X's in Table VI*b*.

In developing the sign of the result and the condition-satisfied signal Y71, note must be taken of the condition of the carry signal C21 and also the signal CX1 which indicates whether or not the result is zero. It will be recalled that the output signal of the full adder-subtracter derived through amplifier Y31 is used to turn on flip-flop CX1 so that a zero result would leave flip-flop CX1 in its zero state.

Referring now to Table VI*b*, it will be noted that sixteen possible binary conditions are shown corresponding to the various combinations of the signals A1, C21, M5, and CX1. The logical definition of signal Y71 may be derived directly from this table by well-known algebraic techniques. However, in order to obtain a better understanding of the function of this signal, the logic will be introduced with an operational explanation.

It will be recalled that signal Y71 is given a value of binary one whenever the result of an operation has a negative sign or where operand (*b*) is greater than operand (*a*) for either an algebraic or magnitude comparison.

The sign of the result must be negative, or (*b*) must be greater than (*a*), if (*a*) is negative and addition is performed to combine the operands ($M5=0$), provided that the result is not equal to zero. The non-zero status of the result is indicated either by signal $CX1=1$ or, in addition, by the presence of a carryover signal $C21=1$. The logical expression $A1.M5'.(C21+CX1)$ covers these situations and may be noted to have a value of binary one for the following code combinations of A1, C21, M5, and CX1 in Table VI*b*: 1100; 1001; and 1101.

The reason the result must be negative or (*b*) greater than (*a*) for the above situation becomes evident in reviewing Table VI*a*. First it will be noted that when the sign of operand (*a*) is negative, addition is performed for the operation A*d* only when both signs of (*a*) and (*b*) are negative, so that the result must be negative, or for the operations S*u* and C*a* when the sign of (*b*) is positive. When operation S*u* is performed, the result must be negative since a positive (*b*) operand is subtracted, and operation C*a* must indicate (*b*) greater than (*a*) since (*b*) is positive and (*a*) is negative.

It must be understood, of course, that signals M5 and M5' represent the arithmetic method of combining operands (*a*) and (*b*) and should not be confused with the operation of subtraction, S*u*, and addition, A*d*.

The sign of the result must also be negative whenever the sign of the (*a*) operand is negative and no carryover results, provided that the result is not zero. This is expressed by the logic: $A1.C21.CX1$.

Finally, a negative result will occur, or (*b*) will be greater than (*a*), whenever the sign of (*a*) is positive and subtraction is performed ($M5=1$), resulting in an overdraft ($C21'=1$). The entire logic for signal Y71 for the operations *Ad*, *Su*, *Ca*, and *Cm* may be expressed as follows:

$$Y71=A1.M5'.(C21+CX1)+A1.C21.CX1+A1'.M5.C21'$$
$$=A1.C21.(CX1+M5')+A1'.C21'.M5+A1.CX1.M5'$$

The complementation of the ($b$) operated signals under the control of the add-subtract flip-flop M5, accomplished through amplifier Y70, may be defined as follows:

$$Y70=C1.M5'+C1'.M5$$

Amplifier signals Y70, representing either the ($b$) operand during addition, or the complement thereof during subtraction are then employed in the carry circuit logic for flip-flop C21 during the time that the ($a$) and ($b$) operands are being shifted forward in the S and C registers under the control of signal SX1. Thus the basic addition carry logic may be expressed as follows:

$$C21j=SX1.Y70.S2$$
$$C21k=SX1.Y70'.S2'$$

In addition, it is also necessary to provide for the recomplementation of the negative numbers so that they may be entered into memory as absolute value plus sign. It will be recalled that the C register is circulated through amplifier Y76 during the operations *Ad*, *Ca*, *Su*, and *Cm* so that a complemented number may be reapplied to the full adder-subtracter during the last word time interval ($T13=1$). The true recomplementation requires an introduction of a one into the carry which is performed at the beginning of the last word time of operation ($Y61=1$) provided that subtraction had been performed ($M5=1$) and an overdraft had occurred ($C21'=1$). With the provision for recomplementation, the complete carry function appears as follows:

$$C21j=SX1.Y70.S2+Y61.M5.C21'$$
$$C21k=SX1.Y70'.S2'+Y61.M5.C21$$

Since a true subtraction operation requires not only the complementation of the ($b$) operand but also the addition of a binary one in the least significant position, flip-flop S2 is set to one at time $D0.T11=1$. Thus the complete expression for flip-flop S2 for this modification is expressed as follows:

$$S2j=SX1.Y32+D0.T11$$
$$S2k=SX1.Y32'$$

In summation of the above discussion, the general logic for operations *Ad*, *Su*, *Ca*, and *Cm* is submitted as follows:

*Logic for Ad, Su, Ca, Cm*

```
A1j = D21.T10.A2.AX1          n = 2 - 20               A21j = T10.AX1.M1
                              Anj = AX1.A(n+1)
A1k = D21.T10.A2'.AX1         Ank = AX1.A(n+1)'        A21k = T10.AX1.M1'

                   AX1j = D0.T10
                   AX1k = D21
                        * * *
                                                 n = 2 - 19
C1j = T11'.CX1.C2 + D0'.D21'.T11.Y73             Cnj = CX1.C(n+1)
C1k = T11'.CX1.C2' + T11.Y73' + D21.T11          Cnk = CX1.C(n+1)'

C20j = Y76                  C21j = SX1.S2.Y70 + Y61.M5.C21'
C20k = Y76'.CX1             C21k = SX1.S2'.Y70' + Y61.M5.C21

                   CX1j = T11.Y31
                   CX1k = D21.T13
                        * * *

M1j = Y72.Y75' + D0.Y71.Y75 + D0'.Y31.Y75
M1k = Y72'.Y75' + D0.Y71'.Y75 + D0'.Y31'.Y75

M5j = D0.T11/Ad.(A1.Y73' + A1'.Y73) + (Su + Ca).(A1.Y73 + A1'.Y73') + Cm/
M5k = D21.T13 + Y61.C21
                        * * *
                                                 n = 3 - 21
S1j = SX1.Y31           S2j = SX1.Y32 + D0.T11   Snj = SX1.Y(n+30)
S1k = SX1.Y31'          S2k = SX1.Y32'           Snk = SX1.Y(n+30)'
```

*Logic for Ad, Su, Ca, Cm*—Continued

```
SX1j = D0.T11          SX2j = D0.T11
SX1k = D21             SX2k = SX2
```

* * *

```
Y31 = Y70.C21.S2 + Y70.C21'.S2' + Y70'.C21.S2' + Y70'.C21'.S2
Y51 = SX2.A21          Y61 = D0.T13          Y70 = M5'.C1 + M5.C1'
Y71 = A1.C21.M5' + A1'.C21'.M5 + A1.CX1.C21 + A1.CX1.M5'
Y75 = X4'.X3'.X2'.X1'                 Y76 = S1.CX1.(T11 + D0.T13)
```

The operation of the circuit of FIG. 5 will now be described with reference to FIG. 5*a* where both a general timing diagram is shown and three specific examples are indicated. Referring first to the general timing representation at the top of FIG. 5*a*, it will be noted that the register flip-flops A2–A21 store the (*a*) operand digits *a*1–*a*20 in the manner indicated at D0 time, these digits being transferred in parallel to flip-flops S2–S21 at D1 time. After that, the S register is shifted to the right under the control of signal SX1 so that the (*a*) operand signals appear serially as the output signal of flip-flop S2. At the same time, then, the (*b*) operand, available through amplifier Y73, is entered into flip-flop C1, except for the sign S*b*, and then passed through amplifier Y70. The result is then formed through amplifier Y31 which receives signals Y70, S2, and C21 as indicated, and the result digits *r*1 . . . *r*20 are then shifted serially into the flip-flop S1. Signal S2 is recirculated through amplifier Y76 to the C register as soon as the first non-zero result digit *rx* is detected. Thus, in FIG. 5*a*, it will be noted that the wave form line for CX1 becomes heavy, indicating that it has been turned on, immediately after the digit *rx* is present in amplifier Y31. C31 then remains on until D21 time of the W*t*2.

If the last carry in flip-flop C21 is a zero, indicating an overdraft, M5 remains on, otherwise being changed to zero for the condition *Y*61.*C*21=1. Signal Y71 is shown in FIG. 5*a* as being entered into flip-flop S1 at digit time *D*0.*T*13. Actually, it will be shown that a preferable arrangement contemplates the insertion of the sign signal Y71 into writing flip-flop W0 directly, resulting in a simplification of the writing logic as will be discussed below. For present purposes, however, it is sufficient to note that the correct sign signal is available at the time indicated and could be inserted to complete the result series.

If signal M5 remains on after an overdraft, as indicated by *C*21=0, the C register number is subtracted from the series of zero signals which have been entered into the S register. It will be recalled that this occurs because the amplifier function Y51 is zero as soon as the flip-flop SX2 is turned off. Thus as the S register is shifted right in response to the signal *SX*1=1, zeros are shifted in from the left-hand end, being applied to flip-flop S21. The first zero is entered, it will be noted, at D3 time of the word W*t*1.

Thus, in this manner, complemented numbers which occur due to the overdraft condition are recomplemented by subtracting the C register number from zero. In FIG. 5*a*, the series of result digits *r*1* . . . *r*20* are shown indicating that they have been converted back to sign plus absolute value. In the same manner, the carry signals C1* . . . C20* represent the carries occurring during the recomplementing operation.

Three specific cases will now be considered which may be defined as follows:

| | | | | a20 | | | | | a15 | | | | | a10 | | | | | a5 | | | | a1 |
|---|---|---|---|---|---|---|---|---|---|---|---|---|---|---|---|---|---|---|---|---|---|---|---|
| (1) | (a) | = | | 1 | 0 | 0 | 1 | 1 | 0 | 0 | 0 | 1 | 0 | 1 | 1 | 1 | 0 | 1 | 1 | 0 | 1 | 1 | 1 |
| | (b) | = | | 0 | 1 | 0 | 1 | 0 | 1 | 0 | 0 | 0 | 1 | 1 | 1 | 0 | 1 | 0 | 1 | 1 | 1 | 0 | 1 |
| Carries | | | 0 | 0 | 0 | 1 | 0 | 0 | 0 | 0 | 1 | 1 | 1 | 1 | 1 | 1 | 1 | 1 | 1 | 1 | 1 | 1 | 0 |
| Sum | | | | 1 | 1 | 1 | 0 | 1 | 1 | 0 | 1 | 0 | 0 | 1 | 1 | 0 | 0 | 0 | 1 | 0 | 1 | 0 | 0 |

M5=0 { Ad (±a)+(±b); Su or Ca (±a)−(∓b) }

| | | | | | | | | | | | | | | | | | | | | | | | |
|---|---|---|---|---|---|---|---|---|---|---|---|---|---|---|---|---|---|---|---|---|---|---|---|
| (2) | (a) | = | | 0 | 0 | 1 | 1 | 0 | 1 | 1 | 1 | 1 | 1 | 0 | 1 | 1 | 0 | 0 | . | . | . | . | 0 |
| | (b)′ | = | | 0 | 0 | 1 | 0 | 1 | 0 | 0 | 0 | 1 | 0 | 1 | 0 | 0 | 1 | 1 | 1 | 1 | 1 | 1 | 1 |
| Carries | | | 0 | 0 | 1 | 1 | 1 | 1 | 1 | 1 | 1 | 1 | 1 | 1 | 1 | 1 | 1 | 1 | 1 | 1 | 1 | 1 | 1 |
| Sum | | | | 0 | 1 | 1 | 0 | 0 | 0 | 0 | 0 | 1 | . | . | . | . | . | . | . | . | . | 0 | 0 |

M5=1 { Ad (±a)+(∓b); Su or Ca (±a)−(±b); Cm } |(a)|<|(b)|

| | | | | | | | | | | | | | | | | | | | | | | | |
|---|---|---|---|---|---|---|---|---|---|---|---|---|---|---|---|---|---|---|---|---|---|---|---|
| (3) | (a) | = | | 1 | 1 | 0 | 1 | 0 | 1 | 1 | 1 | 0 | 1 | 0 | 1 | 1 | 0 | 0 | . | . | . | . | 0 |
| | (b)′ | = | | 1 | 1 | 0 | 0 | 1 | 0 | 0 | 0 | 0 | 0 | 1 | 0 | 0 | 1 | 1 | 1 | 1 | 1 | 1 | 1 |
| Carries | | | 1 | 1 | 0 | 0 | 0 | 0 | 0 | 0 | 0 | 1 | 1 | 1 | 1 | 1 | 1 | 1 | 1 | 1 | 1 | 1 | 1 |
| Sum | | | | 1 | 0 | 0 | 1 | 1 | 1 | 1 | 1 | 1 | . | . | . | . | . | . | . | . | . | . | 0 |

M5=1 { Ad (±a)+(∓b); Su or Ca (±a)−(±b); Cm } |(a)|≥|(b)|

Referring now again to FIG. 5*a*, it will be observed that three sets of signals are shown corresponding to the three problems outlined above. Each of these sets of signals includes: S2 and Y70 corresponding to the (*a*) and (*b*) operands, respectively, Y70 representing (*b*)′ for subtraction, C21 corresponding to the carries generated during the serial addition of the quantities (*a*) and (*b*), S1 corresponding to the result signals which are generated, and M5 which indicates whether addition or subtraction is performed. Addition is performed where there is a plus (+) sign between quantities of the same sign or a minus (−) sign between quantities having different signs, and subtraction is performed in cases where there is a plus (+) sign between quantities of different signs and a minus (−) sign between quantities having the same sign.

It will be noted in case (1) that $M5=0$ and addition is performed. Consequently, no overflow occurs since it is assumed that the quantities to be added will not produce a sum greater than the capacity of the registers. In this case, the second word time W*t*2 results in the addition of the previous result to zero with the sign Y71 being shown as inserted into S1 at digit time D1.

In case (2), $M5=1$ and subtraction is performed to combine (*a*) and (*b*). Thus it will be noted that the complement of the (*b*) operand, (*b*)′, is shown. It will also be noted that an initial carry of one is entered in the first digit position opposite the digits *a*1 and *b*1 (see FIG. 5*a*). The operands have been selected for example (2) so that (*a*) is less than (*b*). As a result an overflow occurs which is indicated by the presence of carry signal $C21=0$ at digit time *D*0.*T*13. The reason for an overdraft being indicated by a zero carry during subtraction becomes evident when it is considered that the (*b*) operand is being complemented and that the digits appearing in places higher than the most significant place of the (*b*) operand (*a*) is greater than operand (*b*). In this case carry signal C21 is a one at digit time *D*0.*T*13 so that flip-flop M5 is set to zero, as indicated, and addition is performed during word time interval W*t*2. In this situation, therefore, the first result is added to zero and, therefore, remains unchanged in the final result signals appearing in flip-flop S1, except for a delay of one digit time interval.

*Logic Defining the Transfer of Information to and From the Memory*

(Reference to FIGS. 3*a* and 4)

As indicated above, a simplified set of writing logic is possible where the results of operations are formed through writing flip-flop W0 which also receives the selected (*d*) operand. The reason this technique results in a simplification can best be understood by considering two sets of logic shown below as A and B, respectively, where set A represents the logic which is employed where the results of operations are passed through flip-flop S1 and then applied to the writing flip-flop W0, and set B represents the logic where the results of operation are formed at the gating circuit for flip-flop W0 which also receives the (*d*) operand signal through amplifier Y72.

SET A

```
W0j = T11.M1 + T11'.S1
W0k = T11.M1' + T11'.S1'
Wa(2-4-6) = WX(2-4-6)-b-W0
Wa(1-3-5-7) = W(1-3-5-7)
W(1-3-5-7)j = WX(1-3-5-7).(T11.M1 + T13.S1) + WX(1-3-5-7)'.W(11-13-15-17)
W(1-3-5-7)k = WX(1-3-5-7).(T11.M1' + T13.S1') + WX(1-3-5-7)'.W(11-13-15-17)'
WX(1-3-5-7)j = D0/T11."e".X8' + T13."c".X8' + T13."r".(Tr + In)/
WX(1-3-5-7)k = D21
WX(2-4-6)j = D1./T11."e".X8' + T13."c".X8' + T13."r".(Tr + In)/
WX(2-4-6)k = D0
```

SET B

```
W0j = T13'.Y72 + Y61.Y71 + D0'.T13.Y31
W0k = T13'.Y72' + Y61.Y71' + D0'.T13.Y31'
W(1-3-5-7)j = WX(1-3-5-7).W0 + WX(1-3-5-7)'.W(11-13-15-17)
W(1-3-5-7)k = WX(1-3-5-7).W0' + WX(1-3-5-7)'.W(11-13-15-17)'
W(2-4-6) = W0          Wa(2-4-6) = WX(2-4-6)-b-W(2-4-6)
                       Wa(1-3-5-7) = W(1-3-5-7)
WX(1-7)j = D0.T11."e".X8' + Y61."c".X8' + Y61."r".X7'.X6'
WX(1-7)k = D21
```

operand are binary ones. Thus the presence of a carryover of zero indicates a complete result in the place of binary one, or an overdraft, since the complemented (*b*) operand is greater in negative value than the (*a*) operand to which it is added.

The overflow condition prevents add-subtract flip-flop M5 from being turned to zero so that subtraction is again performed during the following word time interval W*t*2. During this interval, the previously formed result is subtracted from zero by froming its complement and introducing an initial carry. This results in a recomplemented series of digits designated with stars (*) in FIG. 5*a*, corresponding to the absolute value of the difference between (*a*) and (*b*).

A similar example is found in (3) except that here

It will be noted that in the logic of set A above, the control flip-flops WX1, WX3, WX5, and WX7 represented as WX(1–3–5–7) are turned on one digit time earlier (D0) than the control flip-flops WX2, WX4, and WX6, represented hereafter as WX(2–4–6), which are turned on at D1. This is necessary since the signals available through writing flip-flop W0 are applied directly to amplifiers W*a*(2–4–6) and, consequently, are advanced by one digit time with respect to the signals passed through writing circuits W(1–3–5–7). Thus, in order to control the passage of the same information, flip-flops WX(1–3–5–7) must be turned on at D0 time to control the gating of either M1 or S1 into the corresponding writing circuit, and control flip-flops WX(2–4–6) are then turned on at D1 time to control the writing of the signals available through flip-flop W0, delayed one digit time with respect to M1 or S1.

It will be noted that the symbol –*b*– is employed in the control logic for writing amplifiers W*a*2, W*a*4, and W*a*6 in order to indicate that the control signal WX employed serves as a biasing signal rather than a gating signal. This means that when the control signal is off, nothing enters into the writing amplifier so that the information which is already in the memory is not destroyed. If the conventional type of gating circuit were employed, the zero condition of the control signal would cause the writing of zeros, as explained above, which is not the desired control function. A suitable writing amplifier is shown in FIG. 15*b* to be described below.

In set B the amplifier signals Y71, Y72, and Y31 are gated directly into writing flip-flop W0 at the proper time rather than the signals M1 and S1 as in set A. While this requires extra logic for the flip-flop W0, it results in a considerable saving in the other logic as, for example, for the flip-flops W(1–3–5–7). Thus, in set B, the flip-flop W0 has already received the required information to separate the (*d*) operand from the result operand (*r*); whereas in set A, the logic $T11.M1+T13.S1$ must be carried for this separation.

The other improvement of set B is that all control flip-flops WX(1–7) may be actuated at the same time since in this case these flip-flops control the gating of signals in phase.

In both of the sets of logic above, it will be noted that writing circuits having odd numbers receive either new information under the control of signals WX1, WX3, WX5, and WX7; or receive information which is recirculated under the control of signals WX1′, WX3′, WX5′, and WX7′. The even-numbered writing circuits, on the other hand, receive only new information, no recirculation being performed during other time intervals.

The control flip-flops, it will be noted, receive various result signals and are designated by the codes "*e*," "*c*," and "*r*." Code "*e*" is utilized during $T11=1$ when the (*d*) to "*e*" transfer is performed. Code "*c*" is utilized during $T13=1$ for the normal arithmetic operations when "*f*" code $X8'=1$. Code "*r*" is utilized during $T13=1$ for transmit operations T*r* and I*n*.

At this point, another important variation will be considered which is discussed further below when the reading of the command instruction is considered. It will be noted that the "*e*" and "*c*" codes are considered to be available in separate flip-flops in the algebra designated above. However, it will be shown below that it is possible to transfer the "*c*" code to the flip-flops previously storing the "*e*" code so that the control flip-flops actually need sense only the same set of flip-flops, namely: X17; X16; and X15. This makes it possible to simplify the above algebra is set B to provide set C as follows:

SET C

(same as set B except the following)

$$WX(1\text{–}7)j=Y61.\text{“}r\text{”}.X7'.X6'+Y60.(\text{“}c\text{” or “}e\text{”})$$
$$WX(1\text{–}7)k=D21$$
$$Y60=D0.X8'.(T11+T13)$$

In these expressions the codes "*c*" or "*e*" are all available from devices X17, X16, and X15. It will also be noted that the control signal entry is made by first resetting WX(1–7) to zero by signal D21 and then applying the desired selection to the J input circuit.

Before considering the operation of the writing circuit logic just described, it is helpful to introduce the logic employed for reading information. First, consider the manner of deriving the command word or instruction signals. As mentioned previously, the command word signals are shifted serially through reading circuit R11 to command register flip-flop X21 during the interval $T20=1$. These signals, then, are shifted also serially into flip-flops X20, X19 and X18, in that order. The algebra for this serial entry may be expressed as follows:

$$X21j=R11.T20$$
$$X21k=R11'.T20$$
$$X20j=X21.T20$$
$$X20k=X21'.T20$$
$$X19j=X20.T20$$
$$X19k=X20'.T20$$
$$X18j=X19.T20$$
$$X18k=X19'.T20$$

The transfer logic for flip-flops X21–X18 can best be understood by referring to FIG. 4. It will be noted that address "*a*" is available at D20 time and is transferred to flip-flops X1–X4. Since the "*d*" code is also transferred to the same flip-flops at the time $D20.T10$, the entire transfer to flip-flops X1–X4 may be expressed as follows:

$$X(1\text{–}4)j=Y64.(X18\text{–}21)$$
$$X(1\text{–}4)k=Y64.(X18\text{–}21)'$$
$$Y64=D20.(T10+T20)$$

Other functions are introduced into flip-flops X1–X4 which will be considered below when the program transfer and shift control operations are introduced.

The next command word entry into flip-flops X5–X9 is made at digit time D2 and includes the code signals "*f*1"–"*f*4" and "*b*1." The logic for this transfer may be expressed as follows:

$$X(5\text{–}8,9)j=Y65.(X18\text{–}X21,R11)$$
$$X(5\text{–}8,9)k=Y65.(X18\text{–}X21,R11)'$$
$$Y65=D2.T20$$

Flip-flops X5 and X9 are also employed to retain the "*w*" code when it is transferred from flip-flops X1 and X2 during the program transfer operation discussed below. This logic will not be introduced here since it is not employed in the usual arithmetic operations.

Code digit "*b*2" is then transferred at digit time D5 to flip-flop X10 which is also employed below to receive one of the "*w*" code digits as it is transferred. This logic is expressed as follows:

$$X10j=D5.T20.X20$$
$$X10k=D5.T20.X20'$$

Code digits "*b*3," and "*c*1"–"*c*3" are then transferred to flip-flops X11–X14, respectively, at digit time D8, the logical transfer function being expressed as follows:

$$X(11\text{–}14)j=Y67.X(18\text{–}21)$$
$$X(11\text{–}14)k=Y67.X(18\text{–}21)'$$
$$Y67=D8.T20$$

Finally, signals "*e*1"–"*e*3" are transferred to flip-flops X15–X17 at D11 times in accordance with the following logic:

$$X(15\text{–}17)j=Y68.X(19\text{–}20)$$
$$X(15\text{–}17)k=Y68.X(19\text{–}20)'$$
$$Y68=D11.T20$$

Since the "*e*" code is employed at the beginning of the interval to set the corresponding control flip-flop WX, it need not be retained in flip-flops X17, X16, and X15 so that "*c*" may be entered therein. This may be conveniently done at D5 time, the transfer logic being expressed as follows:

$$X(15\text{–}17)j=D5.X8'.\overset{\text{“}c\text{”}}{X(12\text{–}14)}$$
$$X(15\text{–}17)k=D0.X8'$$

It will be noted that flip-flops X15–X17 are first reset to zero by the signals $D0.X8'$ in the above logic to simplify the entry of code "*c*." This type of zero-resetting entry may also be employed as an alternative to the logic given above. Thus, for example, X(15–17) may first be reset to zero by Y65 ($D2.T20$) before receiving X(19–21)

at time Y68 ($D11.T20$). Signal Y65 may also be employed to reset flip-flops X(10–14) which receive command signals thereafter.

A complete set of logic for transferring arithmetic command words into the command register may thus be expressed as follows:

$$X(1\text{–}4)j=Y64.X(18\text{–}21)$$
$$X(1\text{–}4)k=Y64.X(18\text{–}21)'$$
$$Y64=D20.(T10+T20)$$

$$X(5\text{–}8,\ 9)j=Y65.X(18\text{–}21,\ R11)$$
$$X(5\text{–}8,\ 9)k=Y65.X(18\text{–}21,\ R11)'$$
$$Y65=D2.T20$$

$$X10j=D5.T20.X20$$
$$X10k=Y65$$

$$X(11\text{–}14)j=Y67.X(18\text{–}21)$$
$$X(11\text{–}14)k=Y65$$
$$Y67=D8.T20$$

$$X(15\text{–}17)j=Y68.X(19\text{–}21)+D5.X8'.X(12\text{–}14)$$
$$X(15\text{–}17)k=Y65+D0.X8'$$
$$Y68=D11.D20$$

As has been mentioned previously, the selection of the ($a$) and ($b$) operands from the data channels may be performed in a conventional manner since flip-flop reading circuits R1–R7 are employed. Reference should be made again to Table I where the "$a$" and "$d$" codes are shown and Table III where the "$b$" code is shown in order to interpret the following selection logic for amplifiers Y72 and Y73 which is believed to be self-explanatory:

$$\begin{aligned}Y72=\ &R1.X4'.X3'.X2'+\\&R2.X4'.X3'.X1'+\\&R3.X4'.X3'.X2.X1+\\&R4.X4'.X2'.X1'+\\&R5.X4'.X3.X2'.X1+\\&R6.X4'.X3.X2.X1'+\\&R7.X4'.X3.X2.X1+\\&R10.X4.(X3+X2+X1)\end{aligned}$$

$$\begin{aligned}Y72=\ &R1.X11'.X10'.X9+\\&R2.X11'.X10.X9'+\\&R3.X11'.X10.X9+\\&R4.X11.X10'X9'+\\&R5.X11.X10'.X9+\\&R6.X11.X10.X9'+\\&R7.X11.X10.X9\end{aligned}$$

The selection from the constant channels will be considered below when FIG. 14 is considered since a novel circuit is employed which operates directly upon the reading heads.

It will be recalled that the signals selected through matrix $a,d$ #1 are passed through amplifier R$a$10 (FIG. 3$a$) into reading flip-flop R10. Therefore, it will be understood that signal R10 in the above logic effectively represents any of the selections made through matrix, $a,d$ #1 in the manner to be described with regard to FIG. 14. It will be noted in the definition for signal Y72 that the selection of signal R10 is made only where X1, X2, and X3 are not all equal to zero as indicated by $$(X1+X2+X3)$$

and where X4 equals one as indicated in Table II. The other algebra becomes apparent by comparing the code of the logical expression with Table II and noting that some simplification is possible in that no selection is made for the code 0000.

The general operation of the reading and writing circuits will now be described with reference to FIG. 4. It will be noted in FIG. 4 that during a typical arithmetic operation, the sequence timing signal T10 is turned on at the same time the timing signal T13 is on. The reason for this is that the result of the previous operation is to be transferred to the address "$c$" at the same time that the new ($a$) operand is to be selected and entered into the A register as discussed above. Thus at time $$D0.T13=Y61$$

for operations indicated by the code signal $X8=0$ (see Table V above), the "$c$" code corresponding to the address desired specifies a particular control flip-flop WX("$c$"). Thus, in referring to Table III, it will be noted that the "$c$" code $X14.X13.X12=1$ corresponds to the selection of the 7-word revolver and, consequently, turns on the control flip-flop WX7. When the simplification introduced above in set C is employed, code "$c$" is transferred from flip-flop X12–X14, where originally entered, to flip-flop X15–X17.

It will be noted that a dot-dash line is shown in FIG. 4 corresponding to the selected WX("$c$") to indicate that only one of the several control flip-flops is turned on, but once it is turned on it remains on until D21 time corresponding to the interval required to enter the operand. It will be noted in referring again to set B above that result sign signal Y71 is entered into flip-flop W0 at time $Y61=1$ and the remainder of the result is entered at the time $D0'.T13=1$.

A similar timing is employed in order to transfer the results of the operation T$r$ or I$n$ which are specified by the code definition $X7'.X6'=1$, reference being made again to Table V. In this case, the "$r$" code is employed as indicated in Table IV to specify the desired control flip-flop WX("$r$").

Referring again to FIG. 4, it will then be noted that a flip-flop WX("$e$") is turned on at $D0.T11=1$ and then controls the transfer of the ($d$) operand selected through amplifier Y72 to the corresponding writing amplifier. As indicated above, the timing signal T11 also indicates the first word of an arithmetic operation so that the simultaneous ($d$) to "$e$" transfer is performed for all of the usual arithmetic operations where the signal T11 is turned on. It is possible, however, to prevent the actual transfer of numbers to the writing channels by inserting the "$e$" code which specifies no drum storage, indicated in Table III to be 000.

From the description thus far, it should already be apparent that the invention provides an efficient two-word arithmetic operation which includes all of the necessary operand transfers for computation as well as the additional ($d$) to "$e$" transfer allowing the rearrangement of data for later operations. This two-word operation technique will now be reviewed with reference to FIG. 4.

As indicated in FIG. 4, the timing signal T20 is turned on at the time $D15.T11=1$ and the command word for the next operation then is shifted through flip-flops X21–X18. The first part of the command word is the "$a$" address which is then transferred in parallel to flip-flops X1–X4 at the digit time D20. This address code then becomes effective when the sequence timing signal T10 is turned on at the time $D21.T20=1$, and controls the selection of the ($a$) operand which is routed through the matrix ($a,d$) to amplifier Y72. This selected ($a$) operand is then shifted into the A register under the control of signal AX1 which is turned on at the time $D0.T10=1$.

This word time of the operation may be referred to as W$t$0 since it occurs prior to the first computation word time interval W$t$1. The period may also be considered to be word W$t$2 of the previous operation. Simultaneously with the reading in of the new ($a$) operand, the last-word-indicating signal T13 becomes one at the time $D21.T11=1$, and the previous result is then transferred to the "$c$" or "$r$" address under the control of the corresponding flip-flop WX.

It will also be noted that during the word time W$t$0, the remainder of the command word is entered so that the corresponding operation may then be begun during the following word time referred to as W$t$1. This time interval is signaled by $T11=1$ and is also employed for the simultaneous ($d$) to "$e$" transfer. It will be noted in FIG. 4 that the timing signal T20 is shown as being turned on again for a following operation for all cases except D*i* or R*t*.

*Derivation of the Logic for Serial-Parallel Multiplication*

(Reference to FIGS. 6, 6*a* and 6*b*)

Having considered the manner in which the operations A*d* and S*u* may be performed in two-word times and the simultaneous (*d*) to "*e*" transfer may be performed; it will now be shown that multiplication may also be performed in two-word times and that an efficient circuit-sharing technique may be employed whereby the S and C registers function both for parallel addition and as shifting registers.

In deriving the logic for multiplication, as will be the case for the other operations to be considered, only new definitions will be introduced. Thus, where the flip-flop function for multiplication is the same as it was for any of the previously considered operations, it will not be discussed, although it will be included in the summary of the logic for multiplication below.

The logic for the A register circuits is the same as above except for the sign entry into flip-flop A1. Thus the (*a*) operand, which may be considered to constitute the multiplicand, is selected from flip-flop M1 representing a previous result or a selection from memory. This operand is then entered into the A register through flip-flop A21 as before under the control of flip-flop AX1, the logic being the same.

After the sign of the (*a*) operand is entered into flip-flop A1, it is then changed when the sign of the (*b*) operand sensed through amplifier Y73 is negative. The reason for this is that the sign of the result for either multiplication or division is always opposite to the sign of the (*a*) operand when the sign of the (*b*) operand is negative. If the (*a*) operand is positive, flip-flop A1 is set to zero and then the presence of a negative (*b*) operand indicates that the sign of the result should be negative. Thus, flip-flop A1 is changed to one. One the other hand, if the sign of the (*a*) operand is negative and flip-flop A1 is initially turned on, it must be reset to zero for a negative (*b*) operand since the sign of the result would then again be positive. The logic for flip-flop A1 then may be expressed as follows:

$$A1j=D21.T10.A2.AX1+D0.T11.A1'.Y73$$
$$A1k=D21.T10.A2'.AX1+D0.T11.A1.Y73$$

It will be noted in FIG. 6 that this logic is expressed as a single input function where the signal A2 is shifted into flip-flop A1 at the time $D21.T10=1$ and then the signal A1', the complement of A1, is shifted into this flip-flop if the sign of the (*b*) operand is negative as indicated by Y73.

Since the sign of the result is thus complete and requires no further modification, the logic for amplifier Y71 is directly equal to A1. Thus: $Y71=A1$.

The major changes which are found in the logic exist in the C and S registers. It will be noted that the amplifiers Y32 through Y50 in the S register receive signals from full adders where a carry function is provided for each full adder through an associated C register flip-flop. Thus C20 provides a carry signal for the full adder in gating circuit *g*Y50 associated with amplifier Y50.

It should also be noted that the full adder signals are applied to the associated amplifier through an "and" circuit controlled by the signal SX2. The full adder is bypassed, however, under the control of the signal SX2'. Thus, it may be seen that the S register is controlled in the following manner. Flip-flop SX1 activates the register to allow either shifting or adding. When signal SX2 is equal to 1, shifting is performed through the full adder, whereas when signal SX2 is equal to 0, the full adders are bypassed and shifting is performed without any addition.

The (*b*) operand digits, which may be considered to constitute the multiplier digits, are then applied to flip-flop SX2 and to flip-flop CX1. Flip-flop SX2 is turned on each time the multiplier digit is one and flip-flop CX1 is turned on each time the multiplier digit is zero. Thus, when the multiplier digit is one and $SX2=1$, the S register becomes a series of full adders and the C register flip-flops then become the carry flip-flops for the respective stages. When the multiplier digit becomes zero, the S register and C register become shifting registers and are right shifted under the control of signals SX1, SX2', and CX1.

It will be noted that signals entered into the S register are effectively shifted right whenever flip-flop SX1 is on regardless of the state of flip-flop SX2. Thus, whether or not the S register functions as a series of full adders, the quantity therein is shifted forward through flip-flop S2 and applied serially to the full adder constituting the gating circuit for amplifier Y31. The S register signals then are added serially to the C register signals which are shifted through flip-flop C1, the carries for this addition being again generated in flip-flop C21. Flip-flop C1 receives signals from flip-flop C2 whenever the shift control signal $CX1=1$, otherwise, it is reset to zero so that nothing is contributed to full adder *g*Y31. The reason for this will be apparent when the multiplication example shown in FIGS. 6*a* and 6*b* is considered below. Amplifier Y70 is not shown here since subtraction is not performed for multiplication and complementation is not required.

It will be noted that a round digit is entered through amplifier Y76 into flip-flop C20. This will also be discussed further below. The logic for multiplication may be summarized as follows:

MULTIPLICATION LOGIC

A1j = D21.T10.A2.AX1 + D0.T11.A1'.Y73

A1k = D21.T10.A2'.AX1 + D0.T11.A1.Y73 n = 2 - 20

Anj = AX1.A(n+1)

Ank = AX1.A(n+1)'

A21j = T10.AX1.M1

A21k = T10.AX1.M1'

AX1j = D0.T10

AX1k = D21

- - - -

C1j = CX1.C2

C1k = C2' + CX1'.T11 n = 2 - 19 Carry

Cnj = CX1.C(n+1) + SX2.An.S(n+1)

Cnk = CX1.C(n+1)' + SX2.An'.S(n+1)'

C20j = Y76 + SX2.A20.S21

C20k = Y76'.CX1 + SX2.A20'.S21'

C21j = SX1.C1.S2

C21k = C1'.S2' + SX1'

MULTIPLICATION LOGIC—Continued

CX1j = (D0'.D21'.Y73' + D21).T11

CX1k = D21'.Y73.T11 + D21.T13

- - - -

S1j = SX1.Y31 S2j = SX1.Y32

S1k = SX1.Y31' + D0.T11 S2k = SX1.Y32' n = 3 - 20

Snj = SX1.Y(n+30) S21j = SX1.Y51 SX1j = D0.T11

Snk = SX1.Y(n+30)' S21k = SX1.Y51' SX1k = D21.T13

SX2j = D0'.D21'.T11.Y73

SX2k = Y73' + D21

- - - -

Y31 = C1.C21.S2 + C1.C21'.S2' + C1'.C21.S2' + C1.C21'.S2' n = 2 - 20

Y(n+30) = SX2[S(n+1).An.Cn + S(n+1).An'.Cn' + S(n+1)'.An.Cn' + S(n+1)'.An'.Cn] + SX2'.S(n+1)

= S(n+1).An.Cn + S(n+1).An'.Cn' + SX2[S(n+1)'.An.Cn' + S(n+1)'.An'.Cn] + SX2'.S(n+1)

Y61 = D0.T13 Y70 = C1 Y71 = A1 Y75 = X4'.X3'.X2'.X1' Y76 = D2.T11

Reference is now made to Figs. 6a and 6b where a typical multiplication operation is shown. These figures illustrate the following binary multiplication:

(a) Multiplicand = .1 1 0 0 0 0 1 0 0 0 1 0 0 0 0 0 1 1 1 1 Sa (b) Multiplier = .1 1 0 1 0 0 1 1 1 1 0 . . . . . . . . . 0 Sb Product = .1 0 1 0 0 0 0 0 1 0 0 1 0 0 1 0 1 0 1 1 Sr

01101000010...0 unused least significant half effective rounding here ↑

It will be noted that in this example numbers are considered to be binary fractions. This convention is helpful in view of the fact that the system is based upon a fixed radix point. Thus, in multiplication, the signals which leave the S register during the word time *Wt1* are the last significant digits and a rounding may be performed just prior to the time that the first significant digit becomes available during word time *Wt2*.

Referring now to FIG. 6*a*, it will be noted that flip-flops A2–A21 store the (*a*) operand corresponding to the multiplicand and flip-flop A1 stores the sign *Sa* at the digit time D0. The next digit time D1 shows the change of the flip-flop signal A1 so that it represents the sign of the result *Sr*. It will be noted then that time is shown as progressing from right to left or from top to bottom depending upon how the drawing is viewed.

No operation occurs in the S register until the multiplier or (*b*) operand has a non-zero digit therein. Prior to that time, however, flip-flop C20 receives the round-off insertion digit through amplifier Y76. This occurs at the time $D2.T11=1$, so that flip-flop C20 is set to one at D3 time. As long as the (*b*) digits are zero, then, the C register simply shifts right so that this round insertion moves to flip-flop C11 at digit time D12 before it becomes employed as a carry.

The first non-zero digit in the (*b*) operand is passed through amplifier Y73 at digit time D11 and is effective to turn control flip-flop SX2 on and flip-flop CX1 off. At digit time D12, then, the S register operates as a parallel adder. Since the S register previously stored all zeros, this first addition simply adds in the round insertion carry. This addition causes a new carry at D13 time which is entered into flip-flop C11 due to the one in flip-flop A11 and the round digit previously entered into flip-flop C11. Since the binary sum of one and one is zero, the S register flip-flop S11 receives a zero. It will be noted that the other A register signals appear to have been shifted forward into the S register as they are added to zero.

The (*b*) operand digits then are ones for the three next successive digit time intervals so that parallel addition is performed with the sum digits in each place being shifted forward in the S register and any carries which are formed in each place being regenerated into the corresponding carry flip-flop. The A register signals are repeated for each of the time intervals involved so that the manner in which the sum and carry digits are formed may be readily apparent from FIG. 6*a*. It will be noted that whenever there is an odd number of ones in any place among the signals A, S, and C, the sum digit entered into S is one, otherwise, it is zero. Thus at digit time D13, the presence of ones in A2 and S3 while there is a zero in C2 results in the entry of a zero into S2 which appears at D14 time. In a similar manner, the presence of a one in A5 while there is a zero in each of S6 and C5 results in the entry of a one into S5 which appears at D14 time.

A carry of one in each place appears whenever there are two or three one digits among A, S, and C. Thus the presence of ones in flip-flops A2 and S3 at the digit time D13 results in a carry which is entered into flip-flop C2 appearing there at time D14. In a similar manner, a carry is generated due to the presence of a one in flip-flop A11 and flip-flop C11 which is then entered as a carry into flip-flop C11 and appears there at D14 time.

Since nothing further occurs in flip-flop A1 after digit time D1, this space is then employed to represent the signal change of flip-flop C21. Each signal C21, then, represents the carry resulting from the previous carry C21 and signals S2 and C1. Thus at D13 time, a zero carry C21 is entered since S and C were previously zero and at D18 time a carry signal $C21=1$ is entered since during the previous interval (D17) both S2 and C1 were 1-representing signals. The same set of three signals C21, S2, and C1 is also utilized to define the new sum digit signal which is entered into flip-flop S1. Thus a sum digit of one is entered into flip-flop S1 and appears there at D14 time after the signals zero, one and zero appear in flip-flops C21, S2, and C1, respectively. In a similar manner, the sum digit is one and the carry signal entered in the C21 is also one after D18 time when all three of the signals C21, S2, and C1 are one.

It will be noted that whenever the signal $CX1=1$, only the S and C register signals are shown and these are shifted forward without change. Thus at D16 time, $CX1=1$ and the numbers in the S and C registers then are shifted forward so as to appear one digit to the right at D17 time. It will also be noted that amplifiers Y51 and Y76 are respectively operative to enter zeros into the left-hand ends of registers S and C. This zero entry at the ends of these registers occurs each time the signal $CX1=1$, and also serves the purpose of clearing these registers during the second word of multiplicaton as will be discussed below.

Signal C1 remains zero until a one is shifted therein after $CX1=1$. This occurs after digit time D16 when flip-flop C2 stores a one and $CX1=1$. A one also appears in flip-flop C2 during D17 time and this again is shifted into C1. However, at D18 time, CX1 becomes zero so that the C register is no longer shifted right but rather becomes a carry storage register and, consequently, the product which is not normaly used. It will be understood, of course, that provision may readily be made for storing this part of the product so that a double word length product could be available, however, in the discussion which follows it will be assumed that only the most significant part of the product having a length corresponding to one word will be utilized.

Reference is now made to FIG. 6*b* where the multiplication operation during word **W*t*2** is shown. As indicated in FIG. 6*b*, a signal produced by amplifier Y73 no longer has any significance, X's being shown therein. These digits are prevented from having any effect due to the inclusion of the signal T11 in the input function for **SX2*j*; the presence of D21 in function SX2*k* providing the desired zero setting. It will be recalled that during the word W*t*2, signal T11 is equal to zero and for all two-word operations, the signal T13** equals one as shown in FIG. 6*b*.

The first part of the product appears at flip-flop S1 at D1 time corresponding to the phasing of signals through flip-flop M1, reference being made for example to FIG. 4 where it will be noted that flip-flop M1 produces a signal representing the sign of the (*a*) operand at the digit time D1. Thus the sign developed through amplifier Y71, corresponding to the digit in flip-flop A1, is shown as being entered as the sign of the result S*r* into flip-flop S1 at the time D1 of the word **W*t*2. As before, it may be preferable to perform the sign entry at writing flip-flop W0**.

It will be noted also that during word **W*t*2 the flip-flop SX2 is zero, CX1 is one, and SX1** is one. This then means that a serial addition is performed where the S and C register numbers are added through gating circuit *g*Y31 to form the product.

It is also at this time that the new (*a*) operand is shifted into the A register as indicated and that zeros are shifted into the S and C registers from the left. Thus at the end of **W*t*2** for multiplication, the S and C registers have been cleared and a new (*a*) operand has been entered so that a new operation may be performed.

The serial-parallel multiplication scheme described above is arranged to insure a simple logic with the full adders in the S register. The technique described above of either adding both the A and C registers to the S register, or adding neither of these registers to the S register and shifting the S and C registers to the right, requires some modification in the logic for such flip-flops as CX1 and C1 but is a considerable saving over the parallel adder logic which would be required where the carry signals are always added to the S register signals and the A register is either added or not depending on the value of the multiplier or (*b*) operand digits. This latter type of parallel added logic can be generally specified as follows:

$$
\begin{aligned}
Y(n+30) &= \Sigma\,[S(n+1),\,SX2.An,\,Cn] \\
&= S(n+1).(SX2.An).Cn + S(n+1).(SX2.An)'.Cn' + \\
&\quad S(n+1)'.(SX2.An).Cn' + S(n+1)'.(SX2.An)'.Cn \\
&= S(n+1).\cancel{SX2}.An.Cn + S(n+1).(SX2' + An').Cn' + \\
&\quad S(n+1)'.SX2.An.Cn' + S\cancel{(n+1)'}.SX2'.Cn + S(n+1)'.An'.Cn
\end{aligned}
$$

flip-flop C1 is reset to zero at digit time D19, as indicated in FIG. 6*a*.

It will be noted that the letter X is shown at digit time D21 of word **W*t*1 in the position for Y73 since a blank digit occurs at this time which has no significance. Reference again to the logic for multiplication shows that nothing is entered into flip-flop SX2 at this time and flip-flop CX1** is turned to one so that the S and C registers are shifted right.

The digits which appear in the output signal S1 during this time correspond to the least significant half of The terms which are crossed out are logically redundant.

In this logic it will be noted that the signal **SX2.A*n*** replaces the signal A*n* in the previous definition for the parallel adder amplifier function. This is done since the signals A*n* are only added when the (*b*) operand signals are one, resulting in the turning on of flip-flop SX2. It will be noted then that an additional term is introduced into each amplifier function. Since 19 amplifiers are employed in the parallel adder, it will be apparent that a considerable amount of additional logic is required in performing serial-parallel multiplication in accordance with the latter technique.

From the foregoing description, it should now be apparent that a two-word serial-parallel multiplication operation may be incorporated into the system of the present invention in a very efficient manner so that the circuits which are employed may be time shared with many other operations. It should now be recognized that the timing of the multiplication operation is the same as any other two-word arithmetic operation so that a series of multiplication and additions or subtractions may be performed with a considerable saving in operational time over the comparative performance of a typical prior art machine.

In many automatic control applications a series of the type:

$$a1.X1+a2.X2 \ldots am.Xm$$

may be involved defining a control signal. In the typical prior art machine of a comparable size to the present invention, each multiplication operation would require in the neighborhood of $Dn+6$ word times, where $Dn$ represents the number of digits in each word. Thus the series solution involving four terms ($m=4$) and $Dn=20$ would require approximately 104 words for the multiplications plus 24 words for the additions or a total of 128 words. The present invention, on the other hand, may be programmed to compute this same series of four terms in 8 words for multiplication and 8 words for addition for a total of 16 words. Thus, the operation time required in a conventional serial digital computer for solving a series of this type is approximately eight times as long as is required with the system of the invention and, consequently, may not be suitable for the control application.

*Derivation of the Logic for Division*

(Reference to FIGS. 7, 7*a* and 7*b*)

The combined circuits for division and square root are shown in FIG. 7 in view of the simple manner by which square root is incorporated into the division logic. Initially FIG. 7 will be referred to with reference to division alone and the square root modification will be discussed in the next section.

Referring now to FIG. 7, it will be noted that the A register receives all three control signals, AX1, AX2, and AX3. This is required since in division the A register may shift right under the control of signal AX1; during the entry of the dividend—(*a*) operand; shift left as the quotient digits are entered under the control of signal AX2; or be cleared under the control of signal AX3 at the beginning of an operation when the dividend is transferred from the A register to the S register as will be discussed below. Thus, the general form for the input logic for flip-flops A3 through A20 appears as follows:

$$\frac{n=3\text{–}20}{Anj=AX1.A(n+1)+AX2.A(n-1)}$$

$$Ank=AX1.A(n+1)'+AX2.A(n-1)'+AX3$$

Flip-flop A21, as before, receives the (*a*) operand constituting the dividend. The logic for flip-flop A21, however, must be modified to introduce the left shift function and the clearance operation, the complete algebra may then be expressed as follows:

$$A21j=T10.AX1.M1+AX2.A20$$

$$A21k=T10.AX1.M1'+AX2.A20'+AX3$$

The logic for flip-flop A1, which receives the sign as before, is similar to that discussed above under the section relating to the multiplication logic. Thus the sign of the quotient in division is always the opposite of the sign in flip-flop A1 after the entry of the operand (*a*), if the sign of the (*b*) operand is negative.

The logic for flip-flop A2 is modified in order to introduce the quotient digits. These quotient digits are entered whenever left shift is performed in the A register as indicated by $AX2=1$. The quotient digit is equal to one whenever the partial remainder which is formed during the previous word time interval is in a 2's complementary form, where the most significant remainder digit is a one. As is further considered below, this condition is indicated by examining the half sum of S2 and C21, the quotient digit being one when this half sum is zero as is expressed by: $S2.C21+S2'.C21'=1$. In view of the changed status of signal C21 during subtraction, this expression also represents a quotient digit of zero.

At the beginning of division, a marker digit is entered into flip-flop A2 and is then shifted left at the end of each word time interval so that its presence in flip-flop A20 marks the end of the division operation. This entry of the marker digit is specified by the logic:

$$A2j=T11.AX3$$

$$A2k=T11'.AX3$$

Thus, when $AX3=1$ and the A register stages A3–A20 are cleared as the dividend is transferred to the S register, the marker digit is entered into A2.

The division logic for flip-flop A2 may then be specified as follows:

$$A2j=AX1.A3+D0.AX2.A2'.(S2.C21+S2'.C21')+T11.AX3$$

$$A2k=AX1.A3'+D0.AX2.A2.(S2.C21+S2'.C21')+T11'.AX3$$

It will be noted that A2' and A2 are employed to represent addition and subtraction, respectively, although M5' and M5 may also be employed. This interchangeability results from the fact that M5 is set by entering A2 as is discussed below.

As before, flip-flop AX1 is turned on at the time $D0.T10=1$ and is turned off at the end of word time W*t*0 by the signal D21 to control the entry of the (*a*) operand. Flip-flop AX2 is turned on at the end of each word time starting with W*t*1 ($T11=1$) throughout the division operation which is indicated by the timing signal $T12=1$, defined below, except for the last word time interval ($T13=1$) when the sign of the quotient is to be entered through Y71. Flip-flop AX2, then, remains on only for a single digit time and is turned off by D0. The division logic for flip-flop AX2 may be expressed as follows:

$$AX2j=D21.(T11+T12.T13')$$

$$AX2=D0$$

Flip-flop AX3 is turned on for one digit time at $D1.T11$ so that the A register is cleared as it is transferred to the S register. It will be noted below that flip-flop SX2 is also turned on at $D1.T11$ to effect the parallel transfer to the S register in the same manner the (*a*) operand is transferred to the S register for addition and subtraction. The logic for flip-flop AX3 may then be specified as follows:

$$AX3j=D1.T11$$

$$AX3k=AX3$$

The (*b*) operand constitutes the divisor for division and is entered in the same manner as for the operations of addition and subtraction through flip-flop C1. This entry through flip-flop C1 occurs only during the word time interval **W*t*1 ($T11=1$) and during the following word times of division ($T11'=1$) the divisor is recirculated through amplifier Y76 and flip-flop C20. This recirculation is controlled, as before by flip-flop CX1 which is turned on at the beginning of division at time $D0.T11=1$ and then is turned on at the beginning of each word except the last during division as specified by $D0.T12.T13'=1$. Flip-flop CX1** then is turned off at the end of each word of division and at the end of the entire operation.

As indicated above, each time a quotient digit of binary one is entered into flip-flop A2, subtraction is performed during the following time interval. Thus carry flip-flop C21 may be set to one to complete the carry subtraction function in accordance with the function: $D1.T12.A2$. In a similar manner, carry flip-flop C21 may be set to zero at the start whenever the quotient digit is zero and addition is performed the next time by the function: $D1.T12.A2'$. Timing signal T12 employed in this logic will be completely defined below when the overall system timing is considered.

The C register logic for division may then be specified as follows:

$$C1j=D0'.D21'.T11.Y73+T11'.CX1.C2$$
$$C1k=T11.Y73'+T11'.CX1.C2'$$
$$\overline{n=2\text{–}19}$$
$$Cnj=CX1.C(n+1)$$
$$Cnk=CX1.C(n+1)'$$
$$C20j=Y76$$
$$C20k=Y76'.CX1.SX2'$$
$$C21j=SX1.S2.Y70+D1.T12.A2$$
$$C21k=SX1.S2'.Y70'+D1.T12.A2'$$
$$Y76=C1.CX1.[T11+T12.T13'.(A20'+SX1')]$$

It will be noted that the signal $T12.T13'.A20'$ is utilized in the definition of Y76 to define the interval for circulation. The marker digit entered into flip-flop A2 is shifted left once each word time until it enters A20 during **W*t*19. Once A20 turns to one in word W*t*19, circulation is terminated, except for the first digit time A20** is on indicated by $SX1'=1$. This extra digit time is required to recirculate the most significant quotient digit. The signal $T12.T13'.A20'$ is also employed in the S register recirculation logic discussed below.

As indicated above, the S register receives the (*a*) operand or dividend in parallel at the beginning of the division operation. This transfer is effected as a parallel addition by turning flip-flop SX2 on at the beginning of the operation, the C and S registers having been cleared at the end of the previous operation. During the division process, the S register functions as a shifting register and successively presents partial remainders to the full adder-subtracter associated with amplifier Y31. Accordingly, the logic is similar to that employed for addition and subtraction except that provision must be made for entering a zero digit into flip-flop S2 at the beginning of each word time of operation to complete the partial remainder as it is effectively shifted left with respect to the divisor.

Flip-flop SX1 is turned on at the beginning of the division operation at time $D0.T11=1$ and then is turned on at the beginning of each of the successively following word time intervals for division at the time $D1=1$. This flip-flop then is turned off at the end of each word time interval at time $D21=1$ so that it is zero for one digit time interval during each word; namely during D0. It is at this time that the zero digit is entered into flip-flop S2 as mentioned above.

The S register logic may then be specified as follows:

$$S1j=SX1.Y31$$
$$S1k=SX1.Y31'+D0.T11$$

$$S2j=SX1.Y32+D0.T11$$
$$S2k=SX1.Y32'+T11'.SX1'$$

$$\overline{n=3\text{–}20}$$
$$Snj=SX1.Y(n+30)$$
$$Snk=SX1.Y(n+30)'$$

$$S21j=SX1.Y51$$
$$S21k=SX1.Y51'$$

$$Y51=SX2.A21+S1.[T11+T12.T13'.(A20'+D2)]$$
$$SX1j=D0.(T12'+T13)$$
$$SX1k=D21$$

$$SX2j=Y61+D0.T11$$
$$SX2k=D21+SX2$$

It will be noted that the timing signal $T12.T13'.A20'$ is employed again to define the division circulation interval for the S register. In addition, the signal $T12.T13'.D2$ is required to recirculate the most significant digit of the previous partial remainder during word time **W*t*19**, as is reconsidered below with reference to FIG. 7*b*.

Since division and square root are not performed in the usual two-word-time computational period, the sequence timing signals T13, specifying the end of an operation, and T20, indicating the time that the next command is to be read in, must be modified. In addition, timing signal T12 is introduced as mentioned above. Signal T12 is turned on at the end of **W*t*1 and then remains on until the marker digit entered into flip-flop A2 has been shifted into flip-flop A20. Since a quotient digit shift occurs only once for each word time interval, after flip-flop AX2 has been turned on, flip-flop A20 does not receive the marker digit until the time interval W*t*19. Flip-flop T12 is then turned off at the end of W*t*19 and flip-flop T13 is turned on at the same time. T20 is turned on during W*t*19** at the usual digit time, namely, $D15=1$. The same timing scheme is employed in square root. The sequencing timing signals for division and square root may then be written as follows:

$$T12j=D21.T11$$
$$T12k=D21.T12.A20$$

$$T13j=D21.T12.T13'.A20$$
$$T13k=D21.T10$$

$$T20j=D15.T12.T13'.A20$$
$$T20k=D14$$

The timing signals T10 and T11 are the same as defined above for the previously discussed operations.

Before considering the logic employed for add-subtract control flip-flop M5, it is helpful to discuss the general division method utilized herein. This method may be referred to as a non-restoring type of division since the divisor and partial remainders are continuously added or subtracted without any return to a previous digital position to correct an overdraft. The logical justification for a non-restoring type of division may be established in a straightforward manner. In the analysis which follows, certain symbols will be utilized which may be similar to symbols previously mentioned in the foregoing description. It should be understood, therefore, that the following derivation is to be considered completely independent from the previously discussed algebra and that the dot (.) and plus (+) signs employed presently represent multiplication and addition, respectively, rather than the logical "and" and "or" utilized above.

Let RO be the dividend, D the divisor, and Q the desired quotient. The following definitions, then, will be employed to derive the non-restoring division technique:

$Qn=n$'th partial quotient (first $n$ digits of Q)
$R(n)$=Remainder after $n$'th step
Then $R(n)=RO-D.Qn$
and $R(n-1)=RO-D.Q(n-1)$
let $Xn=Q(n)-Q(n-1)$=the $n$'th digit of Q The general rule for longhand division, then, may be expressed as follows:

$$R(n)=R(n-1)-D.Xn$$

which simply states that each remainder is equal to the previous remainder minus the product of the divisor times the quotient digit just formed.

In terms of the next remainder, $R(n+1)$, the above rule for longhand division may be written:

$$R(n+1)=R(n)-D.Xn+1$$

In a binary computer, the quotient digits X$n$ are equal to $2^{-n}$ or zero, where it is assumed that all numbers are less than one. Thus, binary .1 is equal to $2^{-1}$ and .01 is equal to $2^{-2}$, $n$ being considered to increase in value from left to right following the radix point.

In the non-restoring approach to division, the occurrence of $R(n)\geqq 0$ means that R($n$) is correct and the formula for $R(n+1)$ is the same as that for longhand division. When $R(n)<0$, however, R($n$) is not correct since the true remainder should be $R(n-1)$ or the restored previous remainder. Thus, the new remainder $R(n+1)$ may be defined as follows for the condition $R(n)<0$:

$$R(n+1)=R(n-1)-D.2^{-n-1}$$

but we know that:

$$R(n)=R(n-1)-D.2^{-n}$$

therefore, substituting for $R(n-1)$ in the expression for $R(n+1)$, we obtain the non-restoring formula for the new remainder as follows:

$$R(n+1)=[R(n)+D.2^{-n}]-D.2^{-n-1}$$
$$=R(n)+D.2^{-n}-1$$

Whenever we have R($n$)$\geqslant$0, the quotient digit $Xn=1$, in the corresponding digital place, and the next operation to be performed is subtraction. On the other hand, whenever we have $R(n)<0$, the quotient digit $Xn=0$ and the next operation is addition. Consequently, the logical definition for each quotient digit $Xn$ is simply a determination as to whether or not $R(n)$ is greater than or less than zero. This is determined, as indicated above, by effectively predicting what the most significant remainder digit would be by sensing S2 and C21 according to the relationship $S2.C21+S2'.C21'=1$, for a quotient digit of one.

The add-subtract control, then, simply requires that M5 be set to one prior to word time W$t$1 so that the divisor is first subtracted from the dividend and that thereafter the quotient digit $Xn$, available in flip-flop A2, be shifted into M5. In other words, subtraction and addition are performed when $A2=1$ and $A2=0$, respectively. A simplification in the logic for M5 may be accomplished by first setting M5 to zero following each word time interval at the time $D0.T12.13'=1$, and then setting M5 to one if $D1.T12.A2=1$ is satisfied. M5 is then cleared to zero by signal $Y61=D0.T13$ at the termination of the division operation. The division logic for flip-flop M5, then, appears as follows:

$$M5j=D0.T11+D1.T12.T13'.A2$$

$$M5k=D0.T12.13'+Y61$$

The manner in which this non-restoring operation is actually carried out may thus be understood by considering a particular example as shown in the division example (Col. 55).

In the Division Example, above, various reference numbers are shown corresponding to the timing signals and flip-flops concerned in the actual system operation. Thus, it will be noted that during word time W$t$1, the dividend appears serially through flip-flop S2 after having been entered in parallel thereto and that the Division Example also shows the dividend with corresponding digit positions being indicated so that these digits may be traced in FIGS. 7$a$ and 7$b$. In particular, it will be noted that the least significant digit of the dividend is a zero and is represented as 0–1 in the time position D3 of W$t$1 for signal S2 shown in FIG. 7$a$. In a similar manner, the most significant digit of the dividend in place 20 is a one and is represented as 1–20 appearing at time D0 of W$t$2 in the position for signal S2. After the first word time W$t$1, signal S2 then represents the successive partial remainders.

It will be noted that the divisor is continuously recirculated through the C register so that the signal C1 provides a corresponding series of signals during each word time interval. Thus the divisor is always represented by C1 in the Division Example, above, and in FIGS. 7$a$ and 7$b$. The new partial remainders are effectively shifted left in their relative position with respect to the divisor due to the fact that the S register length through which they are recirculated includes a total delay of 21 digits, whereas the C register includes only 20 digits. Thus, it will be noted that the 20th digit of the dividend or first partial remainder, digit 1–20 shown at D0 time of W$t$2, is effectively shifted off to the left and zeros are entered at the right of the remainder as it is recirculated. It is for this reason, it will be recalled, that SX1 is turned to zero after D21 and zeros are then entered into S2. Thus, at the start, the dividend in the Division Example has three zeros in the least significant places and then successively receives an additional zero following each time that the signal SX1 is equal to zero.

At the beginning of each word time interval following W$t$1, the signals S2 and C21 are sensed in order to determine the value of the quotient digit. This sensing operation is indicated in FIGS. 7$a$ and 7$b$ by the lines with arrows which run from the positions S2 and C21 at the end of digit time interval D0. Thus, the digit 1–20 for S2 and the carry signal C21 are sensed to produce the quotient digit 1–20 which is entered into flip-flop A2 at the digit time D1 of word W$t$2.

It should also be noted in FIG. 7$a$ that a one is entered into flip-flop A2 after the signal AX3 is on to provide the marker signal which designates the end of division, as described above.

As long as the subtraction of the divisor from the partial remainder results in a quotient digit of one, subtraction is continued and the add-subtract control flip-flop M5 remains set to a one state. However, when the subtraction of the divisor from the partial remainder results in an overdraft, again indicated by sensing the signals S2 and C21 during digit time interval D0, the add-subtract control signal M5 must be set to zero. Thus a simple add-subtract control is effected by initially setting flip-flop M5 to one prior to the first subtraction of the divisor from the dividend during W$t$1, and the quotient digit signal previously registered in flip-flop A2 is entered into M5 since one or zero state indicates the next state desired for M5.

DIVISION EXAMPLE

```
1 1 1 0 0 0 0 1 0 0 0 1 0 0 0 0 0 1 1 1 1          Quotient
201918171615 . . . . . . . . 6 5 4 3 2 1
 1 0 1 0 0 0 0 0 1 0 0 1 0 0 1 0 1 1 0 0 0       Dividend      S2
  201918171615 . . . . . . . . . 6 5 4 3 2 1                                Wt1
 - 0 0 1 0 1 1 0 0 0 0 1 . . . . . . . . . 1      Divisor       Y70 = C1'
 0 0 0 0 0 0 0 0 0 0 0 1 1 . . . . . . . . 1                     C21
  201918171615 . . . . . . . . . 6 5 4 3 2 1
 0 0 1 1 0 1 1 0 1 0 1 1 0 0 1 0 1 1 0 0 0 0                     S2
   201918171615 . . . . . . . . . 6 5 4 3 2 1                               Wt2
   - 0 0 1 0 1 1 0 0 0 0 1 . . . . . . . . . 1                    Y70 = C1'
  .1 1 1 1 1 0 0 0 1 1 1 . . . . . . . . . . 1                    C21
   201918171615 . . . . . . . . . 6 5 4 3 2 1
   0 0 0 0 0 0 1 1 1 0 0 0 0 1 0 1 1 0 0 0 0 0                   S2
    201918171615 . . . . . . . . . 6 5 4 3 2 1                              Wt3
    - 0 0 1 0 1 1 0 0 0 0 1 . . . . . . . . . 1                  Y70 = C1'
    0 0 0 0 1 1 0 0 0 0 1 . . . . . . . . . . 1                  C21
    201918171615 . . . . . . . . . 6 5 4 3 2 1
    1 0 0 1 1 1 0 1 0 0 1 0 1 0 1 1 0 . . . . . 0                S2
     201918171615 . . . . . . . . . 6 5 4 3 2 1                             Wt4
     + 1 1 0 1 0 0 1 1 1 1 0 . . . . . . . . . . 0               Y70 = C1
     1 1 1 1 0 1 1 1 1 0 . . . . . . . . . . . 0                 C21
     201918171615 . . . . . . . . . 6 5 4 3 2 1
Wt5 S2 1 0 1 0 0 1 0 0 0 0 1 1 0 1 1 0 . . . . . . 0
Y70 = C1  + 1 1 0 1 0 0 1 1 1 1 0 . . . . . . . . . 0
 Wt6  S2 1 0 1 1 0 0 1 0 0 1 0 0 1 1 0 . . . . . . . . 0
 Y70 = C1  + 1 1 0 1 0 0 1 1 1 1 0 . . . . . . . . . 0
  Wt7   S2 1 1 0 0 1 1 1 0 0 1 1 1 1 0 . . . . . . . . . 0
   Y70 = C1  + 1 1 0 1 0 0 1 1 1 1 0 . . . . . . . . . 0
    Wt8  S2 0 0 0 0 0 1 1 0 1 1 0 1 0 . . . . . . . . . . 0
    Y70 = C1'  - 1 1 0 1 0 0 1 1 1 1 0 . . . . . . . . . 0
     Wt9  S2 1 0 1 0 0 0 1 1 1 1 0 0 . . . . . . . . . . . 0
     Y70 = C1  + 1 1 0 1 0 0 1 1 1 1 0 . . . . . . . . . . 0
      Wt10  S2 1 0 1 1 0 0 0 1 0 1 1 0 . . . . . . . . . . . 0
       Y70 = C1  + 1 1 0 1 0 0 1 1 1 1 0 . . . . . . . . . . 0
        Wt11 S2 1 1 0 0 1 1 0 0 1 0 1 0 . . . . . . . . . . . 0
         Y70 =C1  + 1 1 0 1 0 0 1 1 1 1 0 . . . . . . . . . . 0
         Wt12  S2 0 0 0 0 0 0 1 1 0 0 1 0 . . . . . . . . . . . 0
          Y70 = C1'  - 1 1 0 1 0 0 1 1 1 1 0 . . . . . . . . . . 0
           Wt13  S2 1 0 0 1 1 1 0 0 0 1 1 0 . . . . . . . . . . . 0
            Y70 = C1  + 1 1 0 1 0 0 1 1 1 1 0 . . . . . . . . . . 0
             Wt14 S2 1 0 1 0 0 0 1 0 1 0 1 0 . . . . . . . . . . . 0
             Y70 = C1  + 1 1 0 1 0 0 1 1 1 1 0 . . . . . . . . . . 0
              Wt15  S2 1 0 1 0 1 1 1 1 0 0 1 0 . . . . . . . . . . . 0
               Y70 = C1  + 1 1 0 1 0 0 1 1 1 1 0 . . . . . . . . . . 0
                          201918171615 . . . . 10. . . . . . . . . 1
                       S2 1 1 0 0 1 0 0 0 0 0 1 0 . . . . . . . . . 0 0
                    Wt16       201918171615 . . . . 10. . . . . . . . 2 1
                  Y70 = C1  + 1 1 0 1 0 0 1 1 1 1 0 . . . . . . . . . 0
                          C21 0 0 0 0 0 0 1 1 1 0 0 0 . . . . . . . . . 0 1
                           201918171615 . . . . 10. . . . . . . . . 2 1
                          S2 1 1 1 1 0 1 0 0 0 1 0 . . . . . . . . . . 0 0
                    Wt17    201918171615 . . . . 10. . . . . . . . . 2 1
                  Y70 = C1 + 1 1 0 1 0 0 1 1 1 1 0 . . . . . . . . . . 0
                          C21 1 1 0 0 0 0 1 1 1 0 . . . . . . . . . . . 0 1
                            201918171615 . . . . 10. . . . . . . . . 2 1
                       S2  1 0 1 1 1 1 0 0 0 1 0 . . . . . . . . . . 0 0
                   Wt18      201918171615 . . . . 10. . . . . . . . . 2 1
                 Y70 = C1' - 0 0 1 0 1 1 0 0 0 0 1 . . . . . . . . . . 1
                         C21 0 1 1 1 1 0 0 0 0 0 1 . . . . . . . . . . 1
                             201918171615 . . . . 10. . . . . . . . . 2 1
                        S2  1 0 1 0 0 1 0 0 1 1 0 . . . . . . . . . . 0 0
                    Wt19      201918171615 . . . . 10. . . . . . . . . 2 1
                  Y70 = C1' - 0 0 1 0 1 1 0 0 0 0 1 . . . . . . . . . . . 1
                         C21  0 0 0 0 1 0 0 0 0 0 1 . . . . . . . . . . 1 1
                    Wt20      201918171615 . . . . 10. . . . . . . . . 2 1
         Quotient       S2    0 1 1 1 0 1 0 1 1 1 0 . . . . . . . . . . 0
Divisor   111000010001000001111
1101001111 1010000001001001011100

           Dividend
```

SUMMARY DIVISION LOGIC

A1j = D21.T10.A2.AX1 + D0.T11.A1'.Y73

A1k = D21.T10.A2'.AX1 + D0.T11.A1.Y73

SUMMARY DIVISION LOGIC—Continued

A2j = AX1.A3 + DO.AX2.A2'.(S2.C21 + S2'.C21') + T11.AX3

A2k = AX1.A3' + DO.AX2.A2.(S2.C21 + S2'.C21') + T11'.AX3 n = 3 - 20
Anj = AX1.A(n+1) + AX2.A(n-1)

Ank = AX1.A(n+1)' + AX2.A(n-1)' + AX3

A21j = T10.AX1.M1 + AX2.A20

A21k = T10.AX1.M1' + AX2.A20' + AX3

AX1j = DO.T10    AX2j = D21.(T11 + T12.T13')    AX3j = D1.T11

AX1k = D21    AX2k = DO    AX3k = AX3

- - -

C1j = DO'.D21'.T11.Y73 + T11'.CX1.C2

C1k = T11'.CX1.C2' + T11.Y73' n = 2 - 19
Cnj = CX1.C(n+1)

Cnk = CX1.C(n+1)'

C20j = Y76

C20k = Y76'.CX1.SX2'

C21j = SX1.S2.Y70 + D1.T12.A2

C21k = SX1.S2'.Y70' + D1.T12.A2'

CX1j = DO.(T11 + T12.T13')

CX1k = D21.T13 + D20.(T11 + T12.T13'.A20')

- - -

M5j = DO.T11 + D1.T12.T13'.A2

M5k = DO.T12.T13' + Y61

- - -

S1j = SX1.Y31    S2j = SX1.Y32 + DO.T11

S1k = SX1.Y31' + DO.T11    S2k = SX1.Y32' + T11'.SX1' n = 3 - 20
Snj = SX1.Y(n+30)

Snk = SX1.Y(n+30)'

S21j = SX1.Y51

S21k = SX1.Y51'

SUMMARY DIVISION LOGIC—Continued

```
SX1j = D0.(T12' + T13)          SX2j = Y61 + D1.T11
SX1k = D21                      SX2k = D21 + SX2
```

- - -

```
T10j = D21.T20        T11j = D21.T10        T12j = D21.T11
T10k = D21.T10        T11k = D21.T11        T12k = D21.T12.A20

T13j = D21.T12.T13'.A20       T20j = D15.T12.T13'.A20
T13k = D21.T10                T20k = D14
```

- - -

```
Y31 = (C1,C21,S2)      Y32 = SX2.(S3,A2,C2) + SX2'.S3 + D0.T13
          n = 2 - 20
Y(n+30) = SX2.An + SX2'.S(n+1)
Y51 = SX2.A21 + S1.[T11 + T12.T13'.(A20' + D2)]
Y61 = D0.T13
Y70 = M5.C1' + M5'.C1
Y71 = A1
Y76 = C1.CX1.[T11 + T12.T13'.(A20' + SX1')]
```

*Derivation of the Square Root Logic*

Having considered the manner in which non-restoring division may be performed, it will now be shown that a simple modification in the division logic allows the utilization of the same circuits to perform square root. It will be recalled that in non-restoring division each new remainder $R(n+1)$ may be defined as follows:

*for* $Rn \geqq 0$ $$R(n+1)=R(n)-D.2^{-n-1}$$

*for* $Rn<0$ $$R(n+1)=R(n)+D.2^{-n-1}$$

A general technique for non-restoring square root, similar in many respects to non-restoring division, will now be formulated. The notation employed above to demonstrate the non-restoring division technique will be used again with the following new definitions:

$RO$=the radicand or number to be rooted
$Q=\sqrt{RO}$ the square root of the number or root
$Q(n)$=first $n$ digits of Q
$R(n)$=remainder after $n$'th step
$Xn=Q(n)-Q(n-1)=n$'th digit of Q In performing square root, each remainder may be defined by the relationship:

$$R(n)=RO-Q(n)^2$$

Since $Q(n)=Xn+Q(n-1)$, $R(n)$ may also be expressed as:

$$R(n)=RO-Q(n-1)^2-2.Q(n-1).Xn-Xn^2$$

As above, it may be assumed that the digits $Xn=2^{-n}$ or zero for binary fractions. Introducing $Xn=2^{-n}$ into the above expression for $R(n)$, we then find:

$$R(n)=R(n-1)-2^{-n+1}[Q(n-1)+2^{-n-1}]$$

If the remainder $Rn \geqq 0$, then, it is the correct $n$'th remainder and a one is entered into the $n$'th place for the square root Q. That is:

$$Q(n)=Q(n-1)+2-^{n}$$

then the next remainder $R(n+1)$ may be defined as follows:

$$R(n+1)=R(n)-2^{-n}[Q(n-1)+2^{-n}+2^{-n-2}]$$

In terms of binary digits, this may be expressed as:

$$R(n+1)=R(n)-2^{-n}[Q(n-1)+(101)]$$

where the notation $[Q(n-1)+(101)]$ means attach the binary digits 101 to the binary representation for $Q(n-1)$.

From the analysis thus far, it is apparent that the next remainder is formed after $R(n) \geqq 0$ by subtracting a number corresponding to the previous quotient digits plus the triplet insertion (101). The manner in which this is actually accomplished in the system will be discussed further below.

When the remainder $R(n)<0$, we note that the $n$'th remainder is actually $R(n-1)$ and that the root digit $Qn=Q(n-1)$. Thus the general expression for the new remainder $R(n+1)$ may be expressed as follows:

$$R(n+1)=R(n-1)-2^{-n}[Q(n-1)+2^{-n-2}]$$

We know that the previous correct remainder $$R(n)=R(n-1)-2^{-n+1}[Q(n-1)+2^{-n-1}]$$

and rearranging $$R(n-1)=R(n)+2^{-n+1}[Q(n-1)+2^{-n-1}]$$

Therefore:

$$\begin{aligned}R(n+1)&=R(n)+2^{-n+1}[Q(n-1)\\&\quad+2^{-n-1}]-2^{-n}[Q(n-1)+2^{-n-2}]\\&=R(n)+2^{-n}[Q(n-1)+2^{-n}-2^{-n-2}]\\&=R(n)+2^{-n}[Q(n-1)+(011)]\end{aligned}$$

where the notation $[Q(n-1)+(011)]$ means attach the binary digits 011 to the binary representation for $Q(n-1)$.

It will be observed, then, that when the root digit $Xn=1$, the triplet insertion is 101 and when the root digit=0, the triplet insertion is 011. The two cases may be covered by the general rule that the triplet insertion is always:

$$Xn\ Xn'\ 1$$

Since each root digit $X_n$ is entered into A2 in the same manner as the quotient digits for division, discussed above, the triplet insertion becomes:

$$A2\ A2'\ 1$$

The manner in which this insertion is made into flip-flops C3, C2, and C1, respectively, will be considered after a specific example of square root is considered with reference to the Square Root Example below.

```
201918171615l4 . . . . . . . . 6 5 4 3 2 1
 1 0 1 1 1 1 1 0 0 0 0 1 1 1 1 0 1 0 0 1            Root
2120191817l615 . . . . . . . . . 6 5 4 3 2 1
 0 1 0 0 0 1 1 0 1 0 0 1 1 0 0 0 1 0 1 1 1          Number        S2
  201918171615 . . . . . . . . . . . . . . . 1                                 Wt1
 - 1 0 1 . . . . . . . . . . . . . . . . . . 1       Subtrahend    Y70 = C1'
 1 0 1 . . . . . . . . . . . . . . . . . . . 1                     C21
  2120191817l615 . . . . . . . . . 6 5 4 3 2 1
 - 0 1 0 0 1 1 0 1 0 0 1 1 0 0 0 1 0 1 1 1 0                      S2
    201918171615 . . . . . . . . . 6 5 4 3 2 1                                 Wt2
   - 0 1 0 1 . . . . . . . . . . . . . . . . 1                     Y70 = C1'
   0 0 0 . . . . . . . . . . . . . . . . . 1 1                     C21
    2120191817l615 . . . . . . . . . 6 5 4 3 2 1
   - 1 1 1 1 1 0 1 0 0 1 1 0 0 0 1 0 1 1 1 0 0                    S2
      201918171615 . . . . . . . . . 6 5 4 3 2 1                               Wt3
     + 1 0 1 1 0 . . . . . . . . . . . . . . . 0                   Y70 = C1
     1 1 1 1 0 . . . . . . . . . . . . . . . 0 1                   C21
      2120191817l615 . . . . . . . . . 6 5 4 3 2 1
     - 1 0 1 0 0 1 0 0 1 1 0 0 0 1 0 1 1 1 0 0 0                  S2
        201918171615 . . . . . . . . . 6 5 4 3 2 1                             Wt4
       - 0 1 0 1 0 1 . . . . . . . . . . . . . 1 1                 Y70 = C1'
       0 1 0 1 . . . . . . . . . . . . . . . . 1 0                 C21
        2120191817l615 . . . . . . . . . 6 5 4 3 2 1
        1 0 1 0 0 0 0 1 1 0 0 0 1 0 1 1 1 0 0 0 0                 S2          Wt5
        - 0 1 0 0 1 0 1 . . . . . . . . . . . . . 1                Y70 = C1'
        0 1 0 0 0 1 1 1 1 0 0 0 1 0 1 1 1 0 . . 0 0               S2          Wt6
          - 0 1 0 0 0 1 0 1 . . . . . . . . . . . 1 1              Y70 = C1'
          0 0 1 1 0 0 1 0 0 0 0 1 0 1 1 1 0 . . 0 0 0             S2          Wt7
            - 0 1 0 0 0 0 1 0 1 . . . . . . . . . 1 . 1            Y70 = C1'
   Wt8 S2     0 0 0 0 0 1 0 1 1 0 1 0 1 1 1 0 . . 0 . . 0
 Y70 = C1'      - 0 1 0 0 0 0 0 1 0 1 . . . . . . . 1 . . 1
   Wt9 S2     1 0 1 0 1 1 0 0 0 0 0 1 1 1 0 . . 0 . . . 0
  Y70 = C1        + 1 0 1 1 1 1 1 0 1 1 0 . . . . 0 . . . 0
    Wt10 S2     1 0 1 1 0 1 1 1 1 0 0 1 1 0 . . 0 . . . . 0
    Y70 = C1      + 1 0 1 1 1 1 1 1 0 0 1 1 0 . . 0 . . . . 0
     Wt11 S2      1 1 0 0 1 1 1 0 0 1 1 0 0 . . 0 . . . . . 0
     Y70 = C1       + 1 0 1 1 1 1 1 1 0 0 0 1 1 0 0 . . . . . 0
     Wt12 S2        1 1 1 1 1 0 1 1 1 1 0 1 1 0 0 . . . 0 . . . 0
     Y70 = C1         + 1 0 1 1 1 1 1 1 0 0 0 0 1 1 0 . 0 . . . 0
       Wt13 S2        0 1 0 1 0 1 1 0 1 0 1 1 1 1 0 . . 0 . . . 0
       Y70 = C1'        - 0 1 0 0 0 0 0 1 1 1 1 0 1 0 1 1 . . . 1
        Wt14 S2         0 1 0 0 1 1 1 0 0 1 1 0 1 1 1 0 0 . . . 0
         Y70 = C1'        - 0 1 0 0 0 0 0 1 1 1 1 0 0 1 0 . . . 1
          Wt15 S2         0 0 1 1 1 1 0 1 1 1 0 0 1 1 1 1 0 0 . 0
          Y70 = C1'         - 0 1 0 0 0 0 0 1 1 1 1 0 0 0 1 0 . 1
                          2120191817l615 . . . .10 9 8 7 6 5 4 3 2 1
              Wt16 S2     0 0 0 1 1 1 0 0 1 0 0 0 1 1 1 1 0 0 0 0 0
              Y70 = C1'     - 0 1 0 0 0 0 0 1 1 1 1 0 0 0 0 1 0 1 1 1
                            2120191817l615 . . . . . . . . . 5 4 3 2 1
               Wt17 S2      1 1 0 1 1 0 1 0 0 0 0 0 1 1 1 1 1 1 0 0 0 0
               Y70 = C1       + 1 0 1 1 1 1 1 0 0 0 0 1 1 1 1 0 1 1 0 0
                    C21       1 1 1 1 1 0 0 0 0 0 1 1 1 1 1 0 0 0 0 0 1
                              2120191817l615 . . . . . . . . . 6 5 4 3 2 1
                 Wt18 S2        0 0 1 0 0 1 1 0 0 1 0 1 1 1 0 1 1 1 0 0 0
                 Y70 = C1'      - 0 1 0 0 0 0 0 1 1 1 1 0 0 0 0 1 0 1 0 1
                      C21       0 1 0 0 0 0 0 1 1 1 1 0 0 0 1 1 0 0 0 1 1
                                2120191817l615 . . . . . . . . . 6 5 4 3 2 1
                  Wt19 S2         1 1 0 0 0 1 1 1 0 1 0 0 1 1 1 0 0 1 1 1 0 0
                  Y70 = C1          + 1 0 1 1 1 1 1 0 0 0 0 1 1 1 1 0 1 0 1 1
                       C21          0 0 1 1 1 1 0 0 0 0 1 1 1 1 1 1 1 0 0 0 1
                                  2120191817l615 . . . . . . . . . 6 5 4 3 2 1
                   Wt20 S2          1 1 1 0 1 1 0 1 1 0 1 0 1 1 0 0 0 0 1 1 1 0 0
                   Y70 = C1           + 1 0 1 1 1 1 1 1 0 0 0 0 1 1 1 1 0 1 0 0 1 1
                        S2            0 0 1 1 1 0 1 0 0 1 1 0 0 1 1 1 1 0 1 1 1 1
```

Referring now to the Square Root Example and to the square root timing and operation shown in FIGS. 7*c* and 7*d*, it will be noted that the first square root digit is a one and that the subtrahend .01 is subtracted first from the radicand or number to be rooted. This number, like the dividend for division, appears serially through flip-flop S2. The subtraction of the first root digit (.1) squared causes no overdraft so that $R(n)>0$. This means, then, that subtraction is performed again and the triplet 101 is introduced. It will be noted, then, that in the position *Wt*2 of the Square Root Example and during the word time interval *Wt*2 in FIG. 7*c*, a triplet insertion of 101 is made into the C register so as to appear serially thereafter as the output signal of flip-flop C1. The logical definition for this insertion will be introduced below.

The second subtraction results in an overdraft as indicated by the signals C21 and S2 so that the next operations are defined by the formula for $R(n)<0$. In this case, then, the triplet 011 is added to the previous series of signals in the C register and the signals C1 are then added to the remainder $R(n)$ to form the next remainder $R(n+1)$. In each case, the insertion is equal to:

$$A2\ A2'\ 1$$

If a comparison is made between FIGS. 7*a* and 7*b*, for division, and FIGS. 7*c* and 7*d*, for square root, it will be noted that the quotient and square root digit formation is accomplished at the same time, as indicated in FIG. 7, through the same logic into flip-flop A2.

The triplet insertion for square root is controlled by flip-flop M2 which is turned on at the beginning of the square root operation at time $D0.T12=1$. Flip-flop M2 is then turned off as soon as the least significant one is detected in the C register number. This means that there is a single digit time interval when both signals M2 and C3 are one. The condition $C3.M2=1$, then, is employed to control the triplet insertion.

The manner in which the triplet insertion is performed is evident from FIG. 7*c* where it will be noted that flip-flops C3, C2, and C1 receive the signals A2, A2', and 1, respectively. Thus during the word time interval W*t*2, the previous A2 digit 1–20 is inserted into C3, the complement of this digit or zero is entered into C2, being referred to as 0–19, and the one is entered into C1, being shown as 0–18 for amplifier Y70 due to the complementation for subtraction. Flip-flop C1, then, receives the digits 0–19 and 1–20 during the following intervals as right shift is performed. It will be noted, then, that the complement of the triplet insertion 101, that is 010, appears serially through amplifier Y70 during digit time intervals D21, D20, and D19 during word W*t*2, corresponding to the formation of a root digit of binary 1.

In a similar manner, the triplet insertion for a quotient digit of zero is shown in W*t*3 where 0–19 corresponds to A2, 1–18 corresponds to A2', and 1–17 to the one.

In this manner, then, the previous least significant one in the C register is detected in C3 and employed to reset M2 and the condition C3.M2 is utilized to enter A2, A2', and 1 into flip-flops C3, C2, and C1, respectively. The algebra for this insertion and right shift through C1, C2, and C3 may be specified as follows:

$$C1j=CX1.C2+M2.C3$$

$$C1k=CX1.C2'(M2'+C3')$$

$$C2j=CX1.C3.M2'+M2.C3.A2'$$

$$C2k=CX1.C3'$$

$$C3j=CX1.C3'.C4$$

$$C3k=CX1.C4'.M2'+M2.C3.A2'$$

In this algebra, it will be noted that C1 is turned to one by the application of the signal M2.C3 to its J input circuit, thereafter receiving signals through flip-flop C2 under the control of CX1; flip-flop C2 is set to A2' through the application of the signal M2.C3.A2' to its J input circuit and thereafter receives C3 shifted under the control of $CX1.(M2'+C3')$; and C3 is turned to zero by the signal M2.C3.A2' applied to its K input circuit so that it remains in a one state if $A2=1$, otherwise being reset to zero.

In comparing the division operation shown in FIGS. 7*a* and 7*b* with the square root operation shown in FIGS. 7*c* and 7*d*, it will be noted that the signals in S2 and S1 for square root are advanced one digit time with respect to the same signals for division. The reason for this is that in square root we may subtract .01 from .11 (assuming again that all numbers are fractions) so that the remainder may have a significant digit to the left of the radix point. In the square root example, the most significant remainder digit in S2 is referred to as the 21st digit. In division, on the other hand, the divisor may be selected so that it is always greater than the dividend so that no significant quotient digit could occur to the left of the radix point.

It will be noted, therefore, in FIG. 7*c* that the A register signals are entered in parallel to S2 . . . S21 after digit time D1, SX2 being turned on after D0 time. Thus the logic for SX2 must be modified to provide for the different entry for division and square root as follows:

$$SX2j=D0.T11(Rt)+D1.T11(Di)$$

The symbols R*t* and D*i* are introduced to represent the fact that the timing signals employed are significant only for the respective operation. It will be shown later that division may be represented by the code $X8'.X7.X6.X5'$ and that square root may be recognized by the code $X6.X5$. In the present discussion, however, the operation symbols will be employed rather than the "*f*" code designations.

At the beginning of square root, a one is entered into flip-flop C19 to provide the first subtrahend .01. It will be noted in FIG. 7*c* that this one is shifted right through the C register and then appears in flip-flop C3 at digit time D18 and in flip-flop C1 at digit time D21, being then subtracted from the number in S2, resulting in the carry digit C21 shown in digit time D21.

The modified logic for flip-flop C19 with the inclusion of the first insertion of one may be expressed as follows:

$$C19=CX1.C20+T11.SX2.Rt$$

It will be noted that a forced round is also performed in square root as in division by the entry through Y32, as explained above.

From the foregoing discussion, it should now be apparent that the technique of triplet insertion for square root provided by the invention makes it possible to incorporate square root into the system through a very simple modification in the logic for flip-flops C1, C2, C3, and C19, with the further addition of flip-flop M2 and its logic, and the modification introduced into flip-flop SX2 as discussed above.

The technique of advancing the square root operation one digit time interval makes it possible to employ the division quotient digit logic to form the square root digits with no change being required. The complete C register logic for division and square root may then be written as follows:

C REGISTER LOGIC FOR DIVISION AND SQUARE ROOT

```
C1j = CX1.C2 + D0'.D21'.T11.Y73(D1) + M2.C3
C1k = T11'.CX1.C2'.(M2' + C3') + T11.Y73'(D1)

C2j = CX1.C3.M2' + A2'.M2.C3
C2k = CX1.C3'

C3j = CX1.C3'.C4
C3k = CX1.C4'.M2' + A2'.M2.C3

n = 4 - 18
    Cnj = CX1.C(n+1)
    Cnk = CX1.C(n+1)'

C19j = CX1.C20 + T11.SX2(Rt)
C19k = CX1.SX2'.C20'
C20j = Y76
C20k = Y76'.CX1.SX2'
C21j = SX1.S2.Y70 + D1.T12.A2
C21k = SX1.S2'.Y70' + D1.T12.A2'
 Y70 = M5'.C1 + M5.C1'
 Y76 = C1.CX1.[T11 + T12.T13'.(SX1' + A20')]
```

*Derivation of the Logic for the Operations of Transmit, Input, and Output*

(Reference to FIGS. 8, 8*a*, and 8*b*)

Referring now to FIG. 8, it will be noted that the A register logic includes the three control signals AX1, AX2, and AX3, as in division and square root. In addition, provision is made for the parallel entry of the signals L1 . . . L21 which represent an input number. As will be discussed further below, this number may be either a conventional or reflected binary code. In the case where a reflected binary code is entered, provision is made for converting this into a conventional binary number during word time W$t$0 ($T10=1$).

In the operations of transmit and output, an (*a*) operand is entered in the manner previously discussed through flip-flop M1 into flip-flop A21. The most important modification introduced into the A register is required for the reflected code conversion which will now be considered. It will be assumed for the discussion which follows that the input digit entered into flip-flop A2 is a zero when the code entered is in a conventional binary form and is a one when the code is a reflected binary code. It will be assumed that the reflected binary code is of the general type shown in Table VII below.

TABLE VII

| Reflected | | | | | Conventional | | | | |
|---|---|---|---|---|---|---|---|---|---|
| n . . . | 4 | 3 | 2 | 1 | n . . . | 4 | 3 | 2 | 1 |
| 0 | 0 | 0 | 0 | 0 | 0 | 0 | 0 | 0 | 0 |
| 0 | 0 | 0 | 0 | 1 | 0 | 0 | 0 | 0 | 1 |
| 0 | 0 | 0 | 1 | 1 | 0 | 0 | 0 | 1 | 0 |
| 0 | 0 | 0 | 1 | 0 | 0 | 0 | 0 | 1 | 1 |
| 0 | 0 | 1 | 1 | 0 | 0 | 0 | 1 | 0 | 0 |
| 0 | 0 | 1 | 1 | 1 | 0 | 0 | 1 | 0 | 1 |
| 0 | 0 | 1 | 0 | 1 | 0 | 0 | 1 | 1 | 0 |
| 0 | 0 | 1 | 0 | 0 | 0 | 0 | 1 | 1 | 1 |
| 0 | 1 | 1 | 0 | 0 | 0 | 1 | 0 | 0 | 0 |
| 0 | 1 | 1 | 0 | 1 | 0 | 1 | 0 | 0 | 1 |
| 0 | 1 | 1 | 1 | 1 | 0 | 1 | 0 | 1 | 0 |
| 0 | 1 | 1 | 1 | 0 | 0 | 1 | 0 | 1 | 1 |
| 0 | 1 | 0 | 1 | 0 | 0 | 1 | 1 | 0 | 0 |
| 0 | 1 | 0 | 1 | 1 | 0 | 1 | 1 | 0 | 1 |
| 0 | 1 | 0 | 0 | 1 | 0 | 1 | 1 | 1 | 0 |
| 0 | 1 | 0 | 0 | 0 | 0 | 1 | 1 | 1 | 1 |
| . . . | | | | | . . . | | | | |
| 1 | 1 | 0 | 0 | 0 | 1 | 0 | 0 | 0 | 0 |
| 1 | 1 | 0 | 0 | 1 | 1 | 0 | 0 | 0 | 1 |
| 1 | 1 | 0 | 1 | 1 | 1 | 0 | 0 | 1 | 0 |
| 1 | 1 | 0 | 1 | 0 | 1 | 0 | 0 | 1 | 1 |
| 1 | 1 | 1 | 1 | 0 | 1 | 0 | 1 | 0 | 0 |
| 1 | 1 | 1 | 1 | 1 | 1 | 0 | 1 | 0 | 1 |
| 1 | 1 | 1 | 0 | 1 | 1 | 0 | 1 | 1 | 0 |
| 1 | 1 | 1 | 0 | 0 | 1 | 0 | 1 | 1 | 1 |
| 1 | 0 | 1 | 0 | 0 | 1 | 1 | 0 | 0 | 0 |
| 1 | 0 | 1 | 0 | 1 | 1 | 1 | 0 | 0 | 1 |
| 1 | 0 | 1 | 1 | 1 | 1 | 1 | 0 | 1 | 0 |
| 1 | 0 | 1 | 1 | 0 | 1 | 1 | 0 | 1 | 1 |
| 1 | 0 | 0 | 1 | 0 | 1 | 1 | 1 | 0 | 0 |
| 1 | 0 | 0 | 1 | 1 | 1 | 1 | 1 | 0 | 1 |
| 1 | 0 | 0 | 0 | 1 | 1 | 1 | 1 | 1 | 0 |
| 1 | 0 | 0 | 0 | 0 | 1 | 1 | 1 | 1 | 1 |

Referring now to Table VII, it will be noted that the $n$'th digit is shown for both the reflected and conventional binary code and the first four least significant digits are indicated. In the conversion process, then, it will be noted that the $n$'th conventional binary digit is directly equal to the $n$'th reflected code digit. After that, each successive lower place digit in the conventional binary code is equal to the reflected binary digit in the same place whenever the previous higher place reflected binary digit is a zero and is equal to the complement of the reflected binary digit in the same place whenever the next higher place reflected binary digit is a one.

Thus, the signals in column 4 of the conventional code are equal to those in column 4 of the reflected code when the previous reflected digit (assumed to be $n$ in Table VII) is zero and are equal to the complement of those in column 4 of the reflected code when the previous digit is one.

In a similar manner, the conventional digits in column 3 of Table VII are equal to those in column 3 of the reflected code whenever the reflected code digits in column 4 are zeros and are equal to the complement of the respective digits in column 3 whenever the reflected code digits in column 4 are ones.

In terms of the actual flip-flops in the A register, this conversion may be effected by transferring the reflected code digits in parallel into flip-flops A10 through A21. These signals are available through input devices L10 through L21. A signal is entered into flip-flop A2 specifying whether or not a conversion of the reflected code has been entered so that $A2=1$ when the code is a reflected code and $A2=0$ when the code is a conventional code. Flip-flop A1 receives the sign of the input number.

The parallel entry is effected by resetting the register under the control of flip-flop AX3 so that at the beginning of the conversion it is known that the A register flip-flops are in a zero state. Consequently, the conversion, according to the rules indicated above with reference to Table VII, may be effected by changing the state of flip-flop A3 whenever the reflected digit present in flip-flop A21 is a one and shifting the converted digits entered into flip-flop A3 to the left each successive digit time interval. In this manner, then, the conventional code digits are entered into flip-flop A3 starting with the most significant digit and then successive lower place digits are entered as the converted number is shifted to the left.

The reflected code conversion logic appearing in the input circuits for flip-flop A3 may then be defined as follows:

$$A3j=T10.AX2.A3'.A21$$
$$A3k=T10.AX2.A3.A21$$

This logic, then, specifies that during W$t$0 ($T10=1$), the control signal AX2 for left shift also indicates that a conversion is to be performed. Thereafter, the state of flip-flop A3 is changed whenever $A21=1$, since if $A3=0$ ($A3'=1$), the signal A21 is effective at the J input circuit to turn A3 on and when $A3=1$, A21 is effective at the K input circuit to turn flip-flop A3 off.

Since the input operand is transferred in parallel to the A register, the (*a*) operand is not employed and control flip-flop AX1 must be turned off to prevent the entry thereof. This is accomplished by signal $Y65=D2.T20$ during the input operation indicated by the condition $X20'.X18=1$ at that time. The logic $Y65.X20'.X18$ may be employed to turn flip-flop AX1 off and also to turn flip-flop AX3 on to clear the A register. These functions may be expressed as follows:

$$AX1k=Y65.X20'.X18$$
$$AX3j=Y65.X20'.X18$$

$AX3k=AX3$, where signal AX3 in the K input circuit resets the flip-flop one digit time interval after it has been turned on.

After signal AX3 has been turned on, input control flip-flop IX1 is turned on so that the input signals are available in L1 through L21. This occurs during W$t$0 (T10=1) and may be expressed as:

$$IX1j=T10.AX3$$

Flip-flop AX2 is then turned on at D7 time during W$t$0 to start the reflected binary code conversion if the digit entered previously into flip-flop A2 is a one. This flip-flop is then turned off after the conversion time interval at the time $D19.T10$. The conversion control functions for flip-flop AX2 may then be specified as follows:

$$AX2j=D7.T10.A2$$
$$AX2k=D19.T10$$

In view of the fact that flip flop AX2 is also turned on for division and root, provision must be made to prevent the left shifting of signal A2 into flip-flop A3 during division or root. This may be accomplished by shifting A2 into A3 for division whenever $T10'=1$. The conversion process is then performed at the input circuit of flip-flop A3 only during the time $T10=1$. The complete function for flip-flop A3 covering all operations may then be specified as follows:

$$A3j=AX1.A4+AX2.A2.(T10'+D0)+D0'.T10.AX2.A3'.A21+L3$$
$$A3k=AX1.A4'+AX2.A2'+D0'.T10.AX2.A3.A21+AX3$$

The next important modification to be considered for the operations T*r*, I*n*, and O*u* is the logic for right and left shift. As indicated in FIG. 2, the code "*s*" for the shifting operation is first received by flip-flops X17 through X21. The signals in X18 through X21 are then transferred to flip-flops X1 through X4, respectively, after digit time D20. This transfer is shown in FIG. 8*a* during the word time W*t*0.

In referring to FIG. 8, then, it will be noted that the output signals of flip-flops X17 and X1 through X3 are applied to amplifier Y74 which produces an output signal $Y74=X17'.X1'.X2'.X.3'$ which indicates when "*s*"=0. Flip-flops X17 and X1 through X3 are interconnected as a binary counter controlled by flip-flop M4 so that after M4 is turned to one, the code "*s*" is then counted down through zero.

The "*s*" code digit entered into flip-flop X21 and then transferred to flip-flop X4 is assumed to indicate the direction of shift, $X4=1$ being selected to represent a left shift and $X4=0$ a right shift.

When flip-flop M4 is turned on to control shifting, the signal in flip-flop X4 is also sensed and, if it is a zero for right shift, control flip-flop AX1 is turned on at D5 time; whereas if it is a one, control flip-flop AX2 is turned on at D5 time.

Flip-flop M4 is initially turned on at $D3.T11=1$ whenever "$s$"$\neq 0(Y74'=1)$ and is then turned off when $$\text{"}s\text{"}=0\ (Y74=1)$$

The definition for this flip-flop may then be written as follows:

$$M4j=T11.D3.Y74' \quad (\text{"}s\text{"}\neq 0)$$

$$M4k=T11.Y74$$

The counting logic for flip-flops X17, and X1 through X4 may be specified as follows:

$$X17j=X17'$$
$$X17k=X17$$
$$X1j=X1'.X17'$$
$$X1k=X1.X17'$$
$$X2j=X2'.X17'.X1'$$
$$X2k=X2.X17'.X1'$$
$$X3j=Y74$$
$$X3k=X3.X17'.X1'.X2'$$
$$X4k=Y74$$

And the input logic for flip-flops AX1 and AX2 for shifting may be specified as follows:

$$AX1j=D5.M4.X4'$$
$$AX1k=T11.M4'$$
$$AX2j=D5.M4.X4$$
$$AX2k=T11.M4'$$

The term T11.M4' in AX1*k* and AX2*k* terminates all shifting after M4 turns to zero and "*s*"=0.

Reference is now made again to FIGS. 8*a* and 8*b* where a typical example of the various transmit, input and output operations is indicated. In the input operation, it will be assumed that the reflected code 0 . . . 10111 is to be converted into a binary code, flip-flops A20 . . . and A14 through A10 receiving the reflected code digits. As indicated in FIG. 8*a*, then, the reflected code is entered in parallel into these flip-flops at digit time D7 and then the conversion into flip-flop A3 begins whereby the state thereof is changed each time the digit in flip-flop A1 is a one. Thus it will be noted that flip-flop A3 produces a series of zeros during the digit time intervals D9 through D15 corresponding to the time that the digits in A21 are zeros. After the first one appears in flip-flop A21 during digit time D15, flip-flop A3 is set to one and then changes state each time thereafter a one appears in flip-flop A21 such as occurs during digit times D17, D18, and D19. The converted binary number, then, appears in flip-flops A3 through A14 during digit time interval D20 as follows:

0 . . . 11010

It is assumed as a further example that the converted reflected code is to be shifted to the left by fourteen digit positions. Thus it will be noted that flip-flop AX2 is turned on by the signal $D5.M4.X4.T11$ as shown in FIG. 8*a* and that M4 is turned on by the signal $$D3.T11.Y74'$$

As long as signal AX2 is on, the A register is caused to left shift while at the same time flip-flops X17 and X1 through X4 are counted down until "*s*"=0 and $Y74=1$. At this time, then, it will be noted in FIG. 8*b* that flip-flop AX2 is turned off by the signal T11.M4'.

The shifting function is generalized for the operations T*r* and O*u* by showing both signals AX1 and AX2 as dashed lines, either of which may be turned on depending upon the status of signal X4. It will be recalled that if $X4=0$, AX1 is turned on for a right shift and if $X4=1$, $AX2$ is turned on for a left shift. The length of time that AX1 or AX2 remain on, of course, depends upon the number "*s*" which has been entered into flip-flops X17 and X1 through X4 so that the flip-flop which is turned on remains on for "*s*" digit time intervals to control the corresponding shift.

A further consideration for the shifting operations is the entry of zeros to clear the A register as the shifting is performed. This is accomplished during left shift by applying zero-setting signals to the K input circuit of flip-flop A21 so that zeros are entered during any right shifting for word time W*t*1.

During output operations, control flip-flop HX1 is turned on at D21.T11 permitting the transmittal of information from the A register in parallel as indicated in FIG. 8. During the operations T*r* and I*n*, on the other hand, information is transmitted to the address "*r*," as discussed above.

The output transmission during the operations T*r* and I*n* is accomplished by transferring the A register number after appropriate conversion and shift, as discussed above, to the S register. This is controlled through SX2 which is turned on at $D21.T11=1$ for one digit time.

The S register is then shifted to the right after the parallel entry of the A register number and the sign is introduced in the least significant digit position as discussed above. This sign entry, however, will be assumed to be made through writing flip-flop W0 so that no entry is required into flip-flop S1.

The timing and sequence control signals for *Tr*, I*n* and O*u* are the same as for the operations of add and subtract, previously discussed, and will now be shown in the summary below.

SUMMARY OF THE LOGIC FOR THE OPERATIONS Tr, In, AND Ou

A1j = D21.T10.AX1.A2 + L1

A1k = D21.T10.AX1.A2' + AX3.T10

A2j = AX1.A3 + L2

A2k = AX1.A3' + T11.AX2

A3j = AX1.A4 + AX2.A2.(T10' + D0) + D0'.T10.AX2.A3'.A21 + L3

A3k = AX1.A4' + AX2.A2' + D0.T10.AX2.A3.A21 + AX3 n = 4 - 20

Anj = AX1.A(n+1) + AX2.A(n-1) + Ln

Ank = AX1.A(n+1)' + AX2.A(n-1)' + AX3

A21j = T10.AX1.M1 + AX2.A20 + L21

A21k = T10.AX1.M1' + AX2.A20' + AX3

AX1j = D0.T10 + D5.M4.X4'

AX1k = D21 + T11.M4' + D3(In)

AX2j = D7.T10(In)A2 + D5.M4.X4

AX2k = D19.T10 + T11.M4'

AX3j = D4.T10.AX1'

AX3k = AX3

- - -

HX1j = D21.T11(Ou)

HX1k = HX1

IX1j = T10.AX3

IX1k = IX1

- - -

M1j = Y72.Y75' + D0.Y71.Y75 + D0'.Y31.Y75

M1k = Y72'.Y75' + D0.Y71'.Y75 + D0'.Y31'.Y75

M4j = D3.T11.Y74'

M4k = T11.Y74

- - - n = 1 - 21

Snj = SX1.Y(n+30)

Snk = SX1.Y(n+30)'

SX1j = D0.T11

SX1k = D21.T13

SX2j = D21.T11

SX2k = SX2.T11'

T10j = D21.T20; T11j = D21.T10; T13j = D21.T11; T20j = D15.T11

T10k = D21.T10; T11k = D21.T11; T13k = D21.T10; T20k = D14

COUNT DOWN

X17j = M4.X17'; X1j = M4.X1'.X17'; X2j = M4.X2'.X17'.X1'

X17k = M4.X17 ; X1k = M4.X1.X17' ; X2k = M4.X2.X17'.X1'

X3j = M4.Y74

X3k = M4.X3.X17'.X1'.X2'

X4k = Y74

- - - - -

Y74 = X17'.X3'.X2'.X1'

*Derivation of the Logic for the Program Transfer Operations Ca, Cm and Se*

(Reference to FIGS. 9, 9*a*, and 9*b*)

The present discussion is in part supplementary to the previous discussion relating to the operations of A*d*, S*u*, C*a*, and C*m* where the various circuits were considered without the program transfer functions. FIG. 9, then, must be considered in connection with FIG. 5 in order to analyze the complete operations for C*a* and C*m*. The discussion in this section will be limited to the modifications which must be made in order to introduce the program transfer functions into the circuits shown in FIG. 5.

As has been indicated above, the function for the sign of the result may be made to indicate whether or not certain conditions are satisfied. Reference is made again to Table VI*b* where various conditions are shown for defining the signal Y71. In developing signal Y71 from this table it must be assumed that flip-flop A1 has been set to zero in the compare magnitude operation (C*m*). This may be accomplished in accordance with the signal $Y66.X6'.X5'$, where $Y66=D20.T11.X8.X7$. The signals X8, X7, X6', and X5' are in the "*f*" code and reference to Table V indicates that the code 1100 for the flip-flops X8, X7, X6, and X5 represents the operation C*m*. Thus flip-flop A1 is reset to zero for the operation C*m* after digit time D20. This resetting is shown during word W*t*1 for signal A1 in FIG. 9*a*.

After the sign of the result signal is developed through Y71, it is then re-entered into flip-flop A1 at the same time it is entered as the sign of the result; that is, during the time $D0.T13=Y61=1$. This re-entry occurs only during the program transfer operations which are indicated during T13 by the signal T12. It will be recalled that T12 is equal to zero during T13 time for division and root. The logic for flip-flop A1 for the sign re-entry and reset for C*m* appears as follows:

$$A1j=T12.Y61.Y71$$

$$A1k=T12.Y61.Y71+Y66.X6'.X5'$$

$$Y66=D20.T11.X8.X7$$

Flip-flop A1 also receives the output signal resulting from the comparison function between switches E1 through E7 and the "*q*" field for the sense operation S*e*. While several sensing comparisons may be performed in accordance with the invention, it will be assumed for the present that each digit of the *q* field specifies whether or not a switch E is to be sensed. With this assumption, then, the sense condition is always satisfied except when a *q* digit is present and the corresponding switch E is open. Thus, the simplest manner of defining the sense condition is to define its complement as follows:

$$(X1'+E1)(X2'+E2)(X3'+E3)X4' +X9.E5'+X10.E6'+X11.E7'$$

approach is also to set A1 to zero if the sense condition is satisfied. One manner of performing this function is to initially set flip-flop A1 to a one state prior to the sense comparison and then to reset this flip-flop to zero if the condition is satisfied in accordance with the condition set forth above. As an alternate scheme, however, it will be assumed that flip-flop A1 is set to zero at the beginning of the sense operation and then is set to one for the complementary sensing condition Flip-flop A1, then, may be set to zero by $D19.T10=1$ for the sense operation and then reset to one at the time $D21.T11=1$ if the condition is not satisfied. Since the timing signals and the sense control signals must be repeated for each of the sense comparisons, a worthwhile saving in logical elements may be accomplished by generating a signal Y63 to serve this function through an amplifier. The signal Y63 may be defined as follows:

$$Y63=D20.T11.X8.X7.X6, \text{ where } X8.X7.X6=1$$

specifies the operation S*e*.

Signal Y63 is also employed to reset flip-flop AX1 to prevent the sense condition signal in flip-flop A1 from being destroyed by the shifting in of the sign of a new (*a*) operand.

The sign of the result function, Y71, is the same as previously discussed for the program transfer operations since the (*b*) operand is subtracted from the (*a*) operand and a negative result indicates that (*a*) is less than (*b*). In addition, it will be recalled that CX1 is mechanized to indicate the presence of a zero result and that the sign of the result is made to be zero when the result is zero, which also satisfies the condition $(a)=(b)$.

In operations other than the search for home command, to be described below, flip-flop T20 is turned on after the condition-satisfied signal has been formulated and following the words-to-wait period "*w*." The words-to-wait control is effected in the same manner as the count-down control for "*s*," described above for operations I*n*, T*r*, and O*u*. This is accomplished by turning count-down control flip-flop M4 to one each word time following the detection of the condition-satisfied signal $A1'=1$, until the "*w*" code is counted down to zero. The zero condition of the "*w*" code is detected through amplifier Y74 and then utilized to turn on T20 to read in the next command word. In the case of the "*w*" code, the signal in flip-flop X4 is also sensed since it is a significant digit, rather than the sign of the shifting direction as is the case for the operations I*n*, T*r*, and O*u*. Thus "*w*"=0 is represented by $Y74.X4'=1$.

Flip-flop T20 is turned on during W*t*1 ($T11=1$) in the usual manner and must be turned off during program transfers, represented by a signal $Y62=1$. Signal Y62 is defined below.

The logic for flip-flops T20 and M4 may then be written as follows for the operation C*a*, C*m*, and S*e*:

$$T20j = D15(T11 + T10'.T13.\overbrace{Y74.X4'}^{\text{"w"} = 0}.\underbrace{A1'}_{\leftarrow \text{condition satisfied}})$$

$$T20k = D14 + Y62 \leftarrow \text{program transfer}$$

$$M4j = D5.T10'.T13(\overbrace{Y74' + X4}^{\text{"w"} \neq 0})$$

$$M4k = T13.M4$$

The true sense condition, then, is the complement of the above expression and may be written as follows:

$$(X1'+E1)(X2'+E2)(X3'+E3)(X4' +E4)(X9'+E5)(X10'+E6)(X11'+E7)$$

Since signal $A1'=1$ indicates that the conditions $|a|\geq|b|$ for C*m* or $a\geq b$ for C*a* are met, the logically consistent It will be noted, then, in FIGS. 9*a* and 9*b* that flip-flop T20 is turned on at the usual time $D15.T11=1$ and is reset to zero by signal $Y62=1$ during T12. In a similar manner T10 is turned on in the usual manner and then reset by signal Y62.

It will be noted that the minimum wait time for any program transfer operation is one word since the word Wt2, which normally is word Wt0 for a following operation, is employed to sense the signal of flip-flop A1 to determine whether or not the condition has been satisfied. Thus, even if "w" is equal to zero, the next command word cannot be read in until the following word time interval, thus constituting a wait time of one word as compared to the usual arithmetic sequencing where no wait time is specified.

Thus during Wt2, shown in FIG. 9b, the condition "w"=0, which may occur after $M4=1$ (if "w" was originally equal to one or zero) means that T20 is turned on at D15 time of Wt2. For "w" greater than one, the word time Wt0 of the next operation may be specified as Wt("w"+2) of the previous operation.

In the usual program transfer operation, then, the program transfer condition is analyzed during word Wt0 for the sense operation and during Wt1 for Ca and Cm. If the condition is satisfied, the words-to-wait counting function is performed under the control of flip-flop M4 which is turned on once during each of the successive word time intervals. After M4 has caused the word-time-wait code "w" in flip-flops X17, X1 through X4 to be counted down to zero, as indicated by $Y74=1$ and $X4=0$, flip-flop T20 is turned on again to read in the corresponding command word.

Since only five digits are included in the "w" code, it is apparent that a maximum word time wait of thirty-one words is possible. In certain cases, it may be desirable to wait a longer time than may be specified by the usual code "w." This possibility is provided for in accordance with the invention by reserving the "w" code 11111 for a search for home command which will now be described.

A control flip-flop M3 is provided for the search for home command and is turned on when the code 11111 is detected in "w." The sensing of the code 11111 is performed under the control of signal $$Y66=D20.T11.X8.X7$$

which indicates that one of the operations Ca, Cm, or Se is to be performed. The J input function for M3 may then be written:

$$M3j=Y66.X17.X4.X3.X2.X1$$

It will be understood, of course, that the selection of the code "w"=11111 to represent the search for home operation is purely arbitrary since any selection may be made if an appropriate modification is made in the logic for flip-flop M3.

After being turned on, flip-flop M3 then remains on until the home command word is located which is designated by the code "w"=00000. In referring to FIG. 9b, it will be noted that during word Wtn, corresponding to the last word time of the program transfer operation, the code digits for "w" are found in flip-flops R11 and R18 through R21 at digit time D14. As indicated in FIG. 9, then, the signal function for resetting M3 to zero at this time may be specified as follows:

$$M3k=D14.T20.R11'.X21'.X20'.X19'.X18'$$

The selection of the code "w"=00000 is also arbitrary. Furthermore, the home command need not be designated in any particular code position. A different code could be entered into the "n" digit positions, for example.

After M3 has been turned on by signal Y66 and the search for home code, T20 is thereafter turned on for each successive command word interval until the home command is located. As usual, T20 is turned off at D14 time. No operation is performed in accordance with the command read in during the time $T20=1$ as long as signal M3 is on since it is employed to reset flip-flop T10 to zero at D15 time. The J input logic for T20 and the K input logic for T10 for the home command may then be expressed as follows:

$$T20j=D15.M3$$
$$T10k=D15.M3$$

Signal $A1'=1$ is also employed to control the entry of the code "n" into flip-flops RX1 through RX5 controlling the command channel selection. This entry is made when the signal $Y62=1$, where Y62 indicates that a program transfer function is being performed and that either the condition is satisfied as indicated by $A1'=1$ or a search for home command is to be performed as indicated by $M3=1$. The function for Y62, then, appears as follows:

$$Y62=D1.T12(A1'+M3)$$

Flip-flops RX1 through RX5 are reset to zero whenever a home command is being performed and the condition is not satisfied as indicated by $A1=1$. The input logic for flip-flops RX1 through RX5 may then be specified as follows:

$$\overbrace{RX(1\text{-}5)j=Y62.X(12\text{-}16).A1'}^{\text{"}n\text{"}}$$
$$RX(1\text{-}5)k=Y62.[X(12\text{-}16)'+A1]$$

According to this logic, the code "n" is transferred from flip-flops X12 through X16 into control flip-flops RX1 through RX5 whenever the program transfer condition is satisfied as indicated by the signal $A1'=1$. The code "n" is also transferred to these flip-flops for a search for home command so that the home command code is searched for in any designated channel.

Since the search for home command forces a program transfer regardless of the condition of signal A1, this signal may be employed to designate two "n" code selections. Thus in search for home commands, the condition represented by signal A1 may control the entry of the "n" code into flip-flops X12–X16 if the condition is satisfied, or effectively cause the selection of the origin channel ("n"=0) of the condition is not satisfied ($A1=1$).

The sense command will bear a more detailed discussion herein view of the fact that this command offers several interesting possibilities. One of these possibilities is that the so-called q field may not specify any of the switches to be interrogated. This means that flip-flop A1 will not be turned to one and it will appear that the sense condition has been satisfied. In other words, the failure to sense any of the switches E1 through E7 can be employed in the computer to force a program transfer as if a condition had been satisfied. Thus a sense command order with $q=0$ and an address "n" for the next desired channel may be employed to effect a three-word-time channel transfer. Another possibility, of course, is to perform an operation of compare algebraically or compare magnitude upon numbers (a) and (b) where it is certain that the condition will be satisfied, a typical possibility being a selection of (b) equal to zero and a positive or zero (a) operand.

But the primary importance of the sense command is that it may make it possible to share the system for various other operations when the system is not needed for its principal control function. Thus the programmer may inject a predetermined q field into various points of the program where time may be permitted for a temporary diversion from the principal automatic control process. If it is desired, then, to perform this alternate computational problem, the switches E are set to the corresponding code and the computer will then transfer to the alternate program at the time designated by the programmer.

A simple type of $q$ field coding which may be employed is to place a one in the $q$ field for each of the various possible programs. Thus, with a seven digit code, *a* one in any one of seven different places would represent a different program. This makes it possible, according to the sense coding employed herein, to select several different programs at one time. Thus, the operator might set all E switches to one with the expectation that the computing system would turn to the corresponding program at such a time in the computing process as this program could be performed.

It will be understood, of course, that the $q$ field may be employed with a different code designation where combinations of digits represent different programs. Thus, the $q$ field may specify two digit positions so that the corresponding operation is not performed unless both switches are set. It should be apparent that if the code designation requires a direct correspondence between the $q$ field code digits and the position of the E switches, $2^7$ code possibilities exist. In this case, the logic for the comparison entry into flip-flop A1 would be changed so that the condition-satisfied signal may be defined as follows:

$$(E1'.X1'+E1.X1)(E2'.X2'+E2.X2)(E3'.X3'+E3.X3)(E4'.X4'+E4.X4)(E9'.X9'+E9.X9)(E10'.X10'+E10.X10)(E11'.X11'+E11.X11)$$

It will be understood, therefore, that the basic concept of external switch control through the sense command as contemplated by the present invention is not limited to the particular type of comparison logic which is shown. The basic idea exists in the concept of external control conditioned upon the concurrence of the internal program code.

SUMMARY OF THE LOGIC FOR Ca, Cm, AND Se WITH

PROGRAM TRANSFER FUNCTIONS

A1j = D21.T10.AX1.A2 + Y63.(E1'.X1+...E4'.X4 + E5'.X9+...E7'.E11) + T12.Y61.Y71

A1k = D21.T10.AX1.A2' + D19.T10.Se + T12.Y61.Y71' + Y66.X6'.X5' n = 2 - 20

Anj = AX1.A(n+1)    A21j = T10.AX1.M1

Ank = AX1.A(n+1)'    A21k = T10.AX1.M1'

AX1j = D0.T10

AX1k = D21 + Y63

- - -

M1j = Y72.Y75' + D0.Y71.Y75 + D0'.Y31.Y75

M1k = Y72'.Y75' + D0.Y71'.Y75 + D0'.Y31'.Y75

M3j = Y66.X4.X3.X2.X1.X17    M4j = D5.T10'.T13.(Y74' + X4)

M3k = D14.T20.R11'.X21'.X20'.X19'.X18'    M4k = T13.M4

- - -

RX(1-5)j = Y62.X(12-16).A1'

RX(1-5)k = Y62[X(12-16)' + A1]

- - -

T10j = D21.T20    T11j = D21.T10    T12j = D21.T11

T10k = D21.T10 + Y62 + D15.M3'    T11k = D21.T11'    T12k = D21.T13

T13j = D21.T11    T20j = D15(T11 + T10'.T13.Y74.X4'.A1' + M3)

T13k = D21(T10 + T13.M3)    T20k = D14 + Y62

X17, X1 - X4 See count down functions under Tr, In, Cu.

SUMMARY OF THE LOGIC FOR Ca, Cm, AND Se WITH PROGRAM TRANSFER FUNCTIONS—Con.

```
Y62 = D1.T12(A1' + M3)            Y63 = D20.Se

Y66 = D20.T11.X8.X7

Y71 = A1.C21.M5' + A1'.C21'.M5 + A1.CX1.C21 + A1.CX1.M5'
```

*Derivation of the Complete Timing and Sequence Control Functions for All Operations*

(Reference to FIGS. 10 and 11)

It will be recalled that flip-flop T10 is normally turned on by the signal $D21.T20$ and turned off by $D21.T10$. For the program transfer commands, it is also turned off by the signal Y62 and for home commands, it is turned off by the signal $D15.M3$, or as an alternative $T20'.M3$. The complete control function for flip-flop T10 for all operations, then, appears as follows:

$$T10j=D21.T20$$
$$T10k=D21.T10+Y62+D15.M3$$
$$=D21.T10+Y62+T20'.M3$$

Flip-flop T11 has the same logic for all operations, namely:

$$T11j=D21.T10$$
$$T11k=D21.T11$$

Flip-flop T12 is always turned on at time $D21.T11$ for the operations of division or root indicated by the "$f$" code $X7.X6$ or for the operations of C$a$, C$m$, and S$e$ indicated by the "$f$" code $X8.X7$. T12 is then turned off for division at D21 time after signal $A20=1$, as discussed above, and for C$a$, C$m$, and S$e$ at $T13=1$. The complete logic for flip-flop T12 is then expressed as follows:

$$T12j=D21.T11.(X7.X6+X8.X7)$$
$$T12k=D21(T12.A20+T13)$$

Flip-flop T13 is turned on at D21 time for all operations and at the end of T11 for all operations except division or root. This exception may be expressed as the complement of the division or root "$f$" code which is $(X8'.X7.X6)'$ or $(X8+X7'+X6')$. Flip-flop T13 is turned off for all operations except the home command at $D21.T10$ time and for the home command is turned off at D21 time when M3 is on. The complete expression for T13, then, may be written as follows:

$$T13j=D21[T11(X8+X7'+X6')+T12.T13'.A20]$$
$$T13k=D21(T10+T13.M3)$$

Flip-flop T20 is always turned on at D15 time and for all operations except division or root is turned on at T11 time. For division or root, this flip-flop is turned on by the signal $T12.T13'.A20$ and is also turned on for the program transfer functions either by M3 as a home command or by the signal $T10'.T13.Y74.X4'.A1'$ for C$a$, C$m$, and S$e$. Flip-flop T20 is then turned off at D14 time or by the signal Y62 for the program transfer operations. The complete expression for T20, then, appears as follows:

$$T20j=D15[T11.(X8+X7'+X6')+T12.T13'.A20+T10'.T13.Y74.X4'.A1'+M3]$$
$$T20k=D14+Y62$$

Reference is now made to FIG. 10$a$ where the gross timing for all operations is shown with time increasing from left to right. It will be noted that the signals in FIG. 11 are divided into three basic groups. Group I includes operations which are performed in two word times, such as, M$u$, A$d$, S$u$, T$r$, I$n$, and O$u$. Group II includes the arithmetic operations which cannot be performed in two word times, namely, D$i$ and R$t$. Finally, Group III includes the program transfer operations where the three possibilities discussed above are shown, namely:

(1) where a program transfer operation is performed, other than a search for home command ("$w$"≠11111) and the condition is not met ($A1=1$);

(2) where a program transfer operation is performed, other than a search for home command ("$w$"≠11111) and the condition is met ($A1=0$);

(3) where a search for home command is performed ("$w$"=11111).

FIG. 11 provides a useful summary of the system timing and is also helpful in pointing out certain distinguishing timing characteristics of the system. For example, it will be noted that the condition $T12.T13'=1$ occurs only for the operations of division and root. Thus this signal may be employed instead of the division or root "$f$" code in various places. It will be understood, of course, that it is merely a matter of design choice as to the selection which is made to designate division or root.

Another distinguishing timing condition is $T10'.T13=1$ which occurs only during program transfer operations. Thus the timing condition $T10'.T13$ may be utilized interchangeably with the "$f$" code $X8.X7$. This makes it possible to save logical elements since timing signal T10' is required for the function $T20j$. for other reasons, a saving in logical elements is possible by utilizing signal $T10'.T13$ rather than $T10'.X8.X7$. However, it will be understood that the various logical possibilities discussed herein are not intended to limit the invention to a particular configuration.

It will be noted that in addition to showing the basic configuration for the sequencing circuits T10, T11, T12, T13, and T20, FIG. 10 also shows one form for a digit time counter including flip-flops T1 through T5. As indicated in FIG. 10, the drum timing signal R21 which marks each word is shifted into a flip-flop D0 which then produces timing signals D0 and D0'. While many counter configurations may be employed, it is desirable to limit the number of logical elements required for each timing signal, except those employed frequently which are then passed through a matrix amplifier. A suitable counter configuration is shown below in Table VIII.

TABLE VIII

| Digit times | Counter configuration | | | | | Code representation |
|---|---|---|---|---|---|---|
| | T1 | T2 | T3 | T4 | T5 | |
| D0 | 0 | 1 | 0 | 0 | 1 | D0. |
| D1 | 1 | 1 | 0 | 0 | 1 | T1 T2 T5. |
| D2 | 0 | 0 | 0 | 1 | 1 | T1' T2' T3' |
| D3 | 0 | 1 | 1 | 1 | 0 | T2 T3 T4. |
| D4 | 1 | 1 | 0 | 0 | 0 | T3' T4' T5'. |
| D5 | 1 | 0 | 0 | 1 | 1 | T1 T4 T5. |
| D6 | 0 | 0 | 1 | 1 | 0 | T1' T2' T5'. |
| D7 | 1 | 1 | 1 | 0 | 0 | T1 T2 T3. |
| D8 | 1 | 0 | 0 | 0 | 1 | T2' T3' T4'. |
| D9 | 0 | 0 | 1 | 1 | 1 | T3 T4 T5. |
| D10 | 0 | 1 | 1 | 0 | 0 | T1' T4' T5'. |
| D11 | 0 | 1 | 0 | 0 | 1 | T1' T3' T4' D0' R21'. |
| D12 | 0 | 1 | 0 | 1 | 1 | T2 T4 T5. |
| D13 | 0 | 1 | 0 | 1 | 0 | T1' T3' T5'. |
| D14 | 1 | 1 | 0 | 1 | 0 | T1 T2 T4. |
| D15 | 1 | 0 | 0 | 1 | 0 | T2' T3' T5'. |
| D16 | 1 | 0 | 1 | 1 | 0 | T1 T3 T4. |
| D17 | 1 | 0 | 1 | 0 | 0 | T2' T4' T5'. |
| D18 | 1 | 0 | 1 | 0 | 1 | T1 T3 T5. |
| D19 | 0 | 0 | 1 | 0 | 1 | T1' T2' T4'. |
| D20 | 0 | 1 | 1 | 0 | 1 | T2 T3 T5. |
| D21 | 0 | 1 | 0 | 0 | 1 | R21. |

The counter configuration of Table VIII has been selected so that all counts which are utilized directly require only three logical signals, or less. The signals D0 and D0′ are employed directly and signals R21 and R21′ are utilized to represent digit time intervals D21 and D21′, respectively. With this counter configuration, the digit signals which are not employed very frequently may be represented by three-logical-element "and" circuits. On the other hand, where the timing signal is employed many times, as is the case for signals D1 and D5, the "and" signal is passed through an amplifier so that the desired loading is possible.

Suitable forms for the particular logical circuits will be described below when FIG. 13 is considered showing a typical adder circuit. FIG. 13 also shows a suitable form for an amplifier.

As indicated in Table VIII, during most of the count sequences, the signals of flip-flops T1, T2, T3, and T4 are shifted with inversion into flip-flops T2, T3, T4, and T5, respectively. Thus, at digit time D1, signals 1100 appear in flip-flops T1, T2, T3, and T4, respectively, and are then inverted and shifted ahead to register 0011 in flip-flops T2, T3, T4, and T5, respectively, at D2 time.

Flip-flop T1 receives the inversion of the signal T5 except when $T4=0$. When $T4=0$, flip-flop T1 is set to 0 if $T5=0$, but otherwise remains in the same state.

Provision must also be made to synchronize the counter into the proper word time sequence. This is accomplished by setting flip-flop T1 to one after digit time D0, setting flip-flop T2 to one after digit time D21, and setting flip-flop T4 to zero after digit time D21.

A suitable logical definition for the counter of Table VIII may then be expressed as follows:

$$T1j=T4.T5'+D0$$
$$T1k=T5.D0'$$

$$T2j=T1'+R21$$
$$T2k=T1.R21'.D0'$$

$$T3j=T2'$$
$$T3k=T2$$

$$T4j=T3'.R21'.D0'$$
$$T4k=T3+R21$$

$$T5j=T4'$$
$$T5k=T4$$

The circuit mechanization shown in FIG. 10 may be referred to as a two-level network. By this it is meant that only two levels of logic are employed, where the first level is a series of "and" circuits, and the second level combines the "and" circuits, where necessary, into "or" circuits. While it is not absolutely necessary to employ two-level logic in practicing the present invention, this type of mechanization is preferred, in spite of the increase in logical elements required, to insure the reliability of the gating circuits. It will be understood, however, that the logical representations given above for the various logical circuits are not to be construed as limited to any particular type of mechanization. Thus, in many instances, the logic has been factored several times in order to show the particular function clearly, rather than to indicate a particular type of mechanization.

As an example of this expansion, consider the complete logic for M5*j* introduced again below:

$$M5j=D0.T11[X7.X5'(A1.Y73'+A1'.Y73)+X7.X5(A1.Y73+A1'.Y73')+X8.X5'+X7.X6]+D1.T12.T13'.A2$$

With expansion to two-level logic, this expression is written as follows:

$$M5j=D0.T11.X7.X5'A1.Y73'+D0.T11.X7.X5'.A1'.Y73+D0.T11.X7.X5.A1.Y73+D0.T11.X7.X5.A1'.Y73'+D0.T11.X8.X5'+D0.T11.X7.X6+D1.T12.T13'.A2$$

Accordingly, each logical expression shown herein is to be construed as generic to a class of logic, where any equation in this class may be derived from the other by well known algebraic manipulations. In addition, many equivalent timing and logical signals may be employed such as the replacement of the signal $T12.T13'$ in place of the "*f*" code, $X8'.X7.X6$ for division and root, as mentioned above.

It will be noted in FIG. 10 that a modification is made in the logic for T20 through the introduction of an amplifier Y77 having its signal defined as follows:

$$Y77=T11.(X8+X7'+X6')+T12.T13'.A20+T10'.T13.Y74.X4'.A1'+M3$$

This technique is employed so that the two-level logic discussed above may be utilized without the requirement of so many logical elements. It will also be noted that in the place of the timing signal D15 which is specified for the J input circuit of T20, the timing signal $T2'.T3'.T5'$ is utilized, corresponding to D15 as shown in Table VIII. Other substitutions of this type will also be noted in FIG. 10 and it will be assumed hereafter that when the digit time signal designation is employed, the corresponding substitution is made to derive such a signal from the digit time counter representation.

Having considered the manner in which the various sequencing conditions for flip-flop T20 may be combined to form the complete mechanization logic, a suitable form for the complete system algebra covering all of the operations shown in FIG. 2 will now be presented. An attempt is made in this summation to indicate the particular significance of the various parts of the logic. For this purpose the various symbols employed above will be shown, such as M*u* for multiplication, D*i* for division, S*r* for the sign of the result, S*a* for the sign of the (*a*) operand, and so forth.

Several things must be considered in studying the complete system logic. The first is that in many cases the logic has been simplified by allowing the simultaneous performance of certain operations which do not effect the desired computation. Thus, in many cases, the "*f*" code may specify the operations D*i*, R*t* and S*e* where actually only D*i* and R*t* are desired. This is permissible since the sense operation does not interfere with the operations of Division and Root. In many other cases, simplifications will be noted where the control signal utilized inherently specifies the operation. Thus, in the A register logic, the signal AX2 during certain time intervals may only represent division or root and during other time intervals, may only represent the input operation. The reason for this will be apparent if the AX2 logic is considered in connection with the particular A register flip-flop logic.

It should be noted again that in many instances such timing conditions as $T12.13'$ for division or root or the timing condition $T10.T13'$ for program transfer functions are employed to represent the respective operations.

SUMMARY OF COMPLETE SYSTEM LOGIC FOR ALL OPERATIONS

```
                   Sa           Mu + Di        Sr          In
A1j = D21.T10.AX1.A2 + T11.Y60.X6.X5'.A1'.Y73 + L1 +
                             └—D0.X8'.(T11 + T13)

 ┌D20.X8.X7.X6 +
 └→Y63.(E1'.X1+E2'.X2+E3'.X3+E4'.X4+E5'.X9+E6'.X10+E7'.X11)

 D0.T13
 Y61.Y71.T12
   re-enter
     Sr                   ┌T11'           Mu + Di         Sr'
A1k = Y61.Y71'.T12 + D21.T10.AX1.A2' + T11.Y60.X6.X5'.A1.Y73 +

        Se reset       D20.T11.Cm     In reset
 D19.T10.X8.X7.X6 + Y66.X6'.X5' + AX3.T10

  reset        Mu + Di                  Cm
A1k* = Y65 + T11.Y60.X6.X5'.A1.Y73 + Y66.X6'.X5' + Y61.Y71'
       └—D2.T20                     └—D20.T11.X8.X7
```

- - - -

```
A2j = AX1.A3 + D0.AX2.A2'.(S2.C21 + S2'.C21') + T11.AX3 + L2←In
      Right      Di + Rt Result Digits          Di + Rt   Left shift
      Shift                                     Marker    zero entry
A2k = AX1.A3' + D0.AX2.A2.(S2.C21 + S2'.C21') + T11'.AX3 + T11.AX2
```

- - - -

```
A3j = AX1.A4 + AX2.A2.(T10' + D0) + D0'.T10.AX2.A3'.A21 + L3←In
      Right     Left Shift          In Conversion        Clear
      Shift
A3k = AX1.A4' +  AX2.A2'          + D0'.T10.AX2.A3.A21  + AX3
```

- - - -

```
 n = 4 - 20
Anj = AX1.A(n+1) + AX2.A(n-1) + Ln←In digit
      Right Shift   Left Shift   Clear
Ank = AX1.A(n+1)' + AX2.A(n-1) + AX3
```

- - - -

```
A21j = T10.AX1.M1 + AX2.A20 + L21 +*A20.D2.T12.T13'
       (a) operand  Left Shift Clear      Di + Rt Marker Shift
A21k = T10.AX1.M1' + AX2.A20' + AX3 + T11.AX1} zeros for right shift
```

- - - - -

```
AX1j = D0.T10 + D5.M4.X4'
  (a) operand   Tr+In+Ou     In       D20.Se
AX1k = D21   +  T11.M4' + D3.X7'.X5 + Y63
                  *
           D2.T20        Y65.X20'.X18
```

- - - - -

```
            *AX1'
AX2j = D7.T10.X7'.X5.A2 + D5.M4.X4   + D21.(T11.X7.X6 + T12.T13')
        In Conversion     Tr+In+Ou        Di + Rt
AX2k = D19.T10          + T11.M4'.X7' +   D0
```

- - - - -

Table V

| X | 8 | 7 | 6 | 5 |
|---|---|---|---|---|
| Ad | 0 | 1 | 0 | 0 |
| Su | 0 | 1 | 0 | 1 |
| Mu | 0 | 0 | 1 | 0 |
| Di | 0 | 1 | 1 | 0 |
| Rt | 0 | 1 | 1 | 1 |
| Tr | 1 | 0 | 0 | 0 |
| In | 1 | 0 | 0 | 1 |
| Ou | 1 | 0 | 1 | 0 |
| Ca | 1 | 1 | 0 | 1 |
| Cm | 1 | 1 | 0 | 0 |
| Se | 1 | 1 | 1 | 0 |

SUMMARY OF COMPLETE SYSTEM LOGIC FOR ALL OPERATIONS—CON.

```
     *Y65.X20'.X18
AX3j = D4.T10.AX1' + D1.T11.X7.X6
         In            D1 + Rt + Se
AX3k =               AX3

- - - - -

C1j =       CX1.C2 + M2.C3 +  D0'.D21'.T11.X7.Y73
            Shift    Triplet   (b) operand entry
                     Insertion
C1k = T11'.CX1.C2'.(M2' + C3') + T11.Y73'.(X6' + D21'.X7.X5') +
       Mu+Tr+In+Ou Reset
      X7'.(C2' + T11.CX1') + T11.CX1.C2'.X6.X5
                                    Rt

- - - - -

C2j = CX1.C3.M2' + A2'.M2.C3 + SX2.A2.S3
        Shift       Triplet     Carry
C2k = CX1.C3'    +  Insertion   SX2.A2'.S3'

- - - - -

C3j = CX1.C3'.C4    Triplet   + SX2.A3.S4
        Shift       Insertion    Carry
C3k = CX1.C4'.M2' + A2'.M2.C3 + SX2.A3'.S4'

- - - - -

     n = 4 - 18
Cnj = CX1.C(n+1) + SX2.An.S(n+1)
        Shift        Carry
Cnk = CX1.C(n+1)' + SX2.An'.S(n+1)'
                                      Rt
C19j = CX1.C20 + SX2.A19.S20 + T11.SX2.X6.X5
        shift       carry
C19k = CX1.SX2'.C20' + CX1'.SX2.A19'.S20'

- - - - -

C20j = Y76 + SX2.A20.S21
   circulate   carry
C20k = Y76'.(CX1 + SX2.A20'.S21')

- - - - -

C21j = SX1.S2.Y70  + D1.T12.A2 + Y61.M5.C21'.X6'
        Normal        D1 + Rt     First Carry
        Carry        First Carry  Ad+Su+Cm+Ca+Tr+Ou
C21k = SX1.S2'.Y70' + D1.T12.A2' + Y61.M5.C21.X6'

- - - - -

                                      * D0.X7.X6
CX1j = T11.X8'.X7'.(D0'.Y73' + D21) + D0.(T11.X7.X6 + T12.T13') + T11.X7.X6'.Y31
                   Mu                      D1 + Rt + Se          Ad+Su+Ca+Cm+Mu
CX1k = T11.X8'.X7'.D21'.Y73   + D20.(T11.X7.X6 + T12.T13'.A20') + D21.T13
                                      * D20.A20'.X7.X6

- - - - -

HX1j = D21.T11.X8.X7'.X6           IX1j = T10.AX3
               Ou                           In

HX1k = HX1                         IX1k = IX1
```

SUMMARY OF COMPLETE SYSTEM LOGIC FOR ALL OPERATIONS-CON.

```
M1j = Y72.Y75'  + DO.Y71.Y75   + DO'.Y31.Y75<-X4'.X3'.X2'.X1'
     (a) "a" ≠ 0  Sa "a" = 0     (a) "a" = 0
M1k = Y72'.Y75' + DO.Y71'.Y75  + DO'.Y31'.Y75
```

- - - - -

```
                                          "w" = 11111 Ca + Cm + Se
M2j = DO.T12.T13'.X5            M3j = Y66.X4.X3.X2.X1.X17
          Rt          ;
M2k = C3.M2 + D21               M3k = D14.T20.R11'.X21'.X20'.X19'.X18'
                                M3k*= D14.Y77*"w" = 00000
```

- - - - -

```
                "s" ≠ 0                                "w" ≠ 0
M4j = X8.X7'.D2.T11.Y74'      + D5.T10'.T13.X8.X7.(Y74' + X4)
        Tr + In + Ou                   Ca + Cm + Se
M4k =    T11.Y74              +           T13.M4
         M4  <-X3'.X2'.X1'.X17' ("s" = 0)

M4j* = D21.T10'.T13.T20'
        Ca + Cm + Se
M4k* =      DO
```

- - - - -

```
              Ad+Cm                           Su+Ca
M5j = DO.T11.[X7.X5'.(A1.Y73' + A1'.Y73) + X7.X5.(A1.Y73 + A1'.Y73') +
        Tr+Ou+Cm+Se                Di+Rt
      X8.X5' + X7.X6]   + D1.T12.T13'.A2
               Di+Rt

                               Di+Rt
M5k = Y61.C21 + DO.T12.T13' + Y61.X6 + D21.T13
        Di+Rt
M5k* = DO.AX2
```

- - - - -

```
                               "n"
                 RX(1-5)j = Y62.X(12-16).A1'
                 RX(1-5)k = Y62.[X(12-16)' + A1]
```

- - - - -

```
                                                           n = 3 - 21
S1j = SX1.Y31               S2j = SX1.Y32 + DO.T11         Snj = SX1.Y(n+30)
                          ;                             ;
S1k = SX1.Y31' + DO.T11     S2k = SX1.Y32' + T11'.SX1'     Snk = SX1.Y(n+30)'
                 SX1'

                  SX1j = DO.(T12' + T13) + D1
                  SX1k = D21.X7

                 Mu                         Ad+Su+Ca+Cm          Rt
SX2j = DO'.D21'.T11.X8'.X7'.Y73 + [DO.T11.X7.X6' + DO.T11.X6.X5 +
                 Di                 Di+Rt          Tr+In+Ou
       D1.T11.X8'.X7.X6.X5' + Y61.X8'.X7.X6 + D21.T11.X8.X7']
             Mu
SX2k = X8'.X7'.Y73' + SX2.X7 + SX2.T11' + D21.X6
```

- - - - -

```
T1j = T4.T5' + DO              T2j = T1' + R21              T3j = T2'
                   ;                              ;
T1k = T5.DO'                   T2k = T1.R21'.DO'            T3k = T2
```

SUMMARY OF COMPLETE SYSTEM LOGIC FOR ALL OPERATIONS-CON.

T4j = T3'.R21'.DO' ; T5j = T4'
T4k = T3 + R21 ; T5k = T4

- - - - -

T10j = D21.T20 ; T11j = D21.T10 ; T12j = D21.T11.(X7.X6 + X8.X7)
T10k = D21.T10 + Y62 + D15.M3 (T20') ; T11k = D21.T11 ; T12k = D21.(T12.A20 + T13) (Di+Rt . Ca+Cm+Se)

T13j = D21.[T11.(X8 + X7' + X6') + T12.T13'.A20] ((Di + Rt)' ; Di + Rt)

T13k = D21.(T10 + T13.M3)

T20j = D15.Y77 ; Y77 = T11.(X8 + X7' + X6') + T12.T13'.A20 + M3 + T10'.T13.X4'.X3'.X2'.X1'.X17' ((Di + Rt)' ; Di + Rt ; "w" = 00000)
T20k = D14 + Y62

Y62 = D1.T12.(A1'.X8+M3)

Y77* = T11.(X8 + X7' + X6') + T12.T13'.A20 + T2'.M3 + T10'.T13.X4'.X3'.X2'.X1' + T20.R11'.X21'.X20'.X19'.X18' ("w" = 00000 or "w" = 00001 ; "w" = 11111)

- - - - -

W0j = T13'.Y72 + Y61.Y71 + T13.Y61'.Y31 ; Wa(2-4-6) = WX(2-4-6)-b-W0
((d) to "e" ; Sr ; (r) to "c" or "r" ; DO')
W0k = T13'.Y72' + Y61.Y71 + T13.Y61'.Y31' ; Wa(1-3-5-7) = W(1-3-5-7)

W(1-3-5-7)j = WX(1-3-5-7).W0 + WX(1-3-5-7)'.W(11-13-15-17)
W(1-3-5-7)k = WX(1-3-5-7).W0' + WX(1-3-5-7)'.W(11-13-15-17)'

WX(1-7)j = Y60.("c" or "e") + Y61."r".X7'.X6'
WX(1-7)k = D21

W(11-13-15-17)j = R(1-3-5-7)
W(11-13-15-17)k = R(1-3-5-7)'
"r"(1-7) = X10 - X16

| X 17 | 16 | 15 | "c" | "e" |
|---|---|---|---|---|
| 0 | 0 | 1 | | |
| 0 | 1 | 0 | | |
| 0 | 1 | 1 | | |
| 1 | 0 | 0 | | |
| 1 | 0 | 1 | | |
| 1 | 1 | 0 | | |
| 1 | 1 | 1 | | |

X(1-4)j = Y64.X(18-21) + Y62.X(5,9-11) + M4 (count down)
X(1-4)k = Y64.X(18-21)' + Y62.X(5,9-11)' + M4 (count down)
Y64 = D20.(T10 + T20)

Count Down Logic

X17j = X17' ; X1j = X1'.X17' ; X2j = X2'.X17'.X1' ; X3j = Y74 = X3'.X2'.X1'.X17'
X17k = X17 ; X1k = X1.X17' ; X2k = X2.X17'.X1' ; X3k = X3.X17'.X1'.X2'

X4k = Y74 = X3'.X2'.X1'.X17'

SUMMARY OF COMPLETE SYSTEM LOGIC FOR ALL OPERATIONS-CON.

X5j = Y65.X18 + Y66.X1 ; X(6-8)j = Y65.X(19-21) ; X9j = Y65.R11 + Y66.X2

X5k = Y65.X18' + Y66.X1' ; X(6-8)k = X65.X(19-21)' ; X9k = Y65.R11' + Y66.X2'

Y65 = D2.T20

- - -

X10j = D5.T10.X20 + Y66.X3 ; X11j = Y67.X18 + Y66.X4 ; X(12-14)j = Y67.(X19-X21)

X10k = Y65 + Y66.X3' ; X11k = Y65 + Y66.X4' ; X(12-14)k = Y65

Y67 = D8.T20

X(15-16)j = Y68.X(19-20) + D5.X8'.X(12-13)

X(15-16)k = Y65 + D1.X8'

X17j = Y68.X21 + D5.X8'.X14 + M4 (count down logic)

X17k = Y68.X21' + D1.X8' + M4 (count down logic)

X(18-20)j = T20.X(19-21) ; X21j = T20.R11

X(18-20)k = T20.X(19-21)' ; X21k = T20.R11'

- - -

Y31 = Y70.C21.S2 + Y70.C21'.S2' + Y70'.C21.S2' + Y70'.C21'.S2

Y32 = SX2.S3'.A2.C2' + SX2.S3'.A2'.C2 + S3.A2'.C2' + S3.A2.C2 + SX2'.S3 + D0.T13.X7.X6 (Di+Rt)

n = 3 - 20

Y(n+30) = SX2.S(n+1)'.An.Cn' + SX2.S(n+1)'.An'.Cn + S(n+1).An'.Cn' + S(n+1).An.Cn + SX2'.S(n+1)

Y51 = SX2.A21 + S1.(T11.X7.X6 + T12.T13'.A20' + D2.T12.T13') (D1 + Rt)

Y51* = SX2.A21 + S1.X7.X6.T10'.A21'

Y60 = D0.X8'.(T11 + T13) ; Y61 = D0.T13 ; Y62 = D1.T12.(A1'.X8 + M3)

Y63 = D20.T10.X8.X7.X6 (Se) ; Y64 = D20.(T10 + T20); Y65 = D2.T20

Y66 = D20.T11.X8.X7 (Ca+Cm+Se) ; Y67 = D9.T20 ; Y68 = D11.T20

Y70 = M5'.C1 + M5.C1'

Y71 = A1.[X6 + X7' + CX1.(C21 + M5') + C21.M5] + A1'.X7.X6'.C21'.M5

Y72 = R1.X4'.X3'.X2' +
R2.X4'.X3'.X1' +
R3.X4'.X3'.X2.X1 +
R4.X4'.X2'.X1' +
R5.X4'.X3.X2'.X1 +
R6.X4'.X3.X2.X1' +
R7.X4'.X3.X2.X1 +
R10.X4.(X3 + X2 + X1)

Select (a) or (d)

| X | 4 | 3 | 2 | 1 |
|---|---|---|---|---|
| R1 | 0 | 0 | 0 | 1 |
| R2 | 0 | 0 | 1 | 0 |
| R3 | 0 | 0 | 1 | 1 |
| R4 | 0 | 1 | 0 | 0 |
| R5 | 0 | 1 | 0 | 1 |
| R6 | 0 | 1 | 1 | 0 |
| R7 | 0 | 1 | 1 | 1 |

SUMMARY OF COMPLETE SYSTEM LOGIC FOR ALL OPERATIONS—CON.

```
Y73 = R1.X11'.X10'.X9 +
      R2.X11'.X10.X9' +
      R3.X11'.X10.X9 +
      R4.X11.X10'.X9' +
      R5.X11.X10'.X9 +
      R6.X11.X10.X9' +
      R7.X11.X10.X9
```

| X | 11 | 10 | 9 | |
|---|---|---|---|---|
| R1 | 0 | 0 | 1 | |
| R2 | 0 | 1 | 0 | |
| R3 | 0 | 1 | 1 | |
| R4 | 1 | 0 | 0 | Select (b) |
| R5 | 1 | 0 | 1 | |
| R6 | 1 | 1 | 0 | |
| R7 | 1 | 1 | 1 | |

```
      "s", "w" = 0                                  "a" = 0
Y74 = X3'.X2'.S1'.X17'                       Y75 = X4'.X3'.X2'.X1'

Y76 = S1./X7.X6'.CX1.(T11 + D0.T13)/ +
          Ad+Su+Ca+Cm                         *A21'
      C1./CX1.T11.X8'.X7.X6 + CX1.T12.T13'.(SX1' + A20')/ + X8'.X7'.T11.D2
                           Di + Rt                                 Mu

          (Di + Rt)'             Di + Rt
Y77 = T11.(X8 + X7' + X6') + T12.T13'.A20 + M3 + T10'.T13.X4'.X3'.X2'.X1'.X17'
                                                                "w" = 00000

Y77* = T11.(X8 + X7' + X6') + T12.T13'.A20 + T2'.M3 +
       T10'.T13.X4'.X3'.X2'.X1' + T20.R11'.X21'.X20'.X19'.X18'
                "w" = 00000              "w" = 11111
             or "w" = 00001
```

Several variations, reductions in algebra, and substitutions are indicated in the above summary. In general, the variations are indicated by an asterisk associated with a particular term. Thus A1$k$* represents an alternate resetting function for flip-flop A1. Terms which may be redundant in a particular situation are indicated by a diagonal line passed therethrough, and substitutions are indicated by arrows pointing to the particular term involved. Thus the timing signal T10 in the function A1$j$ is crossed out indicating that it may be redundant, and an arrow associates the logic $D20.T11.X8.X7$ with the amplifier function Y66 in the logic for A1$k$*.

Table V is repeated in part at the beginning of the summary to provide a convenient reference in interpreting the various "$f$" code signals which are employed in the algebra. Thus in the term $T11.Y60.X6.X5'.A1'.Y73$ in A1$j$, where $Y60=D0.X8'(T11+T13)$, the "$f$" code signal $X8'.X6.X5'$ will be noted to cover the operations M$u$ and D$i$ in Table V. As a further convenience, the symbols associated with a particular operation are also placed over the particular terms.

In general, the complete system logic is obtained by taking the separate logic for the operations discussed above and combining associated groups by means of appropriate "$f$" code signals or other signals designating the particular operation. However, in many situations, several alternatives are possible and some of these will be discussed in the order of presentation of the system algebra.

In the input logic for flip-flop A1, it will be noted that amplifier function $Y60=D0.X8'.(T11+T13)$ is employed to designate the operations $Mu+Di$ and the digit time D0. An equivalent arrangement, therefore, is found in the logic $T11.D0.X8'.X6.X5'A1'.Y73$ where appropriate substitution is made for amplifier function Y60. This type of substitution may be made wherever an amplifier function is shown and, therefore, it will be understood that the particular logic is intended to be illustrative only and does not necessarily represent a preferred practice.

Other substitutions will be noted for the function A1$j$. The amplifier function Y63 may be replaced with its equivalent $D20.X8.X7.X6$ covering the operation S$e$ as indicated in Table V. In a similar manner, the function Y61 may be replaced by its equivalent $D0.T13$. It will be noted that the term T12 in $Y61.Y71.T12$ has been crossed out as being redundant. Elimination of this redundancy allows the application of a signal to flip-flop A1 turning it on at the beginning of any word time interval specified by $T13=1$. This simplification is permissible as long as it does not interfere with any of the other operations.

The manner in which the function A1$k$ is formulated should be apparent from the above illustration with respect A1$j$. The variation in A1$k$* provides an interesting alternative. It will be noted that the amplifier function $Y65=D2.T20$ is indicated to be a reset function. This term obviates the necessity of including the other reset terms: $D21.T10.AX1.A2'$; $D19.T10.X8.X7.X6$; and $AX3.T10$, and, therefore, considerably simplifies the function. The input logic for flip-flop A2 is simply the logical combination of the previously discussed functions.

The next important alternative to be noted is found in function A21$j$. Here the term indicated by an asterisk is $A20.D2.T12.T13'$ and provides an additional marker shift for division and root. The purpose of this modification will be more fully understood when the modified versions for amplifier functions Y51 and Y76 are considered below. Briefly the purpose is to transmit the marker into flip-flop A21 to extend the designation of the division and root computation interval. This extension makes it possible to replace a fairly complex set of algebra in each of amplifier functions Y51 and Y76, as will be considered below.

An alternative function is indicated for function AX1$k$ in the replacement of $D3.X7'.X5$ with $Y65.X20'.X18$. This simply permits starting an input operation one digit time earlier and may be desirable for input conversion operations. The fact that the "$f$" code must be sensed at a digit time earlier results in the replacement of $X7'.X5$ with $X20'.X18$ where the corresponding digits appear during their serial entry as discussed above.

An example of the typical replacement of a "$f$" code designation with a simpler function is found in the logic for AX2$j$. Here the "$f$" code $X7'.X5$, designating an input operation, may be replaced with AX1'. The reason for this is found by reference to the logic for flip-flop AX1. Here it will be noted that flip-flop AX1 is never off during $T10=1$, unless it is reset prior to D21 by the input function $D3.X7'.X5$ or its alternative $Y65.X20'.X18$. Another "f" code replacement is indicated in the term $T12.T13'$ in AX2*j*. This particular timing combination occurs only in division and root and, accordingly, may be employed in several places hereafter for this function. Thus it will be noted again below in the function M2j, where the additional "f" term X5 is added to specify root in particular.

A timing alternative is possible in AX2*j*, similar to that discussed above with respect to AX1*k*, where $D7.T10.AX1'$ may be replaced with $Y65.X20'.X18$. As before, the term AX1' provides an alternative for the input "f" code $X7'.X5$.

The logic for flip-flop C1 is obtained by combining the various functions introduced above. It will be noted that the "f" code digit X7 is utilized to control the entry of the (*b*) operand. This eliminates only the operations M*u*, T*r*, I*n*, and O*u*, multiplication being the principal concern. It will be recalled that in multiplication, the (*b*) operand is the multiplier and controls flip-flop CX1 and, therefore, is not entered into the C register. The function for the (*b*) operand entry in C1*k* is more complicated due to the fact that provision must be made to insure that the first root subtrahend is not eliminated. Thus the logic $X6'+D21'.X7.X5'$ covers all operations except root and multiplication. This may be simplified so that only the "f" code digit X7 is required if the first root subtrahend digit is entered through amplifier Y73.

The term $T11.CX1.C2'.X6.X5$, found in the function for C1*k*, has been added to reset flip-flop C1 after a first root subtrahend has been entered therein. C1 would otherwise remain on since no root resetting terms are found in the other part of C1*k*. The term $X7'.(C2'+T11.CX1')$ is designed to cover the required resetting and shifting for multiplication, as discussed above.

The logic for the remainder of the C register will be readily understood as the logical combination of the previously discussed functions. In the function for flip-flop C21, the "f" code digit X6' is added to form $Y61.M5.C21'.X6'$ to eliminate division and root from this particular phase since it pertains only to the recomplementation cycle for add, substract, compare magnitude, and compare algebraically.

An alternate simplification is indicated by an asterisk for flip-flop CX1, where CX1*j* shows the substitution of $X7.X6$ for $T11.X7.X6+T12.T13'$ and CX1*k* shows the substitution $A20'.X7.X6$ for $T11.X7.X6+T12.T13'.A20'$. This simplification is based upon the assumption that the C register signals are only employed during the word time intervals T11 and $T12.T13'$ and that shifting during other intervals such as T10 causes no difficulty. Thus the alternate expressions are independent of particular word time intervals specifying only digit time D0 for turning on CX1 and digit time D20 for turning CX1 off.

The utilization of $T12.T13'.X5$ to specify the "f" code for root will be noted in function M2*j*, as discussed above. It will be understood, of course, that the complete "f" code for root could be employed here but that this would be redundant in view of the requirement of the timing signals which, due to their unique nature, already imply the particular operation.

An alternative for resetting the search-for-home command flip-flop M3 is indicated in M3*k**. This is based upon a modified amplifier function Y77* which will be discussed further below. In substance, the simplification is permissible by introducing the particular terms into the amplifier function.

Alternative terms for operations C*a*, C*m*, and S*e* are indicated for flip-flop M4 as functions M4*j** and M4*k**. It will be noted here that the timing function $T10'.T13.T20'$ is sufficient to specify the desired operations without the particular "f" code $X8.X7$. This variation will be considered again when Y77* is introduced below and the alternative operation of flip-flop T20 is analyzed. In essence, the modified technique starts the counting of word time intervals whenever T20 is equal to zero and the next command word is read in whenever "*w*" is equal to 00000 or 00001. If "*w*" is initially set to either of these codes for turning on T20, the condition T20' in M4*j* prevents any further counting of words since M4 is not then turned on.

A simplification is noted for flip-flop M5 for the operations of division and root in the form of M5*k**. Here note is taken of the fact that the function for flip-flop AX2 includes the term $D21.(T11.X7.X6+T12.T13')$ for division or root and is therefore on whenever flip-flop M5 must be reset to enter signal A2.

It will be noted in function T10*k* that the timing signal D15 may be replaced with T20'. This substitution involves more than simply the replacement of one signal for another since D15 is represented in Table VIII above as requiring three logical elements to represent the function $T2'.T3.T5'$. It will be understood, from this example, therefore, that the digit signals do not necessarily represent actual signals in the system since they may require the code set definition as is the case for signal D15. Situations will arise, as in T10*k*, where a simplification may be possible by employing other combinations of timing signals and the particular set shown in Table VIII.

The modified algebra for amplifier Y77, namely Y77*, will now be considered, reference being made again to the algebra for flip-flops M3 and M4 introduced above. Where Y77* is employed, the functions M3*k** and M4*k** are also employed. The first thing that will be noted is that in the function Y77, the complete code "*w*"=00000 is represented so that flip-flop T20 is turned on only after the words-to-wait interval is zero. In Y77*, however, "*w*" may be either 00000 or 00001 so that T20 is turned on for either of these conditions. In actual operation, the arrangement of Y77* has the same effect as the previous arrangement and allows some simplification. The reason for this is that even though "*w*" is equal to 00000, a one word time interval occurs in either operation since, in either case, flip-flop T20 is turned off by amplifier $Y62=D1.T12.(A1'.X8+M3)$ so that M4 cannot be turned on until after a one word delay. Thus, if "*w*"=00001 or 00000, T20 is then turned on in either system after a one word delay. The presence of T20' in M4*j** prevents word counting after T20 is turned on which would otherwise interfere with the entry of the "*a*" address for the next operation.

The other modification introduced to amplifier Y77 is the introduction of the term $T20.R11'.X21'.X20'.X19'.X18'$ which makes it possible to simplify the logic for flip-flop M3*k* as indicated above.

While only one form for the writing circuits and associated control circuits is indicated, it will be understood that any of sets A, B, or C may be employed as indicated in the above discussion. The set shown in the summary of algebra corresponds to set C where both the "*c*" and "*e*" addresses are entered into control flip-flops X15–X17.

The X register logic corresponds to one of the various alternatives discussed above. Another modification which is not shown is possible where a flip-flop is employed which may be triggered, that is, which may be caused to change state by applying pulses to both its J and K input circuits. In this case, it is unnecessary to include inhibiting terms preventing this type of triggering and the count down functions may then be modified as follows:

$$X17j=X17k=M4;\ X1j=X1k=M4.X17';$$
$$X2j=X2k=M4.X17'.X1'=X3j=X3k=M4.X17'.X1'.X2';\ X4k=Y74$$

This type of simplification may be made throughout the system if the appropriate flip-flop substitution is made.

A modification is possible in amplifier function Y32 which is not indicated in the summary. The forced round function $D0.T13.X7.X6$ may be entered in several other ways. One possibility is the entry of a forced carry into flip-flop C21 which would be combined with the forced one entered into flip-flop S2 to generate an inserted one for the result. Another possibility exists in the direct entry into flip-flop S2; that is, by introducing the same algebra into the function X2$j$ as is found in amplifier function Y32.

An important simplification is found in Y51*. Here the term $T11.X7.X6+T12.T13'.A20'+D2.T12.T13'$ may be replaced by $X7.X6.T10'.A21'$, provided that the modified form for flip-flop A21 is employed where the additional marker shift is introduced as discussed above.

It will be recalled that the complexity in amplifier function Y51 is caused by the entry of the marking signal into flip-flop A20 prior to the completion of the S register circulation. This required the addition of the timing signal term $D2.T12.T13'$. A simplifiction is also possible by using timing signal T10' in the place of separate signals T11, T12, and T13'.

A similar simplification is indicated in the function for amplifier Y76 where $SX1'+A20'$ is replaced with A21', assuming again that the modified form for the logic of flip-flop A21 is utilized. It will be recalled that the term SX1' was added to cover the situation where $A21'=O$, but where recirculation of the C register was necessary. With the modified form of A21, this recirculation occurs due to the effective extension of the marking interval through the modified utilization of flip-flop A21.

*Description of a Suitable Form of Flip-Flop*

(Reference to FIG. 12)

While many types of flip-flops are suitable for utilization in the system of the present invention, it is preferred to employ a transistor flip-flop, of the general type shown in FIG. 12, in view of the low power dissipation, and stability throughout a fairly substantial range of operating conditions including pressure, temperature, and mechanical stress. In addition, the transistor flip-flop is advantageous due to its size, which is important due to the fairly substantial number of flip-flops which are required in the system. The employment of transistors and diodes as logical elements in the system of the present invention makes it possible to mechanize a high-speed, serial-parallel control system which may be attached to automatic machinery or other process-control devices and occupy a relatively small space.

The flip-flop circuit of FIG. 12 is one of several similar circuits described and claimed in copending U.S. patent application by Alfred D. Scarbrough entitled "Anti-Saturation Circuits For Transistor Amplifiers," filed February 25, 1957, Serial No. 642,070, now Patent No. 2,990,478. Accordingly reference is made to this copending application for further specific details concerning the principles and design of the flip-flop shown in FIG. 12.

Referring now specifically to FIG. 12, it will be noted that the J and K input signals derived through the logical circuits discussed above are applied to input diodes 12D$i$1 and 12D$i$2, respectively. These signals are voltage-level signals which provide forward biasing signals for respective transistors 12T1 and 12T2 so that the corresponding transistor is caused to be conducting if a pulse is applied to it. Each of the transistors 12T1 and 12T2 has its collector electrode cross coupled to a point in a network including two Zener diodes. The purpose of the Zener diodes is to provide an effective current switch making it possible to obtain a very reliable triggering action in the flip-flop. The general technique of employing Zener diodes to effect double stability in a transistor flip-flop is more fully described in copending U.S. patent application by C. L. Wanlass entitled "Multivibrator Circuits Employing Voltage Break-Down Devices," filed June 6, 1955, Serial No. 513,426.

In particular, it will be noted that the left-hand Zener diode network includes a resistor 12R$a$1 having one end connected to a suitable source of positive potential, not shown, and the other end connected to the cathode of a first Zener diode 12D$a$1. The anode of Zener diode 12D$a$1 is connected to one end of a second resistor 12R$b$1 having its other end connected to the cathode of a second Zener diode 12D$b$1. The anode of Zener diode 12D$b$1 is connected to the base of transistor 12T1 and also to a base biasing resistor 12R$c$1. A similar network is found in elements 12R$a$2, 12D$a$2, 12R$b$2, 12D$b$2, and 12R$c$2 on the right-hand side of the flip-flop.

When a positive input signal is applied to the J input circuit of the flip-flop, transistor 12T1 is caused by conduct more heavily and the collector potential thereof falls due to the drop across resistor 12R$a$2. This lowers the potential across Zener diode 12D$a$2 causing it to assume a high impedance, as does also Zener diode 12D$b$2. As a result the current received by the base of transistor 12T2 is reduced so that less current passes through its collector electrode and the potential across Zener diode 12D$a$1 then increases. When the potential reaches the Zener breakdown potential for diodes 12D$a$1 and 12D$b$2, transistor 12T1 is driven rapidly into a high-conducting state and thus causes a further reduction in the condition of transistor 12T2. This completes the transition cycle whereby a pulse applied to the J input circuit of the flip-flop results in the highly conducting state of transistor 12T1 and the lowly conducting state of transistor 12T2. A similar transition occurs when a pulse is applied to the K input circuit and transistor 12T2 is driven into a highly conductive state and transistor 12T1 into a lowly conductive state.

The state of the flip-flop may be sampled to produce the logical output signals through a network including two output transistors 12T$o$1 and 12T$o$2 associated with transistor 12T1 and 12T2, respectively. The collector electrodes of these transistors are connected to opposite ends of a transformer, the center tap of which receives the clock pulse signals $Cp$. The output transistors, then, serve as gating devices for passing the clock pulse signals through to ground through the corresponding half section of the transformer primary. Thus when transistor 12T1 is conducting heavily, output transistor 12T$o$1 is forward biased and presents a low impedance gating circuit for clock pulses applied to the transformer. In this case, the clock pulse passes through the left-hand section of the transformer primary and results in an output pulse on the transformer secondary indicated in FIG. 12 as pulse F. At the same time, the secondary of the transformer produces a pulse F' of opposite polarity which is the effective complement of F. When the flip-flop is "on" or in the one state, pulses F and F' are positive and negative, respectively, and when the flip-flop is "off" or in the one state, pulses F and F' are negative and positive, respectively. This gating arrangement constitutes the invention of copending patent application by Alfred D. Scarbrough entitled "Improvements In Gating Circuits For Electronic Computers," filed November 1, 1956, Serial No. 619, 699; other suitable circuits being described herein.

In addition to the above-described elements, the flip-flop in FIG. 12 also includes saturation preventing diodes 12D$s$1 and 12D$s$2. Diode 12D$s$1 has its anode connected to the cathode of Zener diode 12D$b$1 and its cathode connected to the collector electrode of transistor 12T1; whereas diode 12D$s$2 is connected in a similar manner between the cathode of diode 12D$b$2 and the collector electrode of transistor 12T2. The function of these diodes will be illustrated by considering the effect of diode 12D$s$1 at the time transistor 12T1 is conducting. It will be recalled that in this situation a large amount of current is drawn through resistor 12R$a$2 lowering the potential across Zener diodes 12D$a$2 and 12D$b$2 so that they are not broken down and present a high impedance substantially cutting off current to the base of transistor 12T2. Saturation then is prevented in transistor 12T1 since any increase in current through this transistor further depresses the potential at the collector electrode thereof due to the drop across resistor 12R*a*2 and causes the lowering of the potential at the base electrode of transistor 12T1 through the feedback path of diode 12D*s*1 and Zener diode 12D*b*1. In other words, the amount of current which may pass through transistor 12T1 is effectively regulated through the feedback of diode 12D*s*1 which is coupled through Zener diode 12D*b*1 providing a low impedance path when it is in its voltage breakdown state.

In addition, gating diodes 12D*g*1 and 12D*g*2 are introduced between the opposite ends of the output transformer and the collector electrodes of transistors 12T*o*1 and 12T*o*2, respectively, to prevent the passage of negative signals to the respective collector electrodes so that the flip-flop is not triggered spuriously. If a negative signal were allowed to pass to the collector electrode of transistor 12T*o*1, for example, the potential at the base thereof would also be lowered and the tendency would be to draw transistor 12T1 into conduction where it may not be desired. Thus, the flip-flop could be in a zero state and be caused to trigger spuriously due to the passage of a negative signal to transistor 12T*o*1.

The same type of flip-flop shown in FIG. 12 may be employed to provide voltage-level gating control signals. In this case, the collector electrodes of transistors 12T*o*1 and 12T*o*2 are coupled to respective second load resistors 12R*d*1 and 12R*d*2 and the junctions therewith provide output points for control signals.

Diodes 12D*g*1 and 12D*g*2 mentioned above serve to prevent the pulse operation of the circuit from interfering with the D.-C. operation in that these diodes are back biased to block pulses when the associated D.-C. signal is at a high level and pulses are passed through the diodes to ground when the associated D.-C. signal is at its low level.

The technique of deriving voltage-level signals from the flip-flop is further described in the above-mentioned patent appliaction by Alfred D. Scarbrough, Serial No. 619,699.

*Specific Mechanization of a Full Adder Employing Transformer-Coupled Flip-Flops and Diode as Logical Elements*

(Reference to FIG. 13)

The important feature of the flip-flop of FIG. 12 is that while it assumes a static state which may be changed synchronously by signals applied to the J or K input circuits, it also may be read dynamically through the output transformer. In FIG. 13 it will be noted that each of the logical signals which is required for the full adders is derived through an output transformer of the general type shown in FIG. 12.

It will be recalled that the general algebraic definition for the full adder amplifiers may be written as follows:

$$Y(n+30)=SX2'.S(n+1)+S(n+1).An'.Cn \\ +S(n+1).An'.Cn'+SX2.S(n+1)'.An.Cn' \\ +SX2.S(n+1)'.An'.Cn$$

The term $(Sn+1).An.Cn$ is obtained through a diode "and" circuit which includes three diodes 13D1, 13D2, and 13D3 having cathode electrodes receiving signals $Sn+1$, $An$, and $Cn$, respectively. The anodes of these diodes are connected together and to a gating resistor 13R*g*2 which receives a suitable gating potential such as +28 volts. Each of the other "and" functions in the above logic is provided in a similar manner through respective diode "and" circuits.

The output signals of each of the "and" circuits are then applied to the anode of a separate diode in an "or" circuit 131, where the cathodes of each diode in the "or" circuit are coupled together and to a gating resistor 13Rg6 receiving a suitable minus potential. The common connection of the cathodes in "or" circuit 131 is then applied to the base electrode of a transistor 13T*a* which receives a suitable positive potential applied to its collector and has its emitter electrode connected to the primary of a transformer 133, the other end of the primary being coupled through an R-C circuit 135 to ground.

Whenever any of the full adder conditions is satisfied, the output signal of the corresponding "and" circuit rises and a pulse is then passed through the corresponding diode in "or" circuit 131 to the base of transistor 13T*a*. This, then, causes a pulse to pass through primary of transformer 133, and the secondary provides a pulse $Y(n+30)$ or $Y(n+30)'$. This type of output amplifier may also be employed in various other places in the system such as in amplifier Y51.

In viewing FIGS. 12 and 13, then, it will be noted that the output circuit of the various flip-flops in the system may be sampled through the application of clock pulse signals to the respective output transformers thereof, at the same time the flip-flop may receive an input signal which may change its state. Thus carry flip-flop Cn, shown in FIG. 13, may be an on state so that its output transistor 13T*o*1 gates a clock pulse through the corresponding section of the primary of its output transformer causes a positive pulse *Cn* to appear, while at the same time a signal may be applied to its K input circuit so that during the next digit time interval this flip-flop will assume a zero state.

Reference for further particulars concerning this gating technique employed in the circuit of FIG. 13 is made to copending patent by Alfred D. Scarbrough entitled "Improvements In Gating Circuits For Electronic Computers," filed November 1, 1956, Serial No. 619,699.

*Description of Suitable Form for Magnetic Head Selection Matrix*

(Reference to FIG. 14)

As indicated above, the usual logical technique of performing matrix switching is not suitable where low-level magnetic drum signals are to be gated directly into a flip-flop. The obvious advantage of this technique is that a reading flip-flop is not required for each of the channels involved. Thus the constant channels, indicated generally in FIG. 3*a*, may be read directly through a matrix of the type shown in FIG. 14, and an amplifier such as that to be described below in FIG. 15*a*, into a flip-flop such as R10.

In FIG. 14, the secondary windings of a plurality of reading heads are shown and designated as H1 through H7 corresponding to the binary code 001 through 111 shown in Table II corresponding to the seven constant channels. The reading signals are applied to the cathodes of respective gating diodes in the matrix designated as D*g*1 through D*g*7, respectively. The anodes of each of these diodes is then connected to anodes of second gating diodes D*g*11 through D*g*17, respectively, the junctions of respective diodes receiving the gating control signals X1' and X1, alternately. Thus, the odd numbered heads are selected by signal X1 and the even numbered heads are selected by X1'.

A zero signal path is provided by a grounded R-C circuit 140, connected to a diode D*g*0 having its anode connected to the anode of a diode D*g*10. Diodes D*g*10 through D*g*17, then, are grouped in pairs: D*g*10, D*g*11; D*g*12, D*g*13; D*g*14, D*g*15; and D*g*16, D*g*17, having their cathodes connected together and then coupled to a second series of diodes D*g*110, D*g*123, D*g*145, and D*g*167, respectively. At this second level, control signals X2 and X2' are applied to alternate diodes through separate gating resistors, each gating resistor being shunted by a diode with the anode thereof connected to the junction of the associated gating resistor and associated gating diode.

Diodes D*g*110, D*g*123, D*g*145, and D*g*156 are coupled into pairs: Dg110, Dg123; and Dg145, Dg156 and to output diodes Dg1023 and Dg4567, respectively. The selection between these two diodes is controlled by signals X3' and X3, respectively. As in the previous gating situation, each control signal passes through an associated gating resistor shunted by a gating diode.

In its general operation, the matrix of FIG. 14 provides a selection according to each of the control digits so that the final output signal corresponds to only one of the reading heads or the zero signal, whichever the case may be. Thus if the code X3, X2 and X1 is the number 010, the even selections are made through the first group of gating circuits by signal X1'; signal X2 then reduces the selection to just heads H2 and H6, the corresponding signals being applied to diodes Dg1023 and Dg4567, and finally signal X3' provides the output selection so that the signal gated through is H2.

It will be noted that the selection of the zero position corresponds to a zero biasing signal obtained through network 140 which is coupled to the cathode of diode Dg0. Thus when the code 000 appears in flip-flops X3, X2, X1, the output signal is a constant zero level. In this manner a matrix code selection may specify a source of zeros when the code 1000 is specified as indicated in Table II.

Further details as to the basic principles concerning the design of the matrix shown in FIG. 14 are not considered to be relevant here, reference being made to the above-mentioned copending application by R. C. Reed Serial No. 768,236, now Patent No. 2,984,826.

*Description of Suitable Forms for Reading and Writing Amplifiers*

(Reference to FIGS. 15*a* and 15*b*)

As indicated in FIG. 15*a*, the secondary winding of a reading head 15H is coupled through a capacitor 15C1 to the base of a transistor 15T1 which is connected in a conventional manner as an amplifier. An output signal is derived at the junction of a load resistor 15R1 and the collector electrode of transistor 15T1 and applied to the base electrode of a second transistor 15T2 which has its emitter electrode connected to the primary winding of an output transformer 151. The collector electrode of transistor 15T2 receives a suitable potential such as +25 volts which is also applied to the load resistor of transistor 15T1.

The center tap of the secondary winding of transformer 151 is grounded and the ends thereof are coupled through suitable resistors 15R2 and 15R3 to first and second outputs and transistor 15To1 and 15To2. These transistors have their collector electrodes connected to opposite ends of a second transformer 152 which has a secondary winding having its center tap connected to ground. Clock pulses, then, are applied to the center tap of the primary of transformer 152 and are gated through either of transistors 15To1 or 15To2, depending upon the polarity of the signal read through the reading head 15H. If a positive signal passes through head 15H, representing a one, a negative pulse results due to the inversion of the transistor 15T1, and is coupled through transistor 15T2 and the primary winding of transformer 151 to produce a positive pulse which is applied to transistor 15To2 and a negative pulse applied to transistor 15To1. This then provides a low impedance gating path through the lower half of the primary of transformer 152 and a positive pulse passes through the upper portion of the secondary thereof to provide a signal represented as R, a negative pulse is also produced through the lower secondary portion and is represented as signal R'.

In a similar manner, if the pulse of the reading head is negative, representing a zero, transistor 15T1 provides a positive pulse which causes a positive pulse to be applied to output transistor 15To1. A low impedance path to ground is thus furnished the upper half of the primary of transformer 152 allowing a positive pulse to appear on output lead R' representing a zero. At the same time a negative pulse appears as signal R.

A suitable form of writing circuit which may be employed in the system of the present invention is shown in FIG. 15*b*. This type of circuit is sometimes referred to as a Manchester writing amplifier in view of the fact that this type of recording is credited to the University of Manchester in England. In this recording a binary one is written on the magnetic drum as a flux change from a saturation in one direction to saturation in the opposite direction. A binary zero is recorded with an opposite flux saturation change.

In the circuit of FIG. 15*b*, input pulses representing a particular series of binary numbers are applied to first and second input terminals 153 and 154. Terminals 153 receives the information W to be written, and terminal 154 receives complementary signals W'. A typical entry of a binary number is shown in FIG. 15*c* where time is shown to be progressing from right to left and the binary number 101101 is entered into the memory.

In performing the conversion of the conventional binary pulse series into the Manchester series, a change of state is caused to occur at the center of each digit time interval under the control of a Manchester clock pulse designated as MC*p* in FIGS. 15*b* and 15*c*.

Essentially the circuit of FIG. 15*b* constitutes a free-running multivibrator including first and second transistors 15T3 and 15T4. The collector electrodes of transistors 15T3 and 15T4 are coupled to the base electrodes of 15T4 and 15T3 through capacitors 15C3 and 15C4, respectively. The time constant of this multivibrator is adjusted so that its period is slightly greater than the clock pulse period.

The Manchester clock pulse MC*p* is applied through a capacitor 15C5 and a Zener diode 15D3 to the base electrode of transistor 15T3 or a Zener diode 15D4 to the base electrode of transistor 15T4. Only one of Zener diodes 15D3 or 15D4 may pass a pulse since the conducting state of one transistor forward biases the diode associated with the base electrode of the other transistor, while the other diode is back biased into a voltage breakdown state. Thus when transistor 15T3 is conducting, diode 15D4 is forward biased allowing a pulse to pass to the base of transistor 15T4 causing triggering of the multivibrator. When diode 15D4 is forward biased, diode 15D3 is in its Zener breakdown state and provides a feedback path between the collector and base of transistor 15T4 which prevents saturation, while also preventing passage of a trigger pulse to transistor 15T3.

The information pulses W and the complementary pulses W' occurring at the beginning of respective digit time intervals as indicated in FIG. 15*c* are effective through first and second gating circuits 15G3 and 15G4 to turn on transistors 15T3 and 15T4, respectively.

Referring to gating circuit 15G3, in particular, it will be noted that a first diode 15Dg1 is included therein having its cathode connected to the input terminal 153 and its anode connected to a load resistor 15Rg1. When a positive pulse is applied to the cathode of diode 150g1, it causes the potential at the anode thereof to rise toward the plus potential applied to resistor 15Rg1 and this rise in potential is then transmitted through a second diode 150g2 to the base electrode of transistor 15T3.

The pulse then is effective to turn on transistor 15T3 when a signal $W=1$ is applied to terminal 153. During the middle of this clock pulse interval, the multivibrator is caused to change state by the Manchester clock pulse MC*p* so that when the information W is one the output signal provided through output transformer 155 assumes first a high level at the beginning of the digit time interval and then a low level after the Manchester clock pulse has been applied.

On the other hand, the application of a pulse $W'=1$ to input terminal 154 has the same effect through gating circuit 15G4 upon transistor 15T4 and causes the multivibrator then to produce a low level output signal through transformer 155 during the beginning of the digit time interval, and then the application of the Manchester clock pulse $MC_p$ causes the output signal to assume a high level at the end of the digit time interval.

These changing level signals are coupled through transformer 155 to a transistor push-pull amplifier comprising transistors 15T*a*1 and 15T*a*2 having their base electrodes connected to the opposite ends of the secondary of transformer 155. The center tap of the secondary winding receives a writing control signal WX which is obtained from the voltage level signal output circuit of a control flip-flop in the manner discussed above with reference to FIG. 12.

When control signal WX is at a high level, transistors 15T*a*1 and 15T*a*2 may be caused to conduct, drawing current through the primary winding of the writing head transformer 157 which has its center tap coupled to ground through an R-C circuit 159. Thus, when transistor 15T3 is conducting and current is drawn through the left-hand portion of the primary winding of transformer 155, a pulse is applied to the base of transistor 15T*a*1 and causes conduction through the left-hand winding of the primary of transformer 157 which causes flux saturation in one direction through the writing head; and when transistor 15T4 is caused to conduct current through the other section of the primary winding of transformer 155, transistor 15T*a*2 conducts causing current passing through the right-hand section of the primary of transformer 157 and flux saturation through the writing head in the opposite direction. This, then, results in flux recording of the Manchester type, the flux pattern changing from saturation in one direction to the opposite direction for each binary digit, with ones and zeros being designated by the opposite currents of the sequence of flux saturation directions.

*Manual and Test Control Logic*

(Reference to FIGS. 16, 16*a*, and 16*b*)

In the present discussion, frequent reference may be made to the program transfer logic discussed above. Accordingly, it may be convenient to refer also to FIGS. 9*a* and 9*b* where the various program transfer operations are illustrated. The manual control logic employs the program transfer functions to start the computing system at a desired command location. While many types of start cotnrols may be formulated by employing the program transfer functions of the invention, three basic types will be considered here. These types are referred to as:

A. start by searching for the origin command
B. start by searching for the home command on a designated channel
C. start at a selected command of a designated channel It will be assumed for the purpose of illustration only that three switch signals E11, E21, and E22 are provided to indicate the desired type of start command, A, B, and C, respectively. In each of these manual control operations, the home command flip-flop M3 is turned on to simulate a search for home command and flip-flop A1 is turned on the simulate a situation where the program transfer condition is not satisfied.

A timing signal is then required to synchronize the manual control switch signals E11, E21, and E22 with the computer. While this may be accomplished in many different manners, it will be assumed for the present that two flip-flops M10 and M11 are employed to provide this synchronization. Flip-flop M10 is turned on at the end of the word following the switch signal. The logic, then, for M10*j* appears as follows:

$$M10j=D21(E11+E21+E22)$$

In order to be sure that the switch signal is not merely a transient, flip-flop M11 is then turned on after M10 has been turned on if a switch signal is still present. Since flip-flop M11 is turned on at three different digit times for the three types of start operations A, B, and C, only start type A will be considered first.

In starts of type A, as indicated in FIG. 16*a*, M10 is turned on by the signal $D21.E11$ and M11 is turned on by the signal $D1.M10.E11$.

The condition $M10.M11'=1$, then, may be employed to set flip-flops M3 and A1 in the manner discussed above. Thus the J input logic for these flip-flops may be written as follows:

$$M3j=D0.M10.M11'$$
$$A1j=D0.M10.M11'$$

After flip-flops M3 and A1 have been turned on, simulating a home command operation-condition not satisfied, the signal Y62 is simulated by the function:

$$Y62=D1.M10.M11'$$

It will be recalled that in the search for the home command operation, signal $Y62=1$ is effective to reset control flip-flops RX1 through RX5. Thus the origin channel is selected in this manner and the computer then seeks the command with "*w*"=00000, as discussed above.

The general operation thus far described is shown in FIGS. 16*a* and 16*b* where the sets of signals involved are grouped under the heading A. It will be noted, then, that for the A type of start, M3 is turned on and then T20 is turned on during successive command word times until the home command is located at which time M3 is turned off and the normal computing operation begins.

Before proceeding to the B type of start, a simple method of stopping the computer will be described. It will be assumed for this discussion that an arrangement is made so that the manual control unit cannot change from one switching signal to another without going through an intermediate position. These intermediate positions will be designated herein with primed signals but are not true complements since a make-before-break type of switch should be employed.

With this type of switch, then, the computer may be stopped after a start of either the A, B, or C type discussed above by turning off flip-flop M10 in accordance with the signal $D21.E11'.E21'.E22'=1$, which occurs if any switch change is made after a start. M11, then, may be turned off after M10 is turned off or the condition $M10'=1$. The logic for sequencing flip-flop T20, then, is modified by introducing the signal M10 so that the J input appears as follows:

$$T20j=D15.Y77.M10$$

with the result that after M10 is reset through the change of the switch position, flip-flop T20 cannot then again turn on. This means that the previous operation is completed but no further command is read in.

However, provision may be made in a simple manner for reading out the last result into the A register during the time $T13=1$. This is accomplished by turning on right shift control flip-flop AX1 at the time $D0.T13=1$, as signaled by $Y61=1$ and by turning AX1 off at the end of the word. The result of the operation entered into flip-flop W0, in the manner discussed above, may then be shifted into flip-flop A21 during the time $T10'.T13=1$. The occurrence of $T10'.T13=1$ indicates that the operation is being completed but a new command word has not been read in since T10 is not turned on. The logic for this result read out is specified as follows:

$$AX1j=Y61$$
$$AX1k=D21$$

$$A21j=T10'.T13.AX1.WO$$
$$A21k=T10'.T13.AX1.WO'$$

This type of stopping operation may be referred to as a passive stop since no actual control signal is applied to the computer. It is not necessary, however, to include such a stopping operation where external test equipment is available providing an active stop, such as will be described below.

It is also important at the start of any of the manual control starts of type A, B, or C to clear the S and C registers. Since these operations are all simulated search for home command operations, signal $T10.T13'=1$ may be employed to turn on flip-flops CX1 and SX1 to cause the shifting in of zeros into the respective registers. Thus, referring again to FIG. 11, it will be noted that it is only in the case where "$w$"=31, for the search for home command, that T10 is turned on when T13 is not on. These control flip-flops, then, are left on for twenty-one digit times to completely clear the respective registers. The logic for CX1 and SX1 for this operation may be written as follows.

$$CX1j=D0.T10.T13'$$
$$CX1k=D21.T10$$
$$SX1j=D0.T10.T\text{-}13'$$
$$SX1k=D21.T10$$

The B type of start is similar to the A start except that after resetting control flip-flops RX1 through RX5, it is necessary to enter the desired "$n$" channel. This may be accomplished by generating a control signal $$Y69=D3.M10.M11'$$

This signal, then, is employed to enter switch signals E31–E35 into flip-flops RX1–RX5, respectively, after D3 time. It will be understood, of course, that it may be desirable to use electronic signals representing the switch position directly. In this case signal Y69 is not required.

Another change required for the B type of start is that M11 cannot be turned on at the same time as it is for the A start. In this case, as indicated in FIG. 16$a$, M10 is not turned on until D5 time allowing the entry of the switch signals at D3 time.

The C type of start includes all of the previous steps of the A and B starts but includes the further step of resetting flip-flop M3 as soon as signal E22 is present and flip-flop T20 has been turned on. This may be controlled by the signal $D16.M10.M11'$. In this manner, M3 is originally turned on as if a search for home command were to be performed and flip-flop T20 is turned on to search for the home command. However, M3 is then turned off as if the home command has been located so that effectively the command is selected in accordance with the time of occurrence of switch signal E22.

The logic for flip-flop M11 is modified for the C start so that M11 is not turned on until after M3 is turned off, namely at $D16=1$.

The manual control logic thus far presented for the start operations A, B, C may be summarized as follows:

$$A1j = D0.M10.M11'; \quad A21j = T10'.T13.AX1.W0; \quad AX1j = Y61$$
$$A21k = T10'.T13.AX1.W0'; \quad AX1k = D21$$
$$CX1j = D0.T10.T13'$$
$$CX1k = D21.T10$$
$$M3j = D0.M10.M11' \qquad M10j = D21.(E11 + E21 + E22)$$
$$M3k = D16.M10.M11' \qquad M10k = D21.(E11'.E21'.E22')$$
$$M11j = D1.M10.E11 + D5.M10.E21 + D16.M10.E22$$
$$M11k = M10'$$
$$RX1\text{-}5j = Y69(E31\text{-}E35) \qquad SX1j = D0.T10.T13'$$
$$RX1\text{-}5k = Y62.A1 \qquad SX1k = D21.T10$$
$$T10j = D21.T20 \qquad T11j = D4.T10$$
$$T10k = D21.T10 + Y62 + D15.M3 \qquad T11k = D21.T11$$
$$T13j = D21.T11 \qquad T20j = D15.Y77.M10$$
$$T13k = D21.(T10 + T13.M3) \qquad T20k = D14 + Y62$$
$$Y62 = D1.M10.M11' \qquad Y69 = D3.M10.M11'$$

In addition to the so-called passive stop mentioned above, which is accomplished through the intermediate switch positions, it may also be desirable to force a stop including the resetting of all computer flip-flops. The modifications which are required to order to adapt the manual control logic as shown above for this operation is specified in Set D below.

SET D $$M10j=D15.(E10+E20)$$
$$M10k=D21.(E10'.E11'.E20'.E21'.E22')$$
$$M11j=D21.M10.(E10+E20)$$
$$M11K=D15.(E10+E20)$$
$$T20k=D17.M10.M11'$$
$$M3k=D16.M10.M11'$$
$$T13j=D20.M10.M11'$$
$$T13k=D21.T13.M11'$$

The manner in which this logic operates will be explained by referring to FIGS. 16$a$ and 16$b$. It will be noted that flip-flop M10 is turned on at D15 time in response to either signal E10 or E20. These signals are assumed to represent either a physical switch signal or an electronic signal which may be produced by an external control device. M10*k* then is similar to that previously discussed with the addition of intermediate switch positions E10′ and E20′, allowing a passive stop function for any switch change.

After flip-flop M10 is turned on at D15 time upon receipt of the stop signal, it is turned off as shown in FIG. 16*b* by the passive stop signal. The majority of the reset functions are accomplished by the turning on of flip-flop T13 at D20 time for one digit time interval. This is performed immediately after flip-flop M10 has been turned on, but before M11 is on. This logic operates as a reset function due to the presence of many terms $D21.T13$ in various flip-flops. Thus in the summary of algebra considered above, it will be noted that CX1*k*, M5*k*, SX1*k*, and T12*k* all receive resetting signals by this operation.

In addition, provision is made in the above logic for resetting flip-flops M3 and T20, flip-flop M3 being reset after M10 is turned on but before M11 is turned on in response to signal D16, and T20 is turned off the following digit time (D17).

*Summary of Invention*

From the foregoing description, it should now be apparent that the present invention provides an improved arithmetic unit, and various methods for the utilization thereof, making possible an efficient and economical automatic control system.

A technique for increasing the operating speed of a serial computer has been described wherein the address of one of the operands ("*a*" address) may be read at the beginning of a command word prior to the beginning of the last word time of an operation, allowing the reading in of the operand [(*a*) operand] while the remainder of the command word is read.

Another important feature of the invention which has been introduced herein is the arrangement for reading out a previous result while simultaneously bringing in the next command word, and the associated data therefor. Thus sequence control signals T10 and T13 have been introduced above associated respectively with the reading in of the (*a*) operand and the reading out of the previous result or (*r*) operand which is then transferred to the "*c*" or "*r*" address.

The improvement of the invention over the typical prior art described above, in permitting a two-word-time operation for the unusual arithmetic computations, such as addition, subtraction, multiplication, and various comparisons, should now be appreciated. It will be recalled that in one of the known serial systems, nine word times are required to perform a simple subtraction and in others which have been proposed, but have not yet been reduced to efficient practice, five word times are required. The ability to overlap operand read-in and result read-out time intervals with the command word read-in time interval in the manner described, above, therefore, is a very important feature of the invention in adapting the system for efficient utilization for automation.

In another aspect of the invention, an improved utilization of the command code digits is made possible by separating the usual arithmetic processes referred to as as A*d*, S*u*, M*u*, D*i*, and R*t* above, from the program transfer phases referred to as C*a*, C*m*, and S*e* above. This technique allows the sharing of the same code digits in the command word to represent diffierent things for the arithmetic operations and for the program transfer operations.

Thus, the so-called simultaneous (*d*) to "*e*" transfer employs the same code digits for an arithmetic operation to allow an efficient rearrangement of data so that successive operations may be performed without delay; and these digits are also employed to represent the codes "*w*" and "*n*" for the program transfer phase. In this manner it is unnecessary to lengthen the command word, which would naturally result in a slower serial system, but yet the effective result is the same as if the command word had been lengthened in terms of the ability of the computing system to perform a variety of different arithmetic and program transfer operations.

According to another improvement of the invention discussed above, provision may be made in the program transfer command word for effectively extending the words-to-wait period for program transfer so that it is commensurate with the time length of a memory channel. Thus, according to the invention, the code "*w*" representing the words to wait includes one predetermined representation, such as 11111, which represent a search for home command. If code "*w*" has a representation other than the predetermined representation, a counting operation is performed until the designated waiting time interval has been determined; but where the predetermined code is present, the search for home command is initiated by scanning a designated channel until a predetermined identification code is detected therein, referred to above as the home command designation.

While the invention has been illustrated in particular detail with respect to a magnetic drum memory system, it will be understood that the serial techniques which have been introduced herein are appropriate for any type of serial memory system, such as a system including mercury delay lines magnetic core shifting registers, or any type of device which may be operated to produce an output signal corresponding to an input signal after a predetermined delay.

In a particular feature of the program transfer technique of the invention, it is possible to specify a sense command wherein an internal code is entered into a certain position in the command word, represented by digits "*q*" above, and may then be compared to external switches, referred to above as switches E. This technique allows an operator to indicate to the system a desire for a particular transfer which the system then will execute at the appropriate time.

It has been indicated above that the sense command may be employed to force a program transfer where the comparison logic involved specifies that the internal digits determine which of the external switch signals are to be sensed and that if no external switch signals are sensed, the transfer condition has been satisfied.

It has also been shown above that a feature of the invention, particular to the search for home command, is that this operation may be made to have an alternate effect. If a search for home command operation is executed on certain conditions, such as may be present for the comparison operations, the transfer may be made to the origin channel if the condition is not met or to a specified channel by a predetermined code ("*n*") if the condition is met.

The improved features of the program transfer technique of the invention are also useful in introducing starting and stopping control circuits for the system, such as the manual control circuits discussed above. In particular, the search for home command operation may be forced by means of the manual control logic at the beginning of an operation in order to permit initiation of computation at a predetermined word position which may be the origin channel.

Many other specific features of the invention have been described. The serial-parallel multiplication technique introduced above permits an efficient usage of the S and C registers to perform multiplication during a two word time interval. As has been previously pointed out, multiplication is an important arithmetic function for any digital control in view of the frequent existence of series functions with product terms. The high-speed operand access and utilization technique, according to the invention, along with the simultaneous ($d$) to "$e$" transfer and the two-word multiplication technique all form part of an arrangement for efficiently processing data for rapid utilization as required for digital control applications.

Another specific improvement of the invention described lies in the technique of introducing square root functions into logic already present for non-restoring division. The triplet insertion technique introduced above makes this possible and requires but little additional structure over that required for division.

A further specific improvement disclosed herein is the utilization of the C register shift control flip-flop CX1 to perform the additional function of detecting the zero condition of the result. This is accomplished by making the shift control operative after a non-zero result digit has been detected. A dual operation of zero result detection and shift control is possible since shifting is unnecessary until a non-zero result digit is detected and the failure to initiate shifting therefore represents a zero result.

While specific types of flip-flop circuits and gating matrices have been described, it will be understood that the generic features of the invention are not so limited. It is conceivable that a variety of types of storage elements may be employed as well as a variety of types of serial memory devices as discussed above. It will also be understood that the summary of logic indicated above is subject to an almost infinite number of variations, a few of which have been indicated in the related discussion. Therefore, it will be appreciated that any utilization of logic in the appended claims is intended to be generic to all logical variations thereof covering the same basic function and is not intended to specify any particular circuit connection.

What is claimed is:

1. In a serial arithmetic system for high-speed control wherein commands in a memory are arranged with the address of a first operand appearing first in time and the command words are advanced in time with respect to data words so that the address of the first operand is completely available before the beginning of the associated data word, a device for entering the first operand into a register during the time the remainder of the corresponding command is being read from the memory, said device comprising: first means for producing a first timing signal starting just prior to the end of the next-to-last word of each operation by an amount corresponding to the time required to read in the address of the first operand, and continuing for a time corresponding to the length of a command word; second means responsive to said first timing signal for producing a second timing signal having a duration substantially equal to the time required to read said first operand from the memory and starting substantially at the end of said next-to-last word; a control device actuable to an "on" state in response to said second timing signal substantially at the beginning thereof; and a gating circuit controllable by the "on" state of said control device to pass said first operand to the register.

2. A device for entering an operand into a register during the time the remainder of a corresponding command specifying the address of the operand is read from a memory, said device comprising: first means for producing a first signal having an "on" level for controlling the reading in of commands from the memory, each command being read ahead of the time-position of the corresponding operand so that the address of the operand, in the command, is completely available before the beginning of the operand; and second means responsive to said first signal for controlling the passage of the operand to the register during the time the remainder of the corresponding command is read.

3. The device defined in claim 2 wherein said second means includes a control device actuable in response to the "on" level of said first signal to produce a control signal having a first level after said address of the operand has been read in and a second level following the termination of the "on" level of said first signal and the completion of the operand read in period and a gating circuit coupled to and controlled by said control device for passing said operand to the register during the period of the first level of said control signal.

4. The device defined in claim 2 wherein said first means includes a circuit for producing a first timing signal having a duration corresponding to a word time interval, said first timing signal constituting said first signal and being initiated prior to the last word of an operation by an amount corresponding to the time required to read the address of the operand required for the next operation; and wherein in addition third means are included for association with said device for producing timing signals controlling the computation upon the operand entered into said register, during the word time intervals following the entry thereof.

5. In a serial digital system including a memory device having a plurality of storage channels wherein operand signals are stored for later use, into which result signals representing the results of arithmetic operations are entered, and command signals are stored including operation signals specifying which operation is to be performed, first address signals representing the location in said memory of the first operand signals to be employed in the related operation, and second address signals representing the memory channel to which the result signals of the previous operation are to be sent, a circuit for reading operand signals from said memory while simultaneously entering result signals into said memory device, said circuit comprising: first address storage means for receiving and storing said first address signals; first selection means coupled to said first address storage means for reading from the memory first operand signals located in a channel specified by said first address signals; second address storage means for receiving said second address signals; second selection means coupled to said second address storage means for transferring said result signals to a channel specified by said second address signals; and first and second control circuits for actuating said first and second selection means, respectively, said first control circuit producing a first timing signal indicating a period which occurs prior to the beginning of a new operation, and said second control circuit producing a second timing signal indicating the ending of a previous operation, said first timing signal being utilized to control the reading in of said first operand signals while said second timing signal is employed to control the transfer of said result signals to said memory device.

6. A system for reading operand signals from a memory for transfer to a computer arithmetic unit for operation, while simultaneously entering result signals into the memory corresponding to results of operations performed in said arithmetic unit, said system comprising: first means for reading signals from and entering signals into the memory; and selectively operable second means for controlling said first means to read an operand simultaneously with the reading out of the result of an operation and the entering of the result into the memory; said second means including a first circuit coupled to said first means for producing a first timing signal to control the reading of signals from said memory, said first timing signal being produced to indicate the period occurring prior to the beginning of an operation upon said operand signals, and a second circuit coupled to said first means for producing a second timing signal to control the transfer of result signals to said memory, said second timing signal being produced to indicate the ending interval of operation for said arithmetic unit.

7. In a computing system wherein high speed program performance is accomplished by advancing command word signals in a cyclic memory device in time position so that address signals representing the location in said memory of the first operand for an operation may be detected and stored to control the transfer of the corresponding operand signals to an arithmetic unit for said operation while completing the reading in of the associated command word signals and wherein output signals representing the result of the operation performed upon said operand signals may be transferred to said memory device during the period the next command word signals are detected to control the transfer of the next operand signals to said arithmetic unit, a sequencing control circuit comprising: a first sequencing device actuable to an on state for controlling the reading in of command word signals; means for turning said first sequencing device to an on state in advance of the last operation word for said arithmetic unit by an amount corresponding to the time required to read in the address signals of the first operand for the next operation; means for turning off said first sequencing device at the end of the command word read-in time; a second sequencing device actuable to an on state for a one word interval at the beginning of the word following the turning on of said first sequencing device; and a third sequencing device actuable to an on state for a one word time interval at the end of the word time interval during which said second sequencing device is on.

8. In a serial arithmetic system wherein data quantities must be made available to an arithmetic unit from a memory following the completion of each operation, a device for rearranging data signals representing the quantities so as to be accessible at the proper time following an operation, said device comprising: first means coupled to said memory for controlling the selection and transfer of said data signals to the arithmetic unit for operation; second means operable after the completion of the transfer of said data signals to said arithmetic unit to produce a control signal indicating the period for arithmetic computation upon said data signals; and third means for transferring data signals in said memory from one memory location to another during the operation of said arithmetic unit, said third means receiving said control signal from said second means and being operable in response thereto to shift the time position of said data signals so as to be available following the operation which is performed during the period of application of said control signal.

9. A combination incorporating the device of claim 8 and further including: fourth means coupling said memory and said arithmetic unit operable at the completion of the data signal transfer operation of said third means for transferring result signals, representing the output of said arithmetic unit upon completion of the computing operation, to said memory.

10. A combination incorporating the device defined in claim 8 wherein said memory includes storage positions for receiving command word signals of two types, the first type of command word signals specifying that ordinary arithmetic operations are to be performed by said arithmetic unit, and the second type of command word signals specifying that a program transfer is to be performed to sense a different series of commond word signals, if certain conditions are detected in the arithmetic unit operation, said combination including the following additional means: fourth means coupled to said memory for receiving said command word signals and for producing first and second command control signals corresponding to said first and second types of command word signals, said first command control signal being employed to actuate said second and third means during normal arithmetic operations, and said second command control signal being employed to actuate said arithmetic unit to determine said conditions for said program transfer.

11. The combination defined in claim 10 wherein said memory is a cyclic storage device having a plurality of storage channels, said command word signals being selected by specifying the time for reading signals from a particular channel of said memory, and wherein there is further included a program transfer control circuit responsive to said second command control signal for specifying the time following the determination of said program transfer conditions for reading the next series of command word signals, said control circuit including means permitting the extension of the time interval from the end of said condition determination to said command word signal reading so that this interval may be commensurate with the time length of the cycle of said memory.

12. The device defined in claim 8, wherein said third means includes: a selection and reading circuit coupled to said memory; a first memory address code storage circuit coupled between said memory and said selection and reading circuit for receiving a first memory address for the data signals to be transferred; a selection and writing circuit coupled to said memory; a second memory address code storage circuit coupled between said memory and said selection and writing circuit for receiving a second memory address for the memory location to which said data signals are to be transferred when read from said first memory address; and means responsive to said control signal for actuating said reading and writing circuits to cause the transfer of said data signals from said first memory address to said second memory address during said period for arithmetic computation.

13. In a high-speed digital control system wherein ordinary arithmetic operations are performed in accordance with command word signal sets arranged in a first memory channel selected by address code signals stored in a channel selection control circuit, the word signal sets being arranged so as to be available immediately following an arithmetic operation, the selection of a different command memory channel being accomplished through a program transfer initiated in response to a word signal set including a first signal portion designating the new channel address and a second signal portion designating any waiting period between the completion of the program transfer operation and the availability of the first arithmetic word signal set on said new channel, the combination comprising: first means operable at the completion of each arithmetic or program transfer operation for reading in the next word signal set from the selected channel; second means coupled to said first means for translating each word signal set into a first control signal for arithmetic operations and into a second control signal for program transfer operations; third means responsive to said second control signal for transferring said first signal portion to said channel selection control circuit to select said new channel; and fourth means responsive to said second control signal for receiving said second signal portion and for reading out said first arithmetic word signal set from said new channel after the corresponding waiting period.

14. In a serial arithmetic system wherein certain operations require a waiting time before locating the next command signals in a serial memory channel, a device for effectively extending the words-to-wait code signal set representation in said command signals for the words to wait before reading the next command signals, so that these code signals may represent any word time in a range which is commensurate with the time length of said memory channel, the command signals in one position of said memory channel representing an identification code, said device comprising: first means responsive to a predetermined code representation in said words-to-wait code signal set for producing an "on" signal until said identification code is sensed in the command signals of said one position of said memory channel; second means responsive to signal representations in said words-to-wait code signal set representing codes other than said predetermined code for producing a timing signal when the period following the completion of an operation is equal to number of words represented by the words-to-wait code signal set; and a sequence control circuit responsive to the "on" signal of said first means for continuously transferring said command signals from said memory channel to the arithmetic unit of said system until said identification code signal set is detected, and responsive then to said timing signal for transferring the next command signals to said arithmetic unit to control the operation thereof.

15. In a serial memory computing system wherein said memory includes at least one channel for storing command word signal sets, a device for permitting the extension of the waiting time between successive transfers of said command word signal sets from said memory to a computer, the waiting time being identified by a words-to-wait code signal set, so that the code signal set may represent any waiting period commensurate with the time length of memory channels employed in the computer, said device comprising: first means for receiving and storing a first words-to-wait code signal set designating a channel scanning operation; and second means coupled to said first means for locating and sensing an identifying code signal set inserted into a predetermined command word signal set position of said serial memory channel corresponding to the desired extended waiting time after the reception of said first code signal set.

16. The device defined in claim 15 wherein there is further included third means for producing a timing control signal for indicating an interval during which a command word signal set is to be transferred from said memory to said computer, said third means including a first circuit coupled to said first means and operable to transfer command signal sets until said second means senses said identifying code signal set, and including a second circuit coupled to said second means for terminating the command word signal set transfer operation.

17. The device defined in claim 15 wherein there is further included means for producing a control signal indicating a period for arithmetic computation; and additional means for selecting a particular memory channel for the next command word in accordance with the result of the arithmetic computation, the command word signal set being utilized in the selected channel after the desired waiting time.

18. In a serial arithmetic system adapted for high-speed control wherein commands in a memory are arranged with an address "*a*" of a first operand appearing first in time and the command words are advanced in time with respect to data words so that the address "*a*" is completely available before the beginning of associated data words, the system being adapted to perform the simultaneous transfer of previous results from an arithmetic unit to said memory and transfer of a first operand from said memory to said arithmetic unit during the "*a*" period constituting the last word time interval of the previous operation and the first word time interval of the next operation, a sequence control circuit comprising: first means actuable to produce a first sequencing signal, said first sequencing signal being turned on prior to the end of the next-to-last word time interval of each operation by an amount corresponding to the time required to read in the address "*a*"; second means responsive to said first sequencing signal and actuable to produce a second sequencing signal at the end of the next-to-last word time interval after said first means has been actuated; and third means responsive to said second sequencing signal for producing a third sequencing signal indicating said next-to-last word of an operation.

19. A sequence control circuit for a high-speed serial, digital control system wherein command information signals includes a signal quantity "*a*" representing the address of a first operand, a signal quantity "*f*" indicating the operation to be performed, and a signal quantity "*c*" representing the address in a memory for storing the result of the operation, the "*a*" address appearing first in the command information followed by the operation code "*f*" and address "*c*"; said sequence control circuit comprising; first means for initiating the reading in of the command information signals before the completion of the previous operation by an amount of time corresponding to the time required to read the signal quantity "*a*" plus the time required to read the first operand singals; second means coupled to said first means for controlling the reading in of the operand signals in the address "*a*" after said signal quantity "*a*" has been read in under the control of said first means; and third means operable after said second means for initiating a read out interval during which the result is transferred to address "*c*" of said memory.

20. In an arithmetic unit for digital control wherein various operations to be performed are specified by operation code signals forming part of a command word signal set located at a command address in a memory device, said operation code signals being one of two types, the first type of code signals representing an arithmetic operation and the second type of code signals representing a program transfer operation requiring a change in the command address, an arrangement for effecting program transfers when the operation code signals are of said second type and predetermined transfer conditions are satisfied, said arrangement comprising: a command storage register for receiving selected command word signal sets and for producing a first control signal representing operation code signals of the second type; first means coupled to said memory for selecting command word signal sets in accordance with applied address selection signals; second means coupled to said first means for receiving the address selection signals to control said first means; a program transfer circuit responsive to said first control signal for producing a second control signal whenever the predetermined transfer conditions are satisfied; and means responsive to said second control signal for transferring the address selection signals forming part of the command word signal set stored in said command storage register to said second means.

21. The arrangement defined in claim 20 wherein there is further included means for producing a sequencing control signal for reading in new command word signal sets, said means including a circuit for specifying the waiting time interval before selecting a command word signal set from the memory device, said circuit being operable in response to said second control signal to delay the reading of command word signal set until the end of the corresponding waiting time interval and being operative, when no second control signal is produced because of the failure to satisfy said predetermined transfer condition, to read in the next command word signal set.

22. In a digital control system including a memory device and an arithmetic unit wherein arithmetic operations are to be performed in succession with the required data quantities and commands being read in from channels in the memory device through a memory selection circuit after the completion of each operation, certain of said commands specifying the performance of program transfer operations wherein code signals constituting part of the command signals are transferred to said memory selection circuit if certain conditions are satisfied, the code signals designating the new channel address in said memory device; a device for selecting different command channels in said memory upon indication that predetermined program transfer conditions have been satisfied, said device comprising: first means for producing a first control signal indicating that a program transfer is to be performed; second means for producing normal and complementary signals indicating that the predetermined program transfer condition has been satisfied and not satisfied, respectively; third means responsive to said first control signal and said normal signal for producing a second control signal; fourth means for storing said code signals indicating the channel of the command to be selected; and fifth means responsive to said second control signal and to said normal signal for entering code signals into said fourth means, and responsive to said second control signal and to said complementary signal for setting said fourth means to a code representing a predetermined channel.

23. In a serial arithmetic system wherein first and second operands are combined in an adder-subtracter for operations of addition, subtraction, and comparison to produce result signals, a device for controlling the shifting of the result signals produced by said adder-subtracter while simultaneously determining the nature of the result, said device comprising: a flip-flop having first and second input circuits for turning said flip-flop "on" and "off," respectively; means for resetting said flip-flop to its "off" state after completion of any operation; means for applying the result output signals of the adder-subtracter to turn said flip-flop "on" upon receipt of the first non-zero result signal produced by said adder-subtracter; a shifting register for receiving said result signals, said shifting register being actuated to shift the result into storage therein after said flip-flop is "on" and means for detecting the state of said flip-flop at the termination of result signal shifting operation, the "on" state of said flip-flop indicating a non-zero result and the "off" state thereof indicating a zero result.

24. In the system of claim 23 wherein there is included sequencing control means including a first circuit for deriving an add, subtract, or comparison command word from a memory, said command word being arranged in the memory with the address of a first operand available in advance of the following operand word by an amount corresponding to the address of a first operand, a second circuit for entering said first operand into a register and then for initiating shifting of said operand to apply said operand to said adder-subtracter, a third circuit for reading in a second operand simultaneously with the shifting of said first operand, said second operand being applied to a second input of said adder-subtracter, and a fourth circuit for detecting the state of said flip-flop at the beginning of the last word of computation in order to determine the sign of the result derived from said adder-subtracter, the sign being given a particular value for all zero results.

25. In a high-speed arithmetic system for digital control wherein the most frequent arithmetic operations are performed in two serial word time intervals, the system including A, S, and C registers, each including a plurality of storage stages corresponding to the number of digits in the operands to be operated upon, an arrangement for incorporating logical circuits for serial-parallel binary multiplication upon first and second operands (*a*) and (*b*) stored in the memory of the system so that products may be formed in the usual two word time intervals, said arrangement comprising: first means for transferring a first operand (*a*) from said memory into said A register to provide a parallel presentation thereof; second means forming a series of full adders, one for each stage of said S register, said full adders receiving signals from said A register in respective digital places; means for producing digit signals representing said operand (*b*); a first series of circuits for applying the sum output signal of each full adder circuit to the following S register stage in the next lower digital place whenever the operand (*b*) digit signal represents a binary one and for applying the signal of each S register stage to the next lower place stage whenever the digit signal of operand (*b*) is zero; and a second series of circuits for entering the carry signals for each full adder in said S register into the corresponding digital place C register stage when said (*b*) operand digit signals are one, and for interconnecting said C register into a shifting register when said (*b*) operand digit signals are zero.

26. In the system of claim 25 wherein there is further included a first control circuit for reading in a multiplication command word signal set, the address signals of the multiplicand in said command word being available in advance of the following operand word time interval to allow the reading in of said multiplicand signals into said A register while completing the reading of said command word, said system further including a control circuit for reading out the multiplier signals, constituting said second operand, to control the shifting of said S and C registers; and means for reading out the product from said S register while simultaneously initiating the reading in of a new command word signal set, thereby permitting a series of multiplication operations to be performed during successive two-word-time intervals.

27. In a computing system wherein serial division is performed by entering the dividend signals or first partial remainder signals into a first shifting register and the divisor signals into a second shifting register, each of said registers being recirculated for successive additions and subtractions upon the operands entered therein, the division being performed in accordance with a non-restoring sequence wherein successive additions or subtractions of said divisor signals are performed after the formation of quotient digit signals of zero and one, respectively, a combination of logical circuits for performing non-restoring square root wherein number signals to be rooted are entered into said first register and successive additions and subtractions are performed in a non-restoring manner between the first register number signals and variable number signals formed in said second register, said combination comprising: first means associated with said second register actuable to an "on" state at the beginning of a square root operation; second means responsive to the signals shifted toward the least significant end of said second register for producing an "on" signal marking the occurrence of the first "on" digit signal in said second register; third means for turning "off" said first means upon the detection of said first "on" signal of said second means; and fourth means responsive to the "off" signal of said first means and to said first "on" signal of said second means for performing a triplet insertion into said second register to replace said first "on" digit signal with a digit signal having the value of the previously formed root digit signal, to replace the digit signal advanced one digital place ahead of said first "on" digit signal with a digit signal having a value equal to the complement of said previously formed root digit signal, and to enter the digit signal advanced two places from said first digit signal as an "on" digit signal.

28. In the computing system of claim 27 wherein there is further included a first control circuit for reading in a square root command word signal in advance of the operand position for the number signals to be rooted, the advancement being sufficient to identify the address of said number signals to be rooted, a second control circuit for entering the first "on" digit signal into said second register corresponding to a first root subtrahend signal set, and a third control circuit for reading out the square root result signals while simultaneously initiating the reading in of the next command word signal set.

29. A control system for a computer including a serial memory device having a plurality of storage channels identified by respective addresses wherein operand and result signals are stored and wherein command signal sets are stored containing code signals representing an operation to be performed, the address in said memory for operands for said operation, and the address for storing the result of said operation, said command signal sets being arranged in said memory so that the address signals for the first operand for said operation are available in serial memory time before the corresponding operand signals must be transferred from the corresponding channel to said computer, said control system comprising: first means for transferring said first operand address signals to said memory device to control the transfer of said first operand signals to said computer; second means responsive to command signals representing the address of the second operand for controlling the transfer of the corresponding second operand signals to said computer; third means responsive to said operation code signals in said command signal sets for controlling said computer to perform said operation upon said operands; fourth means for transferring the address for the result signals of an operation to said memory; and fifth means for synchronizing the operation of said first and fourth means to cause the transferring of the result signals of one operation to said memory while simultaneously transferring the first operand signals from said memory to said computer.

30. The control system defined in claim 29 wherein said fifth means further includes a timing control circuit for producing a signal a command word time signal having an "on" period corresponding to the interval for reading a command word signal set from the memory.

31. The control system defined in claim 30 wherein certain command word signal sets include signals representing a new memory channel for locating subsequent command signal sets, each of said certain command word signal sets also including a waiting time code specifying the interval of time following the completion of an operation specified by the command signal set before the next command signal set will become available on the new memory channel, and wherein circuits are further included for delaying the turning on of said command word time signal for a predetermined waiting time interval corresponding to the time interval specified by said waiting time code.

32. The control system defined in claim 31 wherein said circuits for delaying the turning on of said command word time signal are arranged to sense a first waiting time code signal set to control the transfer of command words signal sets to said computer until a second identifying code signal set is located in a command word signal set.

33. The control system defined in claim 30 wherein there is further included a shift control circuit for applying the result signals of an operation to an adder-subtracter to recomplement the result signals if in complementary form, said shifting control circuit receiving the output signals of said adder-subtracter and becoming operative upon the sensing of the first non-zero result digit signal, the failure of any non-zero result digit signal to be sensed indicating a zero result.

34. The control system defined in claim 30 wherein said first operand signals represent a multiplicand and said second operand signals representing a multiplier are employed to control the addition of the multiplicand signals, and wherein said fifth means is operative to control the transfer of product result signals produced in multiplication to said memory while simultaneously transferring new first operand signals to said computer.

35. The control system defined in claim 30 wherein said first operand signals represent a number to be rooted, and wherein means are further included for shifting said first operand signals from the register into which entered into a second register for storing a succession of partial remainder signals, said system also including a third register for receiving a first one-representing digit signal corresponding to a first root subtrahend and for receiving successive root subtrahend signals to be combined with the partial remainder signals in said second register; and said control system including means for entering the root digit signals of the result into said first register and for shifting the complete result signals produced in said first register into said second register, the signals of which are transferred to said memory under the control of said fifth means.

36. A control system for selecting and arranging operand signals stored in a memory associated with a computer, said control system comprising: first means for controlling the transfer of command word signal sets from said memory to said computer, each command word signal set containing a plurality of address signals representing the location of operands stored in said memory, the address signals being made available before the beginning of the corresponding operand signals; second means for transferring the operand signals specified by said address signals to said computer during the time the remainder of the command word signal set is transferred to said computer; third means for producing a computing-time control signal specifying a computing interval to commence following the transfer of the first operand signals and the associated command signal set to said computer; fourth means operable in response to said computing-time control signal for transferring other operand signals in said memory from a first location in said memory specified by second address signals in the corresponding command word signal set to a second location in said memory specified by third address signals in said corresponding command word signal set; and fifth means responsive to fourth address signals in said corresponding command word signal set for transferring result signals produced in the operation of said computer to said memory while simultaneously controlling the transfer of new operand signals from said memory to said computer, the address of said new operand signals being specified by the next command word signal set read from said memory.

37. The control system defined in claim 36 wherein said first means includes a timing device for producing a timing signal defining the period for transferring said command word signal sets to said computer and wherein certain of said command word signal sets contain wait-time signals representing the time interval which must lapse following the completion of one operation before the next command word signal set is to be transferred from said memory to said computer, said system further including a program transfer control circuit for delaying the actuation of said timing device so that said timing signal is not produced until a period of time passes corresponding to the time interval specified by said wait-time signals.

38. The control system defined in claim 37 wherein a command word signal set may specify a sense operation and may contain internal code signals indicating which external code signals are to be sensed and said program transfer control circuit includes means for controlling a sense operation in response to command word signals so specifying, said system further including means for comparing the external code signals with the internal code signals, respectively, for each command word signal set specifying said sense operation, and for producing a program transfer control signal upon detecting the respective correspondence between said code signals, said program transfer control signals being utilized to actuate said first means to transfer the next command word signal set to said computer after said waiting-time interval.

39. The control system defined in claim 36 wherein a command word signal set may include a first wait-time code signal set, and another command word signal set in another memory location then contains a second wait-time code constituting an identification code, said first means includes a timing device and a circuit associated therewith for turning timing device on to select successive command word signal sets after receiving said first wait-time code signal set, said first means further including circuits for turning said timing device on for successive selection of command word signal sets until detection of said second wait-time code constituting said identification code, said first means being then operable to transfer the next command word signal set to said computer to control the next operation.

40. The control system defined in claim 36 wherein said first means includes a first timing device actuable to an "on" state in advance of the completion of the next-to-last word of each operation by an amount of time corresponding to the time required to read the address of the first operand, wherein said second means includes a second timing device actuable to an "on" state at the beginning of the last word of an operation corresponding also to the operand read-in period of the next operation, and wherein said third means includes a third timing device actuable to an "on" state at the end of the word period designated by said second timing device and actuable to an "off" state after a period of one word time.

41. The control system defined in claim 36 wherein the first operand signals transferred to said computer represent a multiplicand, said system including a first register for receiving said first operand signals under the control of said second means, wherein said third means includes circuits for controlling the transfer of second operand signals constituting the multiplier to said computer at the beginning of said computing interval, said second operand signals controlling the parallel addition of said first operand signals in said register, and wherein said fifth means is operable to transfer product signals resulting from multiplication to said memory while simultaneously transferring new first operand signals to said computer.

42. The control system defined in claim 36 wherein the first operand signals representing a number which is to be rooted, are entered into a first register, said second means being operable to control the entry of first root subtrahend signals into a second register for combination with successive partial remainder signals to form a series of root digit signals entered into said first register, and said fifth means is operable to transfer the root signals resulting from the operation to said memory while simultaneously transferring new first operand signals to said computer.

43. In a high-speed digital control system wherein ordinary arithmetic operations are performed in accordance with command word signal sets arranged for successive reading from a serial memory channel, the selection of a different command memory channel being accomplished through a program transfer operation, the command word signal sets of the system being of first and second types, the first type of command word signal set specifying the ordinary arithmetic operation and including channel address signals for operand and result signals and the second type of command word signal set specifying the program transfer and including new command address signals designating the channel for reading the next series of command word signals of the first type; a circuit for translating the two types of command signal sets into control signals, said cricuit comprising: first means for selecting each command word signal set in accordance with the command address signals of the previous command of the second type, and for storing the selected command word signal set; second means associated with said first means for translating predetermined portions of each command word signal set of said first type to produce first control signals defining an ordinary arithmetic operation; third means associated with said first means for translating predetermined code portions of command word signal sets of the second type into second control signals specifying the time to wait before reading in the next command word signal set and the new channel address signals; and fourth means responsive to said first control signals for performing the ordinary arithmetic operation, and responsive to said second control signals.

44. The circuit defined in claim 43 wherein said first means includes a storage register for receiving code signals "n" representing said new channel address code signals "n" being entered into said register upon completion of the operation of said fourth means in determining said program transfer condition.

45. The circuit defined in claim 44 wherein a command word signal set may include first code signals specifying a channel scanning operation as part of a program transfer, and a second command word signal set then contains identification code signals, and said third means includes a device responsive to a said first code signals for controlling a channel scanning operation to locate the command word signal set containing said identification code signel, the time of scanning corresponding to the desired time to wait following the completion of the previous operation before reading in the next command word signal set.

46. The circuit defined in claim 43 wherein a command word signal set may include code signals specifying a sense operation wherein internal code digits in the command word signal set are utilized to control the sensing of external code signals, and wherein said fourth means is arranged to define a program transfer operation based upon the sensing of said external code signals in accordance with said internal code signals, said fourth means including a comparison device for detecting correspondence between said internal and external code signals and for indicating satisfaction of the program transfer condition upon detection of correspondence therebetween.

47. The circuit defined in claim 43 wherein said command word signal sets of the first type each include channel address signals for data rearrangement to be performed during the arithmetic operation, one set of address signals specifying the memory location of data signals to be transferred, and the other set of address signals specifying the location in memory for storing the data signals to be transferred and wherein said first means includes a first timing device actuable to an "on" state prior to the end of the next-to-last word of operation by an amount corresponding to the time length of the address of a first operand, wherein said fourth means includes a second timing device for indicating a computing time interval and wherein said circuit further includes fifth means for controlling the transfer of said data signals to accomplish said data rearrangement contemporaneously with the performance of the computing operation during the interval designated by said second timing device.

References Cited in the file of this patent

UNITED STATES PATENTS

| | | |
|---|---|---|
| 2,636,672 | Hamilton | Apr. 28, 1953 |
| 2,679,638 | Bensky et al. | May 25, 1954 |
| 2,767,908 | Thomas | Oct. 23, 1956 |
| 2,776,418 | Townsend | Jan. 1, 1957 |
| 2,777,634 | Williams et al. | Jan. 15, 1957 |
| 2,777,635 | Tootill et al. | Jan. 15, 1957 |
| 2,785,388 | McWhirter et al. | Mar. 12, 1957 |
| 2,799,449 | Turing et al. | July 16, 1957 |
| 2,895,671 | St. Johnston | July 1, 1959 |
| 2,935,259 | Bird et al. | May 3, 1960 |
| 2,939,120 | Estrems et al. | May 31, 1960 |
| 2,947,976 | Mendelson et al. | Aug. 2, 1960 |

FOREIGN PATENTS

| | | |
|---|---|---|
| 1,106,950 | France | Dec. 27, 1955 |

OTHER REFERENCES

McPherson et al.: "Performance of the Census UNIVAC System, pages 16 to 22, Joint AIEE–IRE Computer Conference, Dec. 10–12, 1951.

Davis: "The Use of Electronic Data Processing Systems in the Life Insurance Business," pages 11 to 18, Proc. of the Eastern Joint Computer Conference, Dec. 8–10, 1953.

Smagorinsku: "Data Processing Requirements for the

(Other references on following page)

OTHER REFERENCES

Purposes of Numerical Weather Prediction," pages 22 to 30, Proc. of the Eastern Joint Computer Conference, Dec. 8–10, 1953.

Finkelstein: "Small Computers and Automatic Optical Design," pages 81 to 85, Proc. of the Eastern Joint Computer Conference, Dec. 8–10, 1954.

Whitby: "The Automatic Handling of Business Data," pages 75 to 79, Proc. of the Western Joint Computer Conference, Feb. 11, 12, 1954.

Bennett et al.: "Electronics in Financial Accounting," pages 26 to 32, Proc. of the Eastern Joint Computer Conference, Nov. 7–9, 1955.

Eckert et al.: "The UNIVAC System," pages 6 to 16, Joint AIEE–IRE Computer Conference, Dec. 10–12, 1951.

UNITED STATES PATENT OFFICE

CERTIFICATE OF CORRECTION

Patent No. 3,070,304 December 25, 1962

Lowell D. Amdahl et al.

It is hereby certified that error appears in the above numbered patent requiring correction and that the said Letters Patent should read as corrected below.

Column 4, line 34, for "is" read -- as --; column 9, line 17, after "operation" insert -- occurring --; column 24, line 67, for the indistinct words read -- Address for operand --; line 69, for "REGISTER" read -- A REGISTER --; column 26, line 21, for "Wt2-Wtn1" read -- Wt2-Wtn-1 --; column 33, line 7, for "operated" read -- operand --; column 35, line 65, for "C31" read -- CX1 --; column 37, line 70, for "froming" read -- forming --; column 38, line 23, for "operation" read -- operations --; column 39, line 54, for "is" read -- in --; column 41, line 41, for "Y72=" read -- Y73= --; column 50, line 67, for "AẊ2=DO" read -- AX2k=DO --; column 67, line 32, for ".X.3′" read -- .Ẋ3′ --; column 71, lines 54 and 55 should appear as shown below instead of as in the patent:

X1.E1′+X2.E2+X3.E3′+Ẋ4.E4′+X9.E5′+X10.E6′+Ẋ11.E7′ column 72, line 9, after "condition" insert a period; column 91, line 49, for "(T11+T13)" read -- .(T11+T13) --; column 94, line 69, second line of the equation should appear as shown below instead of as in the patent:

X2j=X2k=M4.X17′.X1′X3j=X3k column 96, line 53, for "one" read -- zero --; column 97, line 41, for "appliaction" read -- application --; line 58, for "An′.Cn" read -- An.Cn --; column 101, line 47, for "cotnrols" read -- controls --; column 104, line 59, for "to", first occurrence, read -- in --; column 105, line 49, for "unusual" read -- usual --; column 112, line 10, for "singals" read -- signals --; column 115, line 21, strike out "signal", first occurrence; column 117, line 69, after "signals" insert -- for determining any program transfer conditions --; column 118, lines 8 and 9, for "signel" read -- signal --.

Signed and sealed this 12th day of May 1964.

(SEAL)
Attest:

ERNEST W. SWIDER
Attesting Officer

EDWARD J. BRENNER
Commissioner of Patents